(12) United States Patent
Hadad et al.

(10) Patent No.: US 12,180,742 B2
(45) Date of Patent: Dec. 31, 2024

(54) NITINOL BELLEVILLE ELASTIC NONLINEAR (NI-BELLE-E-N) STRUCTURAL ASSEMBLY

(71) Applicant: University Of Cincinnati, Cincinnati, OH (US)

(72) Inventors: Alireza Asgari Hadad, Cincinnati, OH (US); Patrick Fortney, Cincinnati, OH (US); Bahram Shahrooz, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 326 days.

(21) Appl. No.: 17/654,473

(22) Filed: Mar. 11, 2022

(65) Prior Publication Data

US 2022/0290458 A1 Sep. 15, 2022

Related U.S. Application Data

(60) Provisional application No. 63/160,709, filed on Mar. 12, 2021.

(51) Int. Cl.
| | | |
|---|---|---|
| *E04H 9/00* | (2006.01) | |
| *E04H 9/02* | (2006.01) | |
| *F03G 1/02* | (2006.01) | |

(52) U.S. Cl.
CPC ......... *E04H 9/0237* (2020.05); *E04H 9/0215* (2020.05); *E04H 9/028* (2013.01); *E04H 9/00* (2013.01); *F03G 1/029* (2021.08)

(58) Field of Classification Search
None
See application file for complete search history.

(56) References Cited

U.S. PATENT DOCUMENTS

| | | | | |
|---|---|---|---|---|
| 3,748,108 A | * | 7/1973 | Rothwarth et al. | ..... B32B 15/01 428/656 |
| 6,422,010 B1 | * | 7/2002 | Julien | ................... F01D 25/005 60/527 |

(Continued)

FOREIGN PATENT DOCUMENTS

| | | | | |
|---|---|---|---|---|
| CN | 114562052 A | * | 5/2022 | |
| JP | 4729134 B1 | * | 7/2011 | ............... E04B 1/98 |

(Continued)

OTHER PUBLICATIONS

Qiu, et al., Seismic upgrading of multistory steel moment-resisting frames by installing shape memory alloy braces: Design method and performance evaluation, Struct. Control Health Monit. 2020;27:e2596 (19 pages).

(Continued)

*Primary Examiner* — Phi D A
(74) *Attorney, Agent, or Firm* — Wood Herron & Evans LLP

(57) ABSTRACT

A structural assembly and a structural bracing system including the structural assembly are presented. The structural assembly includes Belleville disks and shape memory alloy (SMA) rods with nonlinear elastic behavior (e.g., Nitinol rods) to resist lateral force. Stacked Belleville disks are placed between plates resulting in nonlinear elastic behavior in compression. Shape memory alloy rods are placed at the corners of the plates and held by nuts at the exterior faces of the plates. The rods are loose when a compression load is applied to the plates and will work in tension when a tensile load is applied to the plates. A shaft (e.g., steel tube) is placed at the center of the Belleville disks to stabilize the assembly. Addition of the assembly with nonlinear elastic behavior in both tension and compression (Continued)

loadings to a structural bracing system improves the structural behavior of the bracing system.

20 Claims, 74 Drawing Sheets

(56) References Cited

U.S. PATENT DOCUMENTS

| | | | | |
|---|---|---|---|---|
| 8,497,590 | B2* | 7/2013 | Williams | F03G 7/10 |
| | | | | 290/1 E |
| 9,677,274 | B2 | 6/2017 | Saiidi | |
| 2007/0138720 | A1* | 6/2007 | Evans | F16F 1/32 |
| | | | | 267/162 |
| 2011/0049777 | A1* | 3/2011 | Evans | F16F 1/32 |
| | | | | 267/162 |
| 2015/0308106 | A1* | 10/2015 | Hayes | E04H 9/0237 |
| | | | | 52/167.1 |
| 2016/0265217 | A1* | 9/2016 | Hayes | E04B 1/1903 |
| 2017/0335588 | A1* | 11/2017 | Douglas | E04H 9/0215 |
| 2018/0155949 | A1* | 6/2018 | Zarnani | E04H 9/021 |

FOREIGN PATENT DOCUMENTS

| | | | | |
|---|---|---|---|---|
| RU | 2648393 | C1 | 3/2018 | |
| WO | WO-2007020801 | A1 * | 2/2007 | E04H 9/02 |
| WO | WO-2018160058 | A1 * | 9/2018 | |

OTHER PUBLICATIONS

Shi et al., Influence of shape memory alloy brace design parameters on seismic performance of self-centering steel frame buildings, Struct. Control Health Monit., 2020;27:e2462 (18 pages).

Fang et al., Shape Memory Alloys for Seismic Resilience, Chapter 4, Self-centering Braces with SMA Elements, Springer Nature Singapore Pte. Ltd. 2020, p. 147-177.

Fang et al., Shape Memory Alloys for Seismic Resilience, Chapter 2, Shape-Memory Alloy Elements, Springer Nature Singapore Pte. Ltd. 2020, p. 43-96.

Miller, et al., Self-Centering Buckling-Restrained Braces for Advanced Seismic Performance, Structures Congress, 2011, © ASCE 2011 (11 pages).

Xu et al., Development and validation tests of an assembly self-centering energy dissipation brace, Soil Dynamics and Earthquake Engineering 116 (2019) p. 120-129.

Westenenk, et al., Self-Centering Frictional Damper (SCFD), Engineering Structures 197 (2019) 109425 (19 pages).

Xu et al., Development and experimental study of a self-centering variable damping energy dissipation brace, Engineering Structures 160 (2018), p. 270-280.

Dong et al., Performance of an innovative self-centering buckling restrained brace for mitigating seismic responses of bridge structures with double-column piers, Engineering Structures 148 (2017), p. 47-62.

Jalaeefar et al., Experimental Investigation of Mechanical Properties of Nitinol, Structural Steel, and Their Hybrid Component, Journal of Materials in Civil Engineering © ASCE 2013, 25(10), p. 1498-1505.

Menna et al., Shape Memory Alloy Engineering, Chapter 13, Applications of Shape Memory Alloys in Structural Engineering, 2015, ISBN 978-0-08-099920-3, p. 369-403.

Jalaeefar et al., Seismic Assessment of Innovative Hybrid Bracing System Equipped with Shape Memory Alloy, 15 WCEE, Lisboa 2012 (9 pages).

* cited by examiner

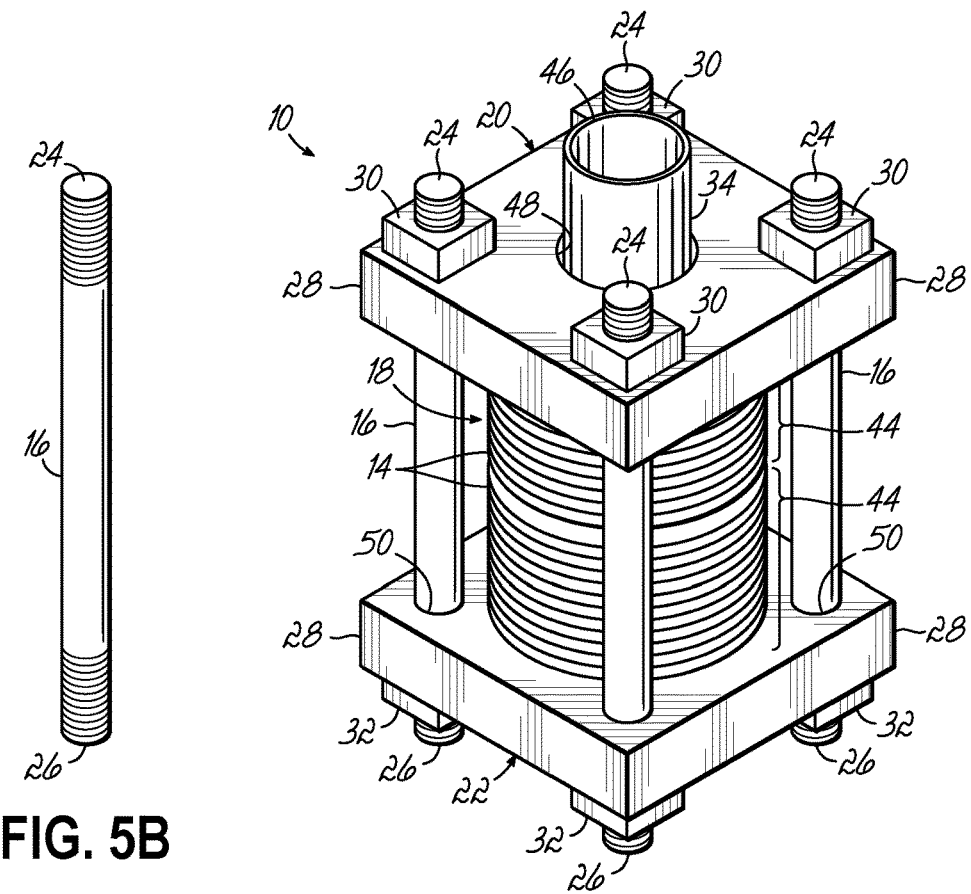
FIG. 5B
FIG. 6A
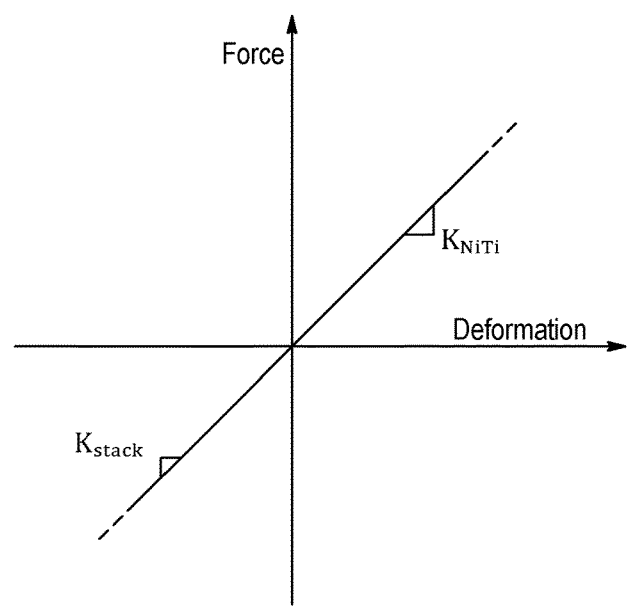
FIG. 6B

NITINOL BELLEVILLE ELASTIC NONLINEAR (NI-BELLE-E-N) STRUCTURAL ASSEMBLY

CROSS-REFERENCE TO RELATED APPLICATIONS

This application claims priority to, and the benefit of the filing date of, U.S. Provisional Application No. 63/160,709 filed on Mar. 12, 2021, the entire contents of which are hereby incorporated by reference.

TECHNICAL FIELD

This application relates generally to structural resiliency, and, more particularly, to seismic control technologies and methodologies.

BACKGROUND

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that these statements are to be read in this light, and not as admissions of prior art.

Due to the growing need of minimizing the economic loss against natural hazards, structural resiliency has emerged as an important research field. In the U.S., a 2014 statement jointly issued by 44 professional associations in the built-environment industry (design and construction stakeholders, owners, and operators) formally recognized that natural and manmade hazards are posing an increasing threat to the safety of the public; and agreed on a resolution to promote resilience in contemporary planning, building materials, design, construction, and operational techniques (AIA (2012), Industry Statement on Resilience. USA, The American Institute of Architects). Collapse prevention limit state, which is a critical component of seismic hazard mitigation, has been advocated by modern design methodologies since the 1960s and been incorporated in most seismic design codes worldwide since the 1970s. This design philosophy is now prevalent worldwide, including the most recent versions of the U.S. codes (ASCE/SEI7-16 (2016), Minimum Design Loads and Associated Criteria for Buildings and Other Structures, American Society of Civil Engineers; IBC-18 (2017), International Building Code, International Code Council, Inc.). However, the recent strong earthquakes worldwide have demonstrated that buildings designed for the collapse prevention limit state experienced extensive nonstructural and structural damage, even when the intensity of the ground shaking was reasonably within the range of the corresponding design spectrum for the site of interest (Kurth, M. H., Keenan, J. M., Sasani, M. and Linkov, I. (2019), "Defining Resilience for the Us Building 612 Industry." Building Research & Information, Vol. 47, No. 4, pp. 480-492; Tena-Colunga, A., Hernandez-Ramirez, H. and de Jesus Nangullasmil-Hernandez, H. (2019), Resilient Design of Buildings with Hysteretic Energy Dissipation Devices as Seismic Fuses. Resilient Structures and Infrastructure, Springer, pp. 77-103).

In order to achieve an efficient and resilient seismic design, the primary structural system, which carries the gravitational loads, should remain essentially elastic after strong earthquakes. At the same time, one typically has a secondary system that would be activated when an earthquake strikes. Furthermore, the structural system should be able to withstand the earthquake ground motions in a stable manner, protecting the primary system to remain essentially elastic or with at most minor damage. This secondary system should be easily replaceable after a strong earthquake, in the event that the developed damage within this system interferes with the functionality of the structure. Therefore, this secondary system acts as a structural "fuse" during the earthquake; it absorbs most of the earthquake energy and, if damaged, it could be easily replaced to minimize interruptions to the building usage (Liu, Y., Guo, Z. Liu, X., Chicchi, R. and Shahrooz, B. (2019), "An Innovative Resilient Rocking Column with Replaceable Steel Slit Dampers: Experimental Program on Seismic Performance." Engineering Structures, Vol. 183, pp. 830-840; Tena-Colunga et al., 2019). To achieve such behavior, novel approaches based on implementing seismic control technologies such as passive, semi-active, and active damping systems have been used. Among the available seismic control methodologies, passive devices represent an advantage over semi-active and active devices, because passive devices do not need an external energy source for their operation. Moreover, they can be easily repaired or replaced after a major seismic event (Soong, T. T. and Costantinou, M. C. (2014), Passive and Active Structural Vibration Control in Civil Engineering, Springer; Aydin, E., Farsangi, E. N., Ozturk, B., Bogdanovic, A. and Dutkiewicz, M. (2019), Improvement of Building Resilience by Viscous Dampers. Resilient Structures and Infrastructure, Springer, pp. 105-127).

A new self-centering device was constructed by Dong et al. (Dong, H., Du, X., Han, Q., Hao, H., Bi, K. Iltang, X. (2017), "Performance of an Innovative Self-Centering Buckling Restrained Brace for Mitigating Seismic Responses of Bridge Structures with Double-Column Piers." Engineering Structures, Vol. 148, pp. 47-62) based on inserting one buckling restrained brace inside the holes of disc springs. The test results indicated the energy dissipation due to friction in compression disks was quite random and it was very difficult to be accurately predicted in the tests. Thus, Dong et al. (2017) did not consider any energy dissipation by compression disks in their physical model for the self-centering device. Xu et al. (Xu, L., Fan, X. and Li, Z. (2017), "Experimental Behavior and Analysis of Self-Centering Steel Brace with Pre-Pressed Disc Springs." Journal of Constructional Steel Research, Vol. 139, pp. 363-373) used pre-pressed disk springs to provide restoring force and added special friction devices to the self-centering steel brace to provide energy dissipation in the bracing system. A non-asbestos-organic friction pad was clamped between stainless steel plates by a high-strength bolt in the special friction device. They applied lubricating oil to the disk springs to reduce the contact friction and suggested to use fewer pieces of disk springs to improve self-centering capability. Although the above procedures simplify the physical model by reducing the frictional action in disc springs, they reduce the total energy dissipation capacity of overall brace. Ding and Liu (Ding, Y. and Liu, Y. (2020), "Cyclic Tests of Assemble Self-Centering Buckling-Restrained Braces with Pre-Compressed Disc Springs." Journal of Constructional Steel Research, Vol. 172, pp. 106229) included frictional actions on overlapped surfaces of stacked pre-compressed disk springs and used them with steel bars and stud bolts to propose a new self-centered buckling restrained brace.

Innovative devices based on superelastic shape memory alloy have been studied by a large number of researchers in base isolators (Dezfuli, F. H. and Alam, M. S. (2013), "Shape Memory Alloy Wire-Based Smart Natural Rubber Bearing." Smart Materials and Structures, Vol. 22, No. 4, pp. 045013), dampers (Parulekar, Y., Kiran, A. R., Reddy, G., Singh, R. and Vaze, K. (2014), "Shake Table Tests and Analytic Simulations of a Steel Structure with Shape Memory Alloy Dampers." Smart materials and structures, Vol. 23, No. 12, pp. 125002.) and bracing systems (Yang, C.-S. W., DesRoches, R. and Leon, R. T. (2010), "Design and Analysis of Braced Frames with Shape Memory Alloy and Energy-Absorbing Hybrid Devices." Engineering Structures, Vol. 32, No. 2, pp. 498-507). According to Gur et al. (Gur, S., Xie, Y. and DesRoches, R. (2019), "Seismic Fragility Analyses of Steel Building Frames Installed with Superelastic Shape Memory Alloy Dampers: Comparison with Yielding Dampers." Journal of Intelligent Material Systems and Structures, Vol. 30, No. 18-19, pp. 2670-2687) these devices outperform other passive devices because they (1) dissipate significant input energy through their flag-shaped hysteresis loops and (2) are able to recover their original shapes after experiencing large tensile strains, which leaves negligible permanent deformation in the structure. Large diameter threaded shape memory alloy bolts were used in connections to achieve a reasonable level of load resistance (Fang, C., Yam, M. C., Lam, A. C. and Xie, L. (2014), "Cyclic Performance of Extended End-Plate Connections Equipped with Shape Memory Alloy Bolts." Journal of Constructional Steel Research, Vol. 94, pp. 122-136; Fang, C., Yam, M. C., Ma, H. and Chung, K. (2015), "Tests on Superelastic Ni—Ti Sma Bars under Cyclic Tension and Direct-Shear: Towards Practical Recentering Connections." Materials and Structures, Vol. 48, No. 4, pp. 1013-1030). Due to fracture susceptibility of such bolts over the threaded area, Fang et al. (Fang, C., Zhou, X., Osofero, A. I., Shu, Z. and Corradi, M. (2016), "Superelastic Sma Belleville Washers for Seismic Resisting Applications: Experimental Study and Modelling Strategy." Smart Materials and Structures; Vol. 25, No. 10, pp. 105013) suggested the net threaded-to-shank area ratio (which decreases the stress demand over the threaded area) be increased to improve the ductility of the bolts.

SUMMARY

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

In one implementation of the invention, a structural assembly is provided. The structural assembly includes an upper plate. The upper plate includes at least one aperture. The structural assembly further includes a lower plate. The lower plate includes at least one aperture, and the lower plate is located a distance below the upper plate. The structural assembly also includes a plurality of Belleville disks. The plurality of Belleville disks is stacked one on top of another to form a stack of Belleville disks. The stack of Belleville disks is located between the upper plate and the lower plate. The structural assembly further includes at least one shape memory alloy rod. An upper end of the at least one shape memory alloy rod is inserted into the at least one aperture in the upper plate. A lower end of the at least one shape memory alloy rod is inserted into the at least one aperture in the lower plate. The at least one shape memory alloy rod spans the distance between the upper plate and the lower plate.

In one embodiment, the upper plate is a rectangular steel plate having four corners. The at least one aperture of the upper plate includes four apertures. Each of the four corners of the upper plate include an aperture. Further, the lower plate is a rectangular steel plate having four corners. The at least one aperture of the lower plate includes four apertures. Each of the four corners of the lower plate include an aperture.

In another embodiment, the stack of Belleville disks is arranged into groups of Belleville disks. The Belleville disks within a group of the groups are arranged in parallel. The groups of Belleville disks may be arranged in series. Specifically, the stack of Belleville disks may include two groups of Belleville disks arranged in series. Each group of the two groups comprising 11 Belleville disks are arranged in parallel, for example. Alternatively, the stack of Belleville disks may include one group of Belleville disks arranged in series. This one group may include 21 Belleville disks arranged in parallel. Further alternatively, the stack of Belleville disks may include two groups of Belleville disks arranged in series. Each group of the two groups may include six Belleville disks arranged in parallel. Even further alternatively, the stack of Belleville disks may include one group of Belleville disks arranged in series. This one group may include 18 Belleville disks arranged in parallel, for example.

In yet another embodiment, the upper end of the at least one shape memory alloy rod extends through the at least one aperture of the upper plate and the lower end of the at least one shape memory alloy rod extends through the at least one aperture of the lower plate. The upper end and the lower end of the at least one shape memory alloy rod may be threaded. An upper nut may be removably fastened to the upper end of the at least one shape memory alloy rod and a lower nut may be removably fastened to the lower end of the at least one shape memory alloy rod.

In a further embodiment, the at least one shape memory alloy rod may include four shape memory alloy rods. The at least one shape memory alloy rod may be a Nitinol rod. Further, the at least one shape memory alloy rod does not carry a load when the structural assembly is in compression and the at least one shape memory alloy rod carries the load when the structural assembly is in tension.

In one embodiment, the assembly further includes a shaft located at a center of the stack of Belleville disks. The stack of Belleville disks surrounds the shaft between the upper plate and the lower plate. The shaft stabilizes the structural assembly. Additionally, the at least one aperture of the upper plate may include a central aperture. The central aperture is located at or near a center of the upper plate. An upper end of the shaft is inserted into the central aperture of the upper plate such that the shaft spans the distance between the upper plate and the lower plate. The shaft may be a hollow steel tube.

In another implementation of the invention, a structural bracing system is provided. The structural bracing system includes a rectilinear frame. The frame includes beam elements operatively connected to column elements. The structural bracing system also includes a plurality of brace elements. The brace elements may be arranged in a chevron orientation and operatively connected to the frame. The structural bracing system may further include at least one structural assembly operatively connected to an end of each of the brace elements. The structural assembly may include an upper plate. The upper plate may include at least four apertures. The structural assembly may also include a lower plate. The lower plate may include at least four apertures and the lower plate is located a distance below the upper plate. The structural assembly then may further include a stack of Belleville disks located between the upper plate and the lower plate. The structural assembly may also include a plurality of Nitinol rods (such as at least four Nitinol rods). An upper end of each Nitinol rod is inserted into an aperture in the upper plate and a lower end of each Nitinol rod is inserted into an aperture in the lower plate. Thus, in a specific embodiment having four Nitinol rods, an upper end of each Nitinol rod is inserted into an aperture of the at least four apertures in the upper plate and a lower end of each Nitinol rod is inserted into an aperture of the at least four apertures in the lower plate.

In one embodiment, the plurality of brace elements may include a compression brace and a tension brace. Both the compression brace and the tension brace may include at least one structural assembly attached to an end thereof.

In another embodiment, the structural assemblies may be operatively connected to both ends of the brace elements. Further, at least one structural assembly may be operatively connected to a gusset plate of the frame via steel C-shaped sections. Additionally, at least one structural assembly may be welded to the brace element.

In yet another embodiment, the structural assembly further includes a shaft located at a center of the stack of Belleville disks. The stack of Belleville disks surrounds the shaft between the upper plate and the lower plate. The shaft stabilizes the structural assembly.

BRIEF DESCRIPTION OF THE DRAWINGS

The accompanying drawings, which are incorporated in and constitute a part of this specification, illustrate embodiments of the invention and, together with the Detailed Description given below, serve to explain the invention.

FIG. 5B is a perspective view of a simulated tensile rod.

FIG. 6A is a perspective view of a first embodiment of a structural assembly (assembly 1).

FIG. 6B is a diagram showing an exemplary stiffness of the structural assembly.

DETAILED DESCRIPTION OF THE INVENTION

The exemplary embodiments described herein are provided for illustrative purposes and are not limiting. Other exemplary embodiments are possible, and modifications may be made to the exemplary embodiments within the scope of the present disclosure. Therefore, this Detailed Description is not meant to limit the scope of the present disclosure.

Figure 10A:
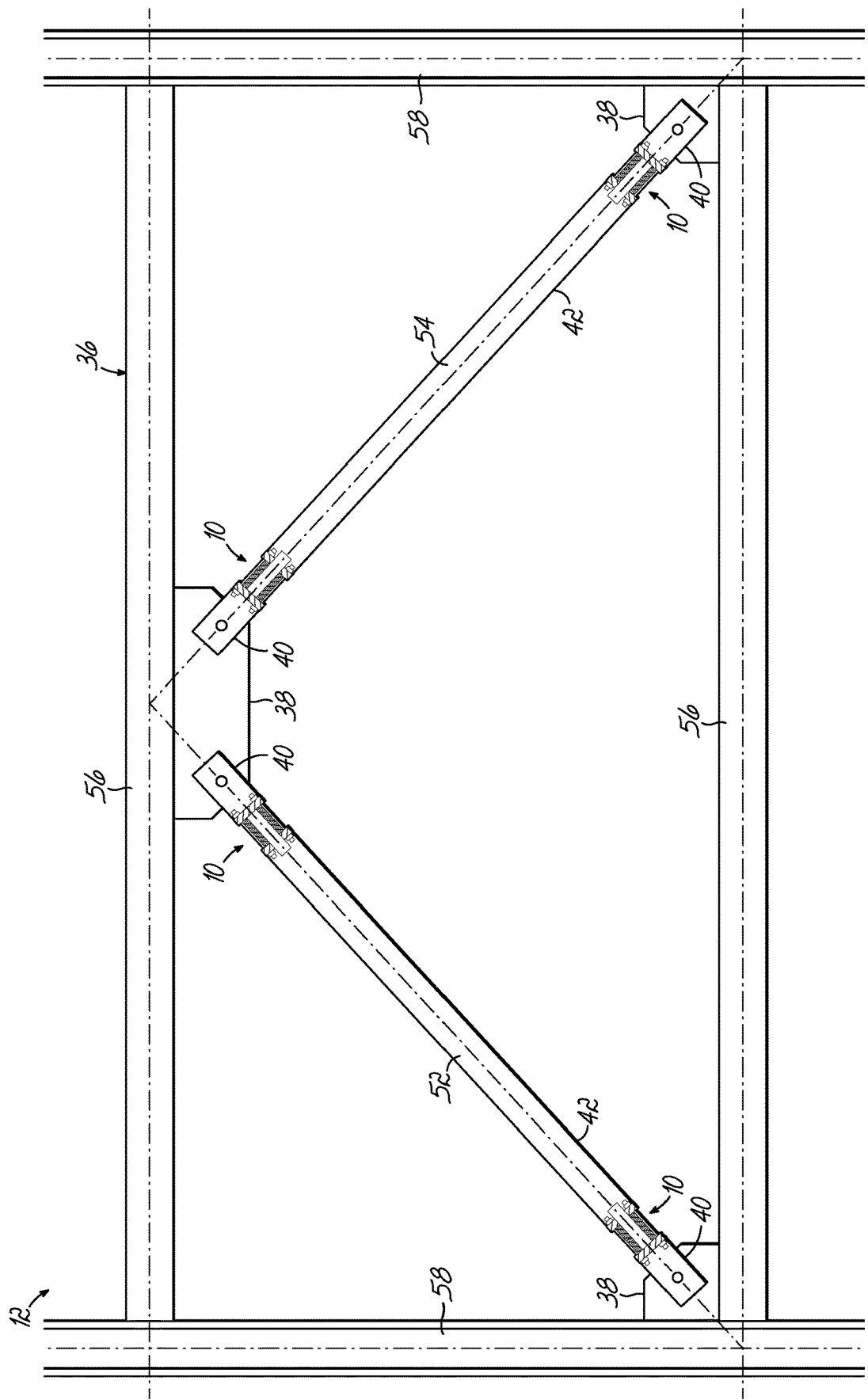
FIG. 10A is a front view of an embodiment of a structural bracing system.
Figure 10B:
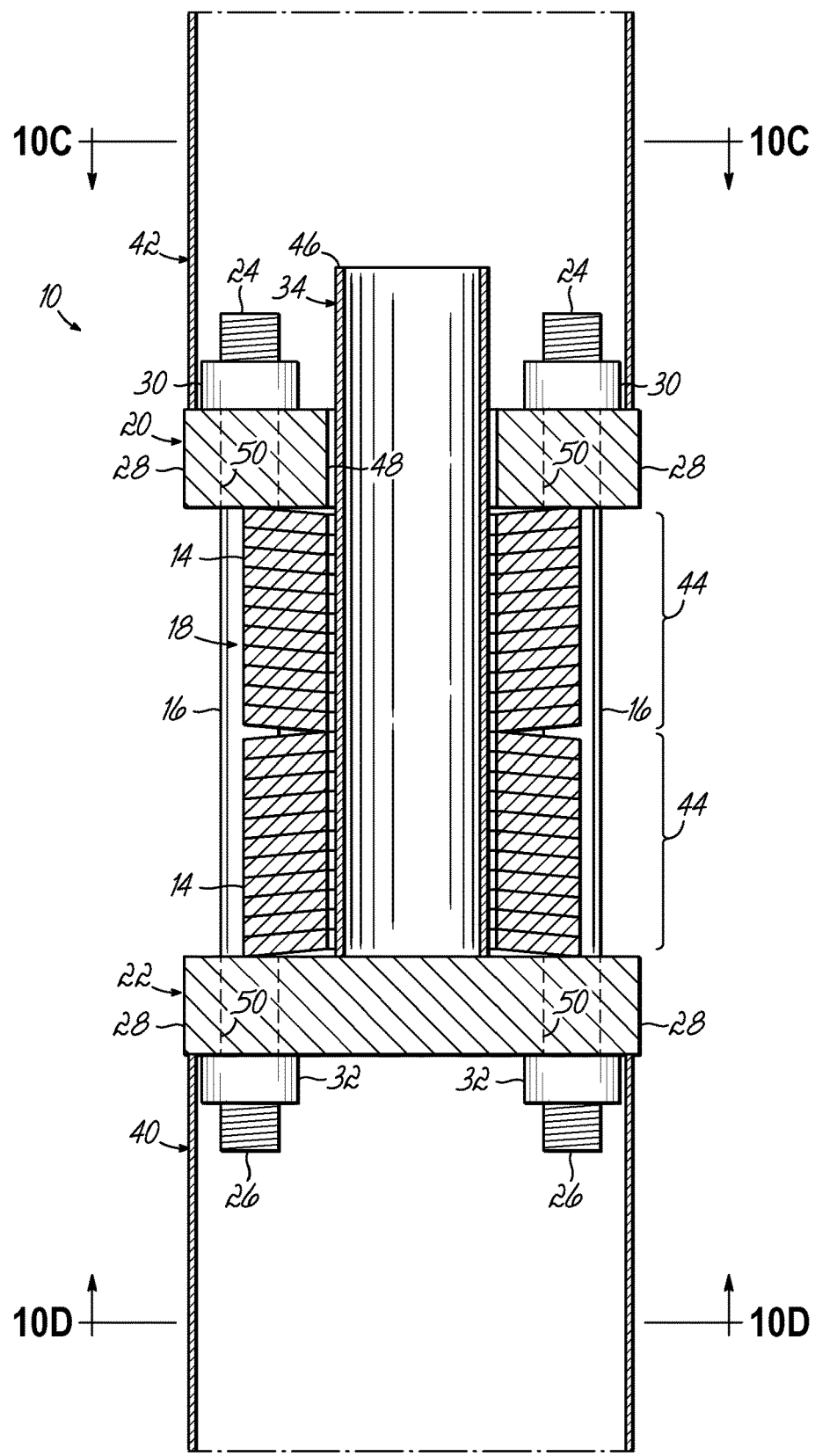
FIG. 10B is a detail view of a portion of FIG. 10A showing the connection of the structural assembly to a brace.
Figure 10C:
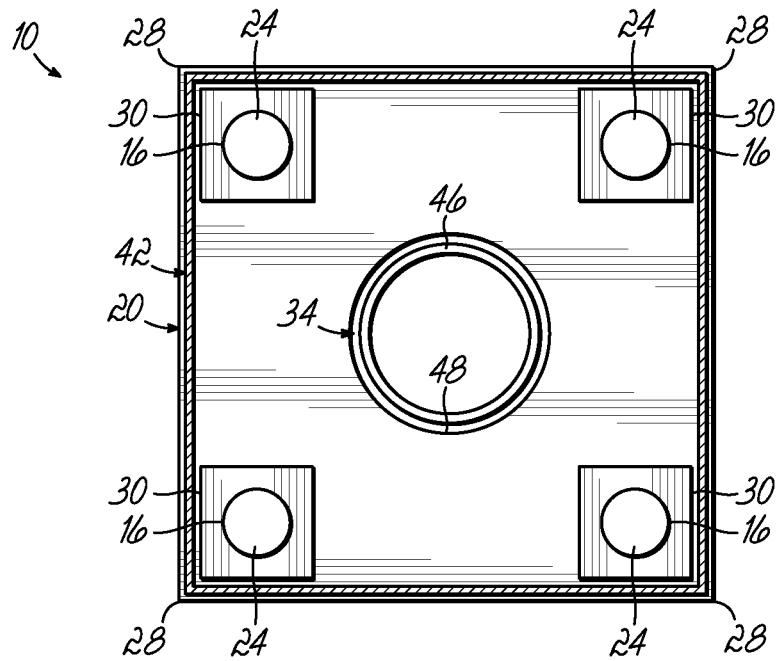
FIG. 10C is a cross sectional view taken along line 10C-10C of FIG. 10B.
Figure 10D:
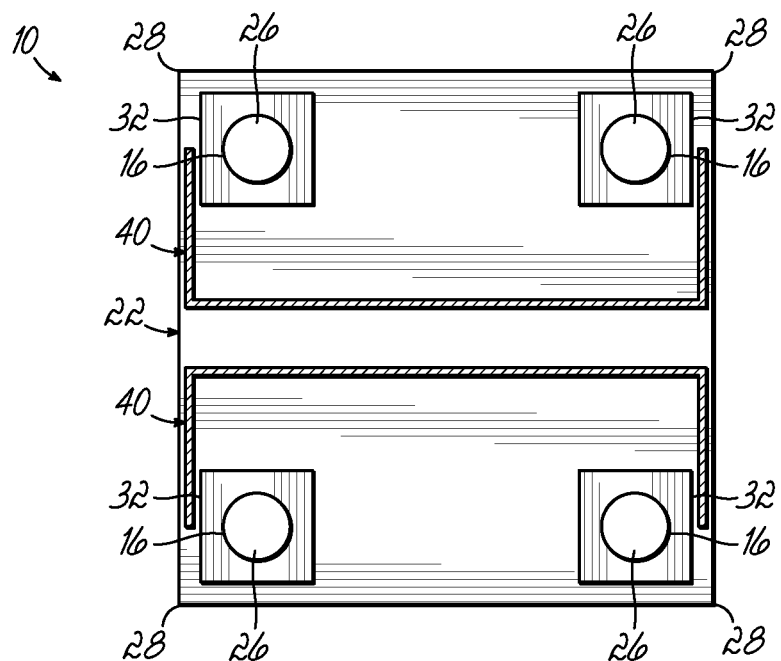
FIG. 10D is a cross sectional view taken along line 10D-10D of FIG. 10B.

Referring to the Figures, various aspects and embodiments of the present invention are shown. Referring at least to FIGS. 6A and 10A, these include a structural assembly 10 and structural bracing system 12 that are based on the assemblage of Belleville disks 14 (also referred to as disk springs, compression disks, or similar) and shape memory alloy rods 16 with nonlinear elastic behavior to achieve a resilient lateral force resistance. In one embodiment, Belleville disks 14 are arranged in a stack 18 and are placed between plates 20, 22 (e.g., steel plates) of the structural assembly 10 to achieve nonlinear elastic behavior in compression. Shape memory alloy rods 16 (e.g., Nitinol rods) with proper threads at ends 24, 26 thereof are placed at the corners 28 of the plates 20, 22 and held by nuts 30, 32 at the exterior faces of the plates 20, 22. The rods 16 are loose when a compression load is applied to the plates 20, 22 and will work in tension when a tensile load is applied to the plates 20, 22. A shaft 34 (e.g., steel tube) is placed at the center of the disks 14 to stabilize the assembly 10. Addition of the structural assembly 10 with nonlinear elastic behavior in both tension and compression loadings to a structural bracing system 12 improves the structural behavior of the bracing system 12. In an embodiment, a structural assembly 10 may be operatively connected on one end to a frame 36 (e.g., a gusset plate 38 of a frame 36) of a structural bracing system 12 through use of two C-shape sections 40 (e.g., made of steel). On an opposing end, the structural assembly 10 may be operatively connected to a brace element 42 of a structural bracing system 12 through welding, for example.

Belleville Disk

Belleville disks, also known as Belleville springs, disk springs, or similar, are conically formed from washers and have a rectangular cross section. The disk spring concept was invented by a Frenchman Louis Belleville in 1865. His springs were relatively thick and had a small amount of cone height or "dish", which determined axial deflection. Coned disc springs are widely used in mechanical systems such as clamping systems, internal combustion engines, clutch and brake systems, and aerospace applications to resist large loads under small deflections. They are compact and can be used for demonstrating various nonlinear load—deflection curves by controlling their dimensions and stacking them in series or parallel. Large coned disc springs are also increasingly being used in base-isolated systems for protection against earthquakes (Ozaki, S., Tsuda, K. and Tominaga, J. (2012), "Analyses of Static and Dynamic Behavior of Coned Disk Springs: Effects of Friction Boundaries." Thin-walled structures, Vol. 59, pp. 132-143).

Figure 1A:
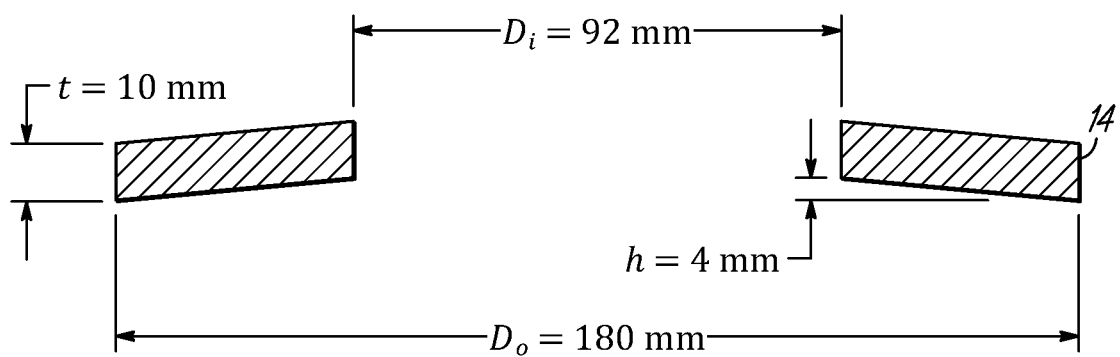
FIG. 1A is a cross sectional view of an embodiment of a Belleville disk.
Figure 1B:
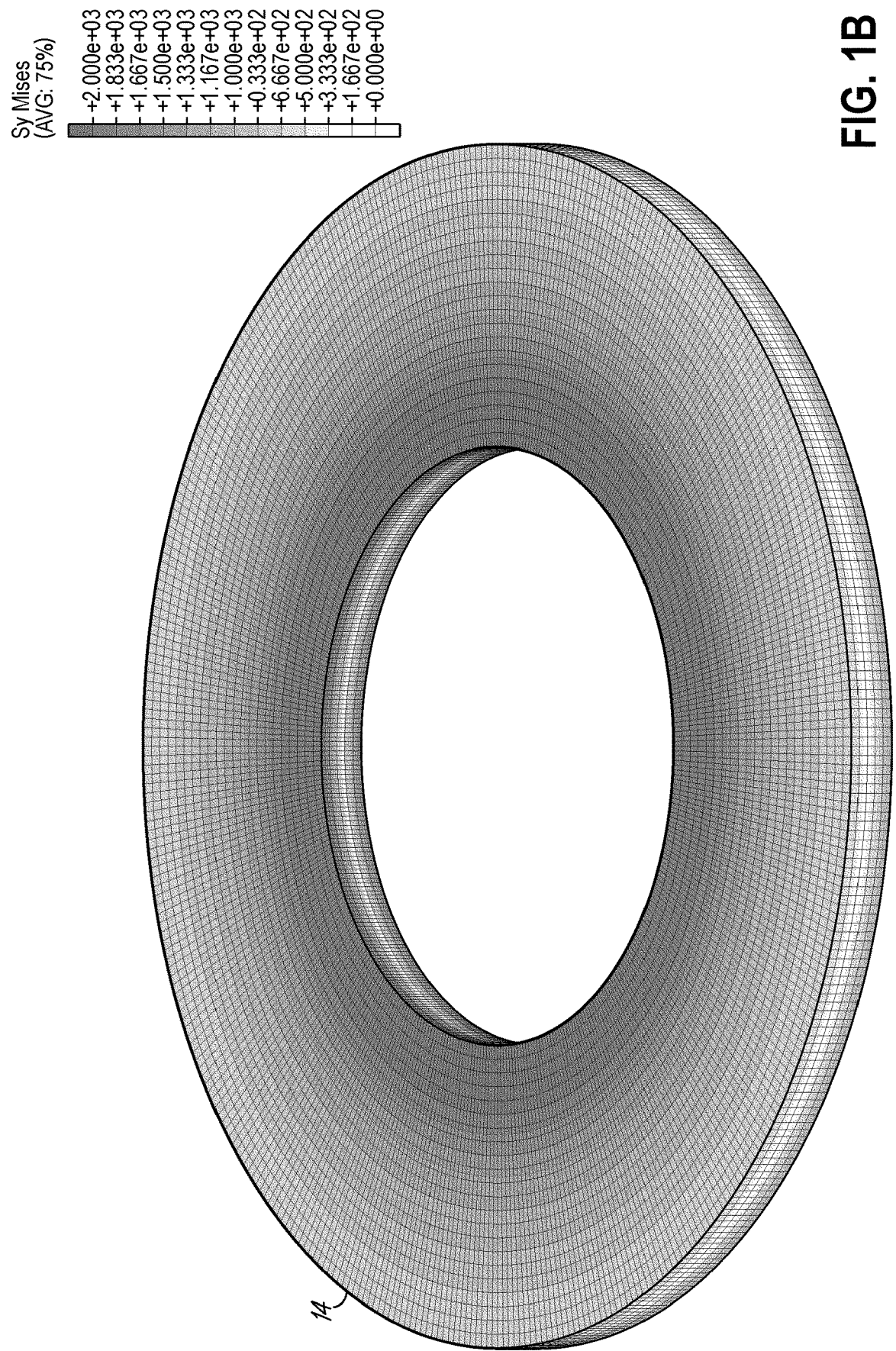
FIG. 1B is a simulated finite element model of the Belleville disk of FIG. 1.

Almen (Almen, J. O. (1136). The Uniform-Section Disk Spring. ASME) derived an equation for the relationship between compressive load F and deflection d of a coned disc spring having thickness t, inner diameter $D_i$, outer diameter $D_o$, and free height h. Almen's equation is shown in Equation (1) in which E is the modulus of elasticity and μ is the Poisson's ratio of the disk material. Mechanical properties of an exemplary disk material are shown below in Table 1. FIGS. 1A (physical) and 1B (simulated) show the configuration of an embodiment of a compression disk 14 with $D_o$=180 mm, $D_i$=92 mm, t=10 mm, h=4 mm. Such a disk 14 was modeled in ABAQUS (Simulia, D. S. (2013), "Abaqus 6.13 User's Manual." Dassault Systems, Providence, RI, Vol. 305, pp. 306) (FIG. 1B) to compare simulation results to those obtained using Almen's equation (Equation (1)).

$$F = \frac{4 \cdot E \cdot d}{(1-\mu^2)K_1 \cdot D_o^2}\left[\left(h-\frac{d}{2}\right) \cdot (h-d) \cdot t + c^3\right] \quad (1)$$

$$K_1 = \frac{\left(\frac{\delta-1}{\delta}\right)^2}{\pi \cdot \left(\frac{\delta+1}{\delta-1} - \frac{2}{\ln\delta}\right)} \text{ where } \delta = \frac{D_o}{D_i} \quad (2)$$

Figure 1C:
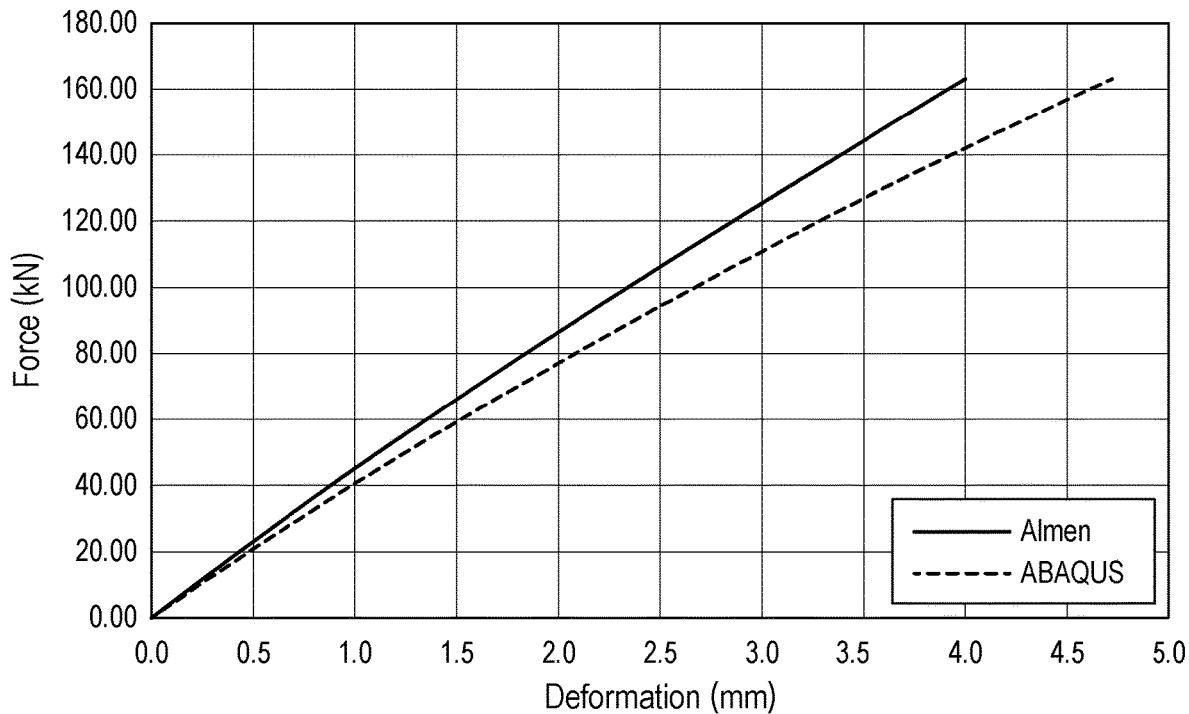
FIG. 1C is a graph showing the force-deformation response of the Belleville disk as determined by simulation (ABAQUS) (FIG. 1B) and through use of Almen's equation (FIG. 1A).

The results of the comparison between the simulation results and the results obtained by Almen's equation (Equation (1)) are shown in FIG. 1C. Almen's equation is widely known for overestimating the compression load for a certain amount of deformation since it is based on the assumption that the loads are concentrically distributed and that the radial stresses are negligible (Ozaki et al., 2012; Zheng, E., Jia, F. and Zhou, X. (2014), "Energy-Based Method for Nonlinear Characteristics Analysis of Belleville Springs." Thin-Walled Structures, Vol. 79, pp. 52-61; Patangtalo, W., Aimmanee, S. and Chutima, S. (2016), "A Unified Analysis of Isotropic and Composite Belleville Springs." Thin-Walled Structures, Vol. 109, pp. 285-295). This trend can be seen in the force-deformation response shown in FIG. 1C. FIG. 1C shows that the difference between the force-deformation response in the simulated results and the results obtained from Almen's equation becomes larger as the applied load increases. It is suggested by some industrial catalogues (Schnorr, A. (2003), "Handbook for Disk Springs.") to use 75% of the disk capacity in design applications due to the better correlation between Almen's equation and experimental results in the mentioned domain. Based on the results, there is approximately a 15% difference between the results when a disk with h/t<1 is loaded up to 65% of its capacity. Thus, only 65% of the disk capacity is used in the design of the structural assembly.

TABLE 1

| Disk material mechanical properties - 51CrV4 (Schnorr, 2003) | |
|---|---|
| Density | 8E-9 gr/cm³ |
| Young modulus | 206 GPa |
| Yield strength | 2000 MPa |
| Poisson's ratio | 0.3 |

Compression disks can be stacked in parallel or series to obtain a certain amount of strength or stiffness. Equations (3) to (6)—below—are used to estimate the force-deformation response of stacked disks. Curti and Montanini (Curti, G. and Montanini, R. (1999), "On the Influence of Friction in the Calculation of Conical Disk Springs") studied the influence of friction on the loading branch of the force-deformation response of compression disks, made out of the same material as is presented in Table 1, both numerically and experimentally. They determined that the average friction coefficient factor on commercial conical disks is equal to 0.14 and observed that the maximum error obtained by using Almen's equation in the evaluation of the disk response is in the range of 2-5% when the friction coefficient factor is 0.14. For n disks arranged in parallel, the following equations are applicable:

$$F_{total} = F \times n \quad (3)$$

$$d_{total} = d \quad (4)$$

F and d are the force and deformation of one disk. For n disks arranged in series the following equations are applicable:

$$F_{total} = F \quad (5)$$

$$d_{total} = n \times d \quad (6)$$

According to Oberg (Oberg, E. (2012), Machinery's Handbook 29th Edition-Full Book, Industrial Press), the parallel and series theory (Equations (3) to (6)) provides accurate results for compression disks with the following ratios: $D_o/D_i$=1.3 to 2.5 and h/t≤1.5.

Figure 2A:
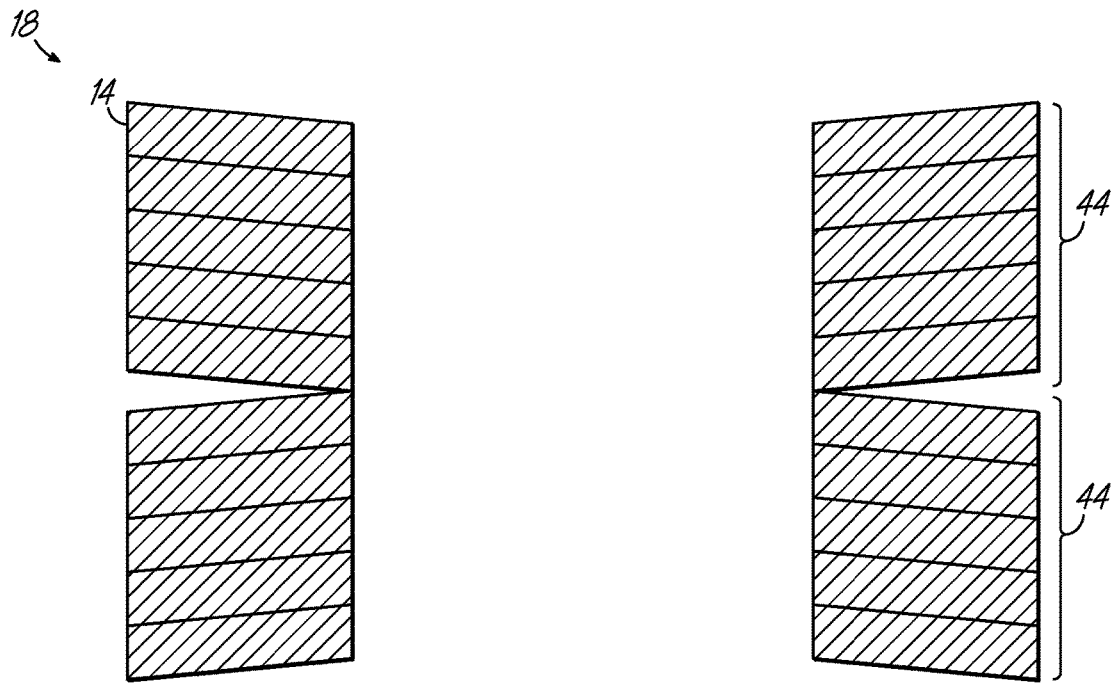
FIG. 2A is a cross sectional view of an embodiment of a stack of Belleville disks showing a group of 5 parallel disks arranged in series with another group of 5 parallel disks.
Figure 2B:
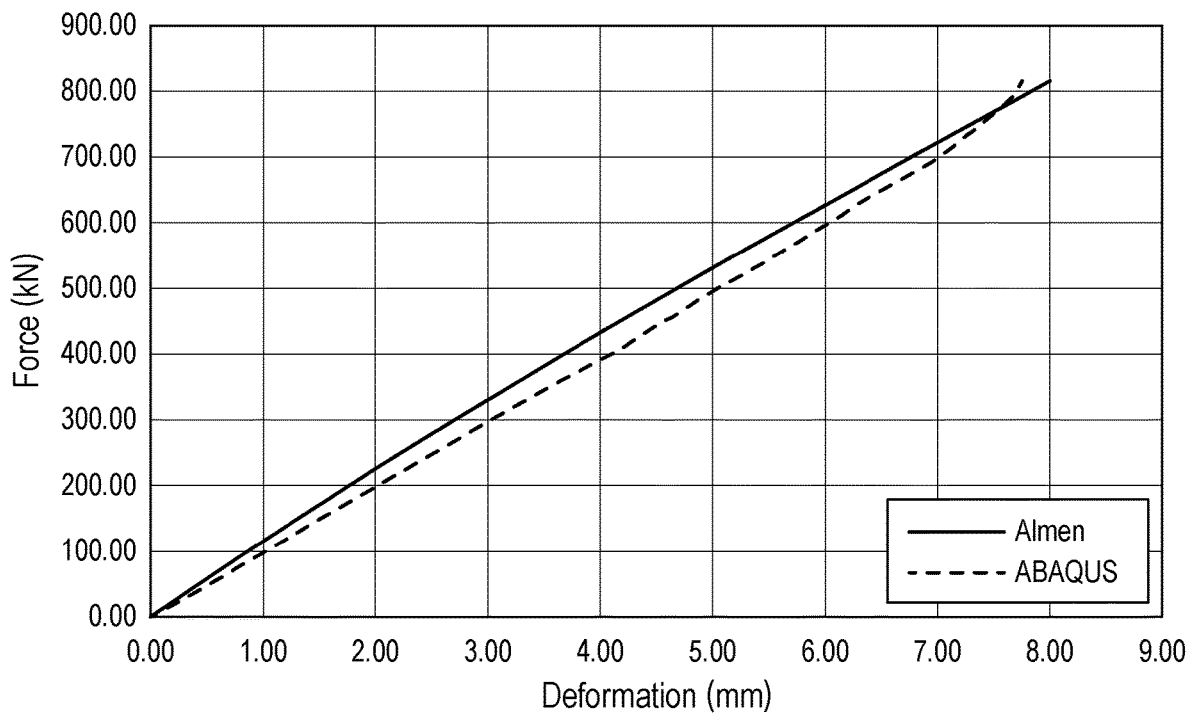
FIG. 2B is a graph showing the force-deformation response of the stack of Belleville disks as determined by simulation (ABAQUS) and through use of Almen's equation (FIG. 2A).

FIG. 2A shows an embodiment of a stack 18 of Belleville disks 14. The depicted embodiment includes 10 disks 14—a group 44 of 5 parallel disks 14 in series with another group 44 of 5 parallel disks. It is to be understood, and will be described later, that the stack 18 of disks 14 can take on several forms and include more or less than 10 disks 14 and that the groups 44 of disks 14 can take on several forms and may be arranged differently than is depicted in FIG. 2A. FIG. 2B compares the finite element simulation (ABAQUS) results to the theoretical results (Almen's equation) for the depicted stack 18 of disks 14. Due to the large amount of contact between adjacent stacked disks 14, the explicit analysis method with the general contact properties were used in ABAQUS simulations (Simulia, 2013). The penalty function algorithm showed acceptable results in earlier studies of force-deformation response of compression disks (Zhu, D., Ding, F., Liu, H., Zhao, S. and Liu, G. (2018), "Mechanical Property Analysis of Disc Spring." Journal of the Brazilian Society of Mechanical Sciences and Engineering, Vol. 40, No. 4, pp. 230). The friction coefficient was taken as 0.14 based on Curti and Montanini (1999). The simulation results of stacked disks (FIG. 2B) are similar to those for single-disk results (FIG. 1C)—with one difference. As the loading reaches the maximum value, stacked disks begin to behave "stiffer" than a single disk. This is attributed to the enhanced stiffening influence of friction between the contact surfaces of adjacent disks as the axial load increases, which does not exist in the case of a single disk.

Shape Memory Alloy

Figure 3:
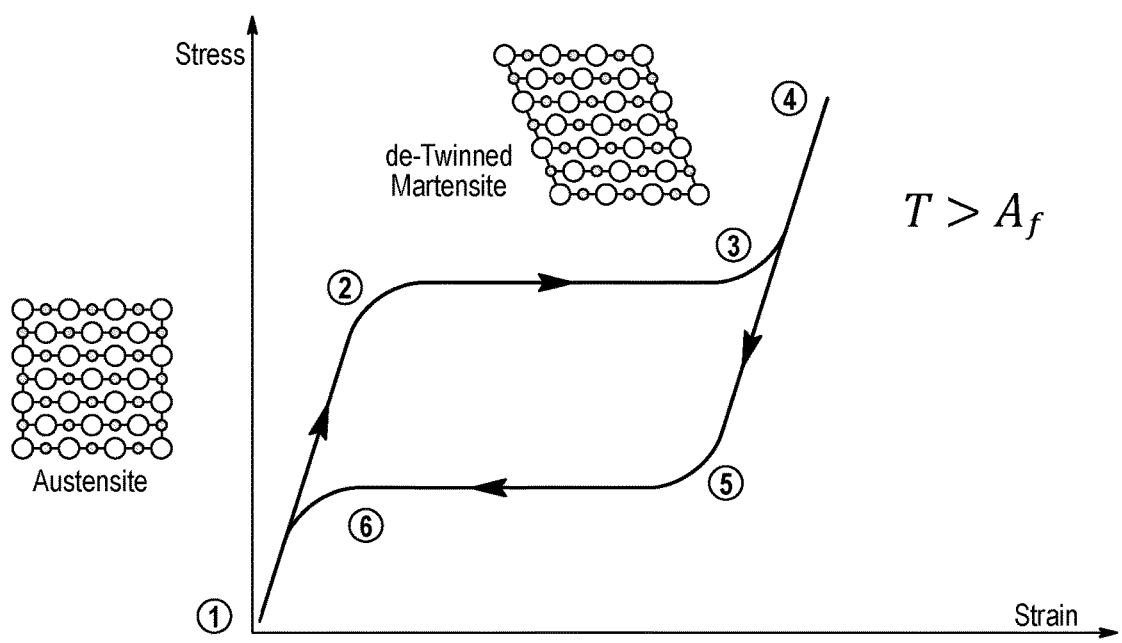
FIG. 3 is a graph showing super elastic behavior.

Shape Memory Alloy (SMA) is a smart material discovered in 1932 by Olander (Olander, A. (1932), "An Electrochemical Investigation of Solid Cadmium-Gold Alloys." Journal of the American Chemical Society, Vol. 54, No. 10, pp. 3819-3833). SMAs possess an interesting property by which the metal "remembers" its original size or shape and reverts to it at a characteristic transformation temperature (Funakubo, H. and Kennedy, J. (1987), "Shape Memory Alloys." Gordon and Breach, xii+275, 15×22 cm, Illustrated). This feature is known as the shape memory effect (SME) and can be used to make sensors and actuators for smart civil structures (Xu, Y.-L. and He, J. (2017), Smart Civil Structures, CRC Press). Another important feature of SMAs is super elastic or pseudo-elastic behavior. Super elasticity for a generic SMA is shown in FIG. 3. The material microstructure of a SMA is initially austenitic (point 1). During loading, the critical stress for phase transition is reached (point 2) and the material transforms directly into detwinned martensite (plateau from points 2 to 3). Once the phase transition is complete, further loading causes elastic deformation of the detwinned martensite (slope from points 3 to 4). Austenite is the only stable phase at high temperature and no stress. Therefore, the critical stress for the reverse phase transition is reached during unloading and the macroscopic deformation is recovered (plateau from points 5 to 6). Because of the presence of a small hysteresis loop between the loading and unloading plateau, this property is often referred to as super elastic behavior (Lecce, L. (2014), Shape Memory Alloy Engineering: For Aerospace, Structural and Biomedical Applications, Elsevier).

In 1965, Buehler and Wiley of the U.S. Naval Ordnance Laboratory (NOL) received a United States patent for a series of Ni—Ti alloys, whose generic name is 55-Nitinol, having shape memory behavior (Buehler, W. J., Gilfrich, J. and Wiley, R. (1963), "Effect of Low-Temperature Phase Changes on the Mechanical Properties of Alloys near Composition Tini." Journal of applied physics, Vol. 34, No. 5, pp. 1475-1477). In honor of the Naval Ordnance Laboratory where the material was first discovered, NiTi SMA is also widely known as Nitinol. NiTi alloy is still one of the most successful alloys of SMA in practice (Fang, C. and Wang, W. (2020), Shape Memory Alloys for Seismic Resilience, Springer). Typical applications of NiTi in civil structures require larger diameter elements because of the magnitudes of the loads, particularly those associated with a seismic event, along with ease of implementation. DesRoches et al. (DesRoches, R., McCormick, J. and Delemont, M. (2004), "Cyclic Properties of Superelastic Shape Memory Alloy Wires and Bars." Journal of Structural Engineering, Vol. 130, No. 1, pp. 38-46) studied the cyclic properties of super elastic, large diameter Nitinol rods (the largest diameter was 25.4 mm) and observed the residual strain gradually increases from an average of 0.15% following 3% strain to an average of 0.65% strain following four cycles at 6% strain. They also noticed continued loading beyond 6% strain typically resulted in unacceptably large increases in residual strains.

Figure 4:
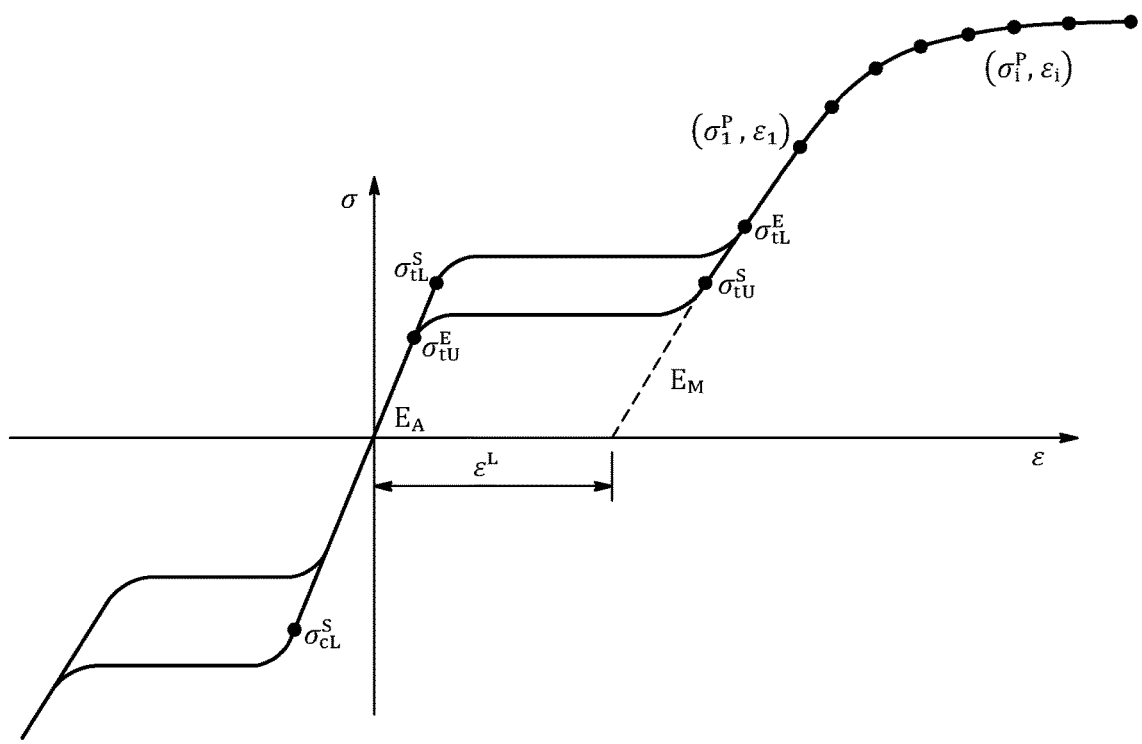
FIG. 4 is an illustration of a shape memory alloy material input in ABAQUS to model super elastic behavior

One quite simple and effective model for super elastic behavior was introduced by (Auricchio, F., Taylor, R. L. and Lubliner, J. (1997), "Shape-Memory Alloys: Macromodelling and Numerical Simulations of the Superelastic Behavior." Computer methods in applied mechanics and engineering, Vol. 146, No. 3-4, pp. 281-312) based on a Drucker—Prager-type loading function. Due to the high computational efficiency of the model, it has been adopted as a built-in user-defined material model by many commercial finite element software packages such as ABAQUS. FIG. 4 and Table 2 illustrate parameters that can be input in ABAQUS to model super elastic behavior.

TABLE 2

ABAQUS input values for super elastic behavior (Lecce, 2014)

| Variable | Value |
| --- | --- |
| $E_a$: Young's modulus of austenite | 40 GPa |
| $v_A$: Poisson's ratio of austenite | 0.33 |
| $E_m$: Young's modulus of martensite | 32 GPa |
| $v_M$: Poisson's ratio of martensite | 0.33 |
| $\varepsilon^L$: Maximum transformation strain | 0.041 |
| $\sigma_{tL}^S$: Forward transformation start stress | 440 MPa |
| $\sigma_{tL}^E$: Forward transformation finish stress | 540 MPa |
| $\sigma_{tU}^S$: Reverse transformation start stress | 250 MPa |
| $\sigma_{tU}^E$: Reverse transformation finish stress | 140 MPa |

Figure 5A:
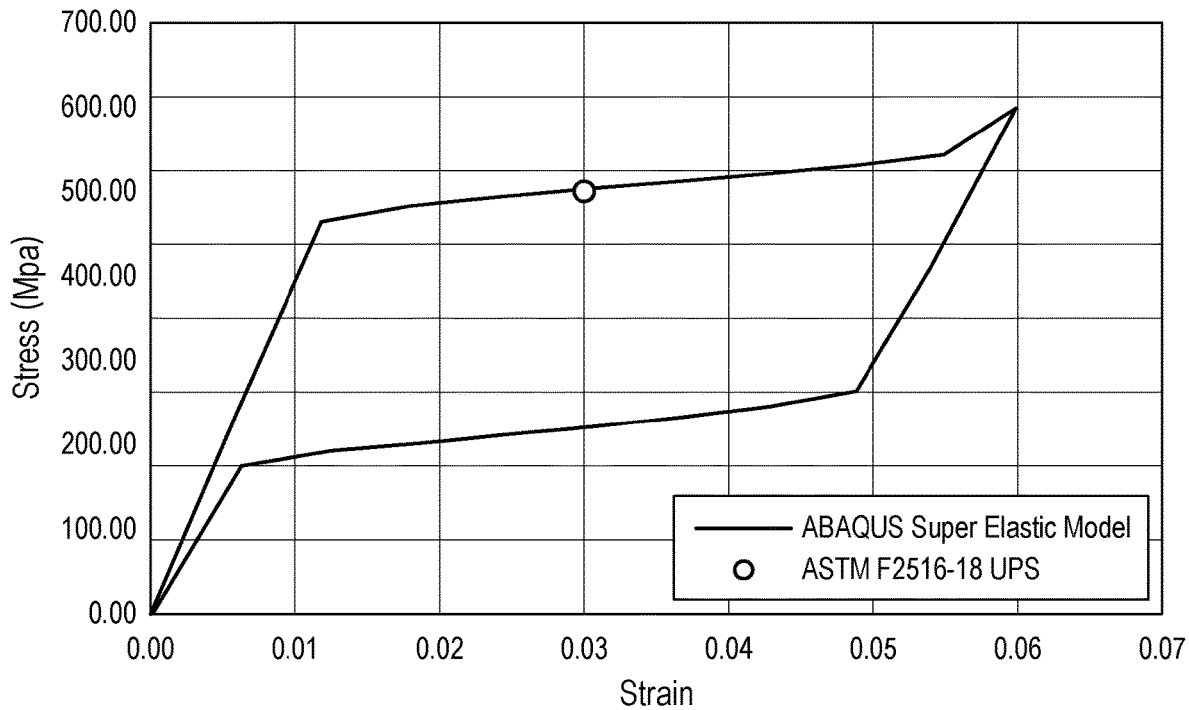
FIG. 5A is a graph showing ABAQUS super elastic model results versus ASTM-F2516-18 upper plateau strength in a stress-strain curve.

ASTM-F2516-18 (ASTM-F2516-18 (2018), Standard Test Method for Tension Testing of Nickel-Titanium Superelastic Materials. West Conshohocken, PA, ASTM International) specifies the tension testing method to determine some stress-strain related properties of Nickel-Titanium super elastic materials. Upper plateau strength (UPS) is the stress at 3% strain during loading of the sample and is specified as 500 MPa on average for 2.5 mm diameter specimens (the largest tested in the standard). FIG. 5A compares the results obtained by finite element simulation (ABAQUS) of a tensile rod versus the specified UPS by ASTM. An exemplary rod 16 is shown in FIG. 5B.

Structural Assembly

A Bellville disk 14 has a nonlinear elastic behavior in compression and SMA (e.g., Nitinol) rods 16 have super elastic behavior in tension. Combining the aforementioned two parts in one assembly 10 (as shown in FIG. 6A) results in a structural assembly 10 that has nonlinear elastic behavior in both tension and compression. Such is illustrated by FIG. 6B in which $K_{stack}$ is the stiffness of the disk stack 18 in compression and $K_{NiTi}$ is the stiffness of Nitinol rods 16 in tension. The compression disks 14 are arranged in a stack 18 and are inserted between two plates 20, 22 (e.g., steel plates)—one at the at the top of the stack 18 and one at the bottom of the stack 18. It is to be understood that the plates 20, 22 may be made of a suitable material other than steel. A shaft 34 (e.g., made out of steel) is placed at the center, inside the disks 14, to stabilize the assembly 10. It is to be understood that the shaft 34 may be made out of a suitable material other than steel. The disks 14 surround the shaft 34. In an embodiment, an upper end 46 of the shaft 34 extends through a central aperture 48 (hole) in at least one of the two plates 20, 22—the top plate 20, for example. The stack 18 of disks 14 will carry the load when the assembly 10 is in compression.

In an embodiment, the upper and lower plates 20, 22 include further apertures 50 (holes) in each of the corners 28 of the plates 20, 22. In the case of a square or rectangular plate 20, 22, each plate 20, 22 will have at least four holes or apertures 50 at or near the corners 28 of the plate 20, 22. Shape memory alloy rods 16 (e.g., Nitinol rods) with sufficient threads at the ends 24, 26 are inserted through the holes 50 at the corners 28 of the plates 20, 22 and are held by nuts 30, 32 on the exterior faces of the plates 20, 22. It is to be understood that the rods 16 may be connected to the plates 20, 22 in another suitable manner—using a different mechanical fastener, for example. With such configuration, the rods 16 are loose when the assembly 10 is in compression and will carry the load when the assembly 10 is in tension. Based on a target stiffness for the assembly 10 ($K_{asm}$), and for a given load ($F_{ult}$), Equations (7) to (18) are used to design the assembly 10. In these equations, $n_D$ is the number of parallel disks 14 in a group 44 and $n_G$ is the number of disk 14 groups 44 arranged in series. Therefore, the total number of disks 14 in a stack 18 is $n_G \times n_D$.

In order to accurately estimate the disks' behavior and also leave some margin of safety in the design of stacked disks, 65% of the disk capacity is used under the given load. This consideration is shown in Equation (7) and incorporated in the Almen's equation as shown in Equation (8). By choosing a compression disk from a manufacturer's catalog and including its geometrical and material parameters ($D_o$, $D_i$, h, t, E, μ) in Equation (8), the number of disks per group ($n_D$) can be found using Equation (9). Note that the disk deformation (d) is assumed to be 65% of the disk capacity (0.65×h) when the ultimate load is applied on the stack.

$$\text{Assumption: } d = 0.65 \times h \text{ when } F_{stack} = F_{ult} \tag{7}$$

$$F_{stack} = F_{ult} = n_D \times F_{(d=0.65h)} \rightarrow F_{ult} = \tag{8}$$

$$n_D \times \frac{4 \times E(0.65h)}{(1-\mu^2) \times K_1 \times D_o^2}\left[\left(h - \frac{0.65h}{2}\right) \times (h - 0.65h) \times t + t^3\right]$$

$$n_D = \frac{F_{ult} \times (1-\mu^2) \times K_1 \times D_o^2}{2.6 \times E \times h \times t \times (0.236 \times h^2 + t^2)} \tag{9}$$

After finding the number of parallel disks in one group ($n_D$), Equations (10) and (11) are used to obtain the number of groups in a stack ($n_G$) in order to reach the target stiffness ($K_{stack}$).

$$K_{asm} = K_{stack} = \frac{F_{stack}}{d_{stack}} = \tag{10}$$

$$\frac{n_D \times F}{n_G \times d} \rightarrow K_{asm} = \frac{n_D}{n_G} \times \left(\frac{4 \cdot E}{(1-\mu^2) \cdot K_1 \cdot D_o^2}\left[\left(h - \frac{d}{2}\right) \cdot (h-d) \cdot t + t^3\right]\right)$$

$$\overset{(d=0.65 \times h)}{\rightarrow} n_G = \frac{n_D}{K_{asm}} \times \frac{4 \cdot E \cdot t}{(1-\mu^2)K_1 \cdot D_o^2}\left[0.236 \times h^2 + t^2\right] \tag{11}$$

Since the tensile stiffness should be the same as the compression stiffness, Equations (12) to (16) are used to obtain the Nitinol rods diameter. According to Equation (14) the length of each Nitinol rod is the total height of the disk stack plus the thickness of the bottom and top plates ($t_{plt}$). By substituting the length of each rod into the axial stiffness equation (Equation (15)), the diameter of each Nitinol rod ($D_{NiTi}$) is found through Equation (16).

$$K_{asm} = K_{NiTi} = K_{stack} \tag{12}$$

$$K_{asm} = K_{NiTi} = \frac{E_A \times A_{rods}}{L_{rod}} \tag{13}$$

$$L_{rod} = (n_D \times t + h)n_G + 2 \times t_{plt} \tag{14}$$

$$K_{asm} = \frac{E_A \times 4 \times (\pi D_{NiTi}^2 / 4)}{(n_D \times t + h)n_G + 2 \times t_{plt}} \tag{15}$$

$$D_{NiTi} = \sqrt{K_{asm} \times \frac{(n_D \times t + h)n_G + 2 \times t_{plt}}{E_A \times \pi}} \tag{16}$$

To ensure the assembly has enough strength in tension while the tensile strain in rods is lower than 6% (to avoid any residual deformation), the condition mentioned in Equation (17) needs to be satisfied. Otherwise, either the diameter of Nitinol rods obtained from Equation (16) has to be increased and the plate thickness be tuned accordingly to satisfy Equation (15), or another compression disk with different dimensions ($D_o$, $D_i$, h, t) needs to be selected and the assembly be redesigned to satisfy all the aforementioned conditions and equations.

$$\text{Check: } 4 \times A_{NiTi} \times (\sigma_{NiTi})_{\varepsilon_{NiTi}=6\%} \geq F_{ult} \tag{17}$$

Cyclic Behavior of the Structural Assembly

Figure 7:
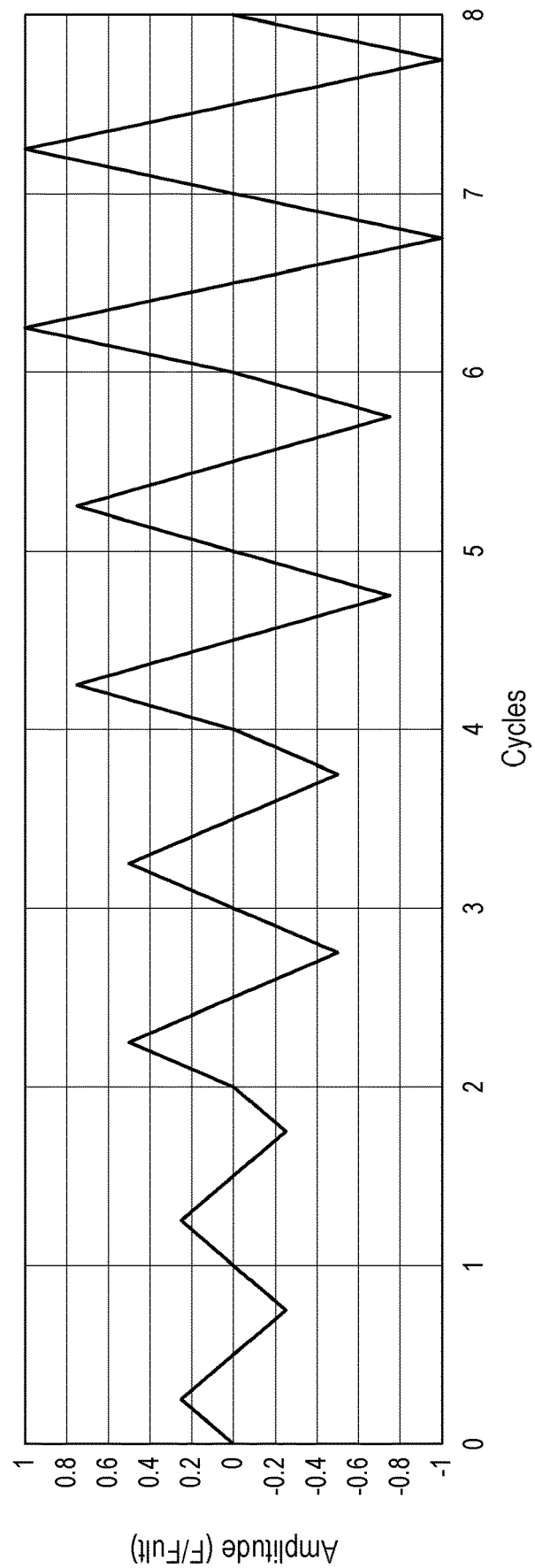
FIG. 7 is a graph of a cyclic loading protocol.

In order to check the cyclic behavior of the assembly 10, five embodiments (e.g., assemblies 10) are presented based on a target stiffness ($K_{asm}$) and an assumed applied load ($F_{ult}$) and were then simulated in ABAQUS. A572-GR50 steel is used for the steel plates 20, 22, central shaft 34, and the steel nuts 30, 32. Though it is to be understood that other suitable materials could be used. The loading protocol for the simulation is shown in FIG. 7. The loading protocol is according to loading histories for quasi-static cyclic testing suggested by FEMA-461 (FEMA-461 (2007), Interim Testing Protocols for Determining the Seismic Performance Characteristics of Structural and Nonstructural Components. Washington, DC.). The details of the embodiments of the assemblies 10 are presented in Table 3 and the drawings of the embodiments of the assemblies 10 with their cyclic response (determined by finite element analyses) are shown in FIGS. 27A-31D.

Figure 8A:
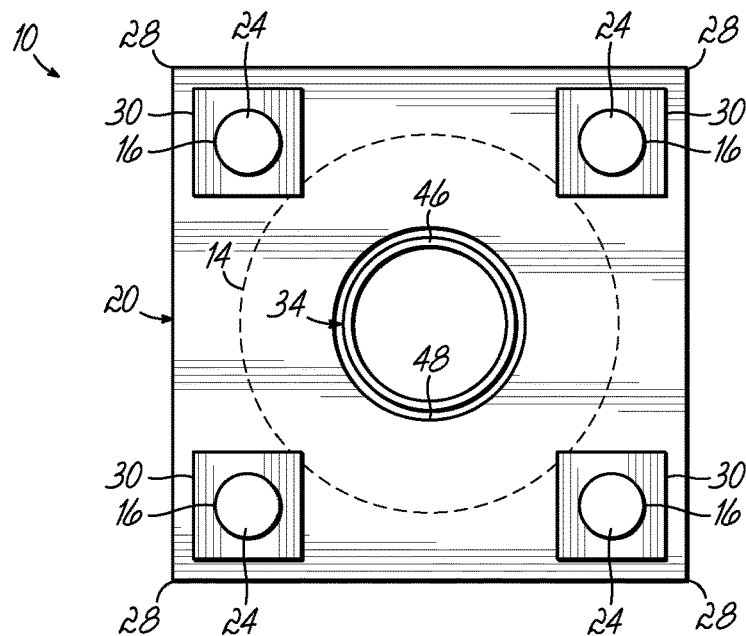
FIG. 8A is a top view of the first embodiment of the structural assembly of FIG. 6A.
Figure 8B:
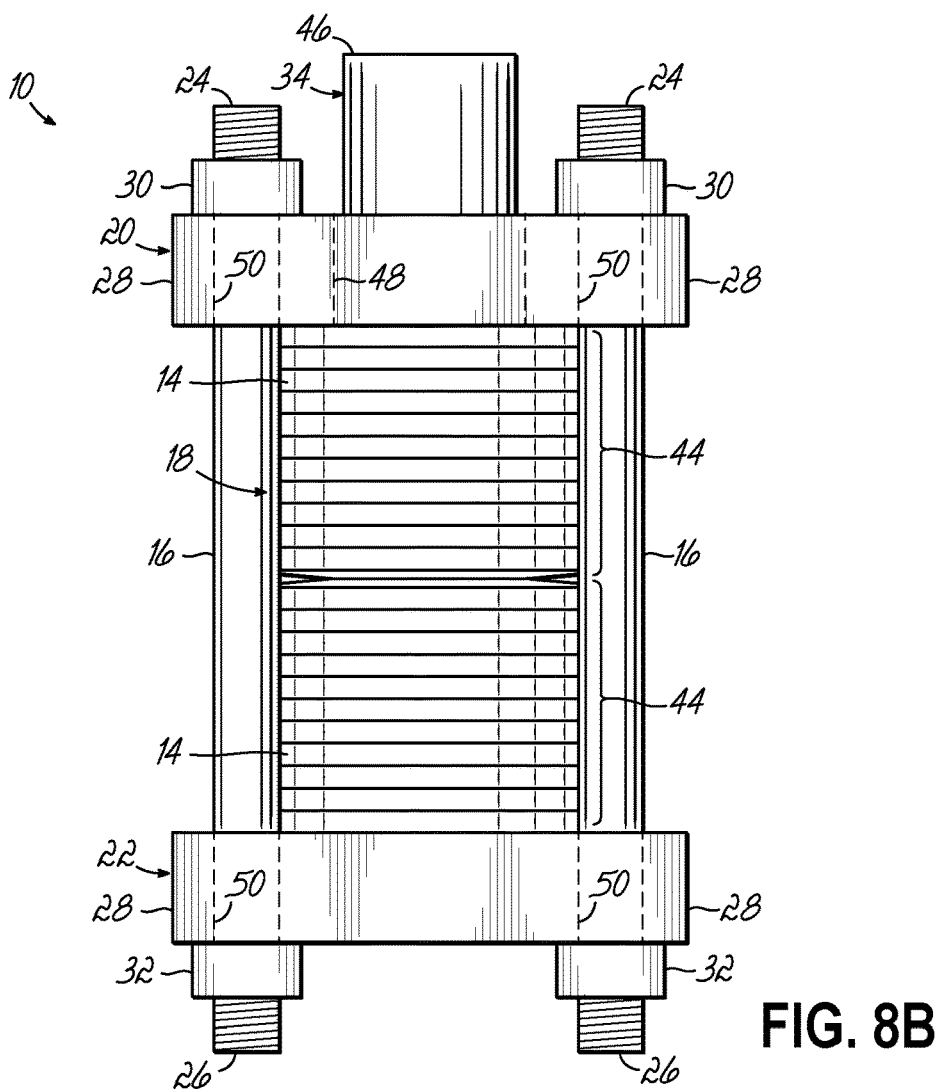
FIG. 8B is a side view of the first embodiment of the structural assembly of FIG. 6A.

The stiffness and load values are based on the force and stiffness of braces in a 5-story special concentrically braced frame (SCBF) building. The target stiffness ($K_{asm}$) is determined based on brace stiffness by applying equivalent lateral force (ELF) load (ASCE/SEI7-16, 2016) and the load ($F_{ult}$) is determined based on brace load by using maximum considered event (MCE) loading. Final equations to find $F_{ult}$ and $K_{asm}$ are developed based on the cyclic behavior results and are presented in Equations (18) and (24). As an example, the drawings of the first embodiment of an assembly 10 (e.g., assembly 1) are shown in FIGS. 8A and 8B with the 3-dimensional (perspective) view of this assembly 10 shown in FIG. 6A.

TABLE 3

Details of designed assemblies for studying cyclic behavior

| Assembly | Load and Target stiffness | | Disk geometry | | | | Stack information | | Rod diameter |
|---|---|---|---|---|---|---|---|---|---|
| | $F_{ult}$ (kN) | $K_{asm}$ (kN/mm) | $D_o$ (mm) | $D_i$ (mm) | t (mm) | h (mm) | $n_D$ | $n_G$ | $D_{NiTi}$ (mm) |
| 1 | 1910 | 334 | 200 | 102 | 12.0 | 4.19 | 11 | 2 | 31.8 |
| 2 | 1220 | 343 | 150 | 71.0 | 6.00 | 4.80 | 21 | 1 | 25.4 |
| 3 | 423 | 144 | 100 | 51.0 | 7.00 | 2.21 | 6 | 2 | 14.7 |
| 4 | 1380 | 359 | 200 | 82.0 | 8.00 | 6.20 | 18 | 1 | 24.2 |
| 5 | 956 | 294 | 150 | 71.0 | 6.00 | 4.80 | 18 | 1 | 22.6 |

Figure 9A:
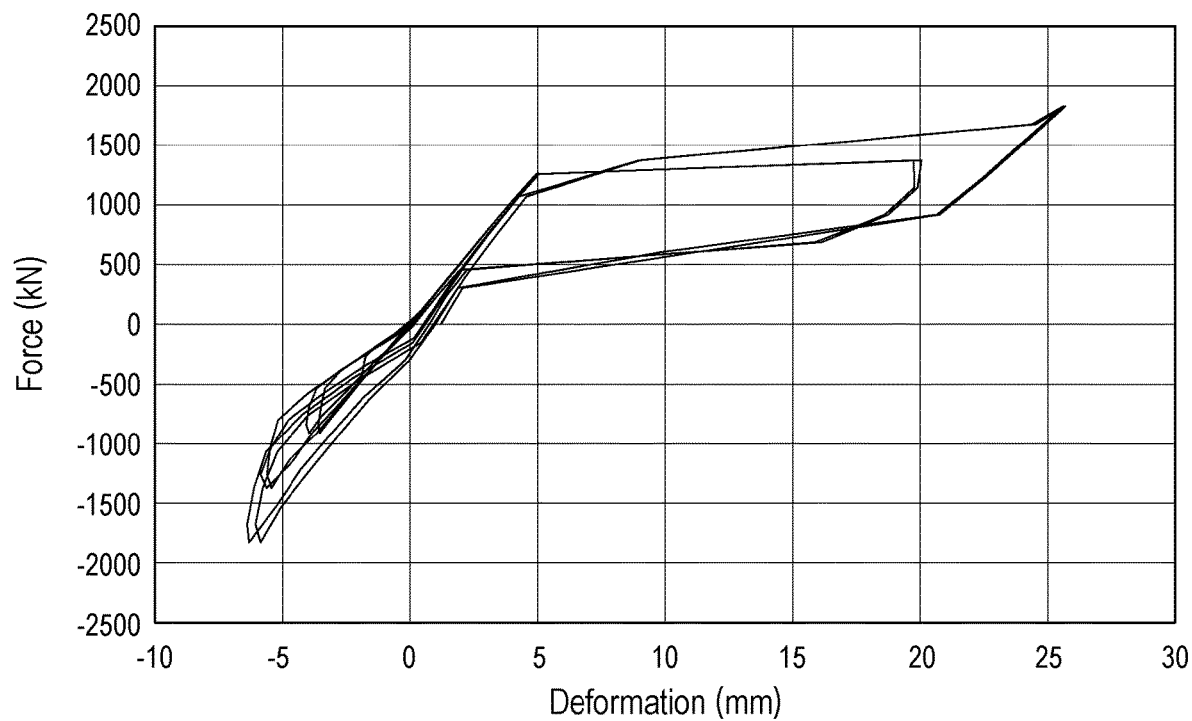
FIG. 9A is a graph of the cyclic response of the first embodiment of the structural assembly (assembly 1) obtained through finite element simulations in ABAQUS.
Figure 9B:
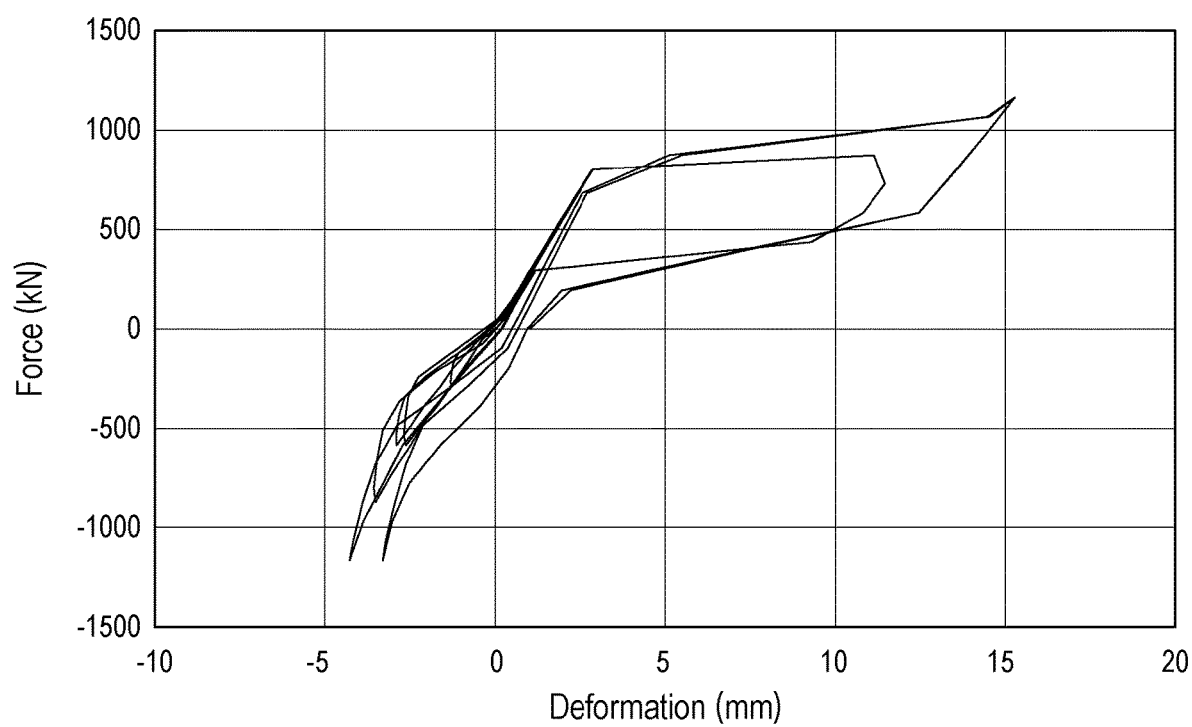
FIG. 9B is a graph of the cyclic response of a second embodiment of the structural assembly (assembly 2), similar to FIG. 9A.
Figure 9C:
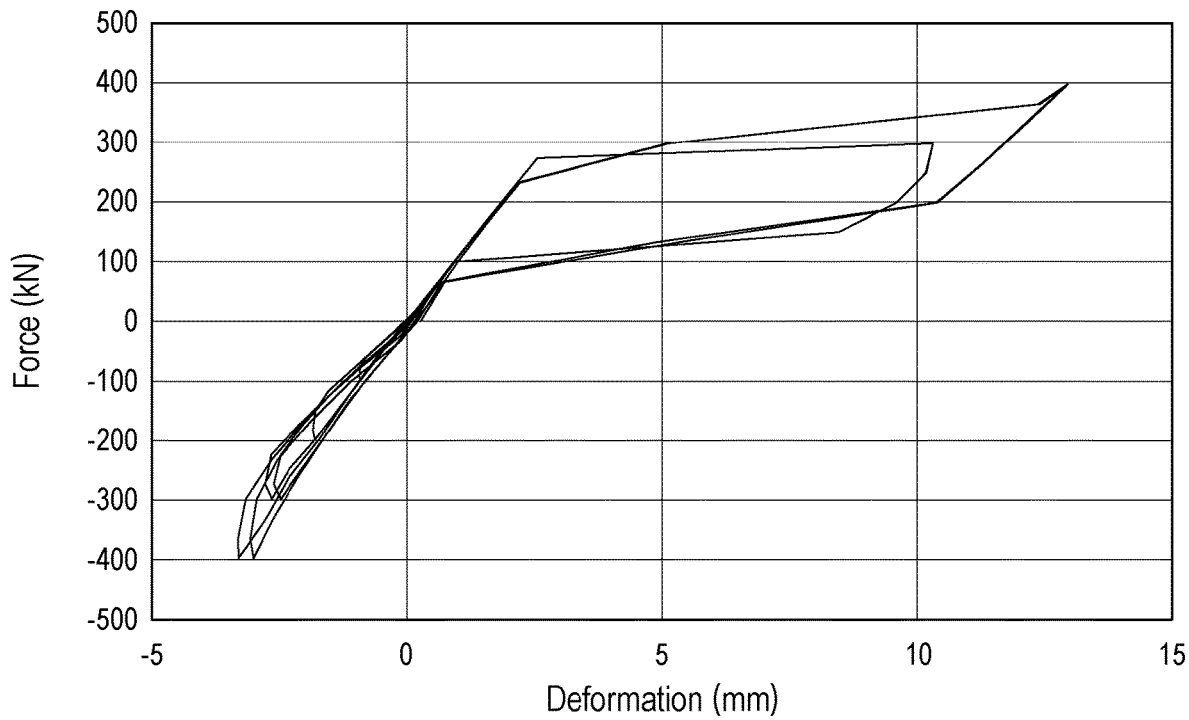
FIG. 9C is a graph of the cyclic response of a third embodiment of the structural assembly (assembly 3), similar to FIG. 9A.
Figure 9D:
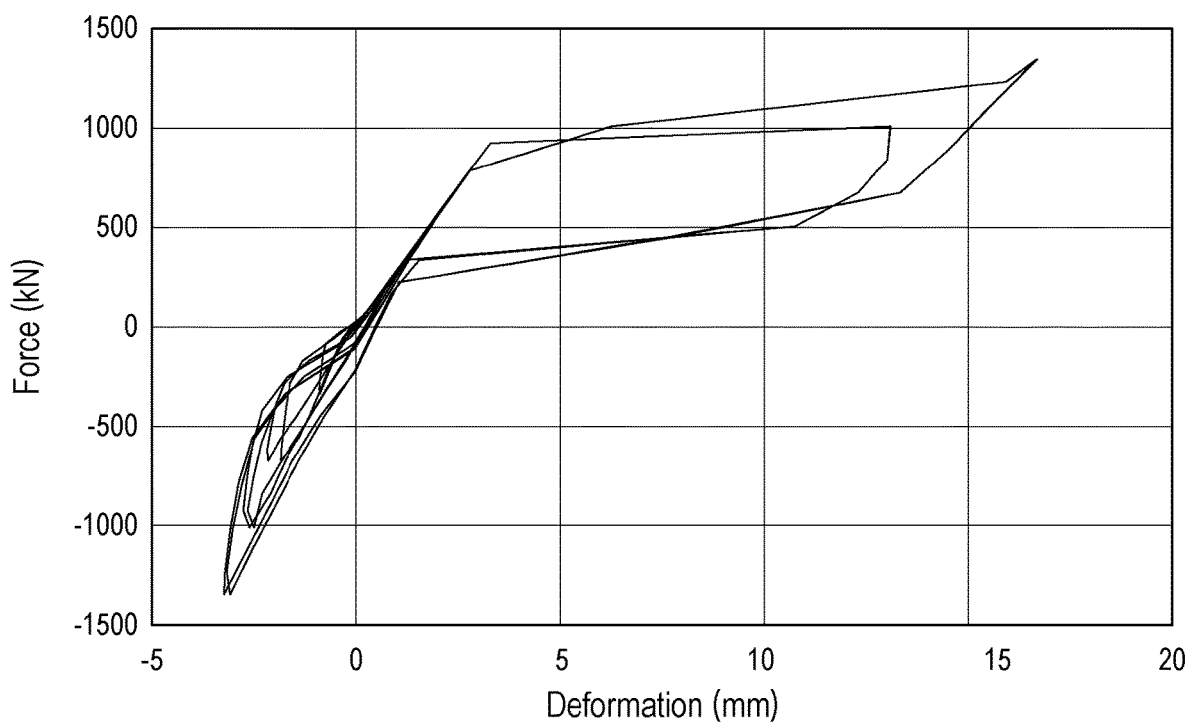
FIG. 9D is a graph of the cyclic response of a fourth embodiment of the structural assembly (assembly 4), similar to FIG. 9A.
Figure 9E:
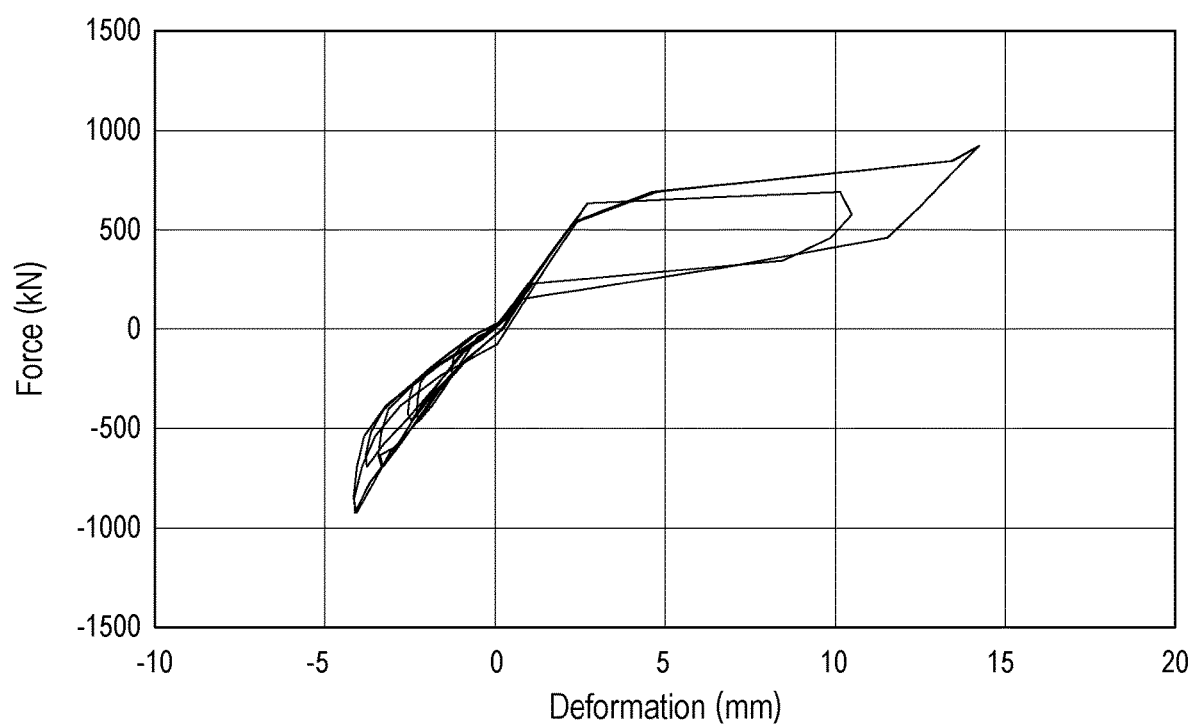
FIG. 9E is a graph of the cyclic response of a fifth embodiment of the structural assembly (assembly 5), similar to FIG. 9A.
Figure 27A:
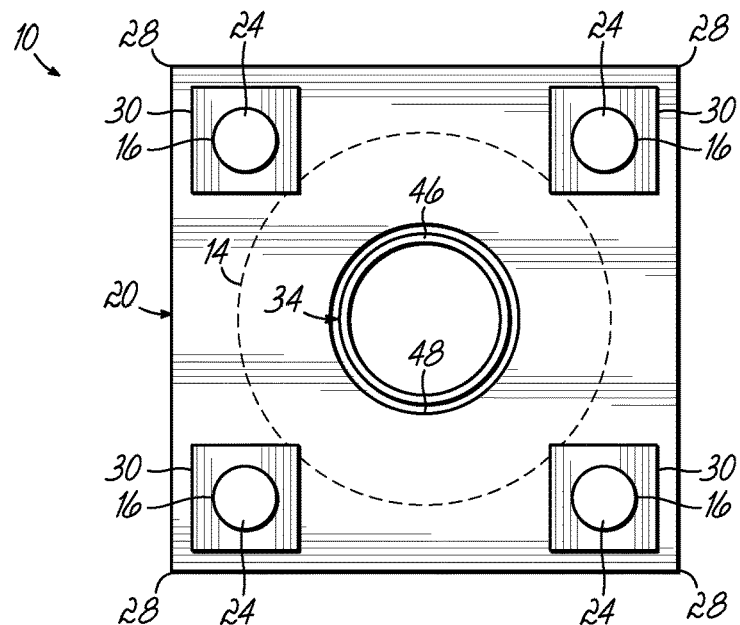
FIG. 27A is a top view of the first embodiment of the structural assembly of FIG. 6A.
Figure 27B:
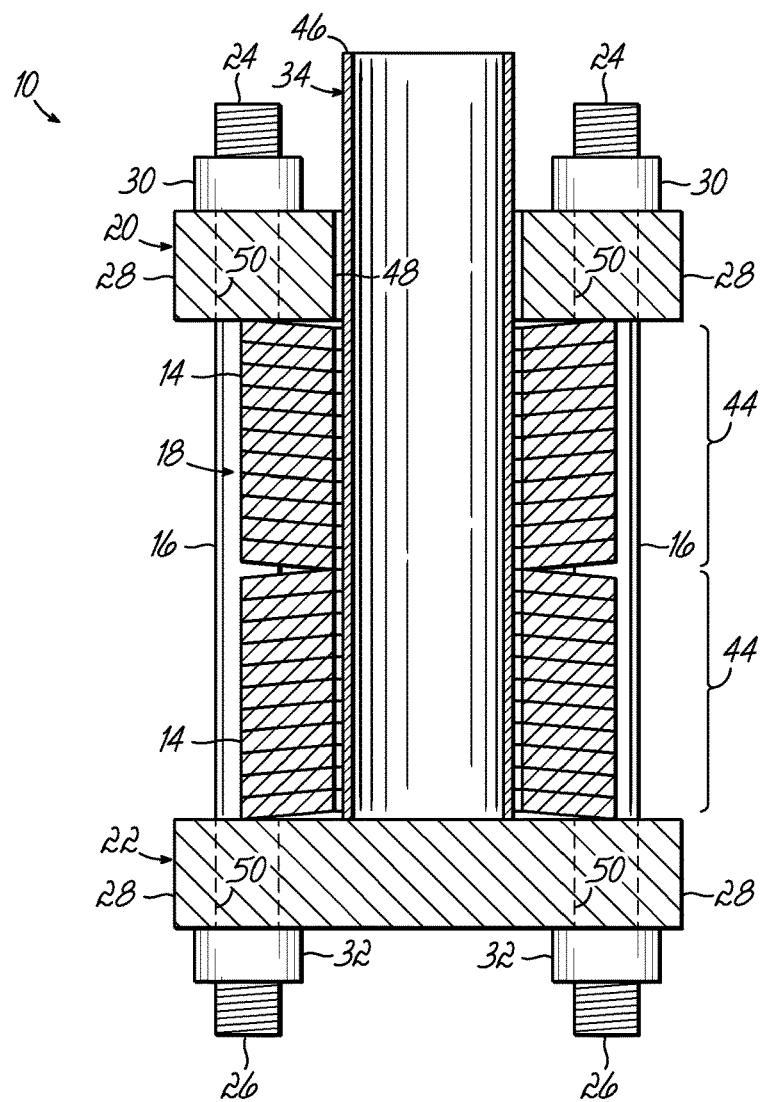
FIG. 27B is a side view of the first embodiment of the structural assembly of FIG. 6A.
Figure 27C:
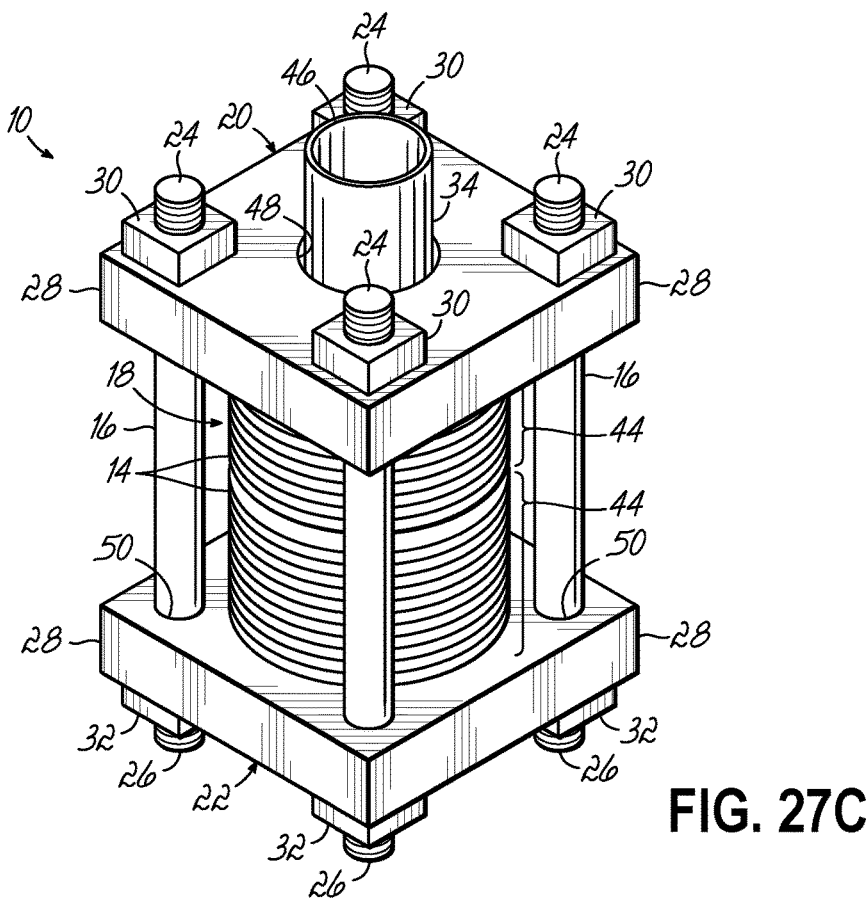
FIG. 27C is a perspective view of an undeformed first embodiment of the structural assembly (assembly 1), similar to FIG. 6A
Figure 27D:
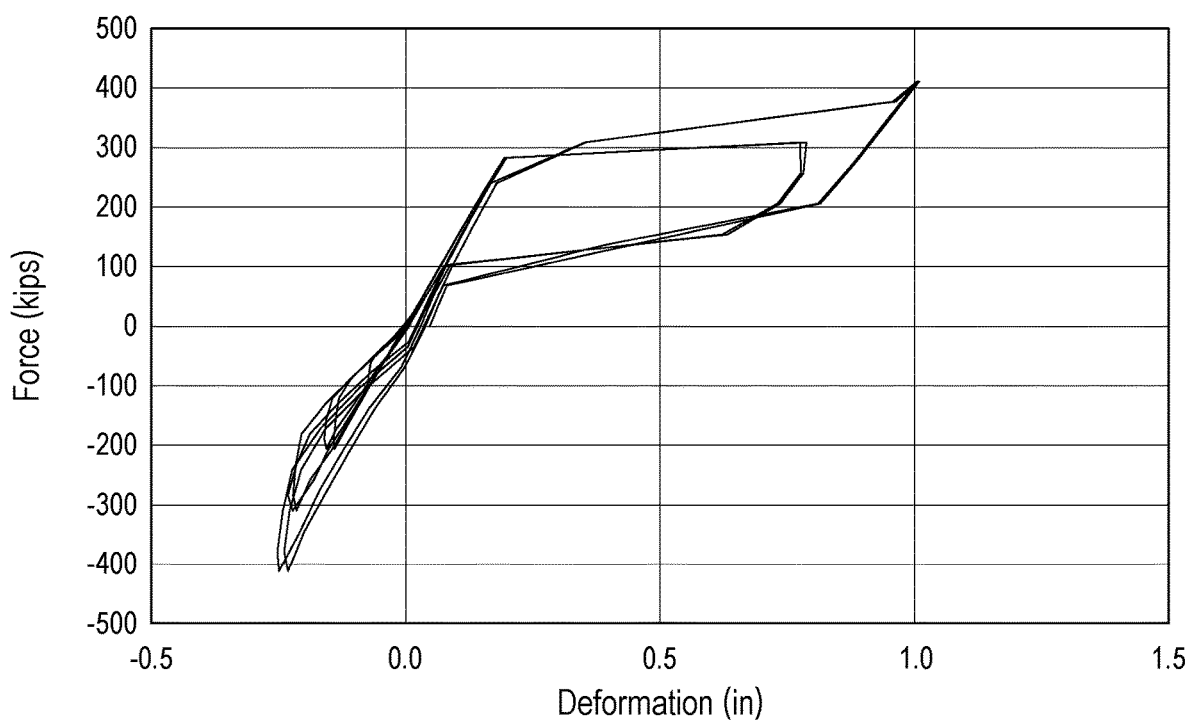
FIG. 27D is a graph of the cyclic response of the first embodiment of the structural assembly (assembly 1) of FIG. 6A.
Figure 28A:
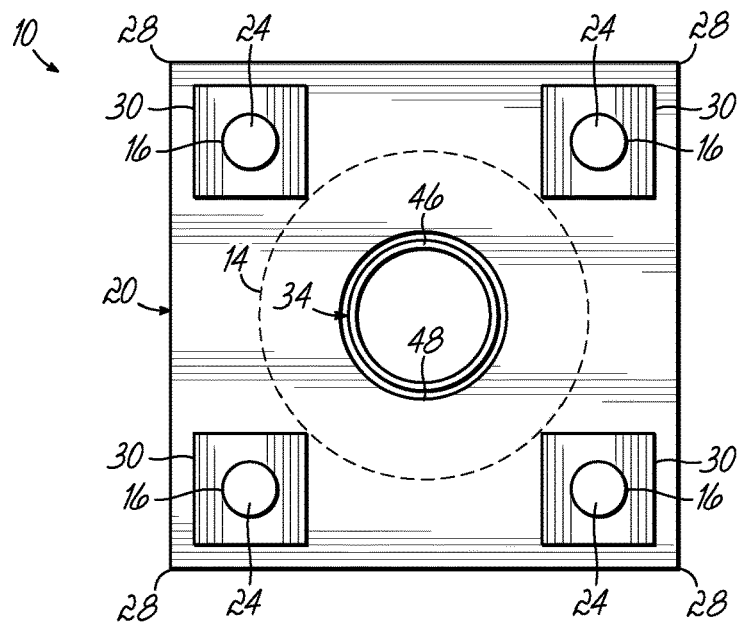
FIG. 28A is a top view of a second embodiment of the structural assembly (assembly 2).
Figure 28B:
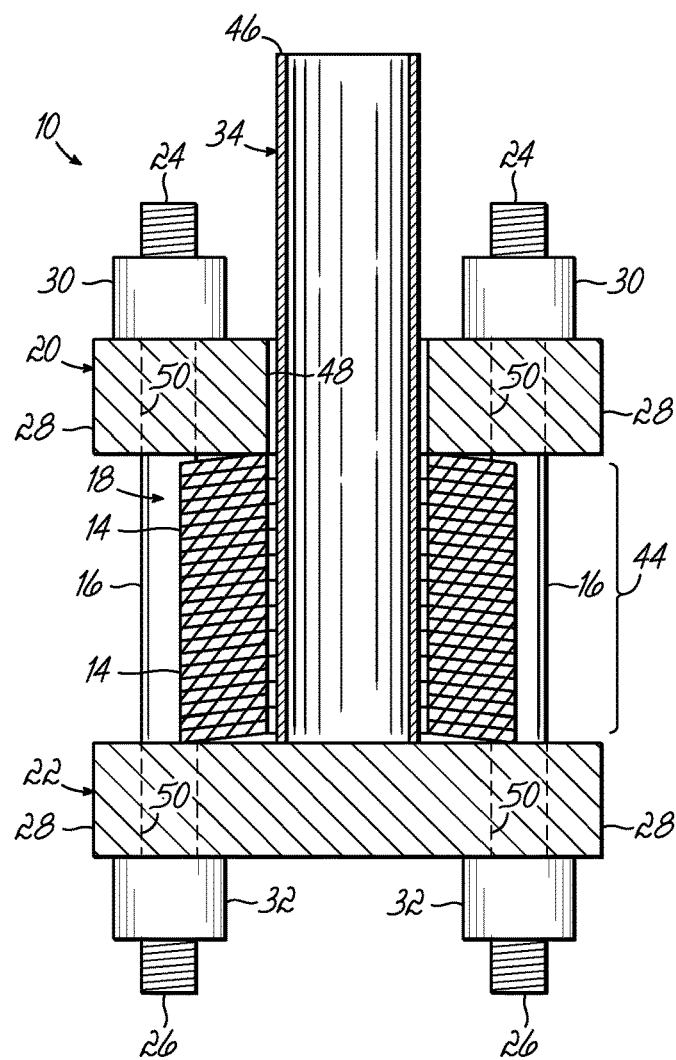
FIG. 28B is a cross sectional view the second embodiment of the structural assembly of FIG. 28A.
Figure 28C:
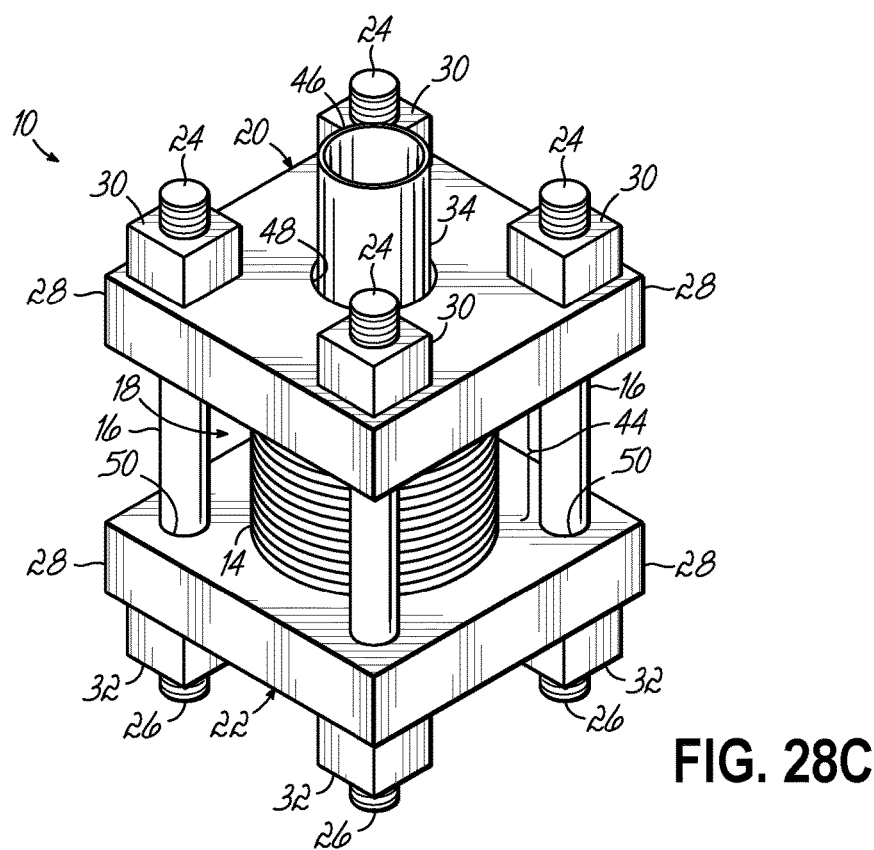
FIG. 28C is a perspective view of the second embodiment of the structural assembly of FIG. 28A.
Figure 28D:
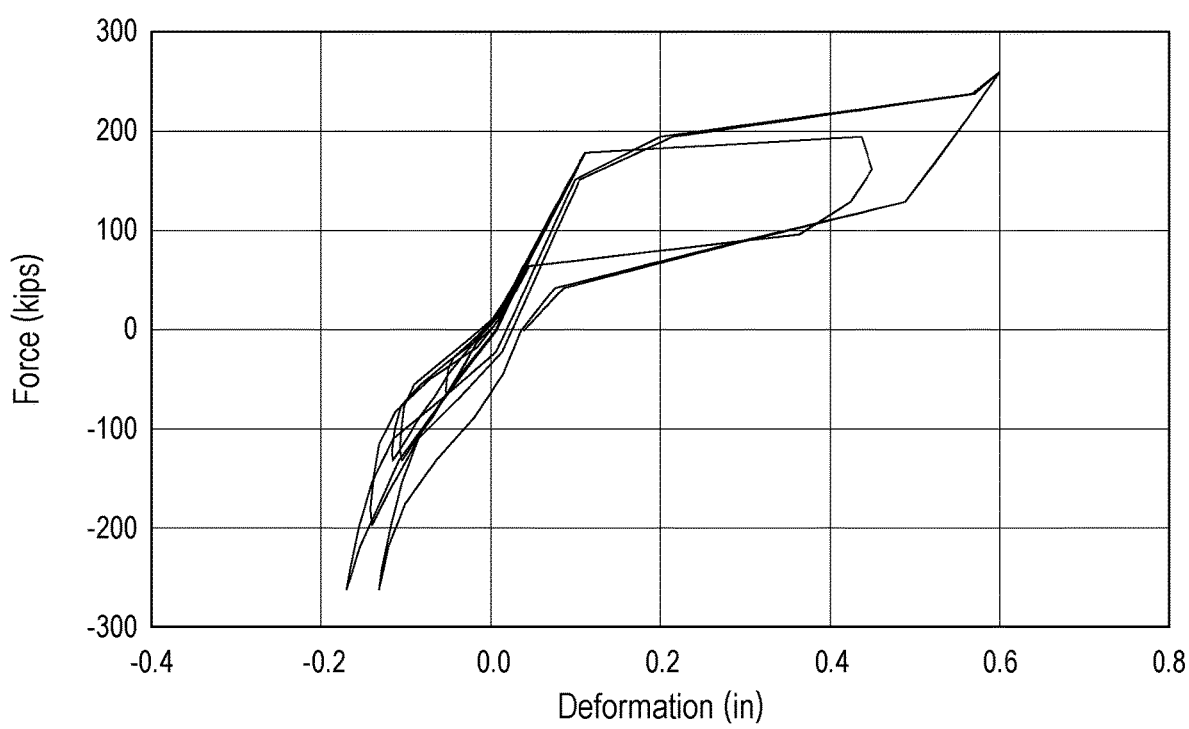
FIG. 28D is a graph of the cyclic response of the second embodiment of the structural assembly of FIG. 28A.
Figure 29A:
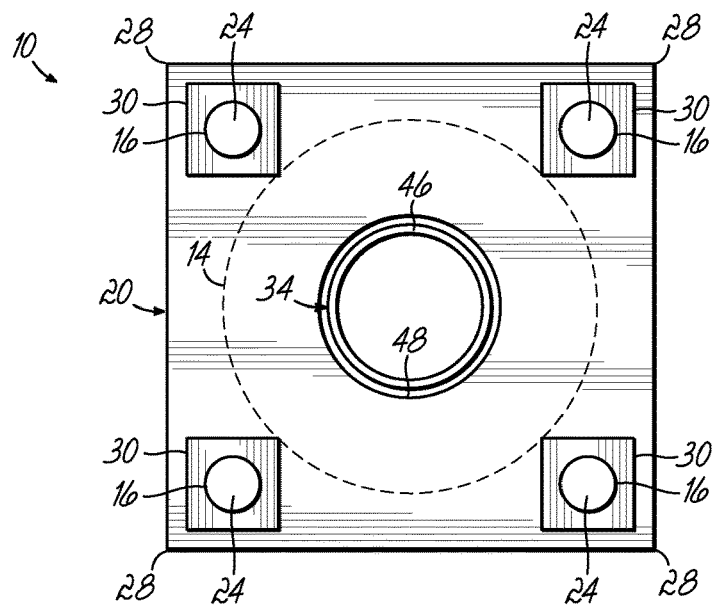
FIG. 29A is a top view of a third embodiment of the structural assembly (assembly 3).
Figure 29B:
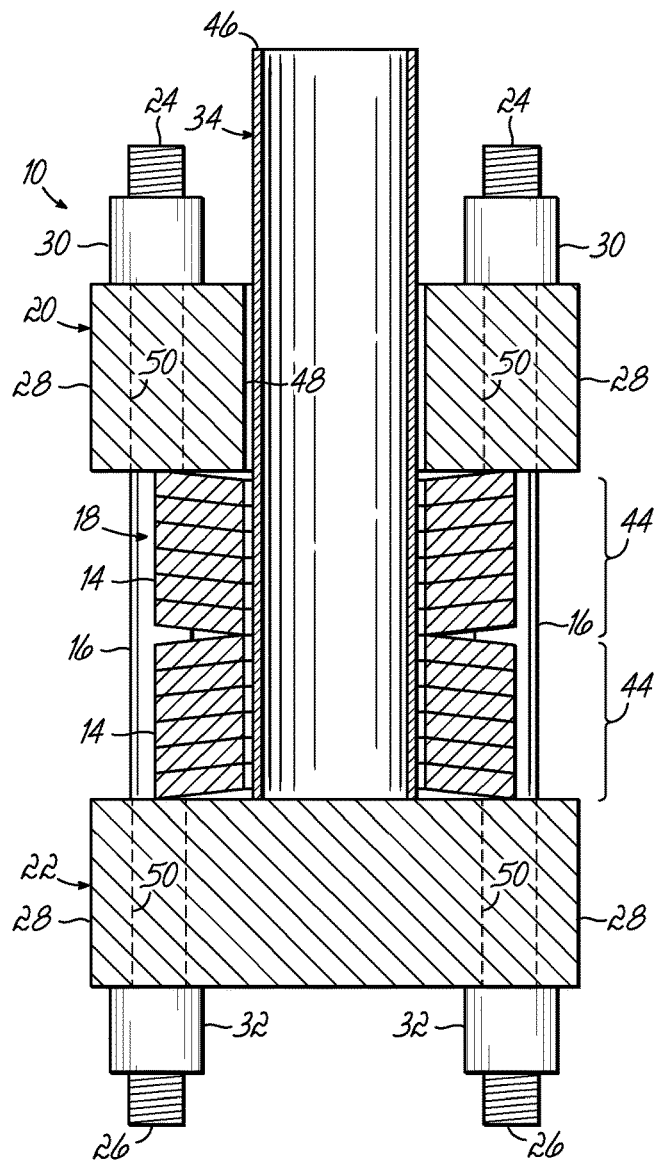
FIG. 29B is a cross sectional view the third embodiment of the structural assembly of FIG. 29A.
Figure 29C:
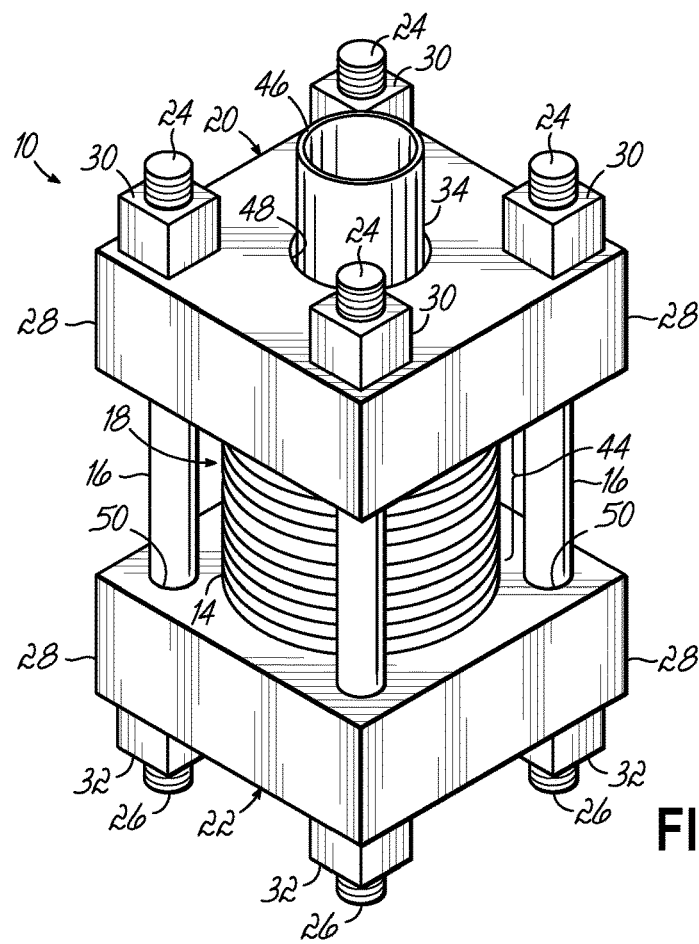
FIG. 29C is a perspective view of the third embodiment of the structural assembly of FIG. 29A.
Figure 29D:
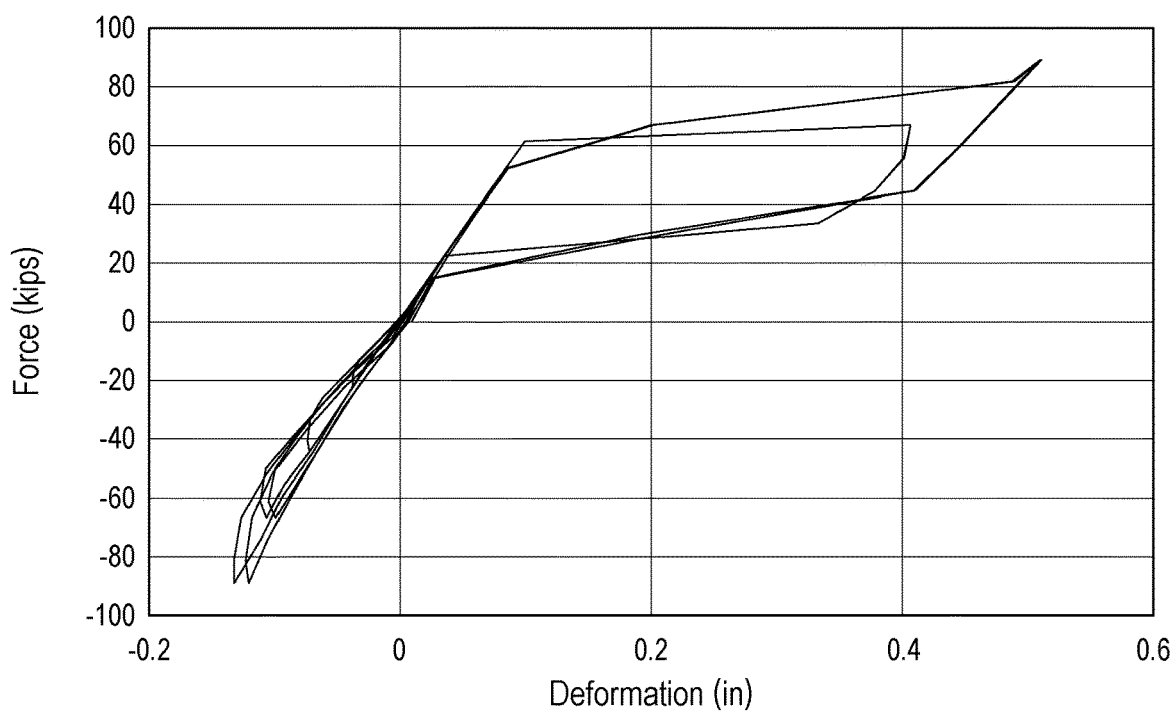
FIG. 29D is a graph of the cyclic response of the third embodiment of the structural assembly of FIG. 29A.
Figure 30A:
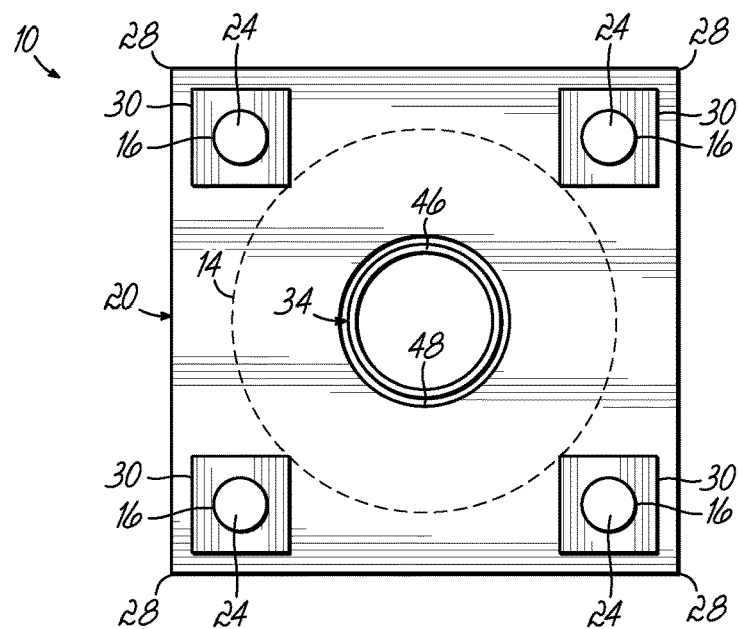
FIG. 30A is a top view of a fourth embodiment of the structural assembly (assembly 4).
Figure 30B:
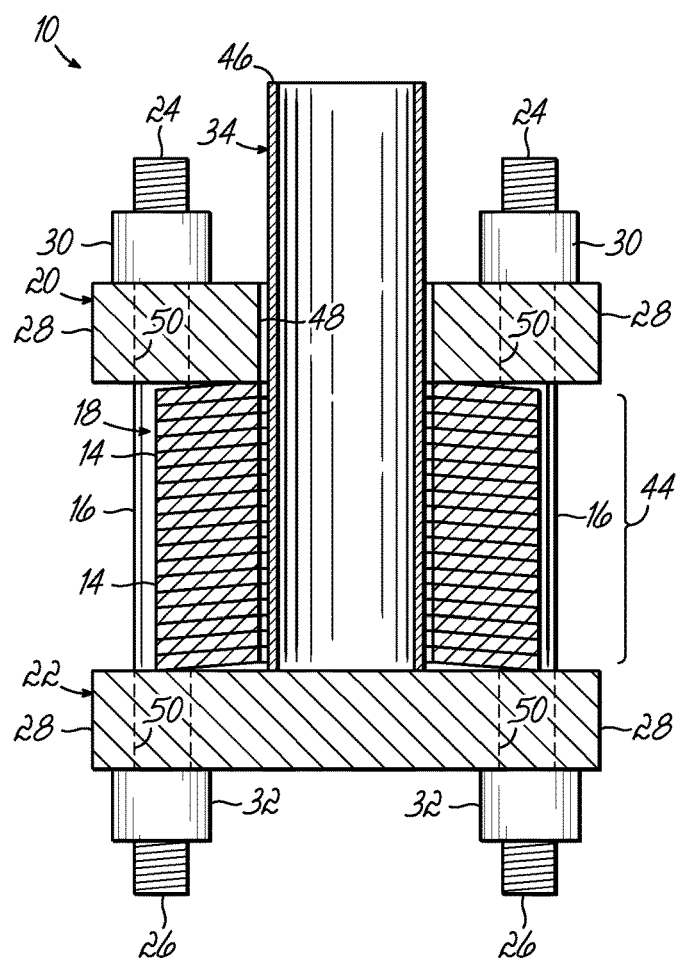
FIG. 30B is a cross sectional view the fourth embodiment of the structural assembly of FIG. 30A.
Figure 30C:
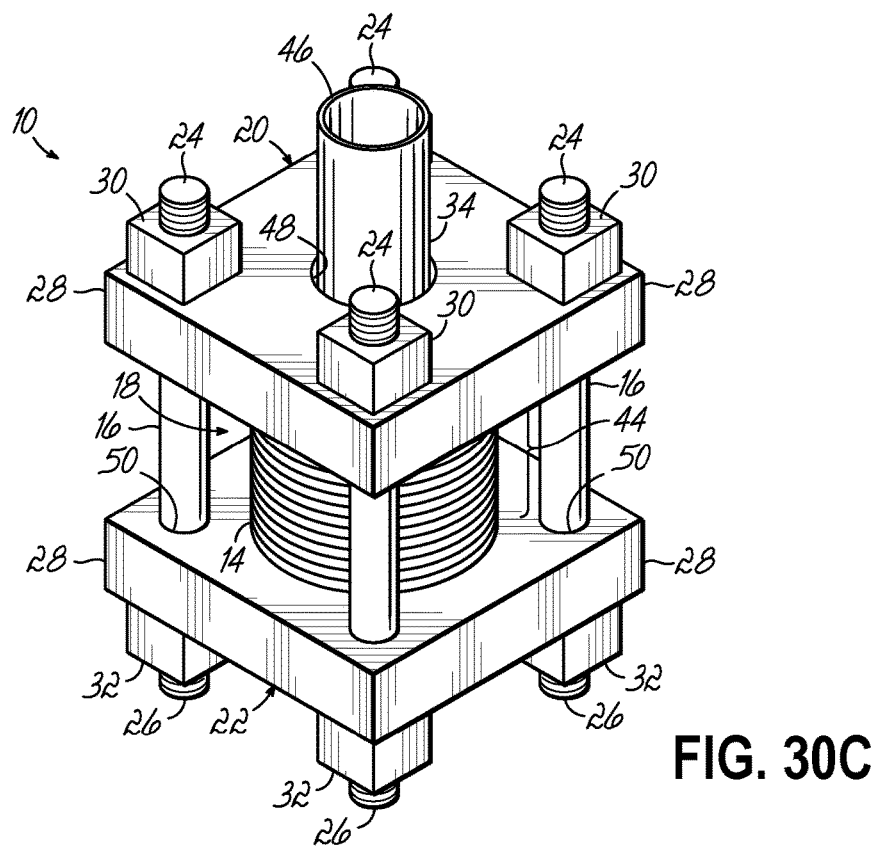
FIG. 30C is a perspective view of the fourth embodiment of the structural assembly of FIG. 30A.
Figure 30D:
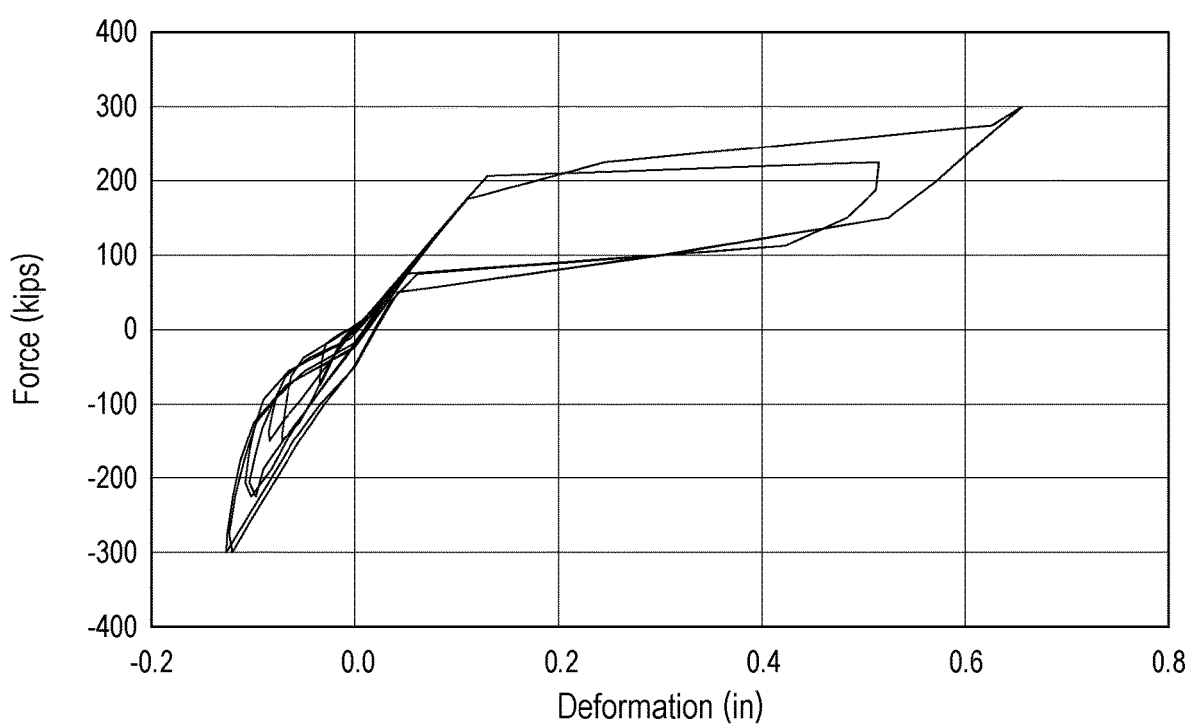
FIG. 30D is a graph of the cyclic response of the fourth embodiment of the structural assembly of FIG. 30A.
Figure 31A:
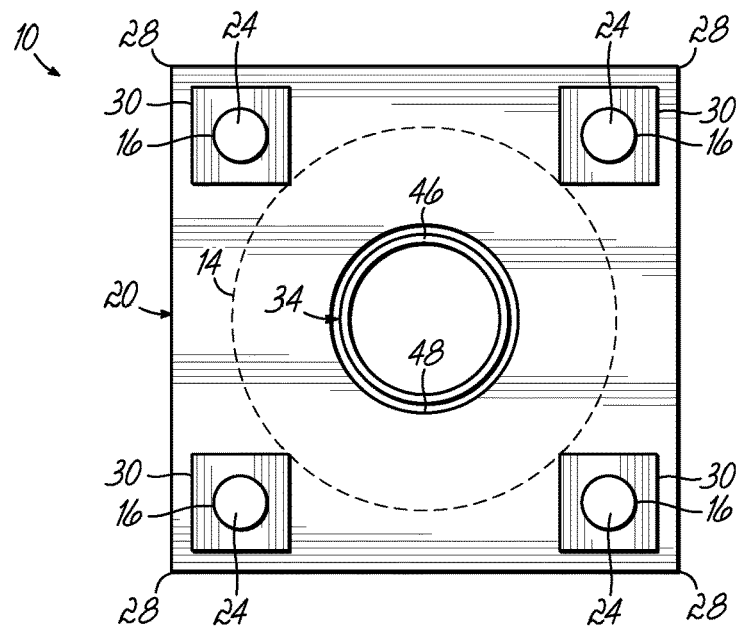
FIG. 31A is a top view of a fifth embodiment of the structural assembly (assembly 5).
Figure 31B:
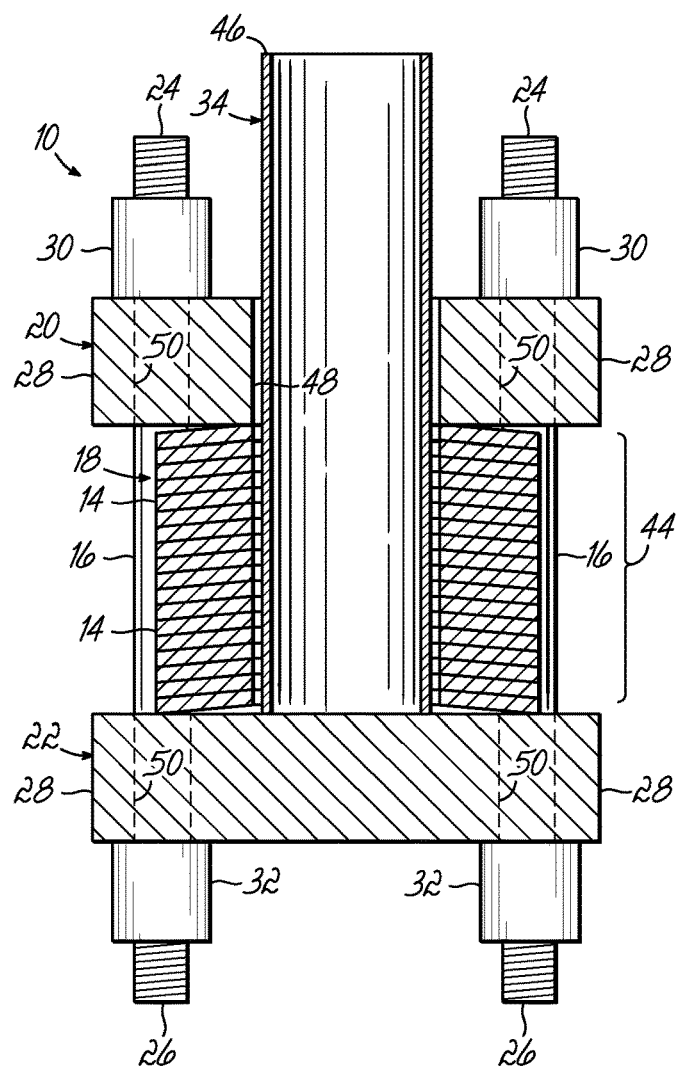
FIG. 31B is a cross sectional view the fifth embodiment of the structural assembly of FIG. 31A.
Figure 31C:
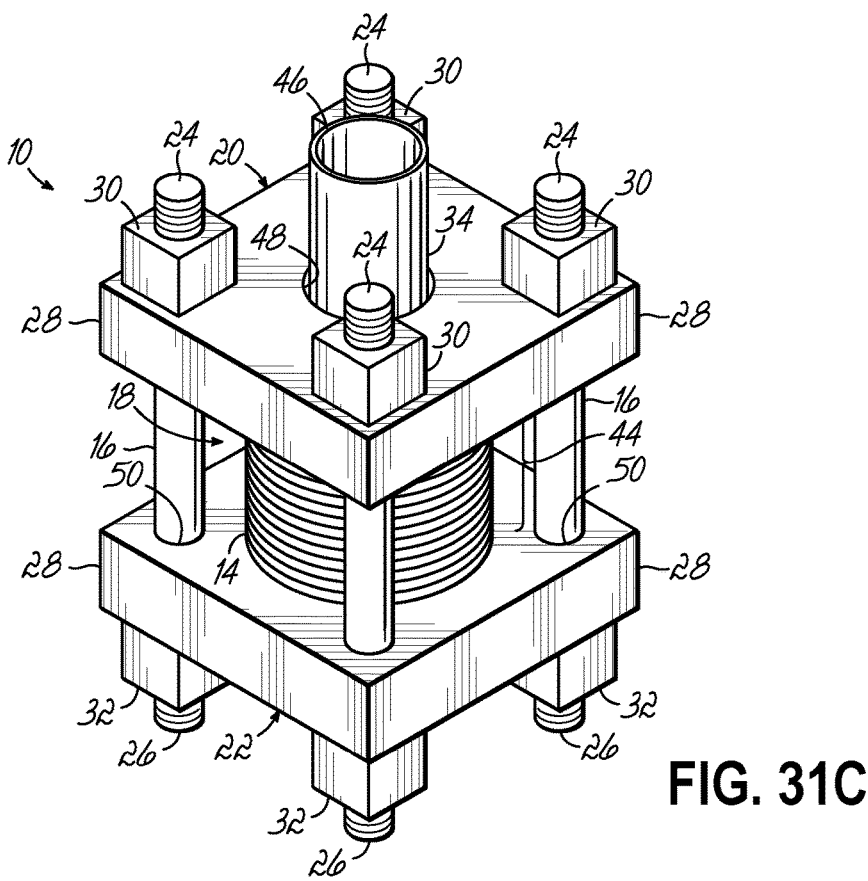
FIG. 31C is a perspective view of the fifth embodiment of the structural assembly of FIG. 31A.
Figure 31D:
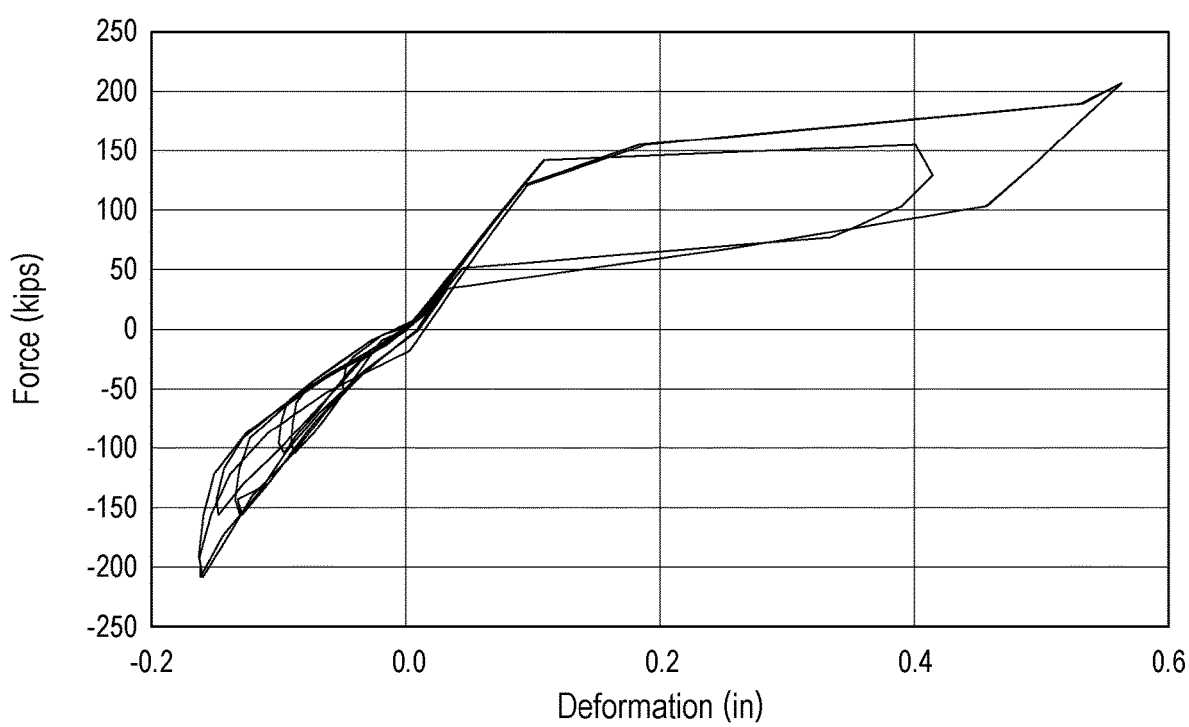
FIG. 31D is a graph of the cyclic response of the fifth embodiment of the structural assembly of FIG. 31A.

Cyclic responses of the embodiments of the assemblies 10 listed in Table 3 were obtained through finite element simulations in ABAQUS and the responses are shown in FIGS. 9A-9E and FIGS. 27D, 28D, 29D, 30D, and 31D. FIGS. 9A and 27D correspond to a first embodiment of the assembly 10 (assembly 1), FIGS. 9B and 28D correspond to a second embodiment of the assembly 10 (assembly 2), and so on. Further, FIGS. 27D, 28D, 29D, 30D, and 31D show some amount of residual deformation in the behavior of structural assembly 10. Since the residual deformation is negligible in comparison to the total deformation under the loading, the assemblies 10 are deemed to behave in a nonlinear elastic manner.

The compression disks 14 are capable of some energy dissipation due to the different loading and unloading paths in their response; however, the amount of dissipated energy is small in comparison to the energy dissipated by Nitinol rods 16 (the amount of area enclosed by the cycles in the negative region compared to the area inside the cycles in the positive region of the force-deformation responses). The energy dissipation in compression disks 14 is a function of friction between the disks 14 which is highly unpredictable as discussed. The results indicate the stacked compression disks 14 exhibit some energy dissipation capability due the differences between loading and unloading paths as evident from the negative domain of cyclic responses.

This type of cyclic response has also been observed in other studies focused on behavior of compression disks (Ozaki et al., 2012; Mastricola, N. P., Dreyer, J. T. and Singh, R. (2017), "Analytical and Experimental Characterization of Nonlinear Coned Disk Springs with Focus on Edge Friction Contribution to Force-Deflection Hysteresis." Mechanical Systems and Signal Processing, Vol. 91, pp. 215-232). Cycles with the same amplitude on the positive (tensile) domain of responses almost completely cover each other. The amplitude of the last two cycles have force almost equal to the point where the flag shape behavior ends, and Nitinol gains more stiffness (see $\sigma_{tl}^E$ in FIG. 4). That is the reason for having the extreme points of the last two cycles located at the higher force values. The maximum load in the cyclic behavior ($F_{ult}$) uses 65% of disk stack capacity (see Equation (7)) in compression and causes 6% strain in Nitinol rods (see Equation (17)) in tension. Thus, the assembly 10 shows nonlinear elastic behavior when brace force is at MCE demand-level.

Structural Bracing System

In an embodiment, the structural bracing system 12 is based on a chevron configured bracing system in which at least one structural assembly 10 is added to each of the braces 42. It is to be understood that the structural bracing system 12 could take on other forms besides a chevron configured bracing system. In order to obtain symmetric cyclic behavior in the depicted structural bracing system 12, the structural assembly 10 is attached to both the tension and compression braces 52, 54. It is to be understood that the same may not be true in other embodiments of the structural bracing system 12. FIGS. 10A-10D show an embodiment of a braced frame 36 with structural assemblies 10 added to both of the braces 42 (e.g., compression 54 and tension 52), which is referred to as the structural bracing system 12. The frame 36 includes beam elements 56 operatively connected to column elements 58, at right angles, for example. The structural assembly 10 can be added to the brace 42, which may be a hollow structural section (HSS) section, at one end or both ends of the brace 42 depending on the demands of a particular situation. In an embodiment, a structural assembly 10 may be operatively connected on one end to a frame 36 (e.g., a gusset plate 38 of a frame 36) of a structural bracing system 12 through use of two C-shape sections 40 (e.g., made of steel). On an opposing end, the structural assembly 10 may be operatively connected to a brace section 42 of a structural bracing system 12 through welding, for example. It is to be understood that the structural assembly 10 may be connected to the frame 36 and to the braces 42 in other manners.

Due to the usage of the structural assembly 10 in both the tension and compression braces 52, 54 in the frame 36, the system 12 possesses a symmetric nonlinear elastic behavior. While the nonlinearity of the behavior dissipates the earthquake energy, the elasticity of the system 12 impedes the formation of residual deformations in the system 12, which leads to a reduction in the structural repairs after ground motions. The aforementioned behavior plays a key role in improving the seismic resiliency of structures.

Cyclic Behavior of Structural Bracing System

Figure 11:
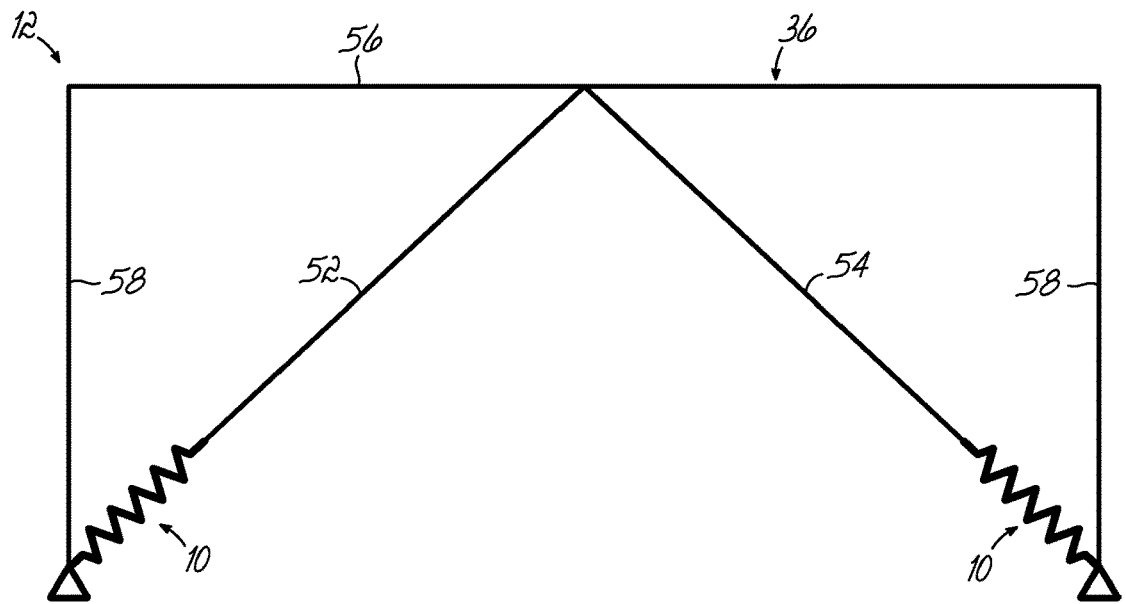
FIG. 11 is a schematic illustration of a simplified RUAUMOKO-2D model of an embodiment of a structural bracing system.
Figure 12A:
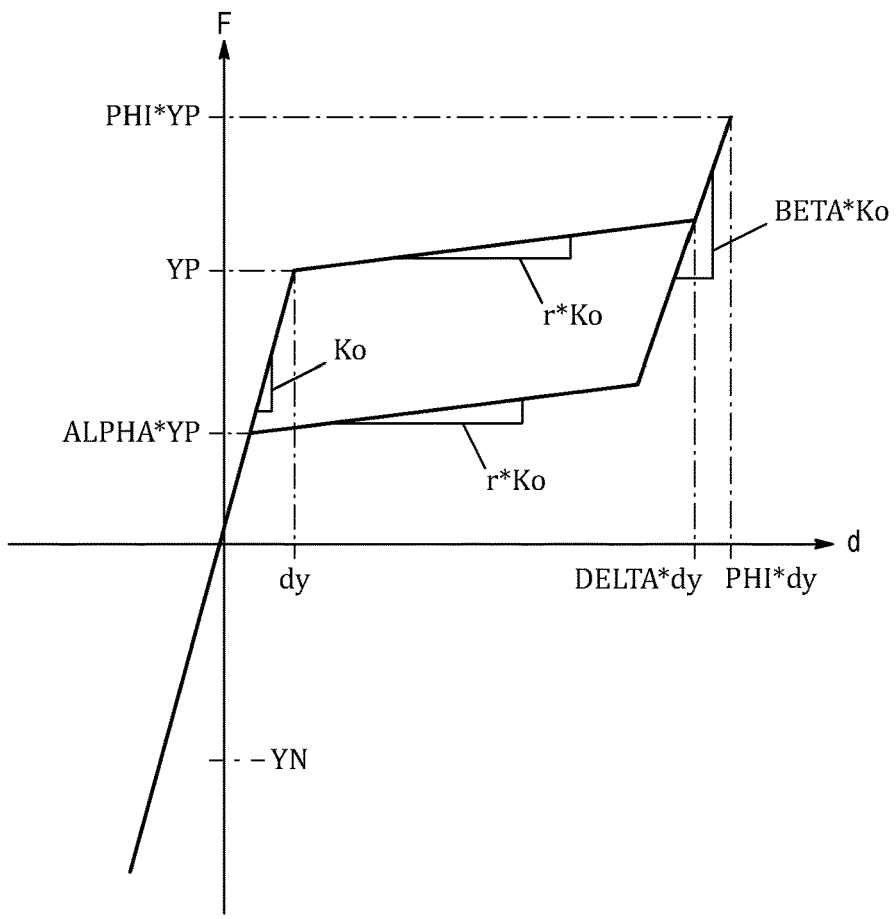
FIG. 12A is a diagram showing modeling parameters for super elastic behavior.
Figure 12B:
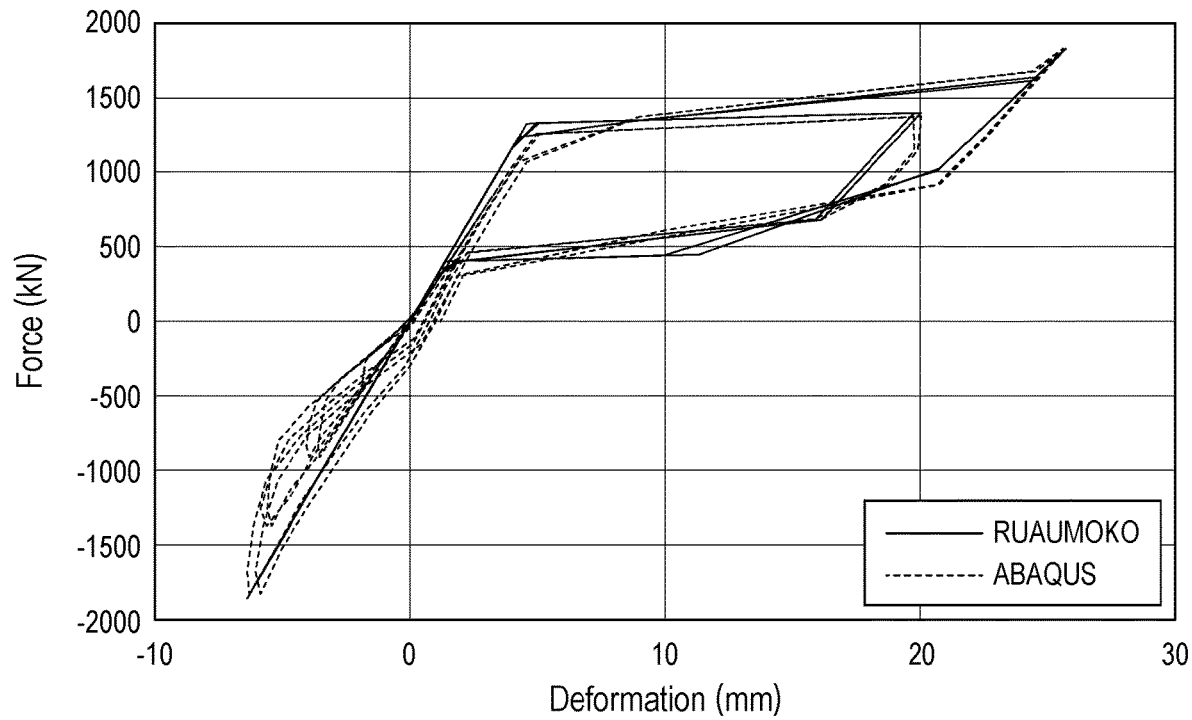
FIG. 12B is a graph of the first embodiment of the structural assembly's (assembly 1) cyclic behavior in RUAUMOKO.
Figure 12C:
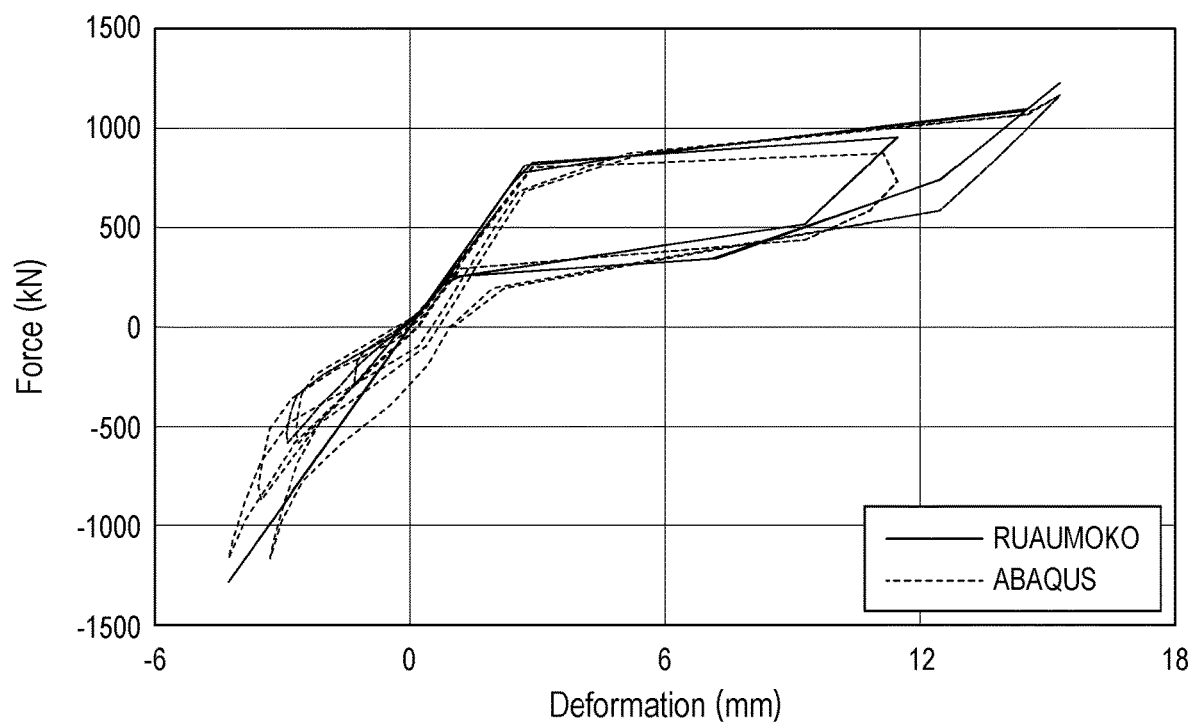
FIG. 12C is a graph of the second embodiment of the structural assembly's (assembly 2) cyclic behavior, similar to FIG. 12B.
Figure 12D:
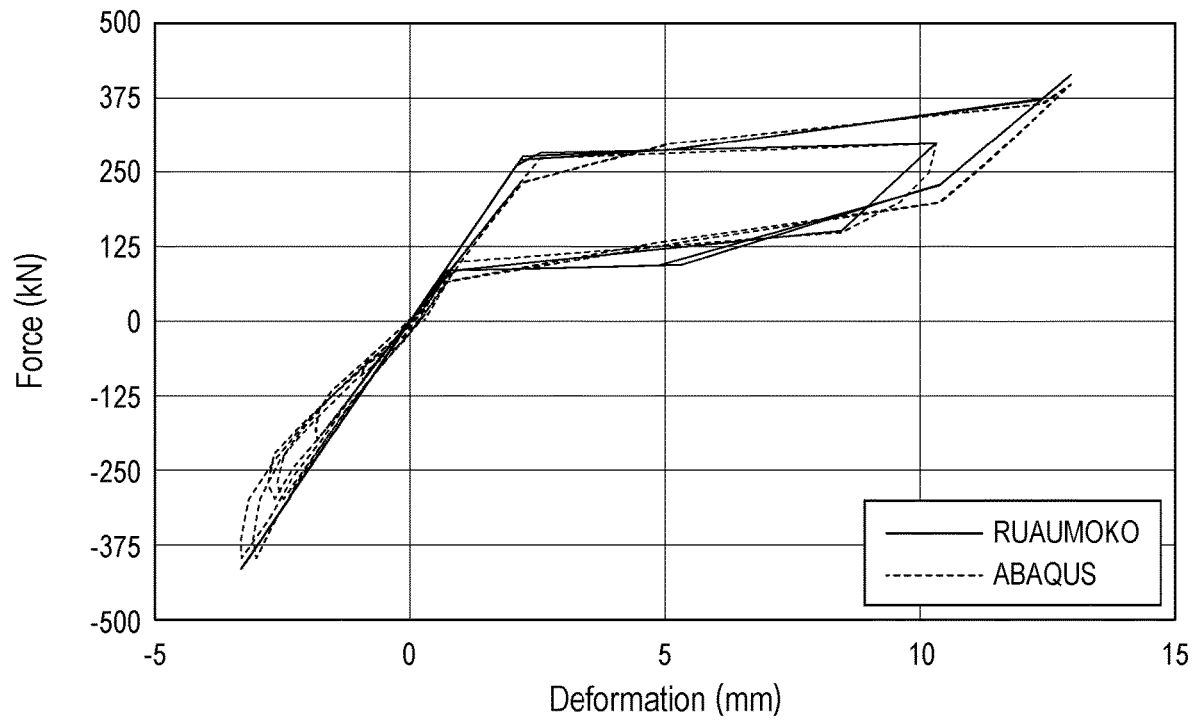
FIG. 12D is a graph the third embodiment of the structural assembly's (assembly 3) cyclic behavior, similar to FIG. 12B.
Figure 12E:
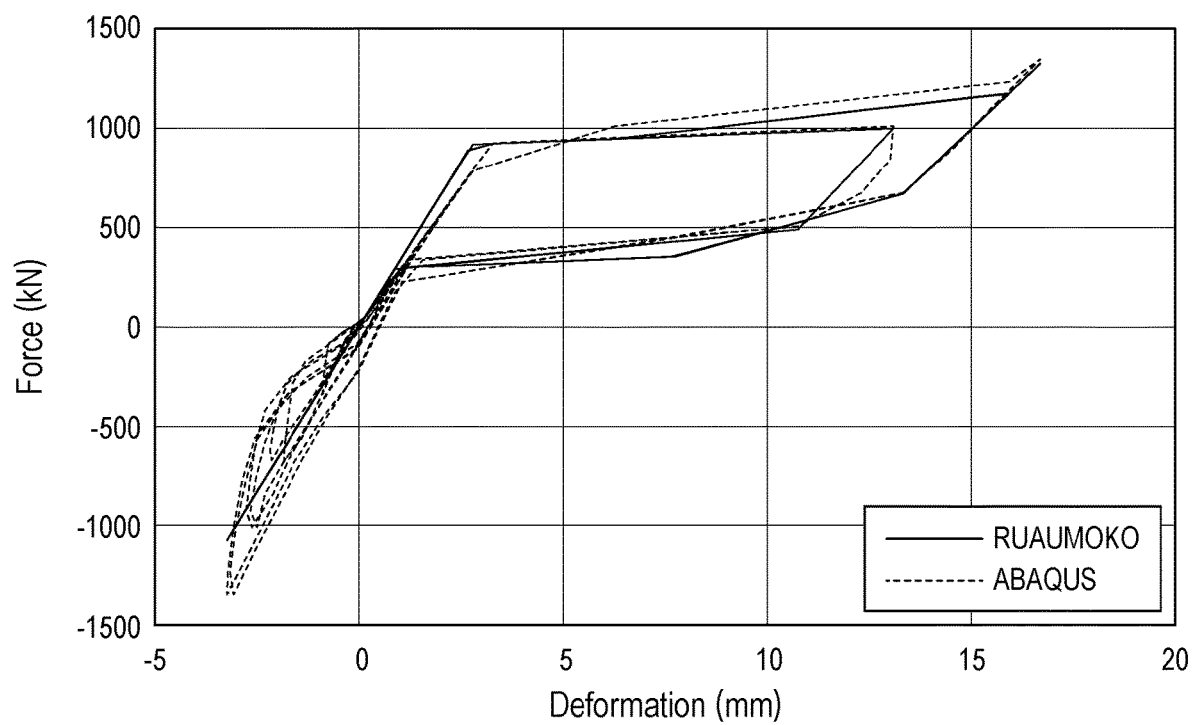
FIG. 12E is a graph of the fourth embodiment of the structural assembly's (assembly 4) cyclic behavior, similar to FIG. 12B.
Figure 12F:
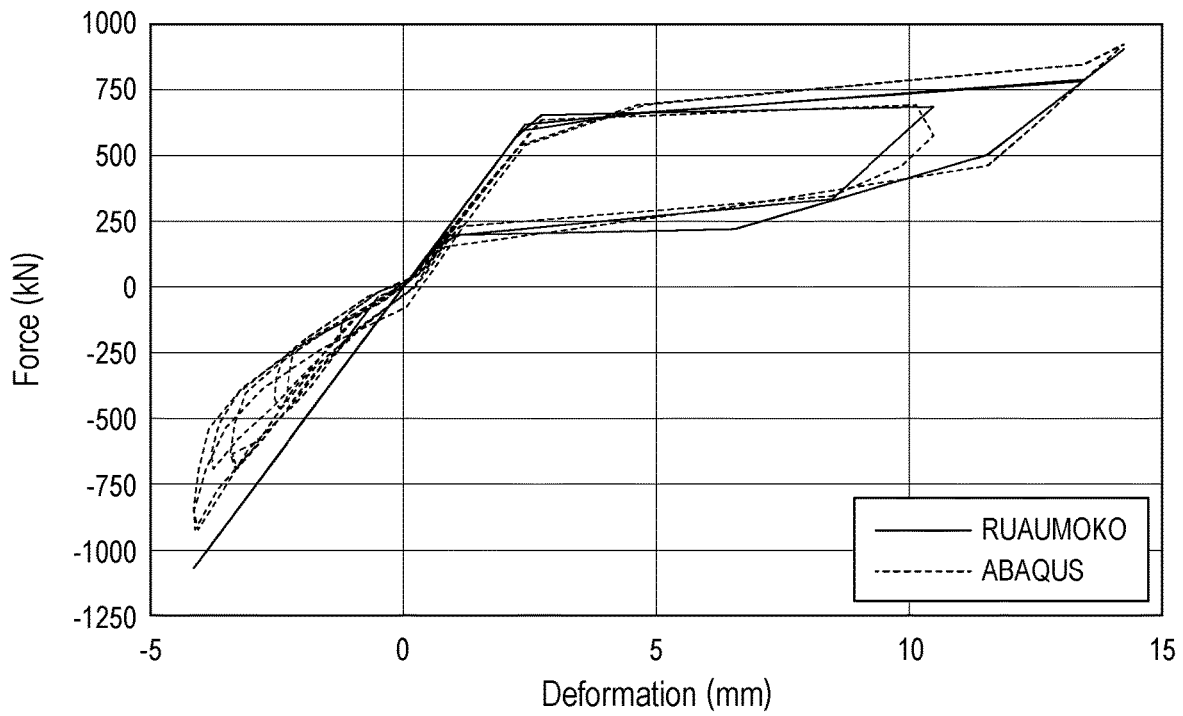
FIG. 12F is a graph of the fifth embodiment of the structural assembly's (assembly 5) cyclic behavior, similar to FIG. 12B.

Cyclic behavior of a frame using the structural bracing system 12, similar to the one shown in FIG. 10A, was studied analytically by using RUAUMOKO-2D (Carr, A. J. (2008), "Ruaumoko-Inelastic Dynamic Analysis Program." Department of Civil Engineering, University of Canterbury, Christchurch, New Zealand) which is a comprehensive dynamic analysis program. The RUAUMOKO model is shown in FIG. 11. The columns 58, beam 56, and the HSS brace sections 42 were modelled with frame elements, as shown in FIG. 11. Elastic-perfectly-plastic behavior was assigned to the frame elements. The behavior of the structural assembly 10 was modelled with a spring element having the cyclic behavior shown in FIG. 12A. This model is available in the RUAUMOKO library for super elastic cyclic behavior. The values of the parameters used to define the model were found by matching the RUAUMOKO hysteretic response to the five cyclic behavior responses obtained from finite element analysis and shown in FIGS. 9A-9E. FIG. 12B shows a good match between the hysteretic responses for the first embodiment of the structural assembly 10 (e.g., assembly 1), for example. The same is true for the second (e.g., assembly 2), third (e.g., assembly 3), fourth (e.g., assembly 4), and fifth (e.g., assembly 5) embodiments of the structural assembly 10 (FIGS. 12C-12F). The values of the modeling parameters are listed in Table 4. The first parameter in the table, α (ALPHA), is the fraction of yield point at unloading path intersection. The second parameter, β (BETA), is the stiffness factor at stiffening path after reaching the end of the flag shape. The third parameter, Δ (DELTA), is the multiplier of yield deformation where stiffening starts. The final parameter, r, is the secondary stiffness factor in the unloading path. These parameters are illustrated in FIG. 12A.

TABLE 4

Cyclic behavior modeling parameters in RUAUMOKO

| α | β | Δ | r |
|---|---|---|---|
| 0.301 | 0.578 | 5.06 | 0.016 |

Figure 13:
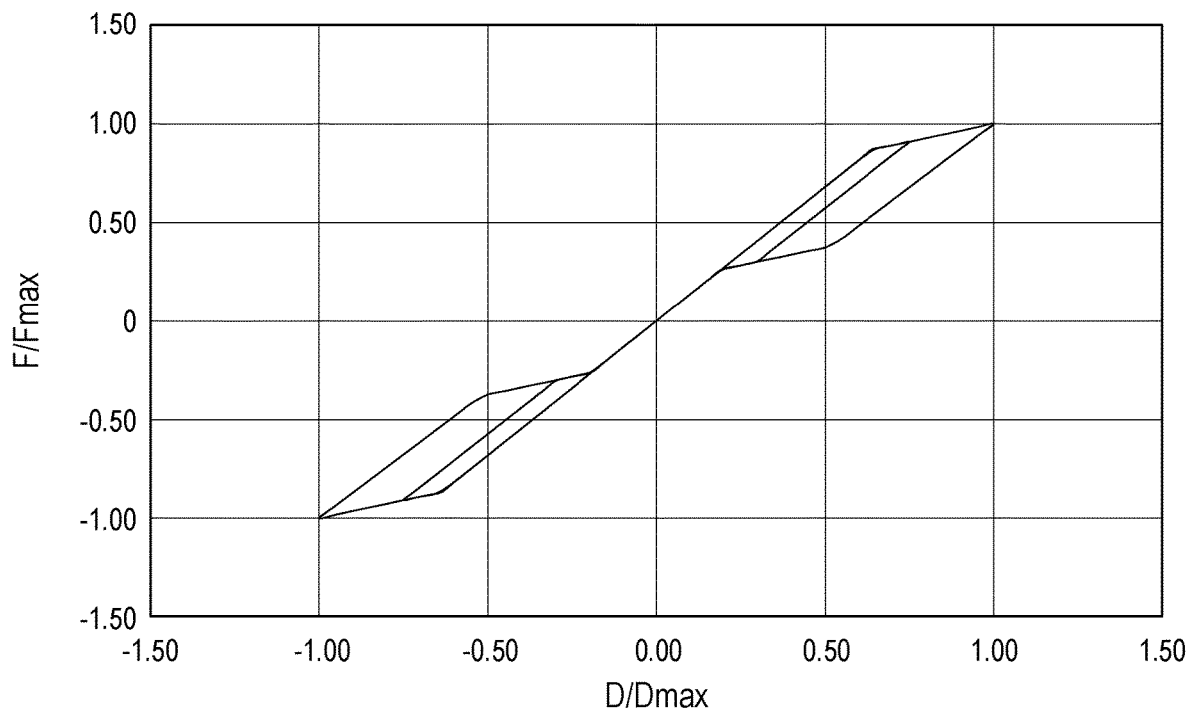
FIG. 13 is a graph of the cyclic behavior of an embodiment of a structural bracing system.

Cyclic behavior of the structural bracing system 12 modelled in RUAUMAKO-2D is shown in FIG. 13. The lateral loading applied to the frame 36 was based on the loading protocol shown in FIG. 7. Since the structural bracing system 12 showed a flag-shape behavior in both tension and compression regions, the system 12 is capable of carrying seismic loads without experiencing permanent deformations. Determination of the structural bracing system 12 ultimate force ($F_{ult}$) and assembly stiffness ($K_{asm}$) of structural assemblies 10 is the key in achieving the desirable behavior (i.e., nonlinear elastic) for the structural bracing system 12.

Determination of Ultimate Force ($F_{ult}$) and Stiffness ($K_{asm}$)

The ultimate force and stiffness of a structural assembly 10 is determined based on the force and stiffness of SCBF braces when ELF load is applied to the SCBF building. The ultimate force in the structural assembly 10 ($F_{ult}$) is determined from Equation (18). $F_{Sbrc}$ is the force in SCBF brace when ELF loading is applied. The value of $\Omega_{SXBF}$ is 2 according to ASCE/SEI7-16 (2016).

$$F_{ult} = \Omega_{SCBF} \times (F_{Sbrc})_{ELF} \quad (18)$$

Equation 19 was used to determine $K_{Sbrc}$, the stiffness of SCBF brace. Since the assembly 10 and the HSS steel section in the structural bracing system 12 function as two springs in series (see FIG. 10A), Equation (20) was used to define the total stiffness of the brace 42 including structural assemblies 10 ($K_{Nibellen}$) The factor of 2 in Equation (20) is based on the assumption that two assemblies 10 have been used (similar to that shown in FIG. 10A). For cases with one assembly 10 operatively connected to in the brace 42, the factor of 2 becomes a factor of 1.

$$K_{Sbrc} = \left(\frac{EA}{L}\right)_{SCBF\ brace\ section} \quad (19)$$

$$\frac{1}{K_{Nibellen}} = \frac{1}{K_{asm}} \times 2 + \frac{1}{K_{HSS}} \quad (20)$$

Since seismic design parameters and drift ratio limits suggested by ASCE/SEI7-16 (2016) are not available for the structural bracing system 12 yet, the total stiffness of brace 42 including one or more structural assemblies 10 ($K_{Nibellen}$) is considered equal to the stiffness of SCBF brace ($K_{Sbrc}$) to pass the drift limits suggested by ASCE/SEI7-16 (2016) for SCBF system. This is shown in Equation (21).

$$K_{Nibellen} = K_{Sbrc} \quad (21)$$

Trial designs showed the stiffness of a steel HSS section ($K_{HSS}$) in a brace 42 including one or more structural assemblies 10 (see FIG. 10A) should be approximately twice the stiffness of SCBF brace in order to have the total stiffness of the brace 42 including one or more structural assemblies 10 ($K_{Nibellen}$) be equal to the stiffness of the SCBF brace. Thus, Equation (22) is considered in the derivations.

$$K_{HSS} = 2 \times K_{Sbrc} \quad (22)$$

Substituting Equations (21) and (22) into Equation (20), Equation (23) is obtained to calculate the stiffness of the assembly 10 or assemblies 10 as a function of the stiffness of a SCBF brace.

$$K_{asm} = \frac{2 \times 2K_{Sbrc} \times K_{Sbrc}}{2K_{Sbrc} - K_{Sbrc}} \rightarrow \begin{cases} (K_{asm})_{having\ 2\ assemblies} = 4 \times K_{Sbrc} \\ (K_{asm})_{having\ 1\ assembly} = 2 \times K_{Sbrc} \end{cases} \quad (23)$$

The cyclic behavior of the assemblies 10 obtained from finite element analyses indicate that the stiffness of the assemblies 10 is, on average, 87% of the target stiffness determined from the design equations. This difference is attributed to the additional deformations in the top and bottom plates 20, 22 and also the nuts 30, 32, which are not included in the design calculations. To include this effect, a K factor is included in Equation (23) to obtain a practical design value for the stiffness of assembly(s) 10. Such is shown in Equation (24).

$$K_{asm} = \frac{1}{\kappa} \times K_{Sbrc} \xrightarrow{\kappa=0.87} \begin{cases} (K_{asm})_{2 \times Assemblies} = 4.6 \times K_{Sbrc} \\ (K_{asm})_{1 \times Assembly} = 2.3 \times K_{Sbrc} \end{cases} \quad (24)$$

Since the structural assembly 10 is the "fuse" in the structural bracing system 12, the maximum force generated from the stack 18 of disks 14 in the assembly 10 is the critical compression force for design of the HSS section. The maximum disk force was obtained by using Equation (8) and setting the value of the disk deformation (d) equal to the disk free height (h), as shown in Equation (25) in which $(\sigma_{cre})_{HSS}$ is the compressive strength of the HSS section.

$$(\sigma_{cre})_{HSS} \times A_{HSS} = (F_{stack})_{d=h} \rightarrow A_{HSS} = \frac{(F_{stack})_{d=h}}{(\sigma_{cre})_{HSS}} \quad (25)$$

The stiffness of the HSS section should satisfy Equation (22). Thus, Equation (26) is used to check the axial stiffness of the HSS section in the structural bracing system 12. Note that the length of the HSS section ($L_{HSS}$) is calculated in Equation (27) based on the assumption that part of the brace length will be allocated to the bracing connections and gusset plates ($L_c$). The value of $L_c$ was taken as 1.5 m (5 ft.). Height of the structural assembly 10 ($H_{asm}$) is multiplied by 2 in cases where two assemblies 10 are used with a brace 42. This factor is replaced by 1 when only one assembly 10 is used with the brace 42.

$$(A_{HSS})_{min} = \frac{2 \times K_{Sbrc} \times L_{HSS}}{E} \quad (26)$$

$$L_{HSS} = L_{Sbrc} - (2 \times H_{asm} + L_c) \quad (27)$$

Chevron beams 56, columns 58, and the connections (e.g., gusset plate 38) have to be able to carry the maximum force that can be generated by the structural bracing system 12. In the compressive brace 54, this force is the stack force when disks 14 are fully deformed (d=h). In the tensile 52 brace, it is the force generated by the Nitinol rods 16 when the tensile deformation of the brace 42 is equal to its compressive deformation when disks 14 are fully deformed. These forces are calculated by Equations (28) and (29), in which $\sigma_{tL}^S$ is the stress at which Nitinol transforms from austenite phase to martensite phase (see Table 2) and $\varepsilon_{tL}^S$ is the strain corresponding to $\sigma_{tL}^S$. The "Chevron Effect" method introduced by Fortney and Thornton (Fortney, P. J. and Thornton, W. A. (2015), "The Chevron Effect—Not an Isolated Problem." Engineering Journal, Vol. 52, No. 2, pp. 125-163; Fortney, P. J. and Thornton, W. A. (2017), "The Chevron Effect and Analysis of Chevron Beams-a Paradigm Shift." Engineering Journal-American Institute of Steel Construction, Vol. 54, No. 4, pp. 263-296) was used to analyze the chevron frame when the mentioned forces are applied. Hadad and Fortney (Hadad, A. A. and Fortney, P. J. (2019). Studying the Ductility Factor for Middle Gusset Connections in Chevron Braced Frame Configurations. Structures Congress 2019: Buildings and Natural Disasters, American Society of Civil Engineers Reston, VA; Hadad, A. A. and Fortney, P. J. (2020), "Investigation on the Performance of a Mathematical Model to Analyze Concentrically Braced Frame Beams with V-Type Bracing Configurations." Engineering Journal, Vol. 57, No. 2, pp. 91-108) have shown a better accuracy of the "Chevron Effect" method in comparison to the Net Vertical Force (NVF) method through studying several cases of beam-gusset assemblies.

$$F_{max,C} = n_D \times \frac{4 \times E \times h \times t^3}{(1 - \mu^2) \times K_1 \times D_o^2} \quad (28)$$

$$F_{max,T} = \left( \sigma_{tL}^S + \frac{n_G \times h - \varepsilon_{tL}^S \times L_{rod}}{L_{rod}} \times E_M \right) \times A_{rods} \quad (29)$$

EXAMPLES

Example 1: Seismic Assessment of the Structural Bracing System (5-Story)

Figure 14:
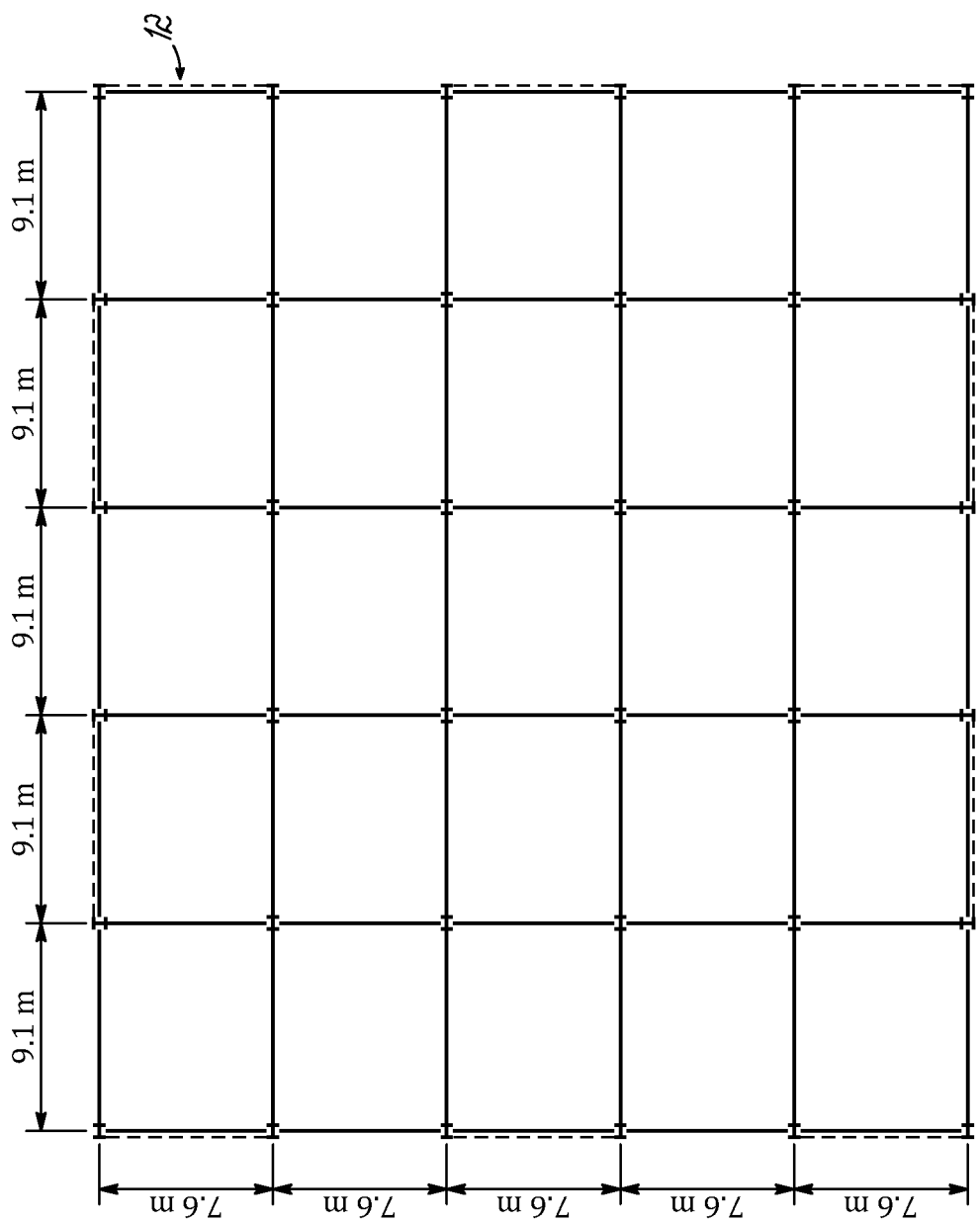
FIG. 14 is a plan view of a five-story braced frame building.

A 5-story office building was selected to study the seismic behavior of an embodiment of the structural bracing system 12 and to compare its performance with a SCBF system. The plan of the building is shown in FIG. 14. The dashed spans in this figure are braced with the structural bracing system 12. Each story has a height of 4.3 m (14 ft.). The loading information is given in Table 5. The building was designed initially based on a SCBF system, and subsequently a structural bracing system 12. The member sizes and dimensions are listed in Tables 6 to 10. The sections were selected according to Steel Construction Manual (AISC (2017), Steel Construction Manual. Chicago, Ill., American Institute of Steel Construction).

TABLE 5

Building information

| Floor dead load (kg/m²) | Floor live load (kg/m²) | Roof dead load (kg/m²) | Roof live load (kg/m²) | $S_s$ (g) | $S_1$ (g) | $T_L$ (s) | Risk category | Site class |
|---|---|---|---|---|---|---|---|---|
| 342 | 244 | 220 | 98.0 | 1.50 | 0.60 | 12.0 | II | D |

TABLE 6

Brace sections

| | SCBF | | Structural Bracing System | |
|---|---|---|---|---|
| Level | XZ | YZ | XZ | YZ |
| 1 | HSS 6 × 6 × ⅝ | HSS 6 × 6 × ½ | HSS 16 × 0.438 | HSS 14 × 0.375 |
| 2 | HSS 6 × 6 × ⅝ | HSS 6 × 6 × ½ | HSS 16 × 0.438 | HSS 14 × 0.375 |
| 3 | HSS 6 × 6 × ½ | HSS 6 × 6 × ½ | HSS 16 × 0.375 | HSS 14 × 0.375 |
| 4 | HSS 6 × 6 × ½ | HSS 5 × 5 × ½ | HSS 16 × 0.375 | HSS 10.75 × 0.375 |
| 5 | HSS 4.5 × 4.5 × ⅜ | HSS 4.5 × 4.5 × ⅜ | HSS 10 × 0.312 | HSS 10 × 0.312 |

TABLE 7

Beam sections

| | SCBF | | Structural Bracing System | |
|---|---|---|---|---|
| Level | Gravity | Chevron | Gravity | Chevron |
| 1 | W 16 × 40 | W 40 × 215 | W 16 × 40 | W 40 × 199 |
| 2 | W 16 × 40 | W 40 × 215 | W 16 × 40 | W 40 × 183 |
| 3 | W 16 × 40 | W 36 × 210 | W 16 × 40 | W 40 × 167 |
| 4 | W 16 × 40 | W 36 × 210 | W 16 × 40 | W 33 × 130 |
| 5 | W 16 × 40 | W 21 × 182 | W 16 × 40 | W 24 × 76 |

TABLE 8

Column sections

| | SCBF | | Structural Bracing System | |
|---|---|---|---|---|
| Level | Exterior | Interior | Exterior | Interior |
| 1 | W 14 × 211 | W 14 × 233 | W 14 × 193 | W 14 × 211 |
| 2 | W 14 × 109 | W 14 × 132 | W 14 × 109 | W 14 × 132 |
| 3 | W 14 × 109 | W 14 × 132 | W 12 × 120 | W 14 × 109 |
| 4 | W 14 × 82 | W 12 × 106 | W 12 × 72 | W 12 × 79 |
| 5 | W 14 × 61 | W 12 × 72 | W 12 × 40 | W 12 × 40 |

TABLE 9

Structural bracing system building brace assemblies-XZ direction

| Level | $n_{asm}$ | $D_o$ (mm) | $D_i$ (mm) | t (mm) | h (mm) | $n_D$ | $n_G$ | $D_{NiTi}$ (mm) |
|---|---|---|---|---|---|---|---|---|
| 1 | 1 | 200 | 92.0 | 14.0 | 4.09 | 8 | 1 | 33.0 |
| 2 | 1 | 180 | 92.0 | 13.0 | 3.51 | 8 | 1 | 33.0 |
| 3 | 1 | 180 | 92.0 | 13.0 | 3.51 | 7 | 1 | 29.7 |
| 4 | 1 | 100 | 51.0 | 8.00 | 2.21 | 10 | 1 | 29.7 |
| 5 | 1 | 80.0 | 41.0 | 5.00 | 1.70 | 14 | 1 | 21.1 |

TABLE 10

Structural bracing system building brace assemblies-YZ direction

| Level | $n_{asm}$ | $D_o$ (mm) | $D_i$ (mm) | t (mm) | h (mm) | $n_D$ | $n_G$ | $D_{NiTi}$ (mm) |
|---|---|---|---|---|---|---|---|---|
| 1 | 1 | 200 | 112 | 16.0 | 2.79 | 5 | 1 | 30.7 |
| 2 | 1 | 200 | 112 | 16.0 | 2.79 | 5 | 1 | 30.7 |
| 3 | 1 | 100 | 51.0 | 6.00 | 2.54 | 22 | 1 | 30.5 |
| 4 | 1 | 100 | 51.0 | 7.00 | 2.21 | 12 | 1 | 27.2 |
| 5 | 1 | 80.0 | 41.0 | 5.00 | 1.60 | 14 | 1 | 21.1 |

Figure 15:
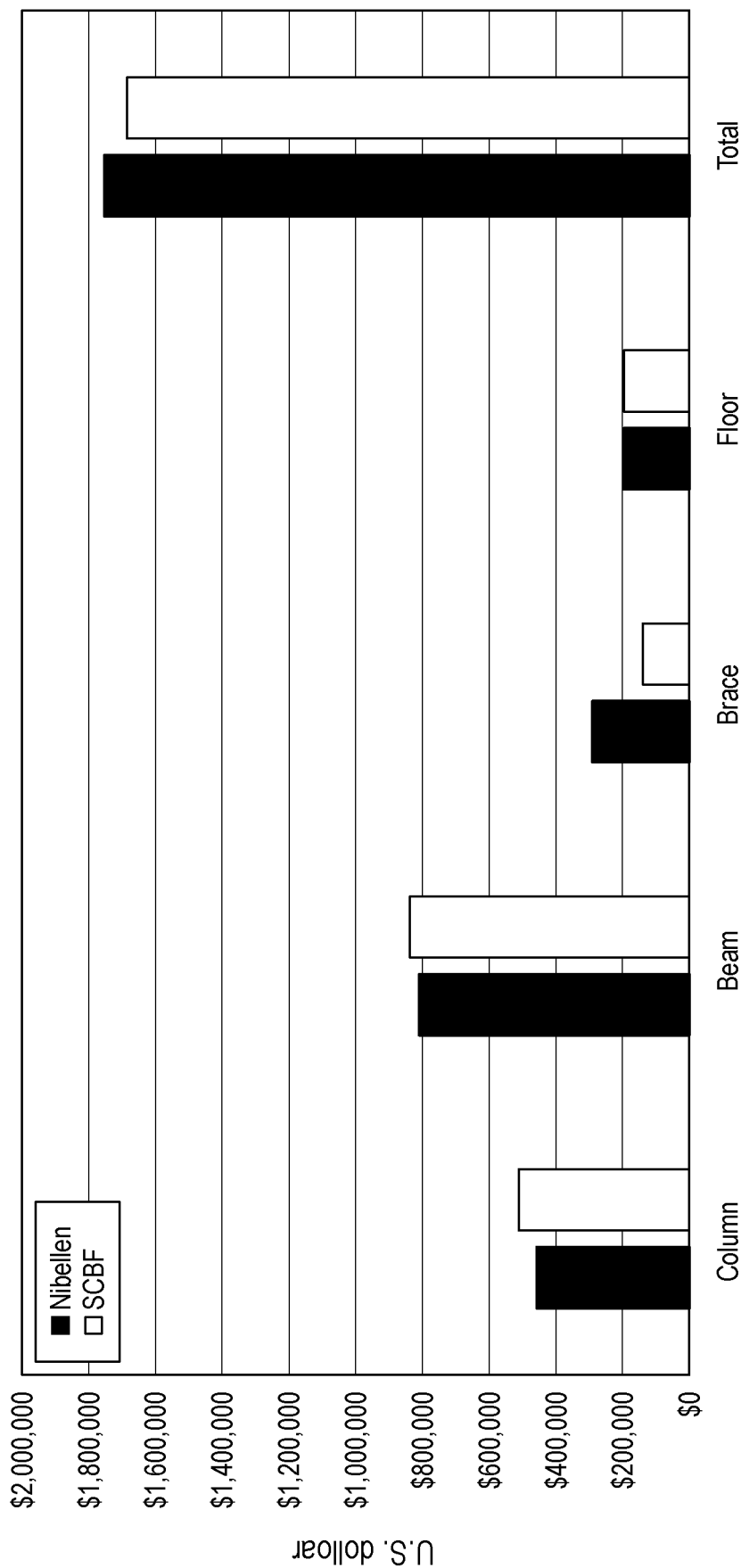
FIG. 15 is a graph showing a comparison of the structural members' construction cost between a structural bracing system (Nibellen) braced building and a special concentrically braced frame (SCBF) braced building.

FIG. 15 compares the construction cost of the designed members in both of the buildings. Construction cost data (Gordian (2018), Building Construction Costs with Rsmeans Data 2018, RS Means Company, Incorporated) were used to estimate the cost of common structural members. Table 11 shows the costs of a number of different diameter Belleville disks 14 and Nitinol rods 16. A compression disk manufacturer (Schnorr, 2003) provided disk costs per item, and a Nitinol manufacturer (SEAS-Group (2018), Shape Memory Alloy Costs (Quotation), Memry corporation) provided the cost of Nitinol rod per weight for the diameter available in stock. The cost of Nitinol rods 16 and Belleville disks 14 used in the studied buildings were estimated based on the cost provided in Table 11. It is worth noting that Bellville disk diameters ($D_o$, $D_i$) and thickness (t) are the key parameters in determining the price for a given disk size, according to the data provided by Schnorr (2003).

Although the brace cost has increased 108% by using new material in the structural bracing system 12, the total construction cost has increased only 4% due to the reduction in the costs of beams and columns. This reduction is possible because of smaller demands in the beams 56 and columns 58 of the chevron braces in the structural bracing system 12 in which the difference between the maximum tension and compression forces (mechanism forces) is less in comparison to SCBF brace mechanism forces. Accounting for the cost of nonstructural elements, the difference between the total costs of the systems will be less noticeable.

To ensure a broad representation of different recorded earthquakes, seven far-field ground motion records were selected from the list of large-magnitude earthquakes provided by FEMA-P695 (FEMA-P695 (2009), Quantification of Building Seismic Performance Factors. Washington, DC.). The response of the 5-story buildings was studied under three ground motion demand levels: (1) maximum base shear of each ground motion is equal to the ELF base shear, (2) the mean spectral acceleration of ground motions matches design-base-event (DBE) spectrum, and (3) the mean spectral acceleration of ground motions matches maximum-considered-event (MCE) spectrum.

Each demand-level was obtained by scaling the ground motion records. The scale factor for the first demand-level was obtained by performing linear response history analysis for each ground motion record, finding the maximum base shear of each record, and calculating the ratio of the maximum base shear over the ELF base shear.

Figure 16:
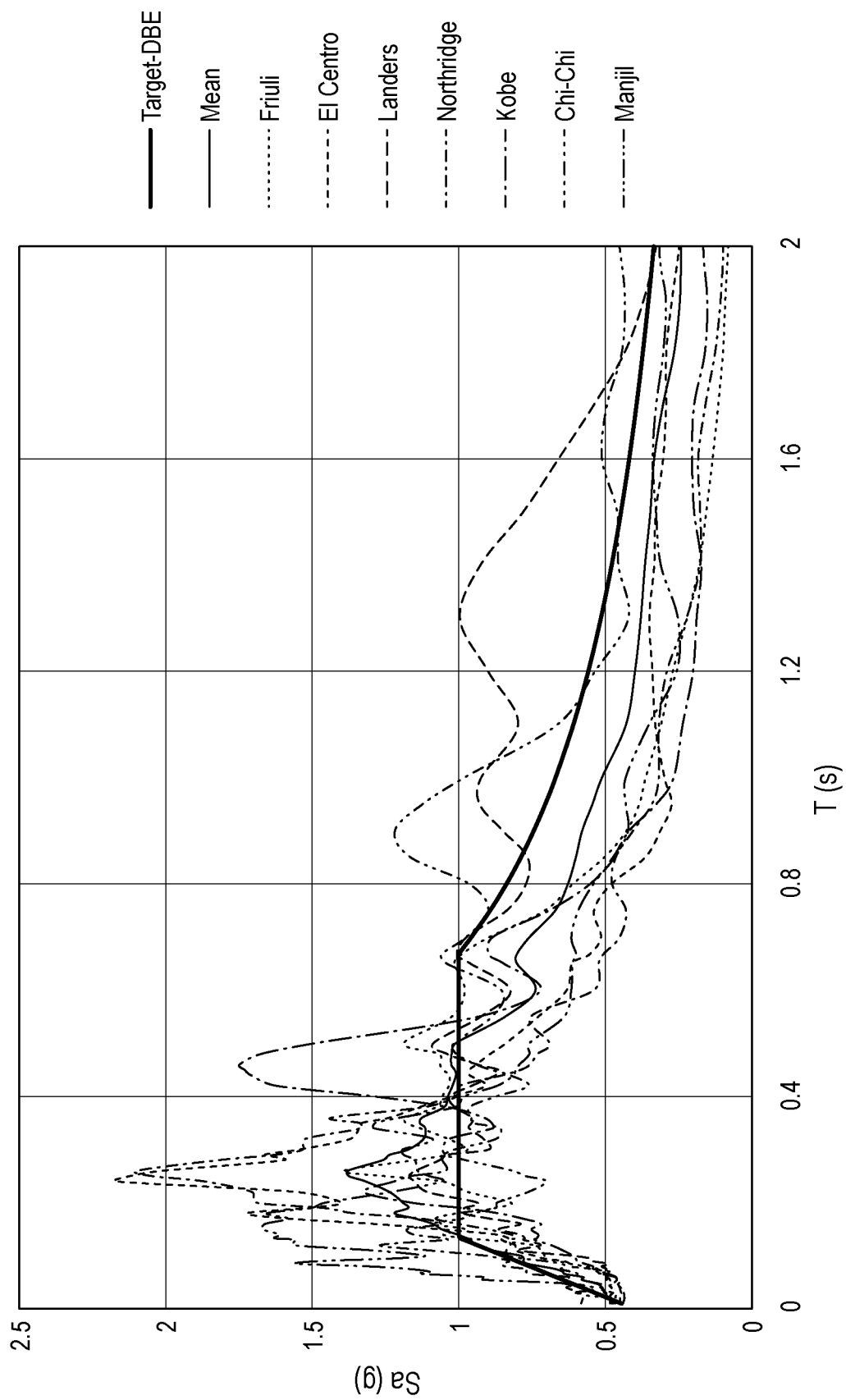
FIG. 16 is a graph showing the spectral acceleration of the scaled selected records versus the design-base-event (DBE) spectrum.

PEER ground motion data base in conjunction with PEER record-scaling-tool were used to find the scale factor for the second demand-level. Target DBE spectrum was generated based on (ASCE/SEI7-16, 2016) for the site of interest (Northern California Region) and then introduced to the tool to match the average ground motion spectrum to the target spectrum. FIG. 16 shows the response spectrum for scaled ground motions versus the DBE spectrum. Since the MCE spectrum can be obtained by multiplying the DBE spectrum by 3/2 (ASCE/SEI7-16, 2016), the scale factors used in the second demand-level were multiplied by 3/2 to obtain the third demand level.

The horizontal components of each ground motion acceleration were applied to the buildings concurrently per (ASCE/SEI4—(2014), Seismic Evaluation and Retrofit of Existing Buildings, ASCE; NITS (2017), Guidelines for Nonlinear Structural Analysis for Design of Buildings Part I—General, Applied Technology Council) to perform response history analyses on the 3-dimensional building models. The aforementioned codes do not require concurrent analysis for regular buildings; however, such analysis was performed to study the behavior of the structural bracing system 12 when used in both building directions. RUAUMOKO-3D (Carr, 2008) was used to perform the analyses. Columns 58, beams 56, and braces 42 were modelled to have an elastic-perfectly-plastic behavior. Structural assemblies 10 were modelled based on the cyclic behavior discussed above with respect to FIGS. 12A-12F. A concrete slab with 10 cm (4 in.) thickness was used as the floor system in buildings. Plane-stress quadrilateral elements with elastic material behavior were used to model the floor

TABLE 11

Structural bracing system assembly materials cost (Schnorr, 2003; SEAS-Group, 2018)

| Item | Information | Cost | Unit |
|---|---|---|---|
| Nitinol Rod | Diameter = 32.3 (mm) | 148 | (U.S. Dollar)/lb. |
| Bellville Disk 1 | $D_o$ = 200, $D_i$ = 102, t = 14 (mm) | 122 | (U.S. Dollar)/Item |
| Bellville Disk 2 | $D_o$ = 200, $D_i$ = 102, t = 5.5 (mm) | 75.0 | (U.S. Dollar)/Item |
| Bellville Disk 3 | $D_o$ = 150, $D_i$ = 81, t = 10 (mm) | 62.0 | (U.S. Dollar)/Item |
| Bellville Disk 4 | $D_o$ = 150, $D_i$ = 81, t = 8 (mm) | 55.0 | (U.S. Dollar)/Item |
| Bellville Disk 5 | $D_o$ = 150, $D_i$ = 71, t = 8 (mm) | 55.0 | (U.S. Dollar)/Item |
| Bellville Disk 6 | $D_o$ = 150, $D_i$ = 61, t = 5 (mm) | 32.0 | (U.S. Dollar)/Item |
| Bellville Disk 7 | $D_o$ = 100, $D_i$ = 51, t = 5 (mm) | 15.0 | (U.S. Dollar)/Item |
| Bellville Disk 8 | $D_o$ = 100, $D_i$ = 51, t = 3.5 (mm) | 9.00 | (U.S. Dollar)/Item |
| Bellville Disk 9 | $D_o$ = 50, $D_i$ = 25.4, t = 3 (mm) | 2.40 | (U.S. Dollar)/Item |
| Bellville Disk 10 | $D_o$ = 50, $D_i$ = 25.4, t = 2 (mm) | 1.78 | (U.S. Dollar)/Item | system. The stiffness for elastic diaphragms, which were modeled by quadrilateral elements, was determined according to the approach recommended by NIST (2017): (a) 30 percent of concrete Young's modulus to reflect an effective stiffness based on the expected deformation and cracking, and (b) 100 percent concrete Poisson's ratio.

Figure 17A:
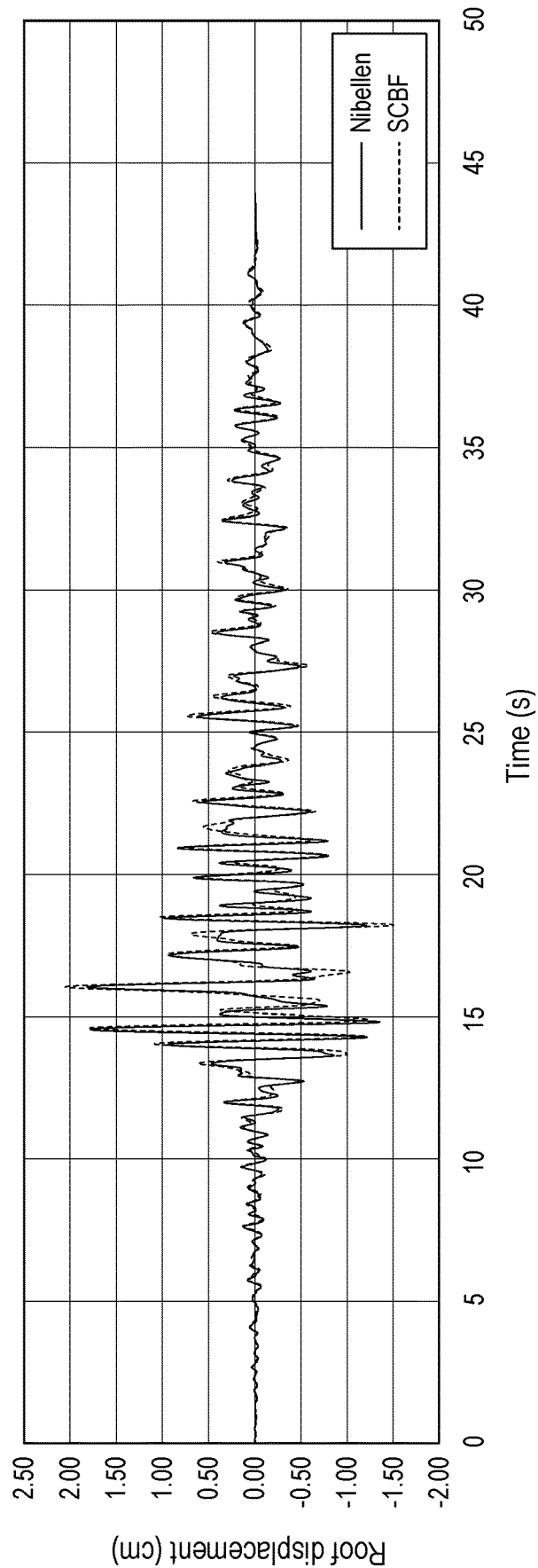
FIG. 17A is a graph showing roof displacement in the X direction under 3 levels of Landers ground motion for a structural bracing system (Nibellen) braced building and a special concentrically braced frame (SCBF) braced building.
Figure 17B:
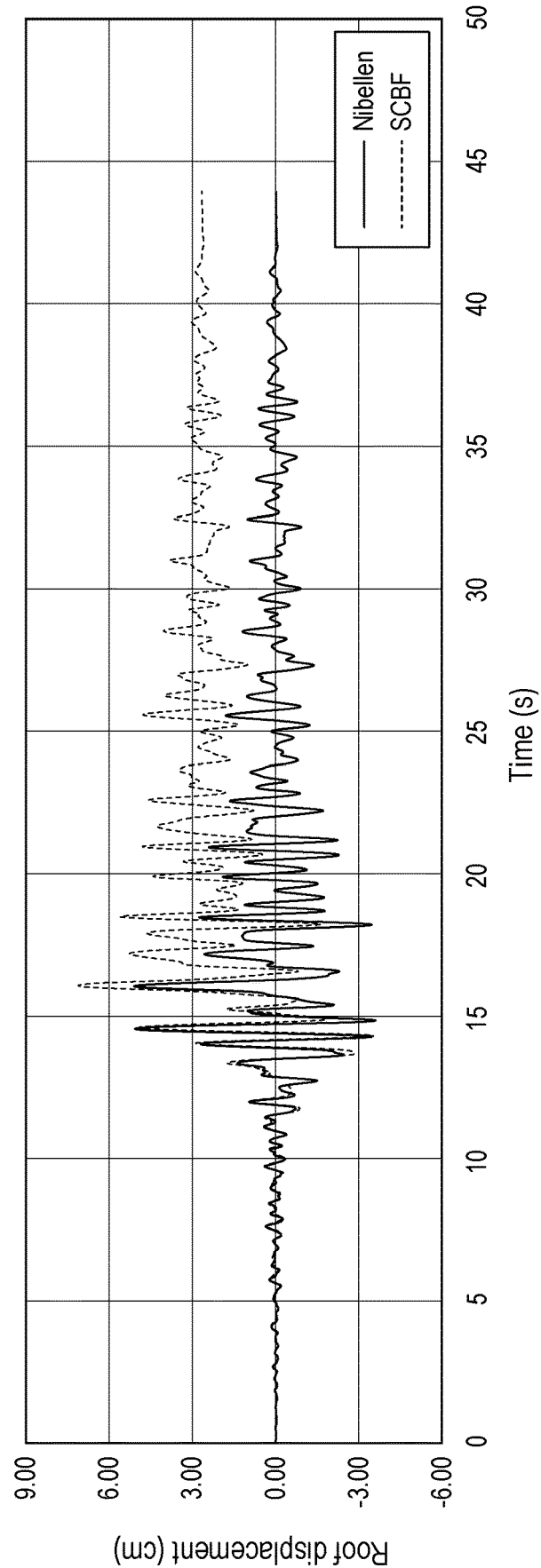
FIG. 17B is a graph showing roof displacement in X direction under 3 levels of Landers ground motion, similar to FIG. 17A.
Figure 17C:
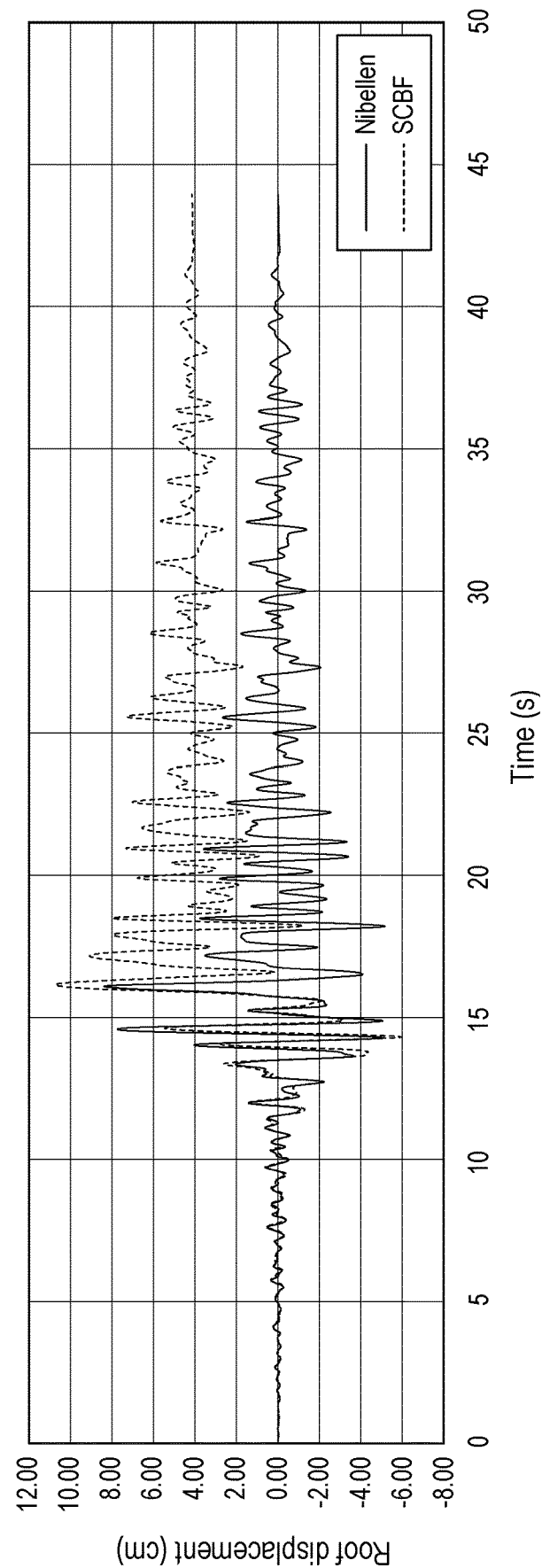
FIG. 17C is a graph showing roof displacement in X direction under 3 levels of Landers ground motion, similar to FIG. 17B.

FIGS. 17A-17C shows representative roof displacement histories for Landers ground motion at different demand-levels. Both systems could resist the earthquake load without residual roof displacement at the first demand level in which the maximum base shear of buildings is equal to the ELF base shear (see FIG. 17A). The SCBF system showed residual roof displacements at the DBE demand level, and a much larger residual value at the MCE demand level (FIGS. 17B and 17C, respectively). The structural bracing system 12, however, did not show any roof residual displacement at both of the DBE and MCE demand levels (FIGS. 17B and 17C, respectively). FIG. 17B shows that ground motion spectral acceleration matches DBE. FIG. 17C shows that ground motion spectral acceleration matches MCE. A similar trend is seen for the other ground motions as evident from Table 12 in which the maximum values of residual roof drifts in the X- and Y-directions are provided in Table 12. The structure using the structural bracing system 12 did not show any residual roof drift at any of the demand levels for any of the ground motions.

TABLE 12

Roof maximum residual diplacement (cm)

| Ground motion | Base shear = ELF | | DBE | | MCE | |
|---|---|---|---|---|---|---|
| | SCBF | Structural Bracing System | SCBF | Structural Bracing System | SCBF | Structural Bracing System |
| Northridge | 0.00 | 0.00 | 0.18 | 0.00 | 0.51 | 0.00 |
| Elcentro | 0.00 | 0.00 | 0.25 | 0.00 | 1.27 | 0.00 |
| Kobe | 0.00 | 0.00 | 0.41 | 0.00 | 1.93 | 0.00 |
| Landers | 0.00 | 0.00 | 2.64 | 0.00 | 4.11 | 0.00 |
| Manjil | 0.00 | 0.00 | 0.05 | 0.00 | 0.56 | 0.00 |
| Chi-Chi | 0.00 | 0.00 | 1.07 | 0.00 | 3.25 | 0.00 |
| Friuli | 0.00 | 0.00 | 0.69 | 0.00 | 1.47 | 0.00 |

Figure 18A:
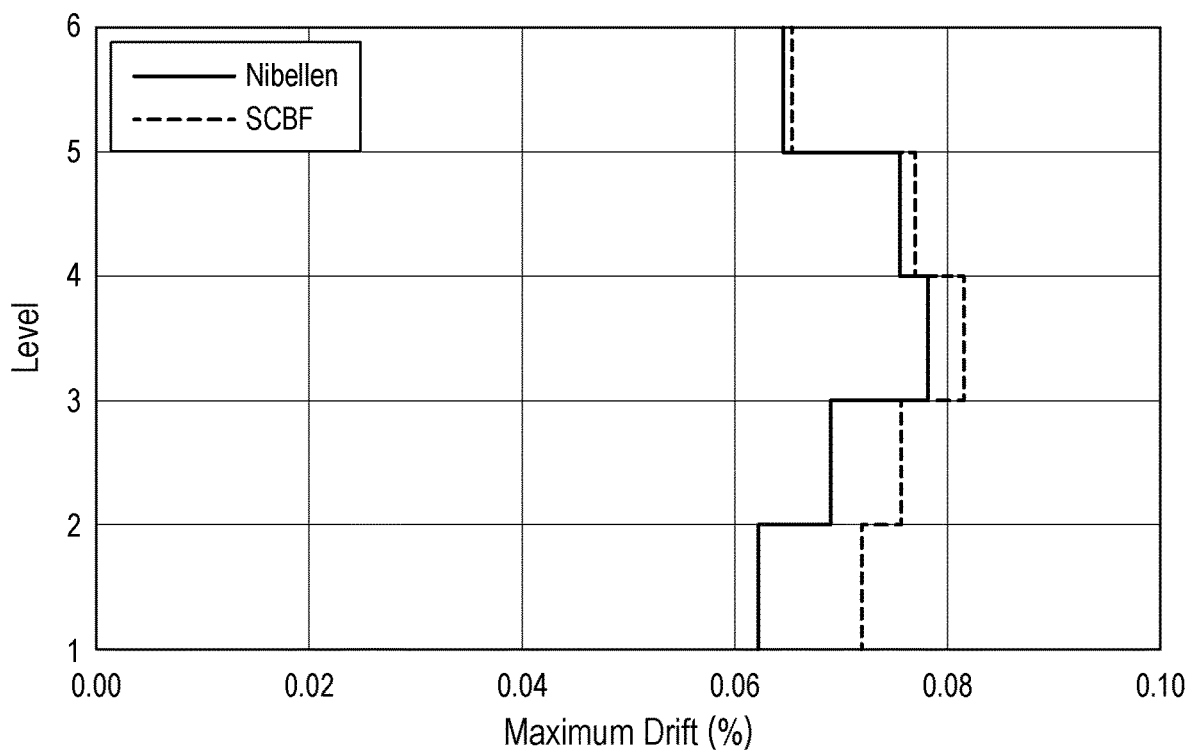
FIG. 18A is a graph showing average of maximum inter-story drift for a 5-story structural bracing system (Nibellen) braced building and a 5-story special concentrically braced frame (SCBF) braced building.
Figure 18B:
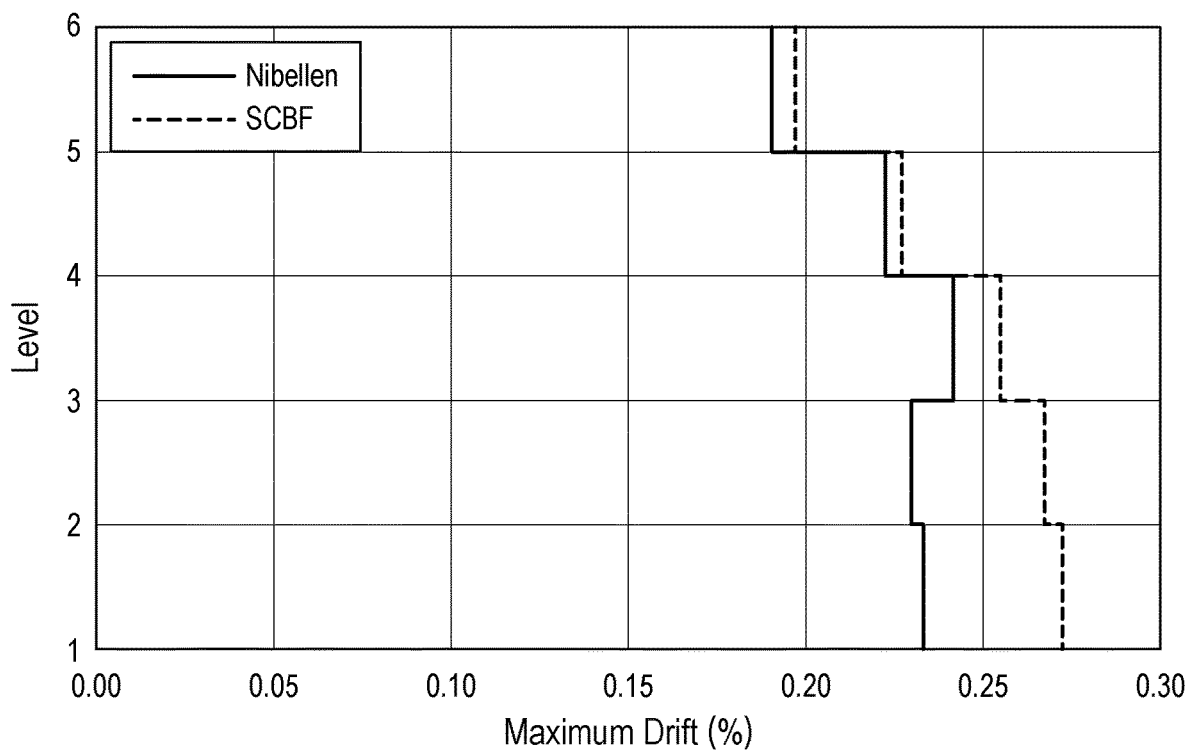
FIG. 18B is a graph showing average of maximum inter-story drift, similar to FIG. 18A.
Figure 18C:
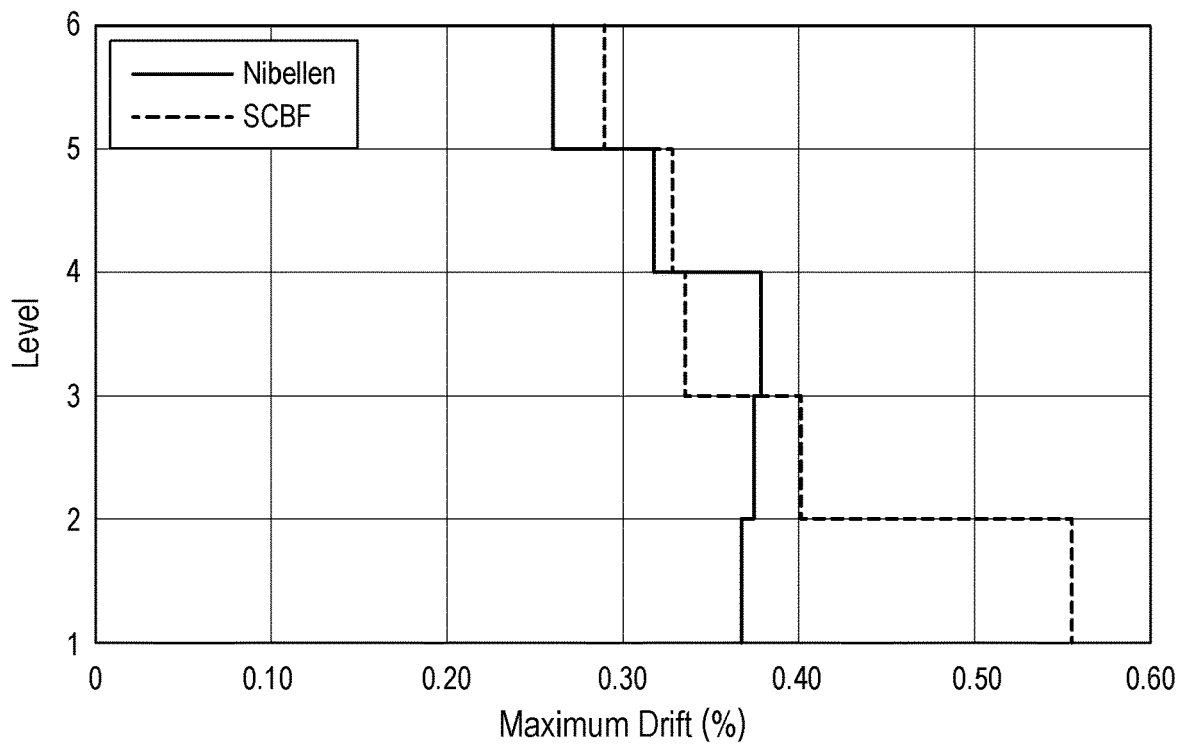
FIG. 18C is a graph showing average of maximum inter-story drift, similar to FIG. 18A.

The average of the maximum inter-story drift is shown in FIGS. 18A-18C for each of the three ground motion demand levels. FIG. 18A shows max base shear equals ELF base shear. FIG. 18B shows mean spectral acceleration matches DBE. FIG. 18C shows mean spectral acceleration matches MCE. Comparing the drift values shows the stiffness of the structural bracing system 12 is close to the SCBF system, as intended in Equation (21). The reason for the larger difference between the drift values at MCE demand level, is the plastic deformations in the SCBF system while the structural bracing system 12 could return to its initial form without plastic deformations.

Resiliency of the System

Seismic resiliency was defined analytically by Bruneau et al. (Bruneau, M., Chang, S. E., Eguchi, R. T., Lee, G. C., O'Rourke, T. D., Reinhorn, A. M., Shinozuka, M., Tierney, K., Wallace, W. A. and Von Winterfeldt, D. (2003), "A Framework to Quantitatively Assess and Enhance the Seismic Resilience of Communities." Earthquake spectra, Vol. 19, No. 4, pp. 733-752) through the measurement of quality degradation in the infrastructure. Equation (30) was used to determine the resiliency. R is the resiliency of the system, Q(t) is the functionality term defined in Equation (31), H is the Heaviside step function, $t_{OE}$ is the event occurrence time, $T_{LC}$ is the control time of the system, $T_{RE}$ is the recovery (repair) time for the event, and $L_S(l)$ is the system's structural loss occurring instantaneously after the seismic event. The structural loss was calculated based on Equation (32) in which $C_{S,j}$ is the damage cost due to damage state j, $P_j$ is the probability of exceeding performance limit state j, and $I_S$ is the total replacement cost.

Performance Assessment Calculation Tool (PACT) provided by FEMA-P58 (FEMA-P58 (2018), Seismic Performance Assessment of Buildings. Washington, DC.) was used to estimate the damage and loss costs. In PACT, each building component and content is associated with a fragility curve that correlates engineering demand parameters to the probability of that item reaching a particular damage state. Story drift ratio was used as the demand parameter. The component's damage was related to a loss (e.g., repair cost or repair time) utilizing consequence functions. The total loss at a certain hazard level was then estimated by integrating losses over all components of a system. To account for the many uncertainties affecting calculation of seismic performance, the FEMA P-58 methodology uses a Monte Carlo procedure to perform loss calculations (Cimellaro, G. P. (2016), "Urban Resilience for Emergency Response and Recovery." Geotechnical, Geological and Earthquake Engineering, Springer International Publishing).

Different types of recovery function ($f_{rec}$) can be selected depending on the system and society preparedness response. The simplest form is the linear recovery function written in Equation (33) which is generally used when there is no information regarding the preparedness, resources available, and societal response (Kafali, C. and Grigoriu, M. (2005). Rehabilitation Decision Analysis. Proceedings of the Ninth International Conference on Structural Safety and Reliability (ICOSSAR'05)).

$$R = \int_{t_{0E}}^{t_{0E}+T_{LC}} \frac{Q(t)}{T_{LC}} dt \quad (30)$$

$$Q(t) = 1 - L_S(l) \times [H(t - t_{0E}) - H(t - (t_{0E} + T_{RE}))] \times f_{rec}(t, t_{0E}, T_{RE}) \quad (31)$$

$$L_s(l) = \sum_j \frac{C_{S,j} \times P_j}{I_S} \quad (32)$$

$$f_{rec}(t, T_{RE}) = \left(1 - \frac{t - t_{0E}}{T_{RE}}\right) \quad (33)$$

Fragility curves were defined as the probability of reaching or exceeding a specific damage state under earthquake excitation. Several fragility functions have been introduced (Nazri, F. M. (2018), Seismic Fragility Assessment for Buildings Due to Earthquake Excitation, Springer), but Equation (34) is the most common equation for fragility, which is based on a research conducted by Yamaguchi and Yamazaki (Yamaguchi, N. and Yamazaki F. (2000). Fragility Curves for Buildings in Japan Based on Damage Surveys after the 1995 Kobe Earthquake. Proceedings of the 12th conference on earthquake engineering, Auckland, New Zealand), and is suitable for all structural types. In this equation, F is the probability of reaching a certain damage state at drift D, φ is the standard normal cumulative distribution function, θ is the median value probability distribution, and β is the logarithmic standard deviation of probability distribution (dispersion).

$$F(D) = \varphi\left(\frac{\ln\left(\frac{D}{\theta}\right)}{\beta}\right) \quad (34)$$

Figure 19A:
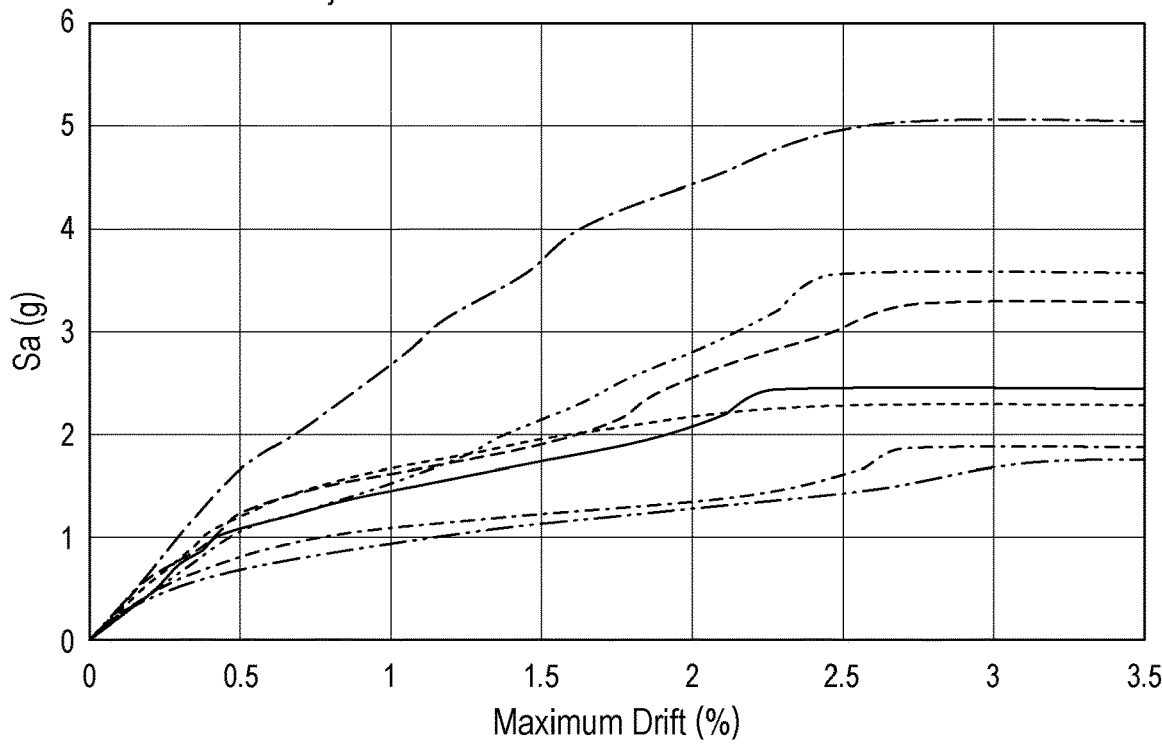
FIG. 19A is a graph showing incremental dynamic analysis of a 5-story special concentrically braced frame (SCBF) braced building.
Figure 19B:
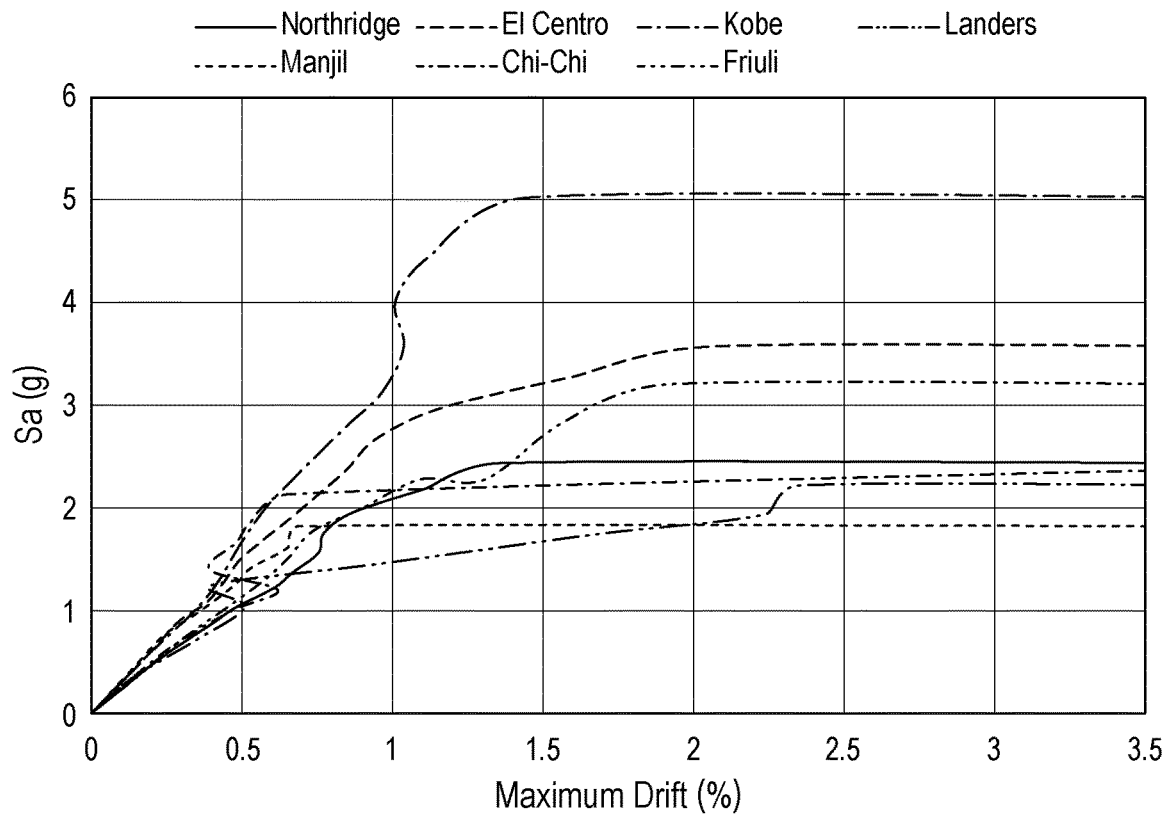
FIG. 19B is a graph showing incremental dynamic analysis of a 5-story structural bracing system (Nibellen) braced building.

Incremental dynamic analysis (IDA) was performed to understand the mean value and the dispersion value for each damage state in the systems. FIGS. 19A and 19B show the results of IDA on the 5-story SCBF and structural bracing system 12 buildings, respectively. The vertical axis shows the spectral acceleration of the ground motions at the first-mode vibration period of the building, and the horizontal axis shows the maximum inter-story drift. The ground motion records were scaled up incrementally until the systems reached collapse. Collapse state was defined as the numerical instability of response history analysis due to the yielding and plastic deformations of gravity members leading to excessive deformations in the building.

Figure 20:
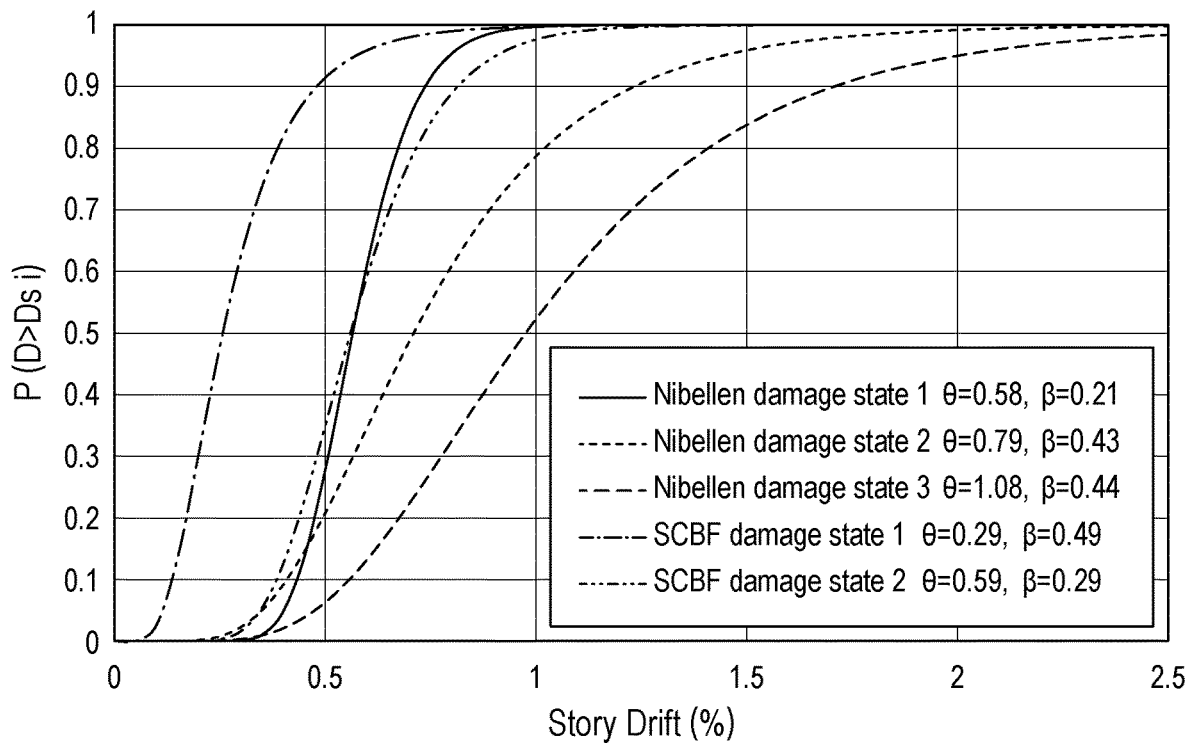
FIG. 20 is a graph showing performance fragility curves of a structural bracing system (Nibellen) braced building and a special concentrically braced frame (SCBF) braced building.

In order to build the fragility curves, two damage states were considered for a SCBF brace: (1) brace compression buckling, and (2) brace tensile yielding. Three damage states were defined for a brace 42 including one or more structural assemblies 10: (1) structural assembly 10 reaching the tensile force corresponds to 6% strain in Nitinols, (2) structural assembly 10 reaching a stack's maximum compression force, and (3) HSS section in the brace 42 including one or more structural assemblies 10 reaching compression buckling force. FIG. 20 shows the fragility curves based on the defined damage states in the systems. The mean and dispersion values for each damage state were obtained by tracking the member's state (force) versus maximum inter-story drift at different increments of the dynamic analysis and saving the value once it reached the damage state limit.

Figure 21A:
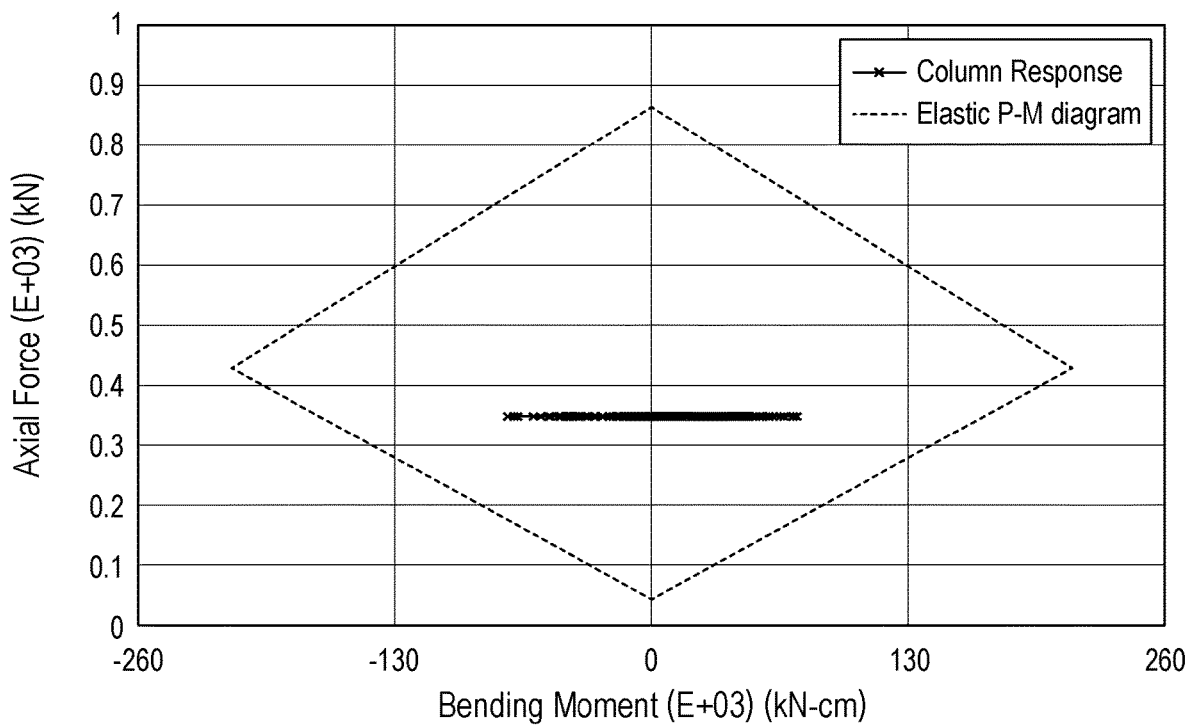
FIG. 21A is a graph showing a representative comparison of demand and capacity for an interior column of a special concentrically braced frame (SCBF) braced building at MCE hazard level.
Figure 21B:
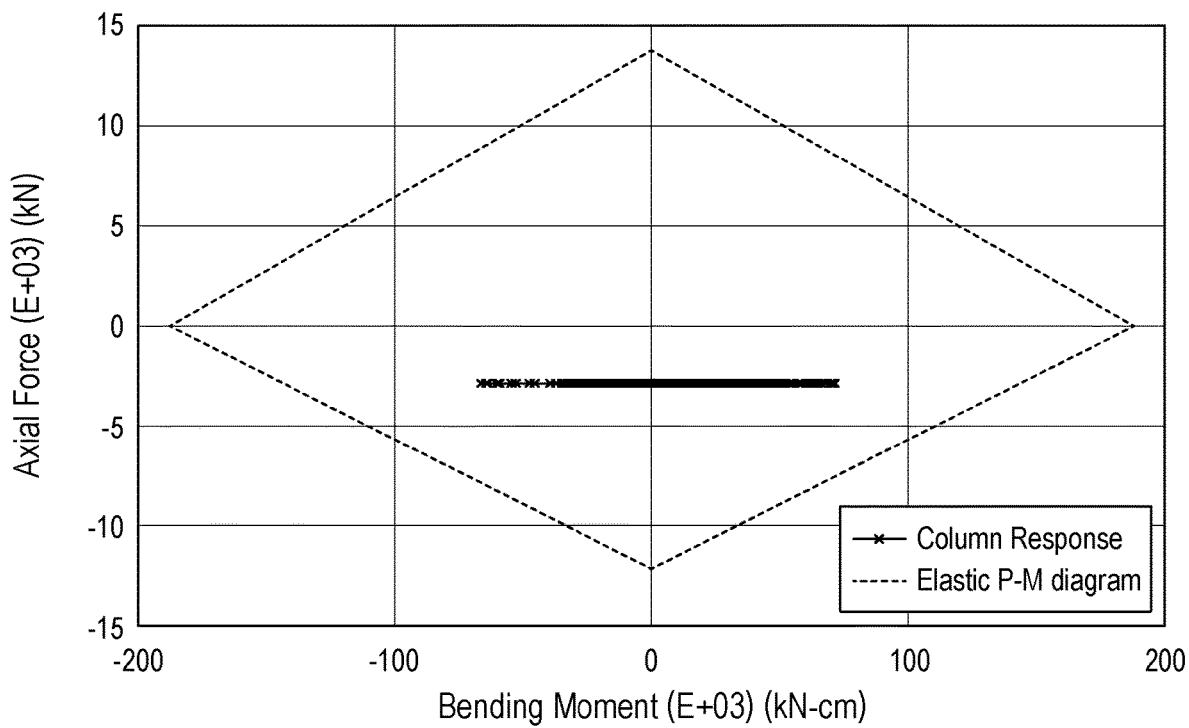
FIG. 21B is a graph showing a representative comparison of demand and capacity for an interior column of a structural bracing system (Nibellen) braced building at MCE hazard level.
Figure 22A:
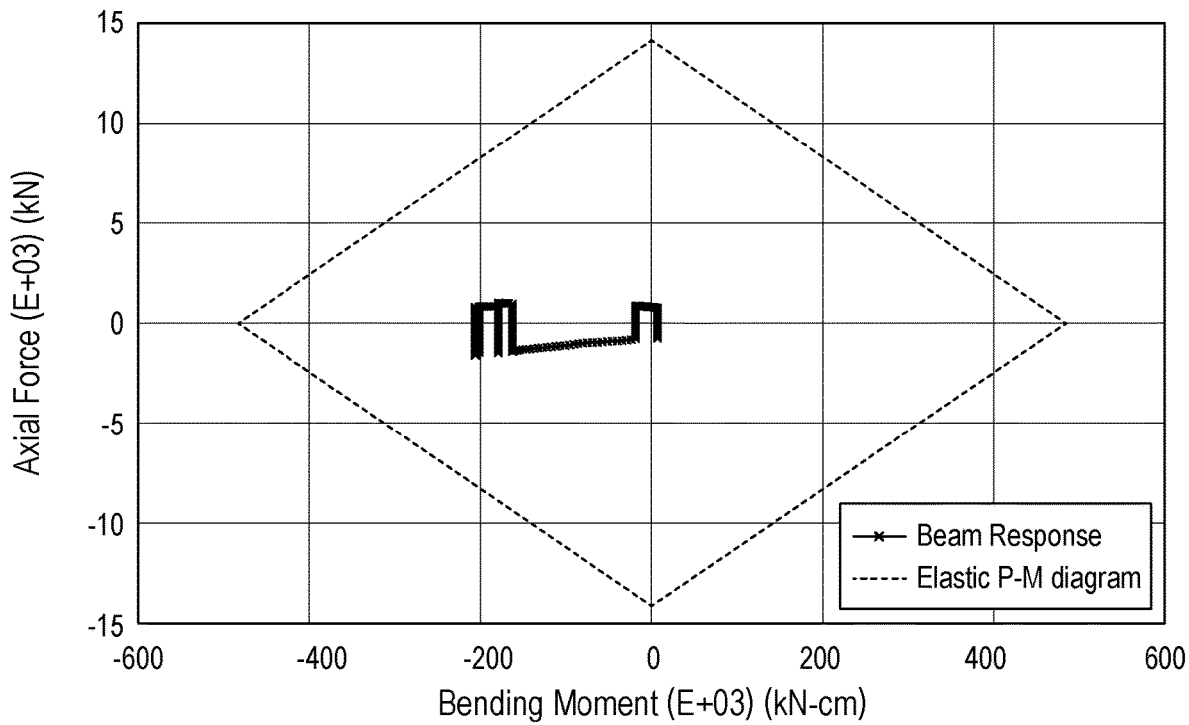
FIG. 22A is a graph showing a representative comparison of demand and capacity for a chevron beam of a special concentrically braced frame (SCBF) braced building at MCE hazard level.
Figure 22B:
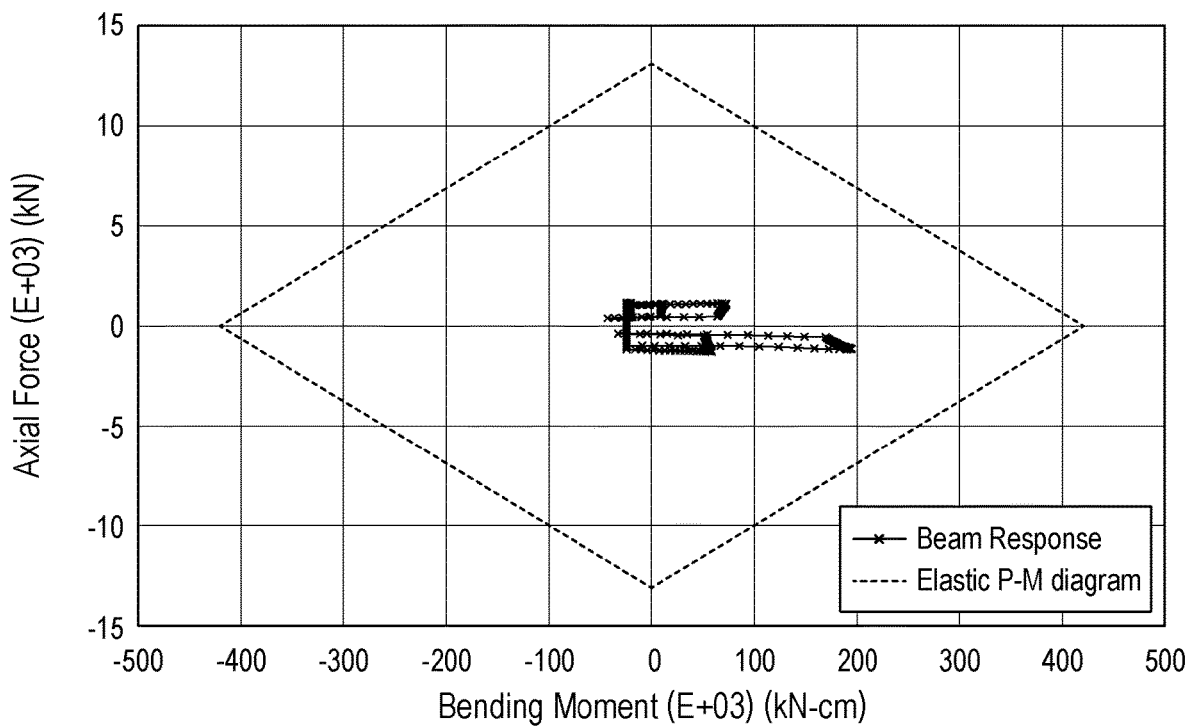
FIG. 22B is a graph showing a representative comparison of demand and capacity for a chevron beam of a structural bracing system (Nibellen) braced building at MCE hazard level.

The beams 56 and columns 58 remained elastic under the hazard levels (DBE and MCE) utilized to assess resiliency of the structural bracing system 12. For example, FIGS. 21A and 21B show the axial force-bending moment elastic interaction diagram for an interior first floor column (which carries the maximum gravity loads) of the structural bracing system 12 and SCBF buildings, respectively, subjected to Chi-Chi ground motion (which among other ground motions caused the maximum demands in the columns) at MCE hazard level. The elastic interaction diagram was obtained from Equation (15) in which $M_E$ is the bending moment strength calculated by Equation (16) and $P_E$ is the tensile and compressive axial strength determined by Equation (17) and Equation (18), respectively. The steel yield strength ($f_y$) was taken as 345 MPa (50 ksi). The critical compressive stress ($f_{cre}$) of the steel sections in compression was obtained from Table 4-22 of AISC (2017). Table 1-1 of AISC (2017) was used to obtain the necessary cross-sectional parameters: area ($A_s$), moment of inertia ($I_s$), and depth ($d_s$). FIGS. 22A and 22B show the axial force-bending moment response of a first-floor chevron beam of the structural bracing system 12 and SCBF buildings, respectively, subjected to Chi-Chi ground motion at MCE hazard level. Equation (15) was also used to obtain the beam interaction diagrams. Beam buckling is prevented by continuous lateral support of the floor diaphragm; hence, $P_E$ is the same for compression and tension. Due to the elastic behavior of beams and columns under the hazard levels, the fragility curves of beams and columns were not included.

$$\frac{M}{M_E} + \frac{P}{P_E} = 1 \quad (35)$$

$$M_E = f_y \times \frac{I_s}{0.5 \times d_s} \quad (36)$$

$$P_E(\text{compression}) = f_{cre} \times A_s \quad (37)$$

$$P_E(\text{tension}) = f_y \times A_s \quad (38)$$

Figure 23A:
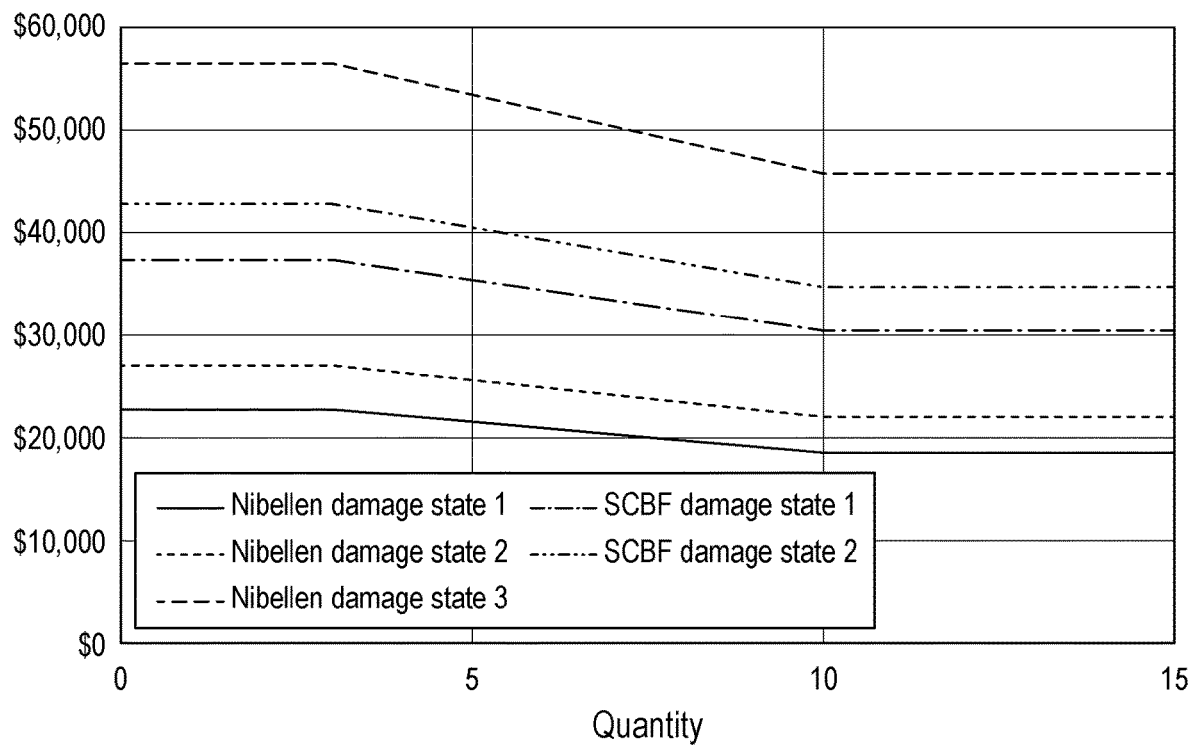
FIG. 23A is a graph showing consequence functions for repair cost for a structural bracing system (Nibellen) braced building and for a special concentrically braced frame (SCBF) braced building.
Figure 23B:
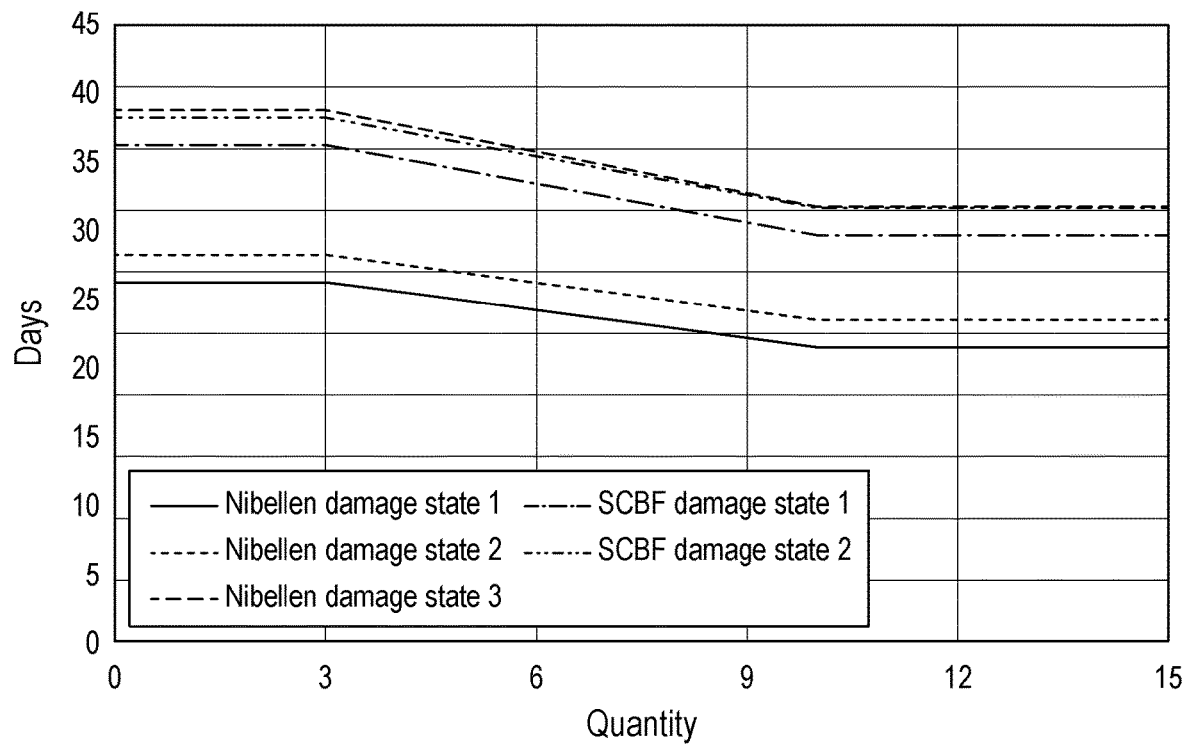
FIG. 23B is a graph showing consequence functions for repair time, similar to FIG. 23A.

The repair cost and time of the systems were developed based on PACT supporting material and digital libraries (FEMA-P58, 2018), construction costs data (Gordian, 2018), and engineering judgment. This data is input into PACT through consequence functions. Consequence functions are relationships that indicate the potential distribution of losses as a function of the damage state, and they translate damage into potential repair and replacement costs and repair time. FIGS. 23A and 23B show the consequence functions defined for the SCBF and structural bracing system 12. To repair the first damage state in a SCBF brace, only the braces in a chevron frame need be replaced since they have buckled. Repairing the second damage state in the SCBF includes further actions since the braces have yielded in tension, and all other members in the system have experienced the maximum force (mechanism force) that can be generated by the braces. Thus, the repair includes replacing the braces, replacing the connection gusset plates, and some local repairs on the beams and columns.

Regarding the repair of the structural bracing system 12, only the Nitinol rods 16 have to be replaced in the first damage state. The structural assembly 10 has to be replaced in the second damage state. Repair of the third damage state requires replacement of structural assembly 10, the HSS brace 42 section, and the connection gusset plates 38 in addition to some local repairs of the beams 56 and columns 58. Some generic costs with respect to removal of nonstructural elements (such as removal of architectural and mechanical, electrical, and plumbing systems), obtaining access to damaged elements, and temporary activities (such as removal or protection of the contents adjacent to the damaged area and protection of the surrounding area against dust and noise with temporary enclosures) were also included in all the repair costs based on FEMA P-58 provided data.

Figure 24:
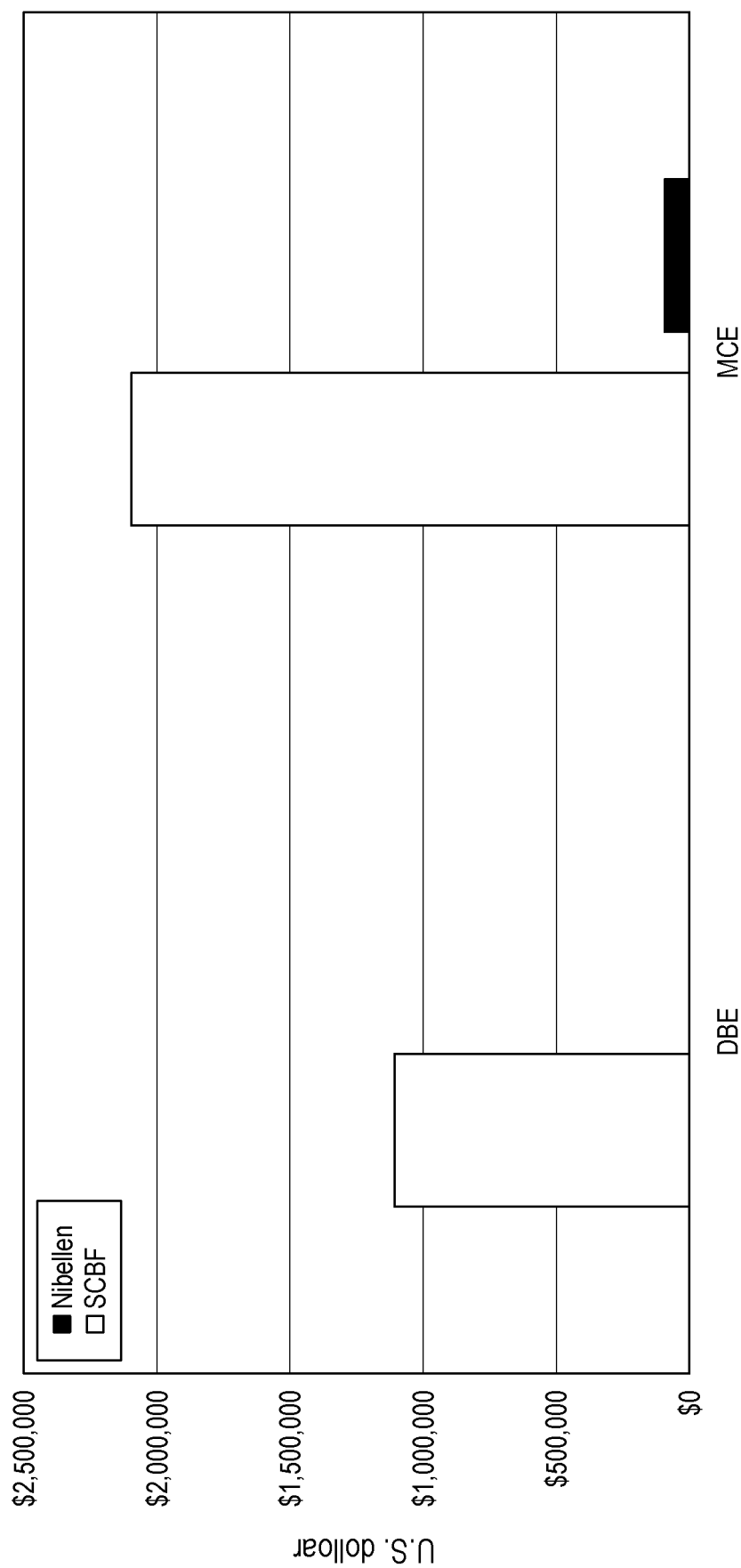
FIG. 24 is a graph showing repair cost of the structural bracing system (Nibellen) braced building and special concentrically braced frame (SCBF) braced building at DBE and MCE.
Figure 25A:
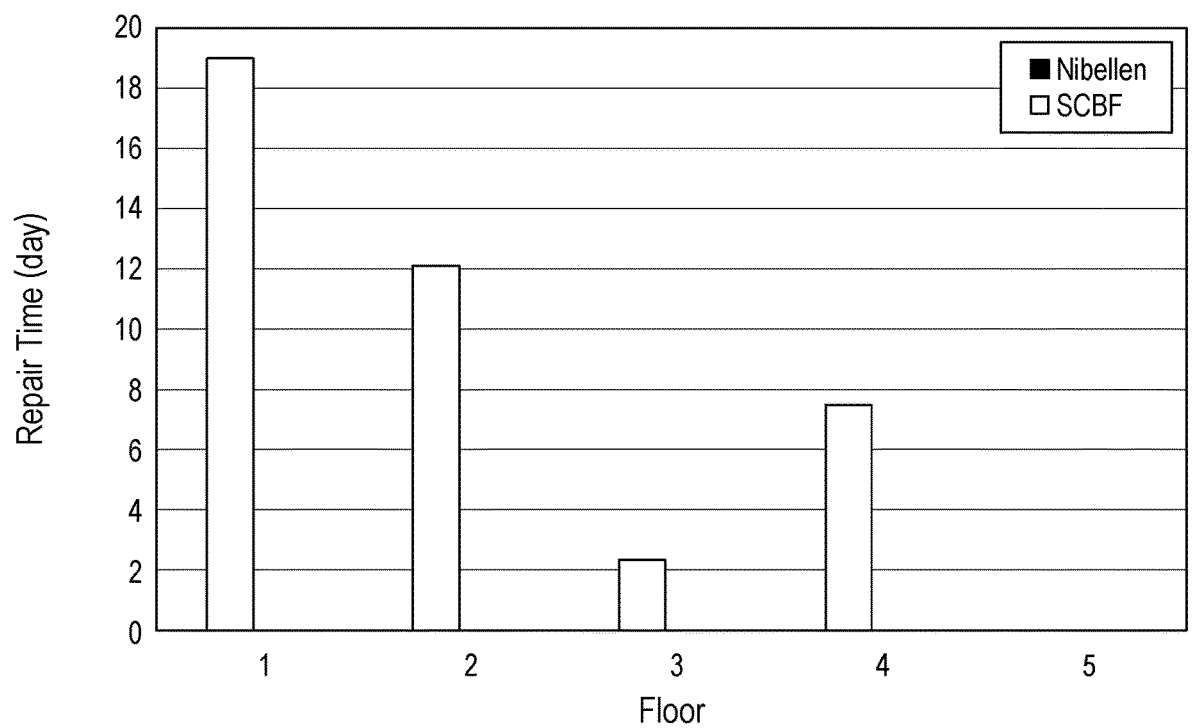
FIG. 25A is a graph showing repair time for each floor of a structural bracing system (Nibellen) braced building and of a special concentrically braced frame (SCBF) braced building at DBE hazard level.
Figure 25B:
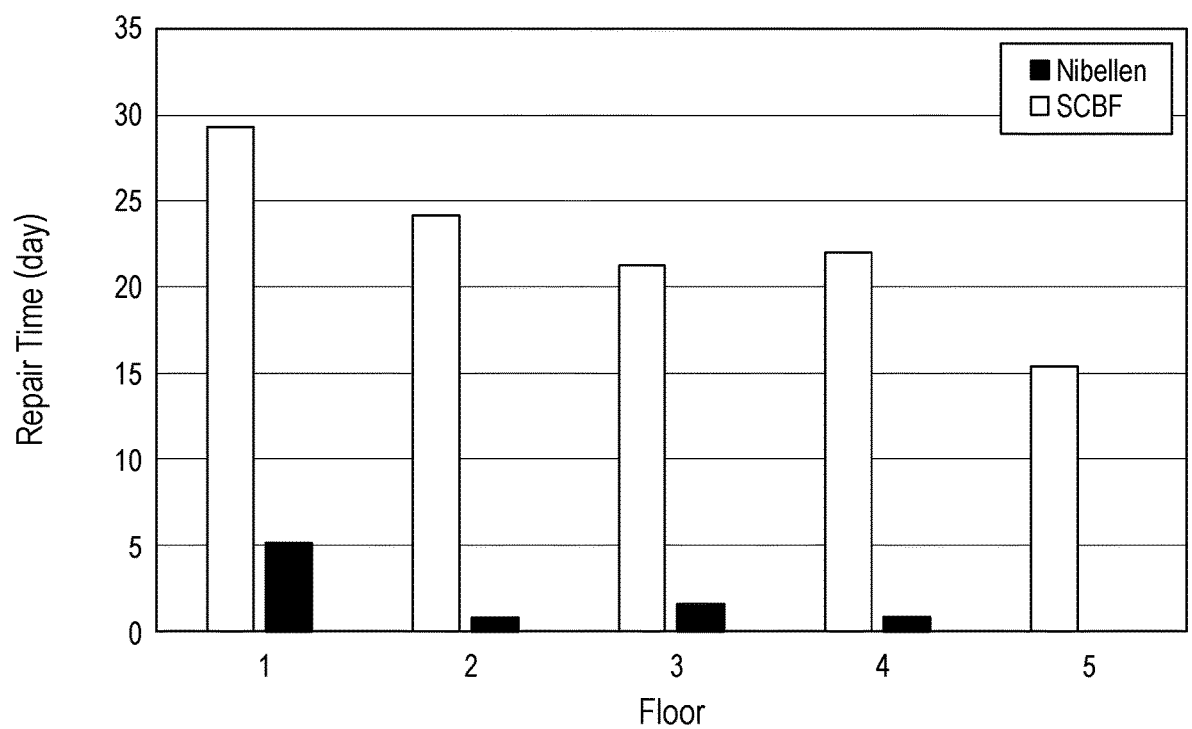
FIG. 25B is a graph showing repair time for each floor of the buildings at MCE hazard level, similar to FIG. 25A

The structural loss, the repair cost, and the repair time were determined by inputting the defined fragility functions (FIG. 20) and consequence functions (FIGS. 23A and 23B) and also the maximum inter-story drift values (FIGS. 18A-18C) into the PACT software. FIGS. 24-25B compare the total repair cost and repair time of each floor, respectively at DBE and MCE demand levels. All the floors were assumed to be repaired concurrently. The complete repair of the SCBF system took 19 days at the DBE demand level, and 29 days at the MCE demand level. These numbers are 0 and 5 days, respectively, in the structural bracing system 12.

The building system using bracing 42 including one or more structural assemblies 10 did not reach any damage state under DBE demand level and, accordingly, FIGS. 24-25B do not show any repair cost and repair time. On the other hand, the SCBF building experienced some damage, resulting in appreciable repair cost and time. While both systems experience some damage at MCE, the extent of damage is higher in the SCBF system. Although the construction cost was increased by 4% in the structural bracing system 12 (see FIG. 15), the repair cost has been reduced by 100% at DBE demand level and by 95% at MCE demand level in comparison to the SCBF building, hence, negating the construction cost increase of 4%.

Figure 26A:
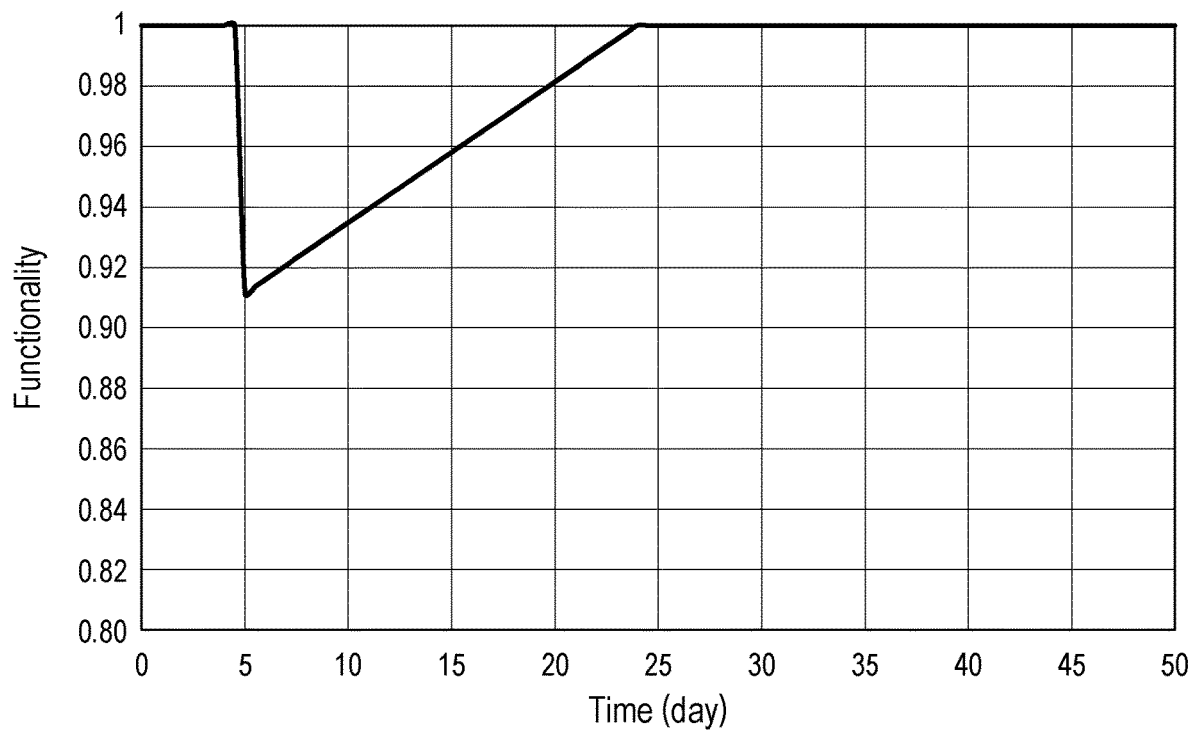
FIG. 26A is a graph showing functionality and calculation of resiliency R for a special concentrically braced frame (SCBF) braced building (Hazard=DBE, R=0.93).
Figure 26B:
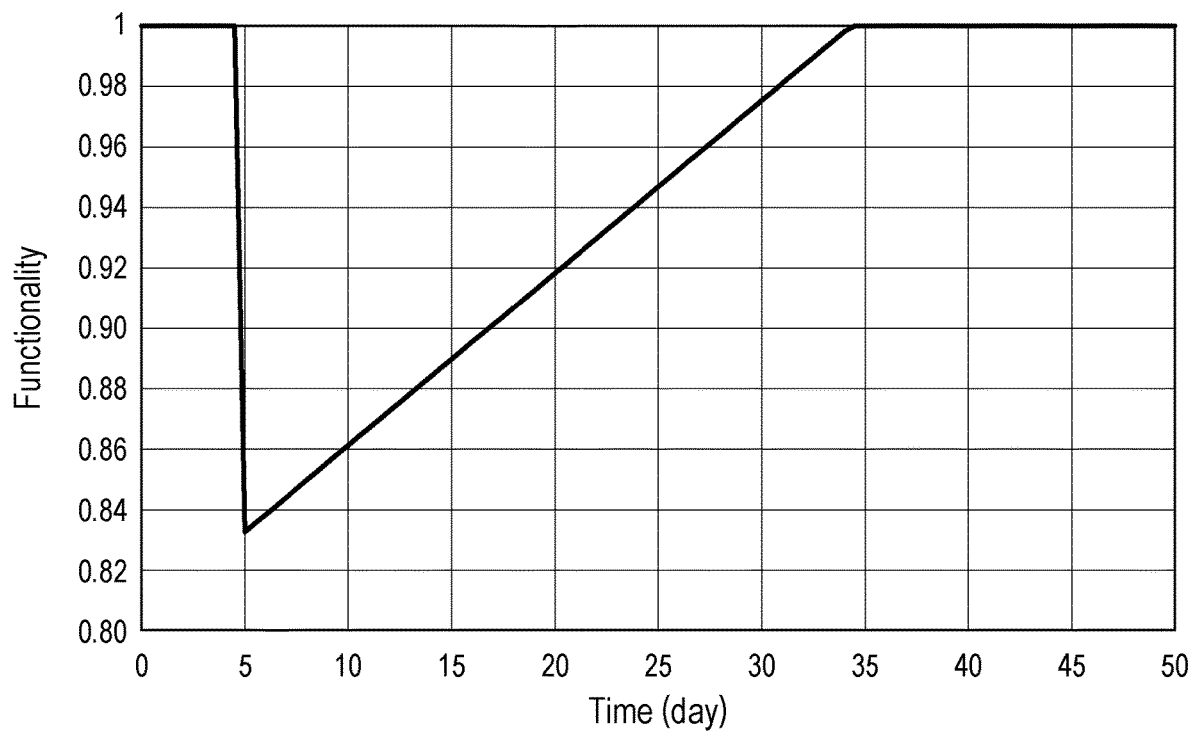
FIG. 26B is a graph showing functionality and calculation of resiliency R, similar to FIG. 26A (Hazard=MCE, R=0.91).
Figure 26C:
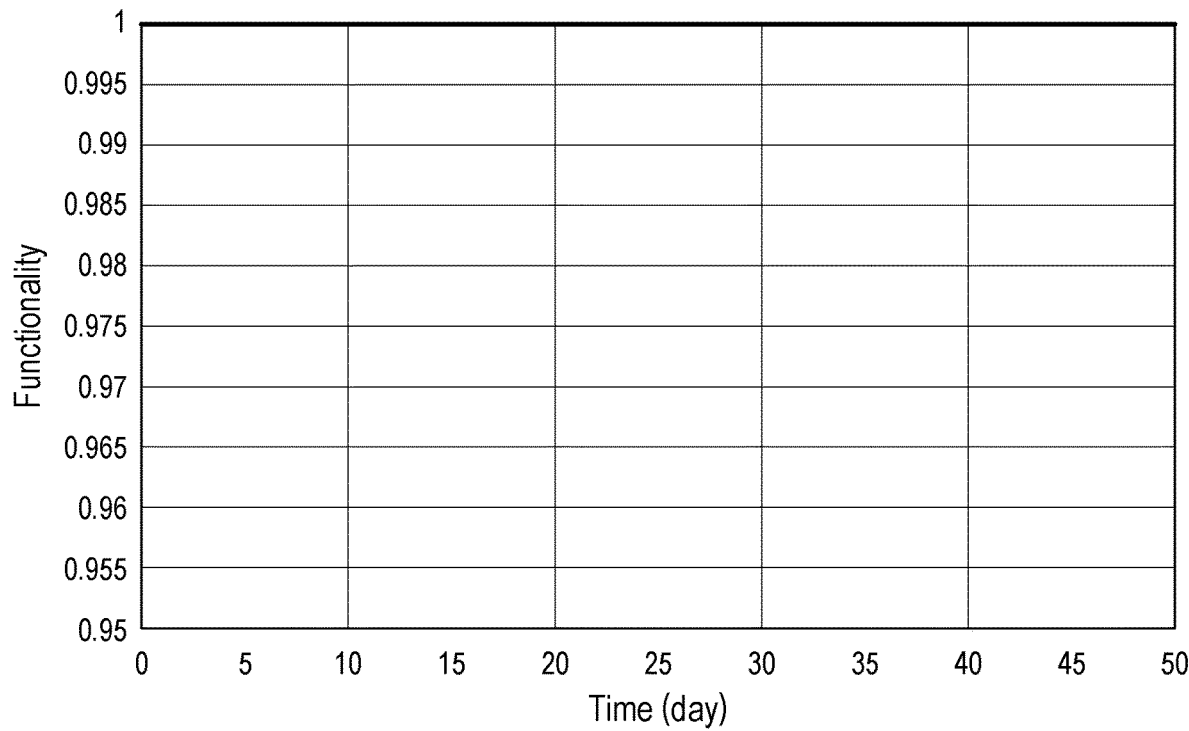
FIG. 26C is a graph showing functionality and calculation of resiliency R for a structural bracing system (Nibellen) braced building (Hazard=DBE, R=1).
Figure 26D:
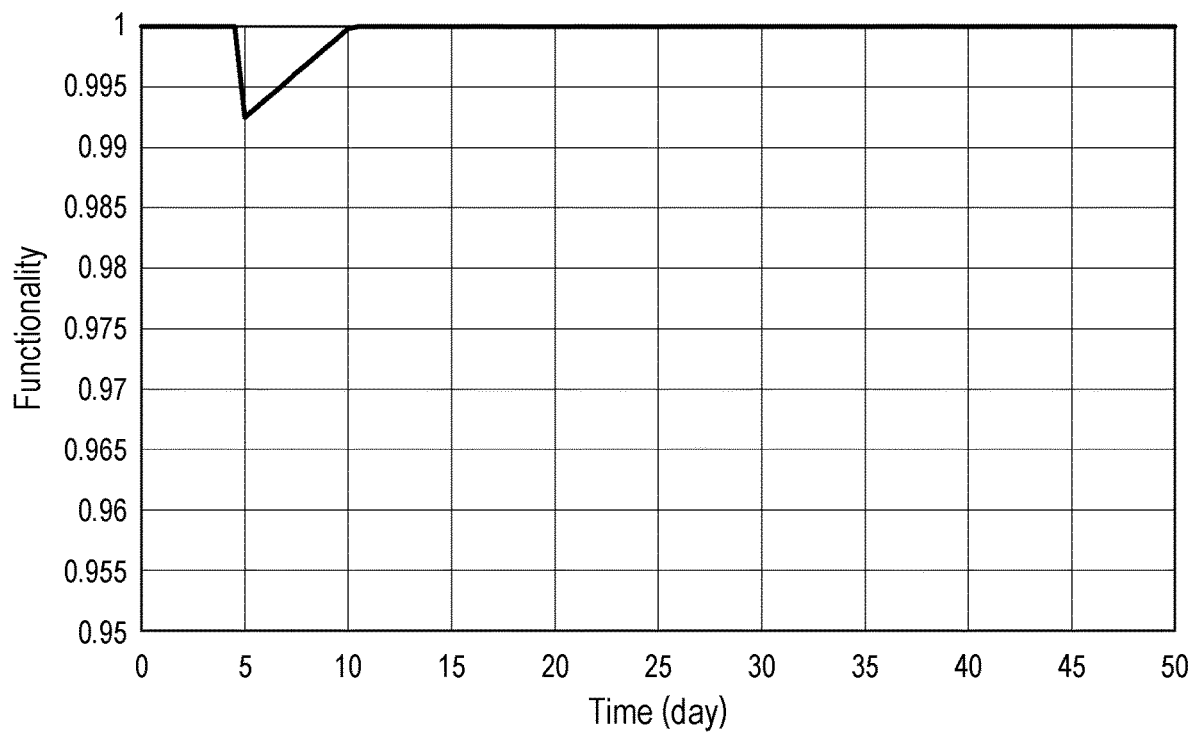
FIG. 26D is a graph showing functionality and calculation of resiliency R, similar to FIG. 26C (Hazard=MCE, R=0.97).

Functionality curves and resiliency were derived based on Equations (30) to (33). FIGS. 26A-26D show the results. Initially the functionality was 100% in all systems because there is no initial damage. The ground motion was arbitrarily assumed to occur after 5 days once monitoring the functionality of buildings began (i.e., $t_{OE}$ is 5). Selecting different values for $t_{OE}$ shifts the functionality curve forward or backward without changing the final results. Functionality of the SCBF system was decreased to 91% at the DBE demand level (FIG. 26A) and 83% at the MCE demand level (FIG. 26B) due to the damages experienced by the system. Since the structural bracing system 12 did not reach any damage state at the DBE demand level, the functionality remained 100% without any decrease (FIG. 26C). Due the small amount of damages experience by the structural bracing system 12 at the MCE demand level, the functionality was decreased slightly to 99% (FIG. 26D) in this system. The functionality returns to 100% in all systems after passing the repair time and following the linear recovery function.

The resiliency of the systems (R) was obtained by calculating the area under the functionality curve according to Equation (30). These values are presented in FIGS. 26A-26D. Comparing the repair costs, time and the resiliencies shows the better seismic performance of the structural bracing system 12 versus the SCBF system.

Conclusion

Utilizing Belleville disks 14 and shape memory alloy 16, a resilient bracing system with nonlinear-elastic behavior was developed. This system is referred to as the structural bracing system 12. Detailed equations for proportioning the various components of the structural bracing system 12 were derived and used to design a 5-story building. A companion special concentrically braced frame (SCBF) was also designed as a benchmark to evaluate the performance of the structural bracing system.

Fragility curves were generated for both systems by performing incremental nonlinear dynamic analyses of three-dimensional models of the designed buildings. A suite of ground motions was selected for the analyses Consequence functions were also generated for the systems in order to estimate the loss in the system after seismic events. In an effort to determine the resiliency of the structural bracing system 12, the level of damage and the associated repair costs were quantified.

While the SCBF building had residual deformations at design base event (DBE) and maximum considered event (MCE) demand levels, the structural bracing system 12 could resist the ground motions with less drift and no residual deformation. The cost of new materials in the structural bracing system 12 results in a 4% construction cost increase in comparison to the SCBF system. However, this increase is rather negligible in comparison to the repair costs, 100% reduction at the DBE and 95% at MCE for the structural bracing system 12 because of its improved performance.

The stiffness and strength of a brace 42 including one or more structural assemblies 10 were determined based on SCBF bracing system since the seismic design parameters listed in ASCE7-16 are for common structural systems and not yet available for the proposed novel system.

Considering that the beams and columns remained elastic for the reported case studies, the focus was on evaluating the resiliency and performance of the braces—the structural bracing system 12 versus conventional braces.

Example 2: Further Seismic Assessments of the Structural Bracing System (5-, 10-, and 15-Story)

The structural bracing system 12 is a resilient bracing system based on the application of Bellville disks 14 and Nitinol rods 16. The cyclic behavior of the structural assembly 10 was obtained, and the design equations were developed based on the available literature. Seismic performance of the system was studied analytically. Two groups of buildings with different lateral force resisting systems were designed and studied: one group with the structural bracing system 12, and the other with the special concentrically braced frame (SCBF) system. Each building group consisted of 5-, 10-, and 15-story buildings. The Design-Base-Event (DBE) and Maximum Considered Event (MCE) were considered as the seismic hazard, and a suite of seven ground motions were scaled accordingly for response history analyses. Finally, the resiliency of the buildings was studied by obtaining the functionality curve of the buildings before and after the seismic event. The construction cost of the 5-story building with the structural bracing system 12 increased, but the post-earthquake cost decreased significantly. The application of structural bracing system 12 in the 10- and 15-story buildings reduced both the construction and repair costs, considerably. Resiliency of all the buildings was improved when structural bracing system 12 was used as the lateral force resisting system.

Archetype Buildings

Figure 32A:
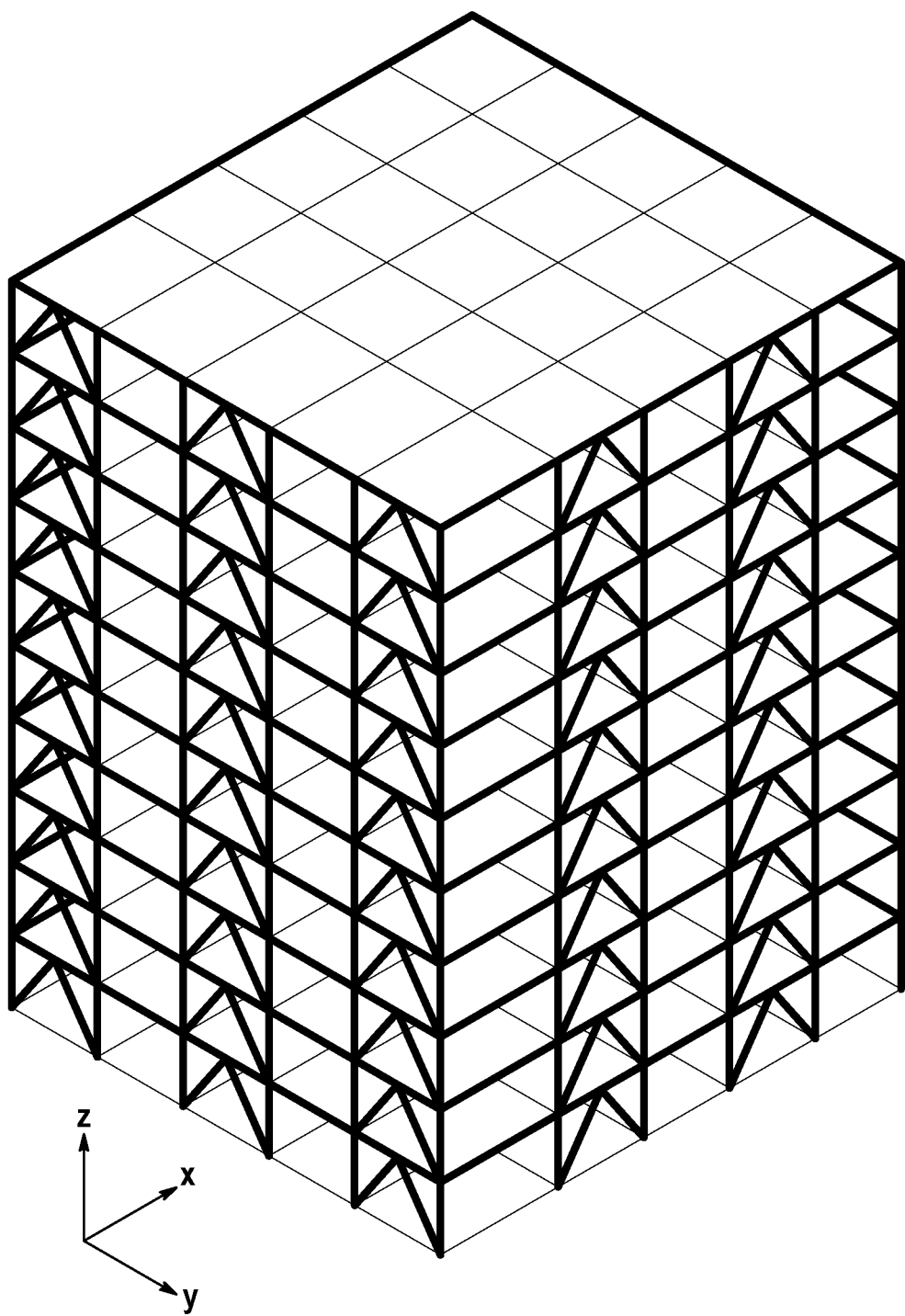
FIG. 32A is a perspective view of a 10-story special concentrically braced frame (SCBF) braced building.
Figure 32B:
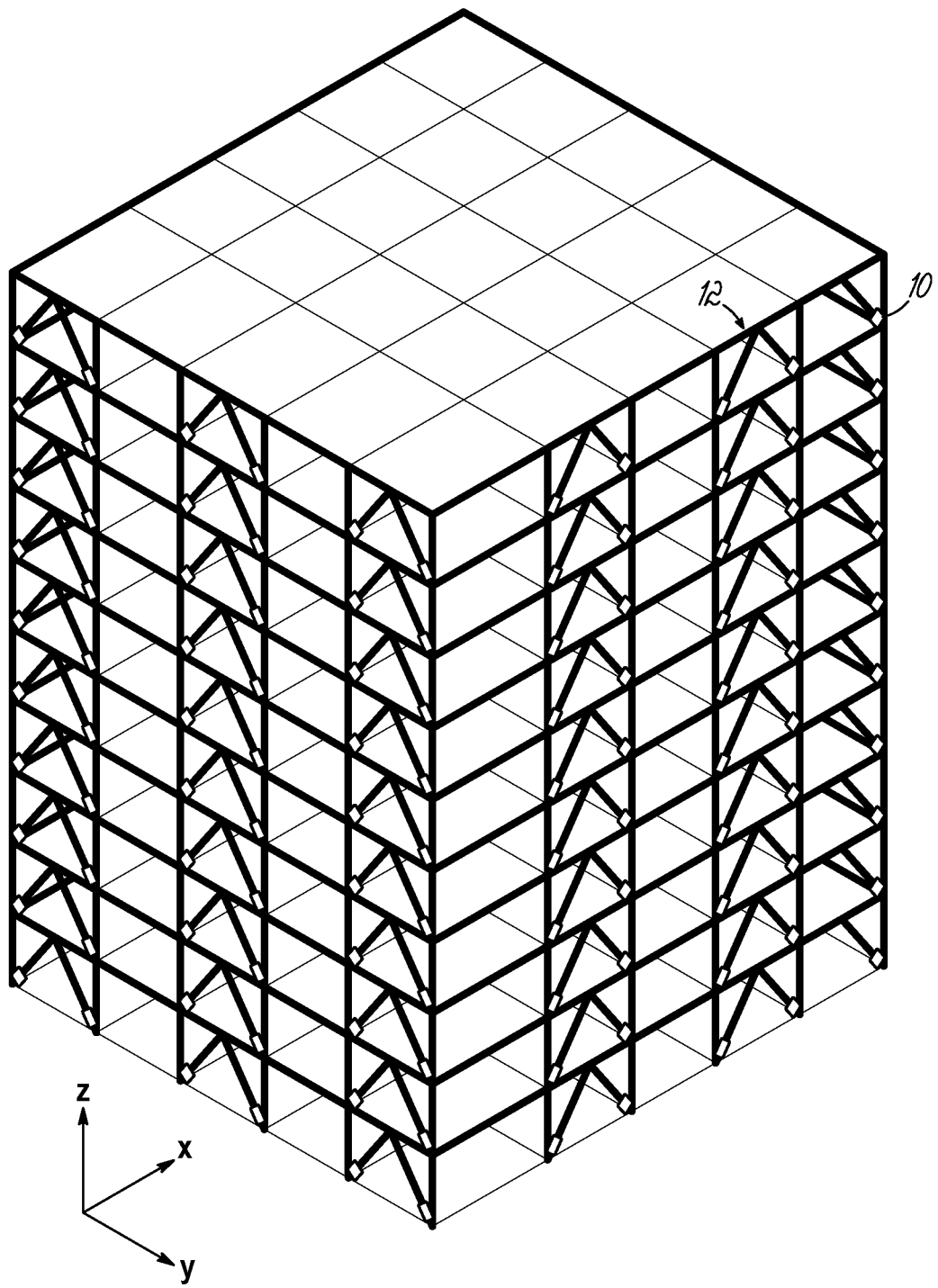
FIG. 32B is a perspective view of a 10-story structural bracing system (Nibellen) braced building.

Two groups of buildings were studied. The lateral force resisting system in one group was the structural bracing system 12, and in the other was the SCBF. Each building group consisted of 5-, 10-, and 15-story buildings. All buildings were office buildings with the same floor plan. The three-dimensional view of 10-story buildings are shown in FIGS. 32A and 32B. The structural bracing system 12 used in the buildings was designed based on having one assembly 10 in each of the chevron braces 42. The assemblies 10 are shown in FIG. 32B. Each story has a height of 4.3 m (14 ft.). The buildings were assumed to be in Northern California region in a site classified as "D" per ASCE 7-16 (2016). The floors carried 340 (kg/m$^2$) dead load and 245 (kg/m$^2$) live load. The roof of the buildings carried 220 (kg/m$^2$) dead load and 100 (kg/m$^2$) live load. Structural sections for the buildings were selected according to Steel Construction Manual (AISC, 2017). Tables 13 to 17 list the structural member sections for the 10-story buildings. The chevron effect analysis method was used to analyze and design the chevron beams in the systems.

Tables 16 and 17 list the designed assemblies for the 10-story structural bracing system building 12. The assemblies 10 were designed according to the equations obtained by Hadad et al. (Hadad, A. A., B. M. Shahrooz and P. J. Fortney (2021). "Innovative resilient steel braced frame with Belleville disk and shape memory alloy assemblies," Engineering Structures, Vol. 237, No. pp. 112166). In the aforementioned tables, the number of assemblies 10 used in each brace 42 is presented by $n_{asm}$, the outside diameter of the selected Bellville disk 14 for the assembly 10 is $D_O$, the inside diameter of the selected Bellville disk is $D_i$, the thickness of the disk is t, the free height (rise) of the disk is h, the number of disks stacked together in parallel is $n_D$, the number of disk groups in the assembly is $n_G$, and the dimeter of the selected Nitinol rod for the assembly is $D_{NiTi}$.

TABLE 13

Brace sections, 10-story building

| | SCBF | | Structural Bracing System | |
|---|---|---|---|---|
| Level | Gravity | Chevron | Gravity | Chevron |
| 1 | W 16 × 40 | W 40 × 593 | W 16 × 40 | W 44 × 262 |
| 2 | W 16 × 40 | W 36 × 529 | W 16 × 40 | W 40 × 183 |
| 3 | W 16 × 40 | W 36 × 529 | W 16 × 40 | W 40 × 167 |
| 4 | W 16 × 40 | W 36 × 529 | W 16 × 40 | W 40 × 167 |
| 5 | W 16 × 40 | W 36 × 529 | W 16 × 40 | W 40 × 167 |
| 6 | W 16 × 40 | W 36 × 487 | W 16 × 40 | W 33 × 152 |
| 7 | W 16 × 40 | W 36 × 487 | W 16 × 40 | W 30 × 116 |
| 8 | W 16 × 40 | W 36 × 487 | W 16 × 40 | W 30 × 116 |
| 9 | W 16 × 40 | W 44 × 262 | W 16 × 40 | W 27 × 84 |
| 10 | W 16 × 40 | W 40 × 215 | W 16 × 40 | W 27 × 84 |

TABLE 14

Beam sections, 10-story building

| | SCBF | | Structural Bracing System | |
|---|---|---|---|---|
| Level | Gravity | Chevron | Gravity | Chevron |
| 1 | W 16 × 40 | W 40 × 593 | W 16 × 40 | W 44 × 262 |
| 2 | W 16 × 40 | W 36 × 529 | W 16 × 40 | W 40 × 183 |
| 3 | W 16 × 40 | W 36 × 529 | W 16 × 40 | W 40 × 167 |
| 4 | W 16 × 40 | W 36 × 529 | W 16 × 40 | W 40 × 167 |
| 5 | W 16 × 40 | W 36 × 529 | W 16 × 40 | W 40 × 167 |
| 6 | W 16 × 40 | W 36 × 487 | W 16 × 40 | W 33 × 152 |
| 7 | W 16 × 40 | W 36 × 487 | W 16 × 40 | W 30 × 116 |
| 8 | W 16 × 40 | W 36 × 487 | W 16 × 40 | W 30 × 116 |
| 9 | W 16 × 40 | W 44 × 262 | W 16 × 40 | W 27 × 84 |
| 10 | W 16 × 40 | W 40 × 215 | W 16 × 40 | W 27 × 84 |

TABLE 15

Column sections, 10-story building

| | SCBF | | Structural Bracing System | |
|---|---|---|---|---|
| Level | Exterior | Interior | Exterior | Interior |
| 1 | W 14 × 283 | W 14 × 311 | W 14 × 311 | W 14 × 311 |
| 2 | W 14 × 193 | W 14 × 176 | W 14 × 176 | W 14 × 159 |
| 3 | W 14 × 193 | W 14 × 176 | W 14 × 176 | W 14 × 159 |
| 4 | W 14 × 159 | W 14 × 159 | W 14 × 145 | W 14 × 120 |
| 5 | W 14 × 159 | W 14 × 159 | W 14 × 145 | W 14 × 120 |
| 6 | W 14 × 145 | W 14 × 109 | W 12 × 106 | W 12 × 120 |
| 7 | W 14 × 145 | W 14 × 109 | W 12 × 106 | W 12 × 120 |
| 8 | W 14 × 145 | W 14 × 109 | W 12 × 72 | W 12 × 72 |
| 9 | W 12 × 120 | W 12 × 87 | W 12 × 40 | W 12 × 72 |
| 10 | W 12 × 120 | W 12 × 87 | W 12 × 40 | W 12 × 45 |

TABLE 16

Structural bracing system building brace assemblies XZ direction, 10-story building

| Level | $n_{asm}$ | $D_o$ (mm) | $D_i$ (mm) | t (mm) | h (mm) | $n_D$ | $n_G$ | $D_{NiTi}$ (mm) |
|---|---|---|---|---|---|---|---|---|
| 1 | 1.00 | 225 | 112 | 16 | 4.5 | 10 | 2 | 41.9 |
| 2 | 1.00 | 200 | 82 | 12 | 4.6 | 16 | 2 | 40.4 |
| 3 | 1.00 | 200 | 82 | 12 | 4.6 | 14 | 1 | 38.9 |
| 4 | 1.00 | 200 | 92 | 14 | 4.09 | 9 | 2 | 36.3 |
| 5 | 1.00 | 200 | 92 | 14 | 4.09 | 8 | 1 | 33.0 |
| 6 | 1.00 | 160 | 82 | 10 | 3.51 | 14 | 2 | 33.0 |
| 7 | 1.00 | 150 | 81 | 8 | 3.71 | 16 | 1 | 29.7 |

TABLE 16-continued

Structural bracing system building brace assemblies XZ direction, 10-story building

| Level | $n_{asm}$ | $D_o$ (mm) | $D_i$ (mm) | t (mm) | h (mm) | $n_D$ | $n_G$ | $D_{NiTi}$ (mm) |
|---|---|---|---|---|---|---|---|---|
| 8 | 1.00 | 150 | 81 | 8 | 3.71 | 12 | 1 | 23.6 |
| 9 | 1.00 | 125 | 71 | 10 | 1.8 | 5 | 2 | 18.3 |
| 10 | 1.00 | 125 | 71 | 10 | 1.8 | 5 | 2 | 18.3 |

TABLE 17

Structural bracing system building brace assemblies-YZ direction, 10-story building

| Level | $n_{asm}$ | $D_o$ (mm) | $D_i$ (mm) | t (mm) | h (mm) | $n_D$ | $n_G$ | $D_{NiTi}$ (mm) |
|---|---|---|---|---|---|---|---|---|
| 1 | 1.00 | 200 | 102 | 14 | 4.19 | 10 | 2 | 37.1 |
| 2 | 1.00 | 200 | 102 | 14 | 4.19 | 9 | 2 | 37.4 |
| 3 | 1.00 | 200 | 92 | 12 | 4.8 | 11 | 1 | 32.5 |
| 4 | 1.00 | 200 | 92 | 12 | 4.8 | 11 | 1 | 32.5 |
| 5 | 1.00 | 200 | 82 | 12 | 4.6 | 10 | 1 | 29.5 |
| 6 | 1.00 | 200 | 82 | 12 | 4.6 | 10 | 1 | 29.5 |
| 7 | 1.00 | 180 | 92 | 10 | 3.99 | 12 | 1 | 28.7 |
| 8 | 1.00 | 180 | 92 | 10 | 3.99 | 9 | 1 | 22.9 |
| 9 | 1.00 | 150 | 81 | 10 | 3 | 6 | 1 | 20.6 |
| 10 | 1.00 | 100 | 51 | 7 | 2.21 | 4 | 1 | 12.7 |

Figure 33A:
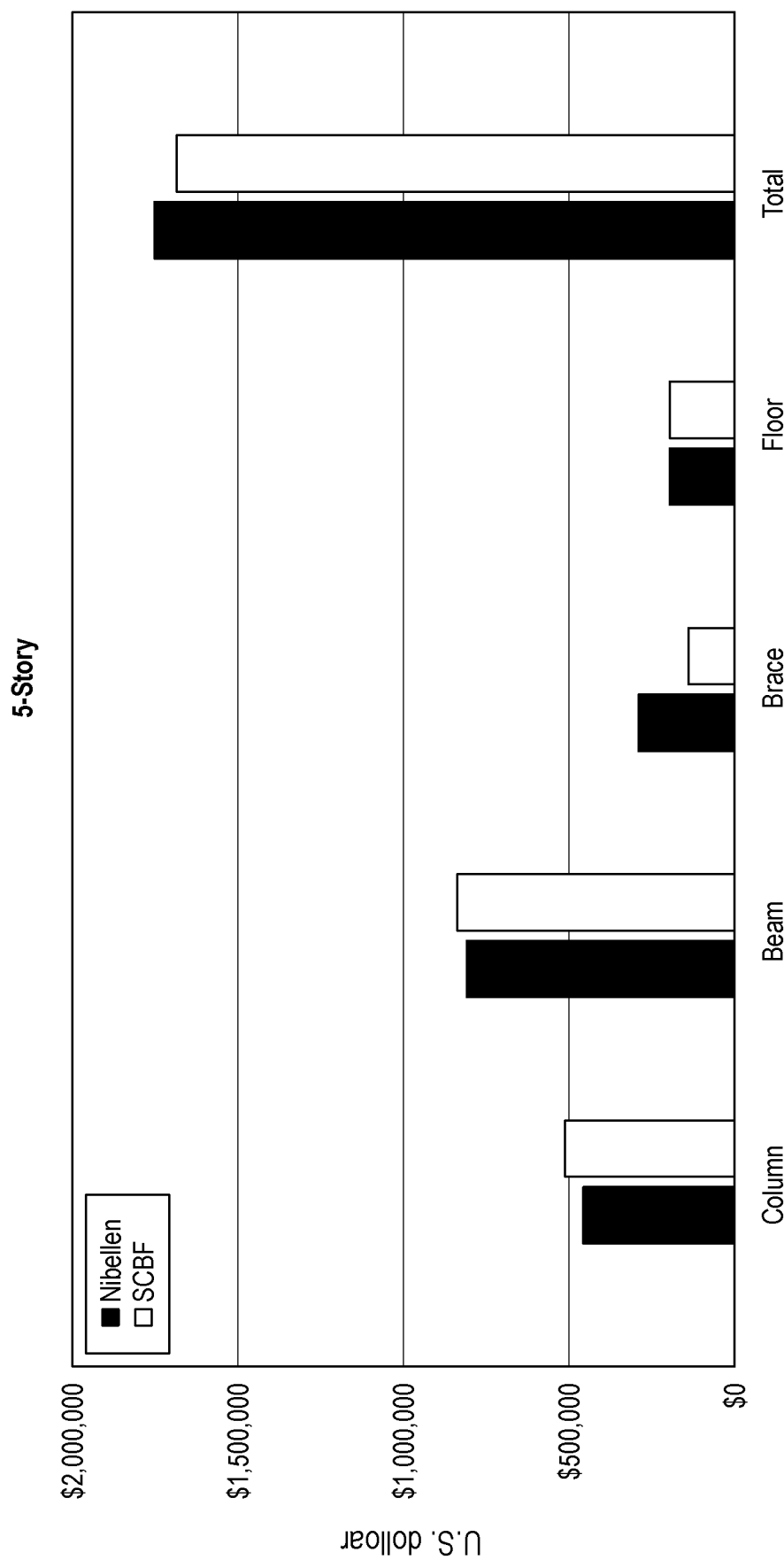
FIG. 33A is a graph showing a comparison of the structural members' construction cost between a 5-story structural bracing system (Nibellen) braced building and a 5-story special concentrically braced frame (SCBF) braced building.
Figure 33B:
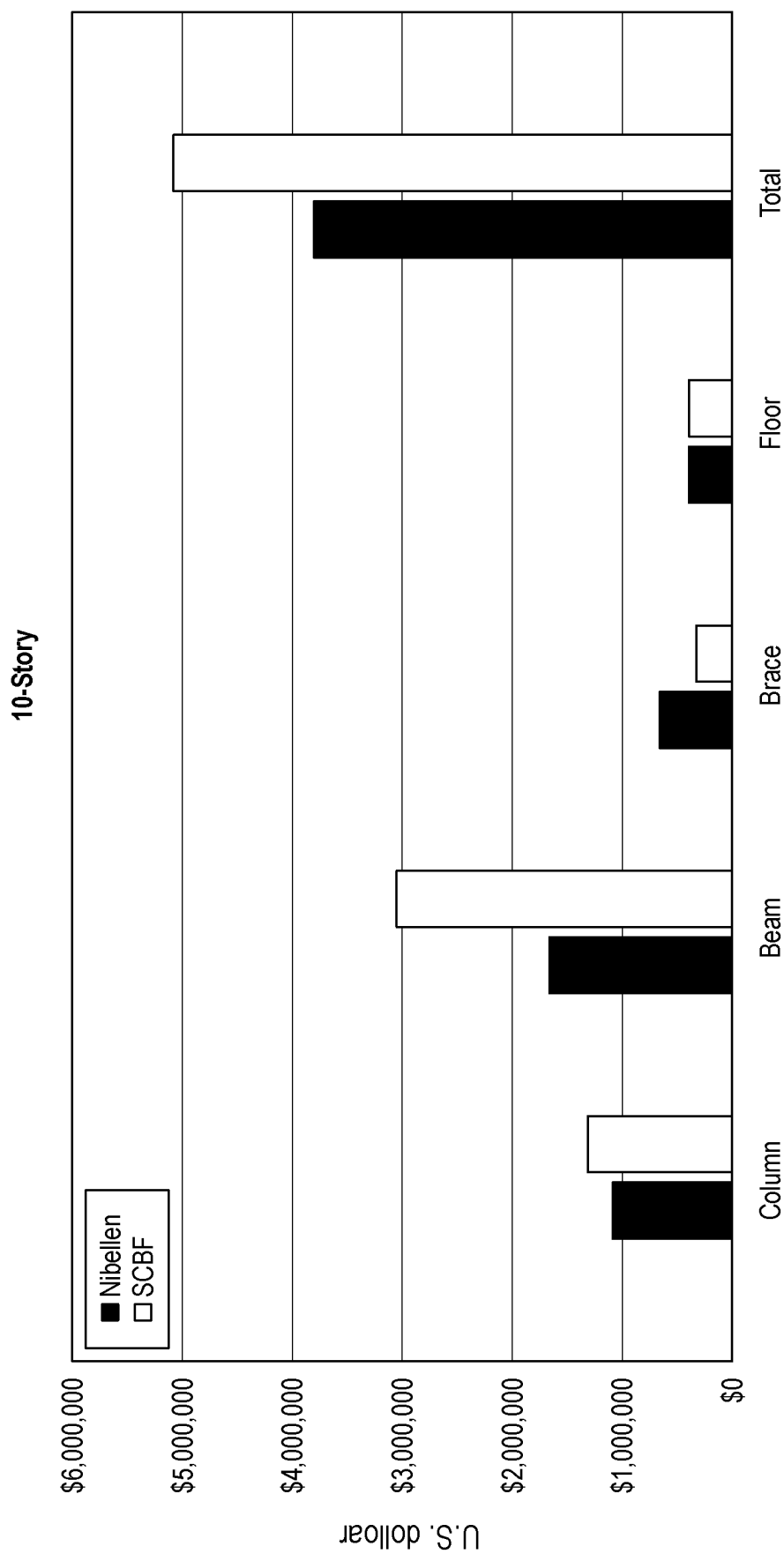
FIG. 33B is a graph showing a comparison of the structural members' construction cost between a 10-story structural bracing system (Nibellen) braced building and a 10-story special concentrically braced frame (SCBF) braced building.
Figure 33C:
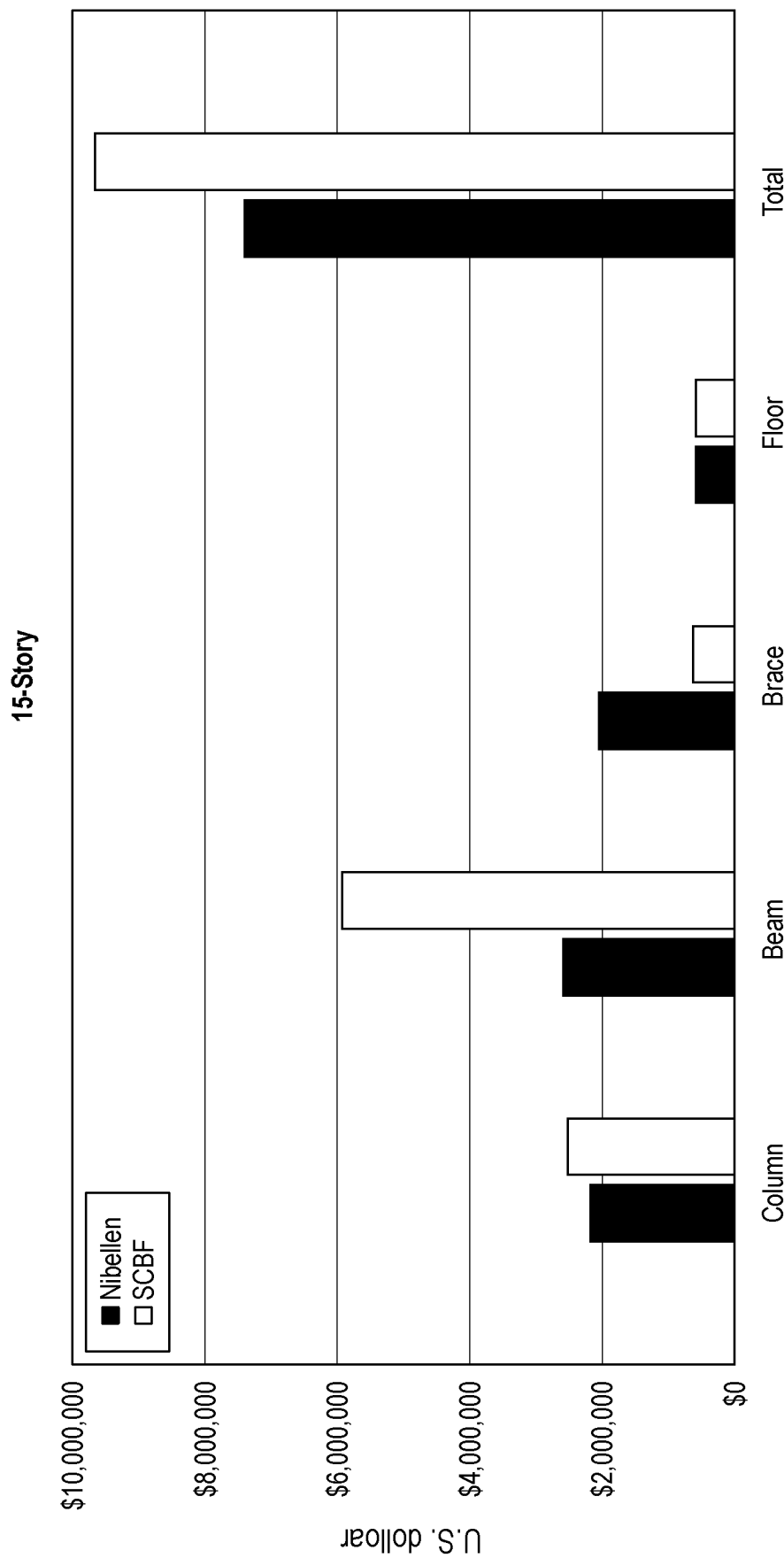
FIG. 33C is a graph showing a comparison of the structural members' construction cost between a 15-story structural bracing system (Nibellen) braced building and a 15-story special concentrically braced frame (SCBF) braced building.

Construction costs of the buildings were estimated based on the designed sections and according to the available construction cost data (Gordian, 2018) and industrial quotes for Nitinol rods and Bellville disks (Schnorr, 2003; SEAS-Group, 2018). FIGS. 33A-33C compares the construction cost of the buildings. Due to the usage of new material and design procedure in a brace 42 including one or more structural assembly 10, the cost of the brace 42 including one or more structural assembly 10 is almost twice the cost of regular SCBF brace. However, the total construction cost of 5-story building with the structural bracing system 12 is only 4% greater than the SCBF building. The total construction cost of 10- and 15-story buildings with the structural bracing system 12 are 25% and 23% lower than the buildings with SCBF system, respectively. As discussed earlier, the value of maximum tensile force in the tensile brace 52 is close to the value of maximum compressive force in the compressive brace 54 (i.e., mechanism forces) in the structural bracing system 12. Thus, they apply a lower demand on braced frame beams 56 and columns 58 when compared to the SCBF brace. Such lower demand in the structural bracing system 12 leads to lighter beam 56 and column 58 sections in the braced frames 36. Due to the greater number of beams 56 and columns 58 in the 10- and 15-story buildings, the amount of cost reduction in the beams 56 and columns 58 exceeds the expense increase because of the addition of one or more structural assemblies 10 in the braces 42, resulting in the lower total construction cost of structural bracing system 12 buildings in comparison to the SCBF buildings.

Seismic Ground Motions

PEER ground motion database and record scaling tool (PEER (2013). PEER ground motion database. University of California, Berkeley, CA, Pacific Earthquake Engineering Research Center) were used to obtain seven ground motion records (Table 18) and the necessary scale factors to match the ground motion intensity to the design base earthquake (DBE) hazard level. The maximum considered earthquake (MCE) and design base earthquake (DBE) acceleration response spectra ($S_a$) were obtained for the buildings' location according to ASCE/SEI7-16 (2016) provided guidelines and seismic design factors.

Figure 34:
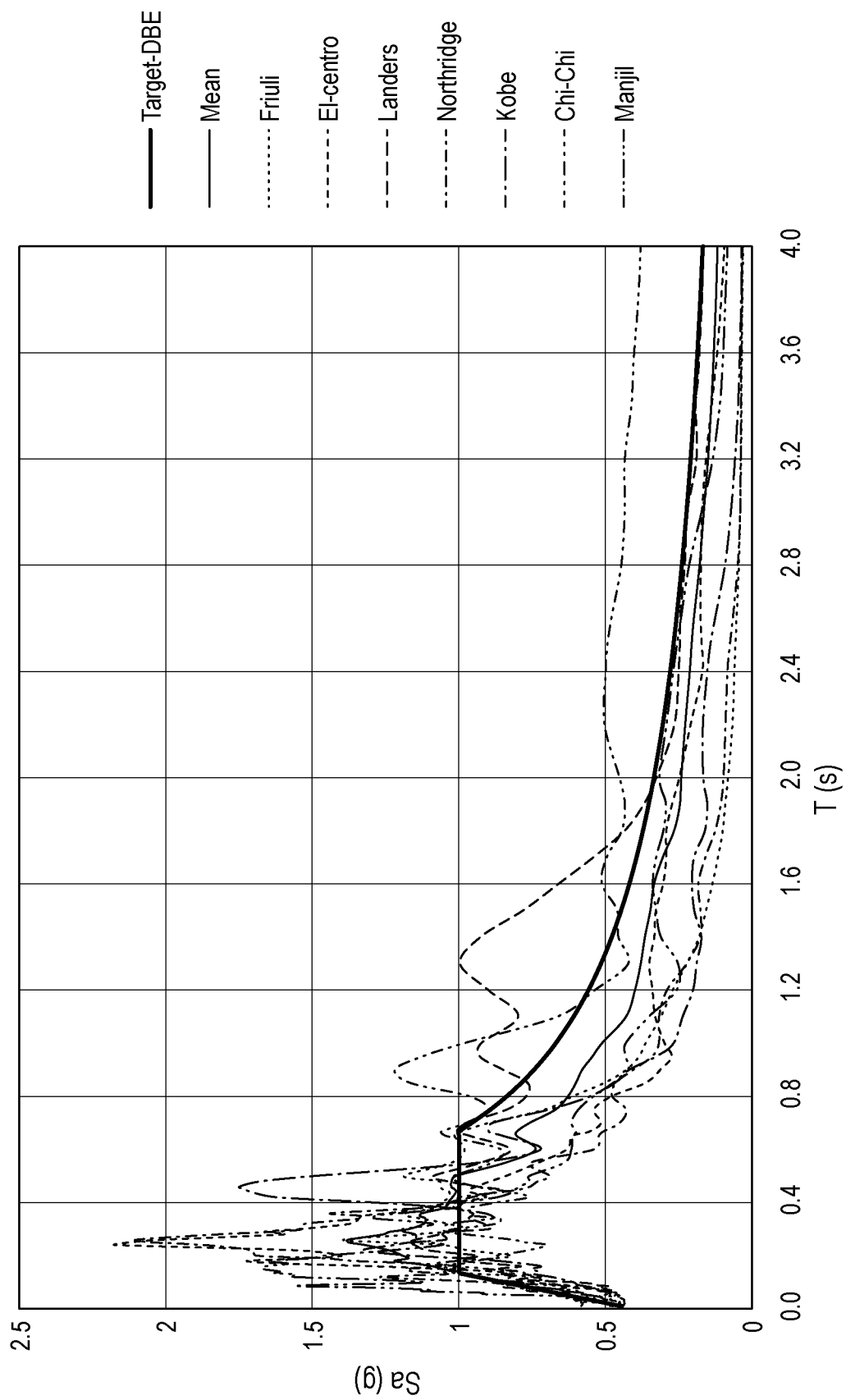
FIG. 34 is a graph showing scaled ground motions to match design-base-event (DBE) spectrum for a 5-story building.
Figure 35A:
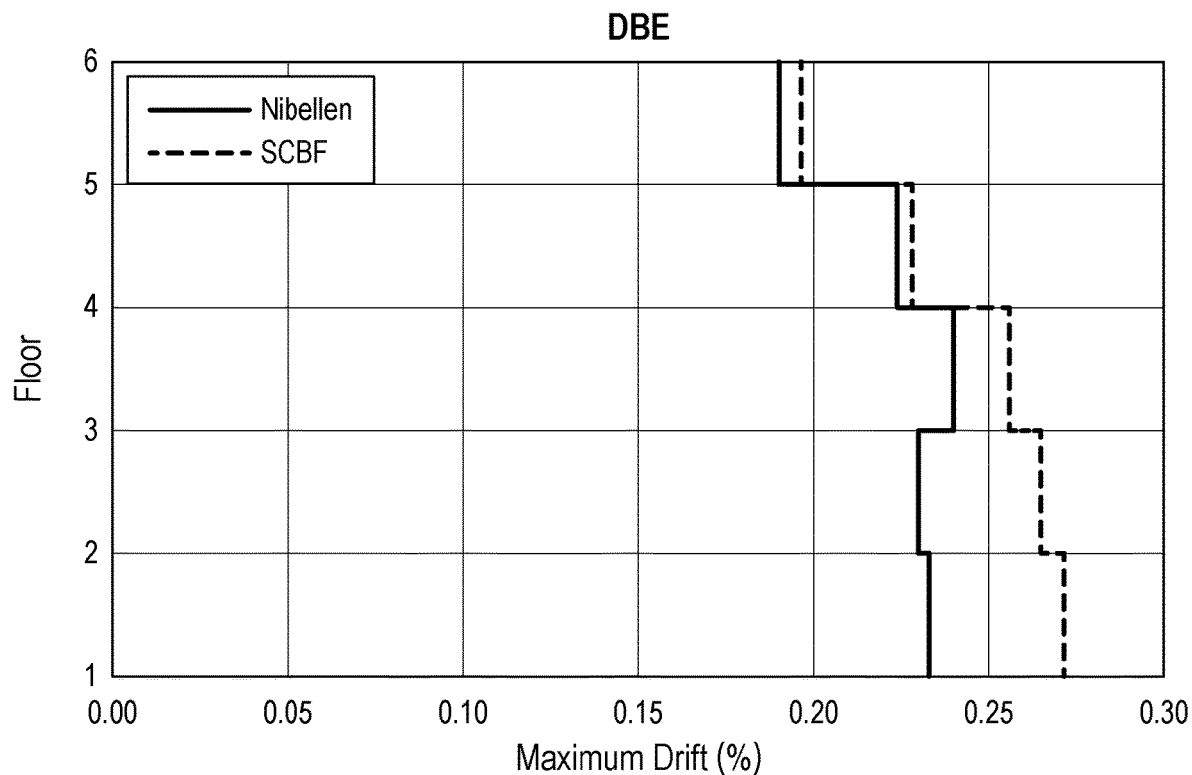
FIG. 35A is a graph showing average of maximum inter-story drift at DBE hazard level for a 5-story structural bracing system (Nibellen) braced building and a 5-story special concentrically braced frame (SCBF) braced building.
Figure 35B:
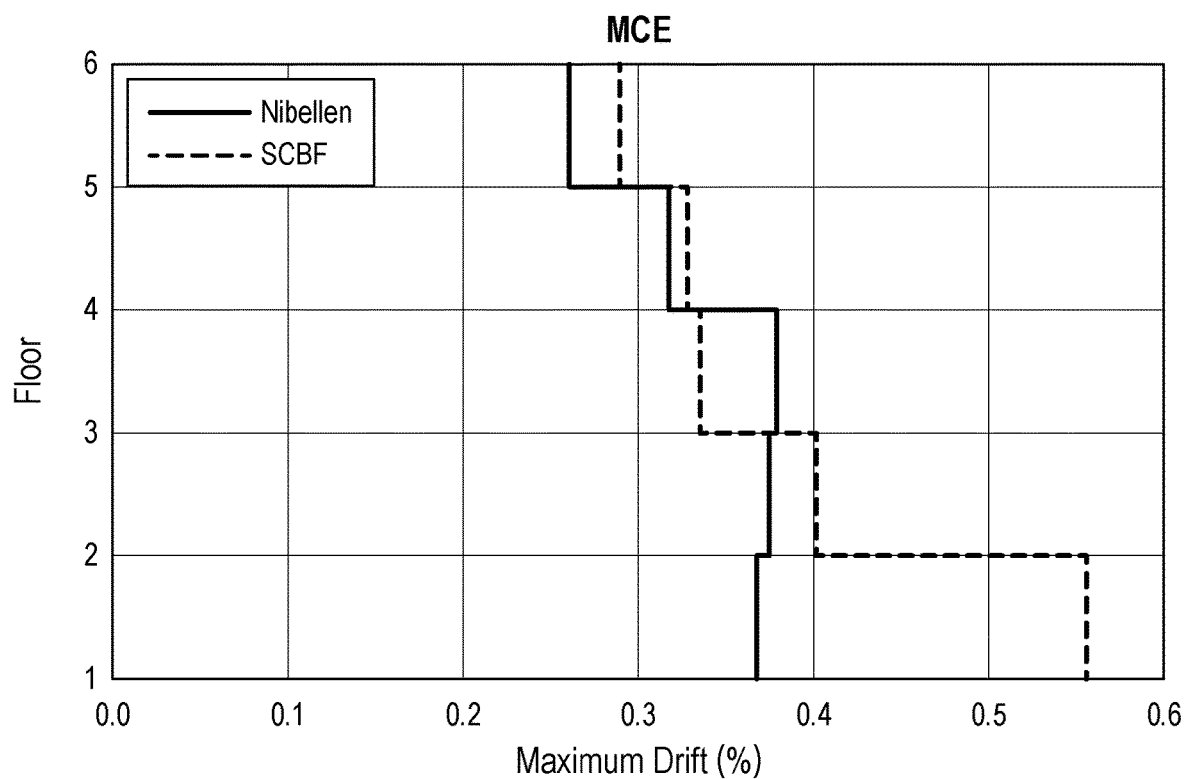
FIG. 35B is a graph showing average of maximum inter-story drift at MCE hazard level, similar to FIG. 35A.
Figure 36A:
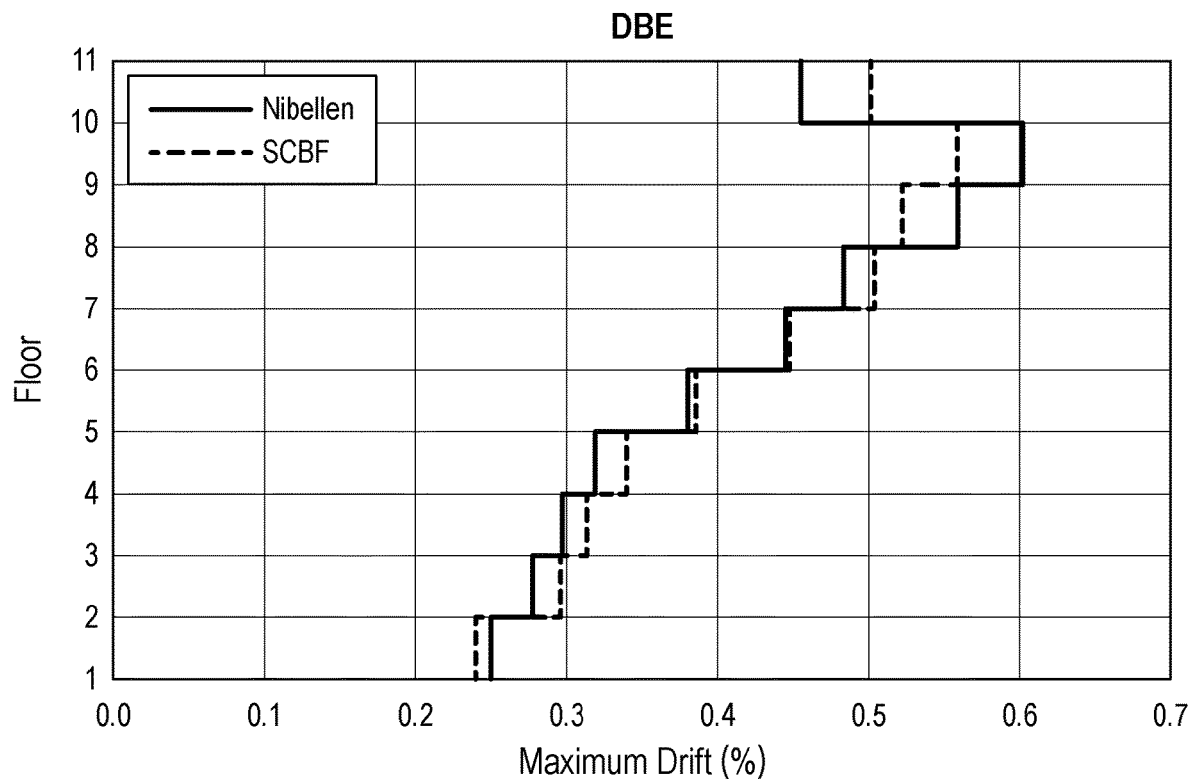
FIG. 36A is a graph showing average of maximum inter-story drift at DBE hazard level for a 10-story structural bracing system (Nibellen) braced building and a 10-story special concentrically braced frame (SCBF) braced building.
Figure 36B:
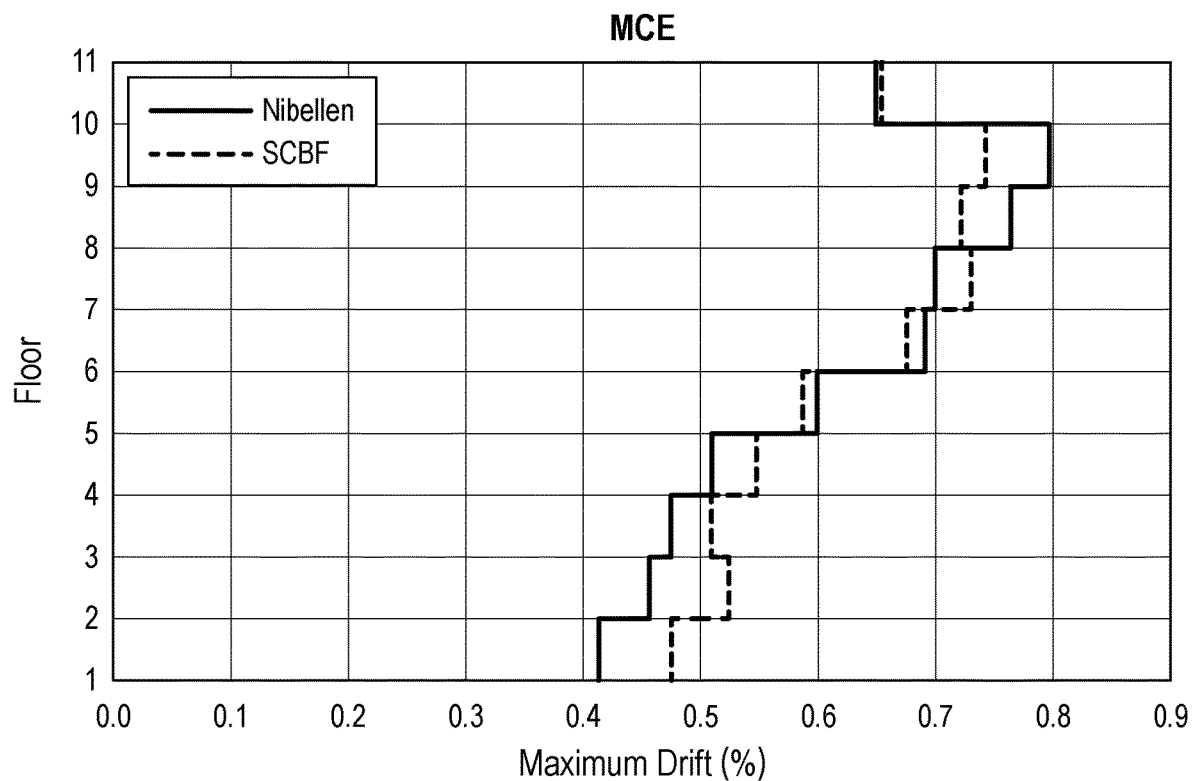
FIG. 36B is a graph showing average of maximum inter-story drift at MCE hazard level, similar to FIG. 36A.
Figure 37A:
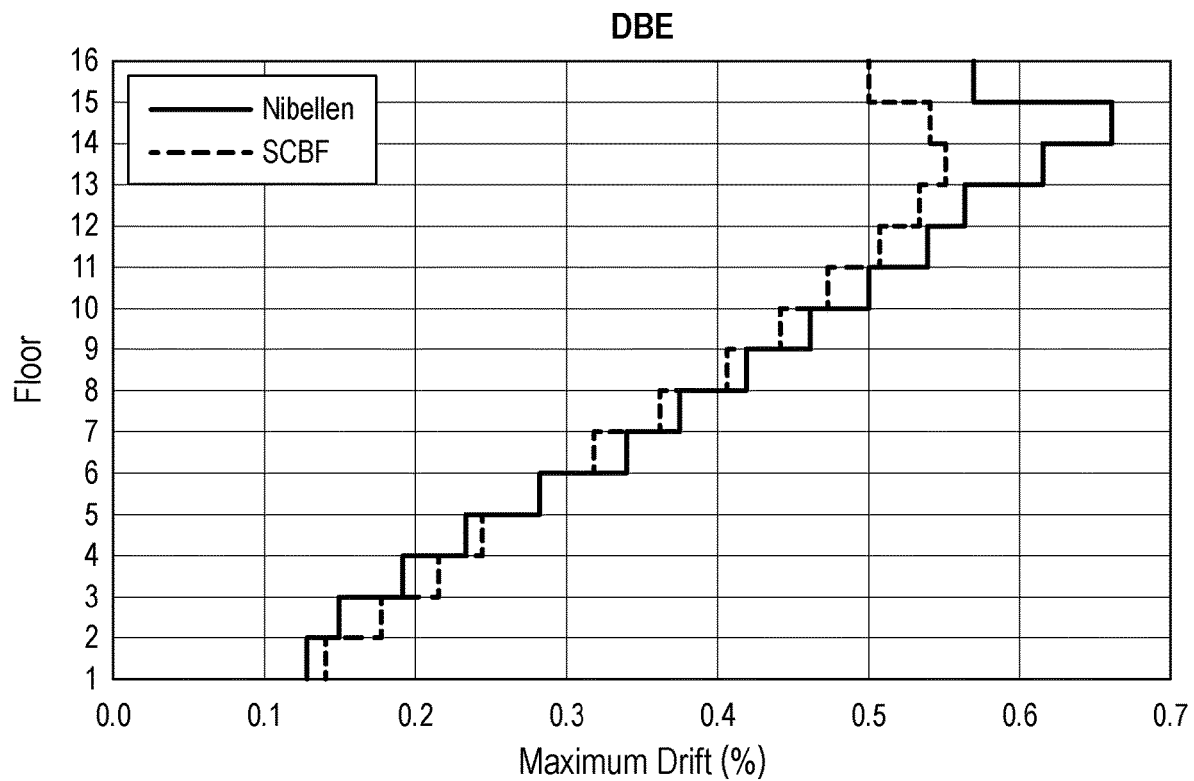
FIG. 37A is a graph showing average of maximum inter-story drift at DBE hazard level for a 15-story structural bracing system (Nibellen) braced building and a 15-story special concentrically braced frame (SCBF) braced building.
Figure 37B:
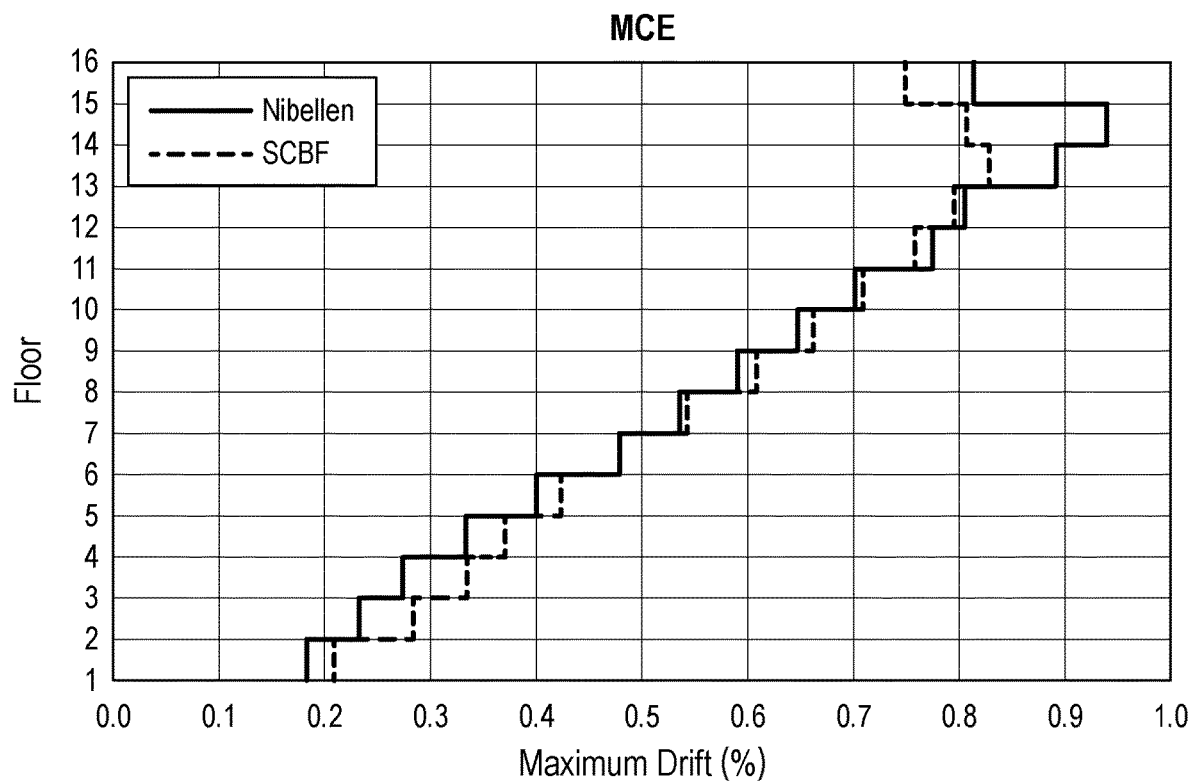
FIG. 37B is a graph showing average of maximum inter-story drift at MCE hazard level, similar to FIG. 37A.
Figure 38A:
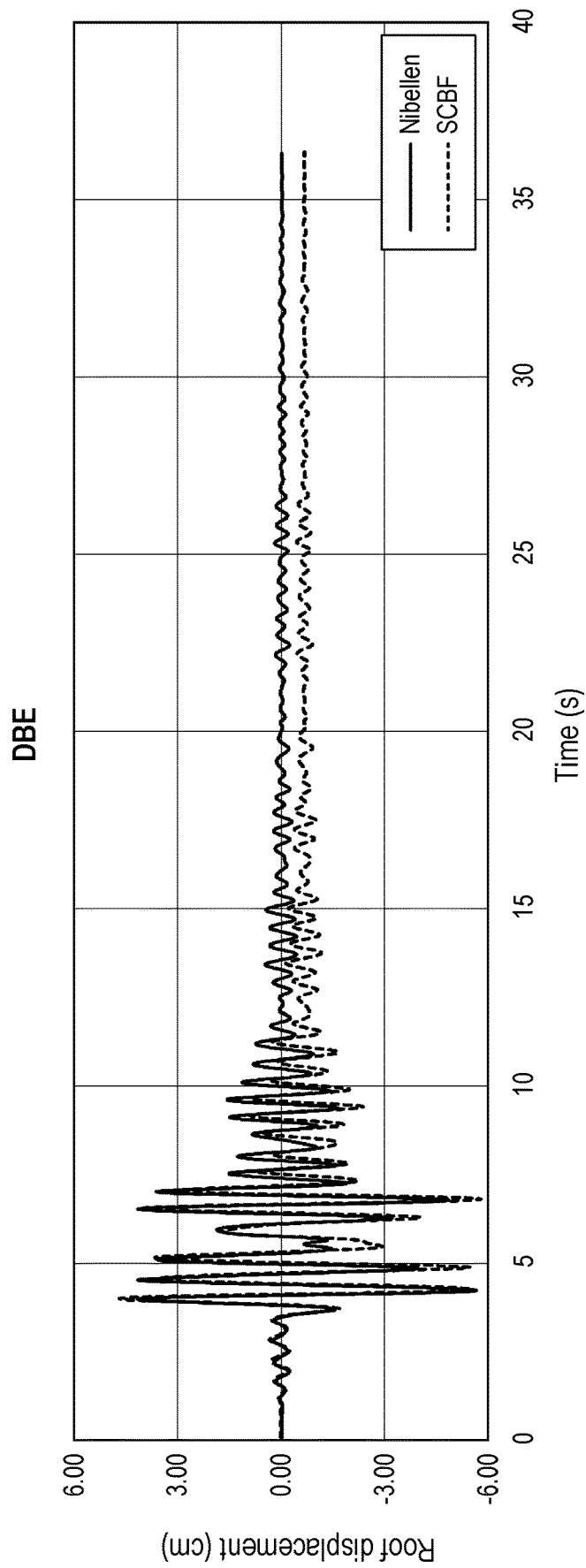
FIG. 38A is a graph showing roof displacement in the Y direction for Friuli ground motion at DBE hazard level for a 5-story structural bracing system (Nibellen) braced building and a 5-story special concentrically braced frame (SCBF) braced building.
Figure 38B:
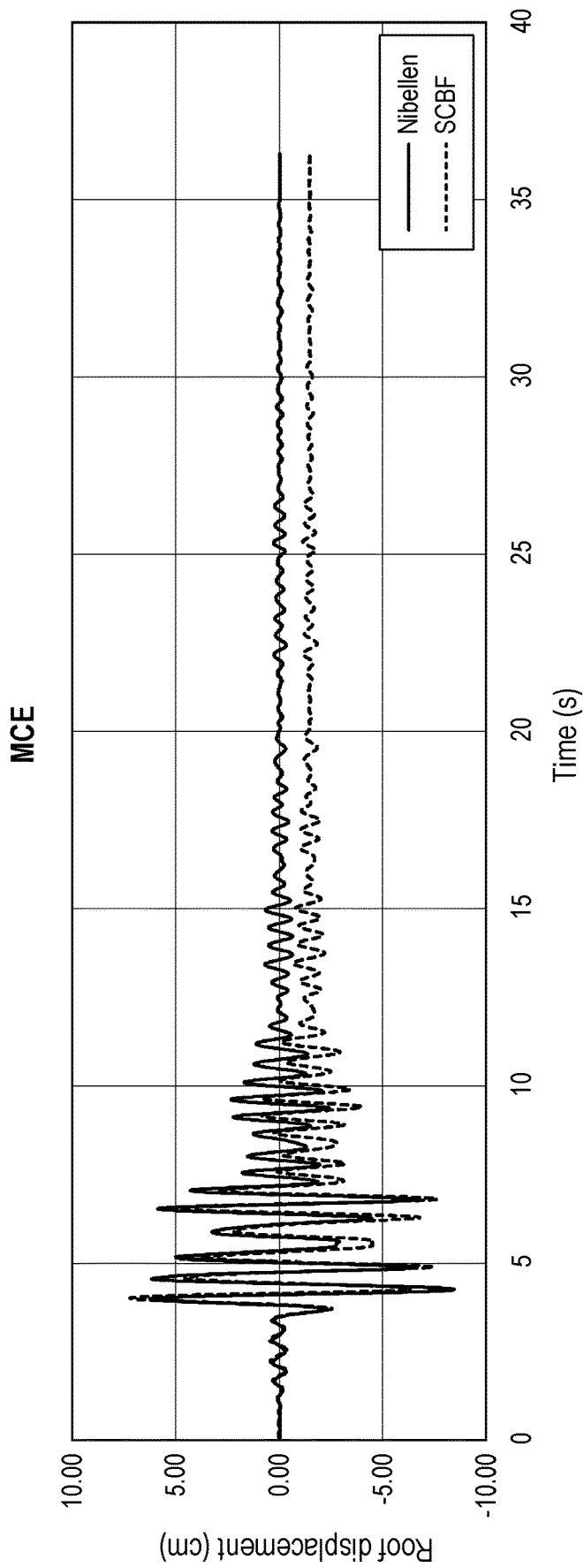
FIG. 38B is a graph showing roof displacement in the Y direction for Friuli ground motion at MCE hazard level, similar to FIG. 38A.
Figure 39A:
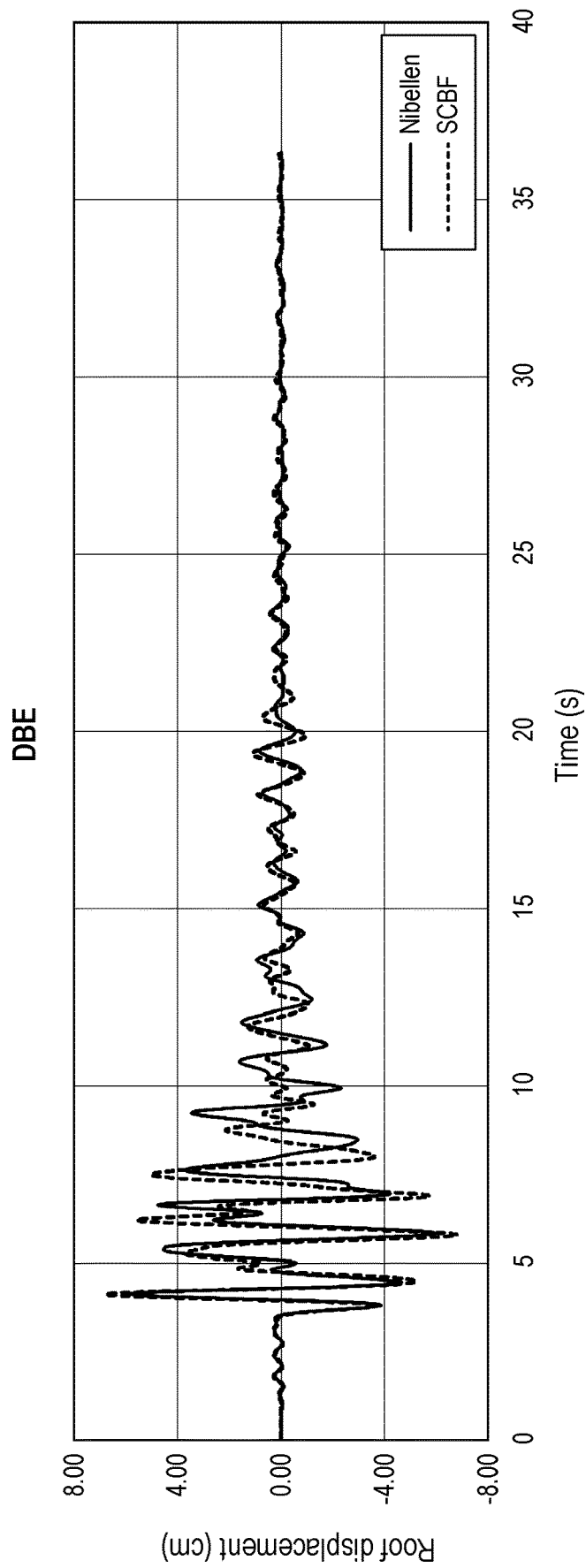
FIG. 39A is a graph showing roof displacement in the Y direction for Friuli ground motion at DBE hazard level for a 10-story structural bracing system (Nibellen) braced building and a 10-story special concentrically braced frame (SCBF) braced building.
Figure 39B:
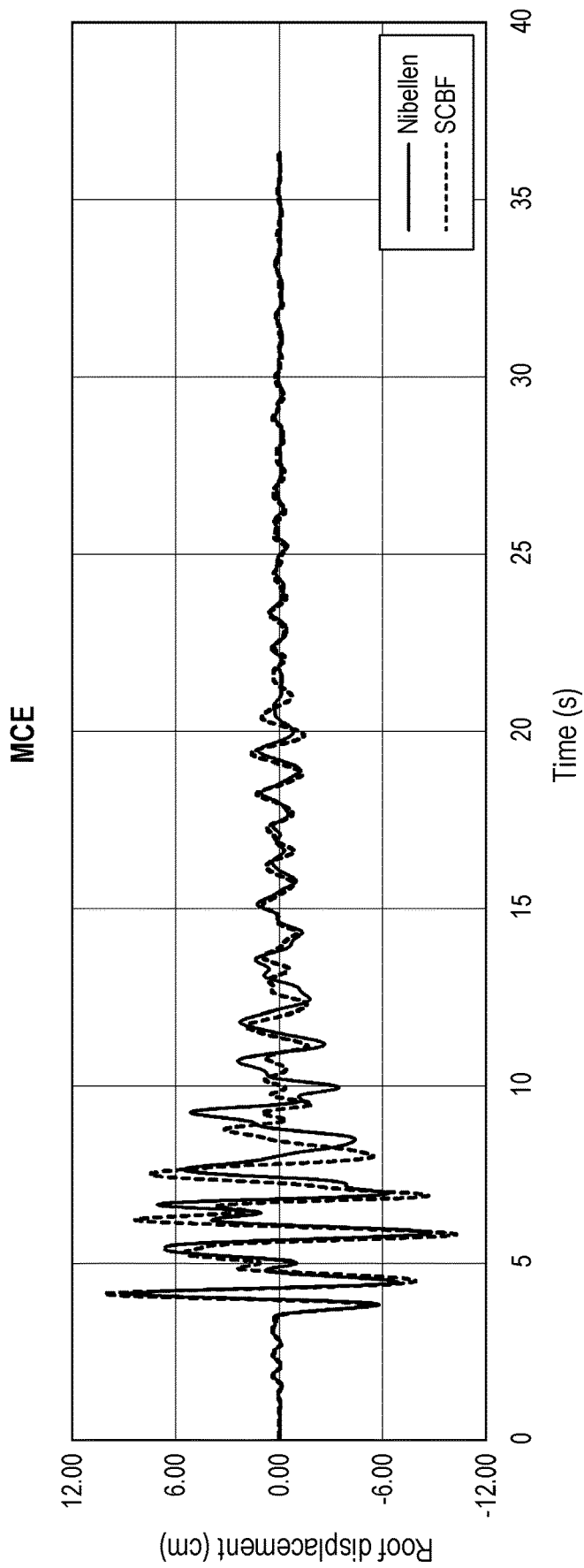
FIG. 39B is a graph showing roof displacement in the Y direction for Friuli ground motion at MCE hazard level, similar to FIG. 39A.
Figure 40A:
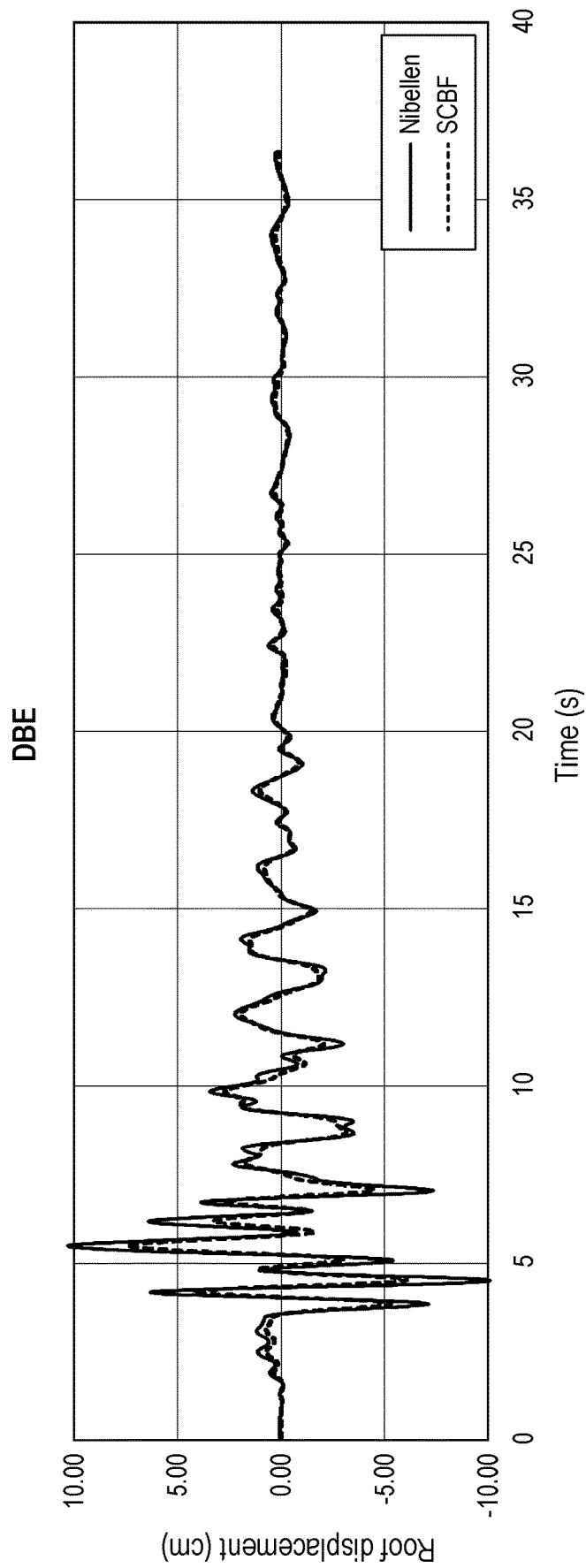
FIG. 40A is a graph showing roof displacement in the Y direction for Friuli ground motion at DBE hazard level for a 15-story structural bracing system (Nibellen) braced building and a 15-story special concentrically braced frame (SCBF) braced building.
Figure 40B:
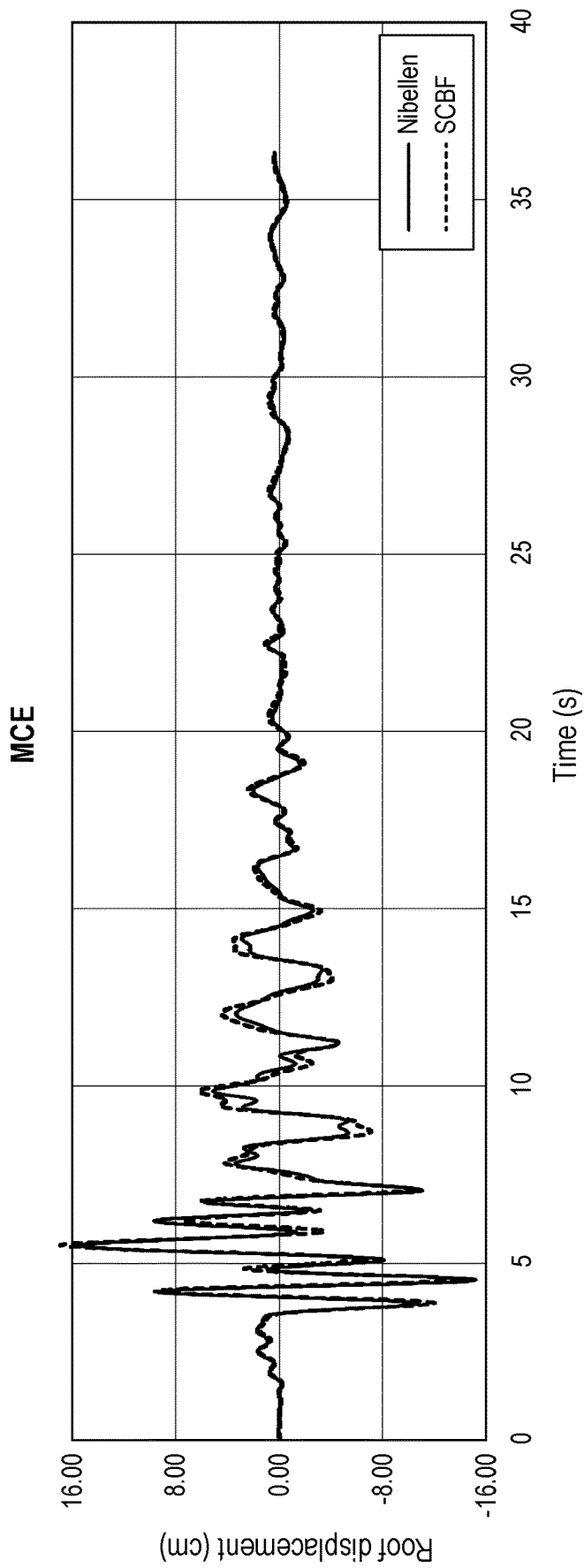
FIG. 40B is a graph showing roof displacement in the Y direction for Friuli ground motion at MCE hazard level, similar to FIG. 40A.
Figure 41A:
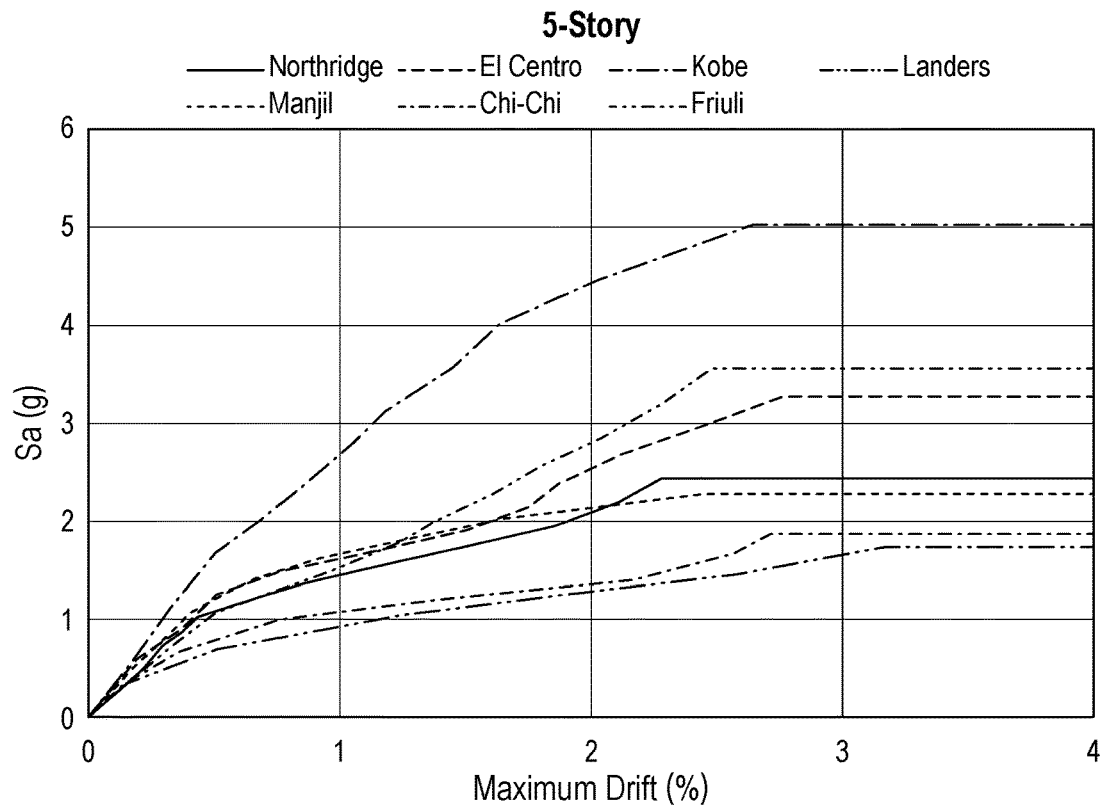
FIG. 41A is a graph showing incremental dynamic analysis of a 5-story special concentrically braced frame (SCBF) braced building.
Figure 41B:
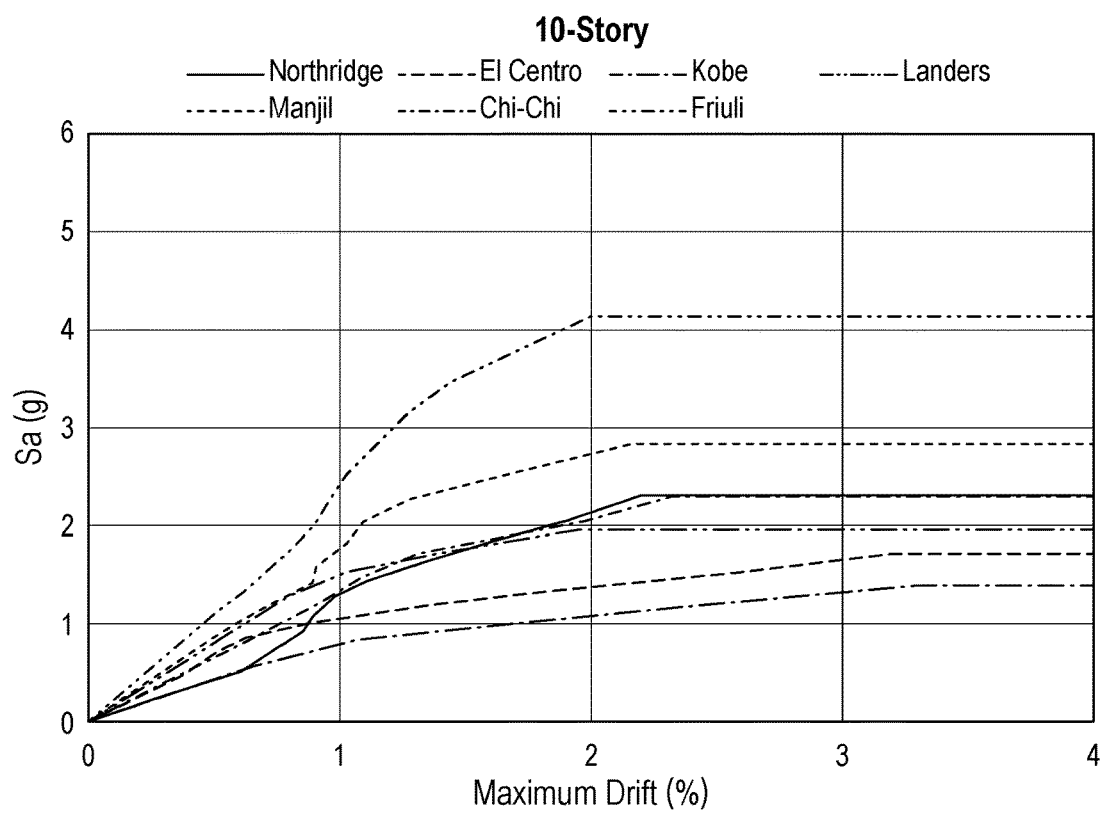
FIG. 41B is a graph showing incremental dynamic analysis of a 10-story special concentrically braced frame (SCBF) braced building.
Figure 41C:
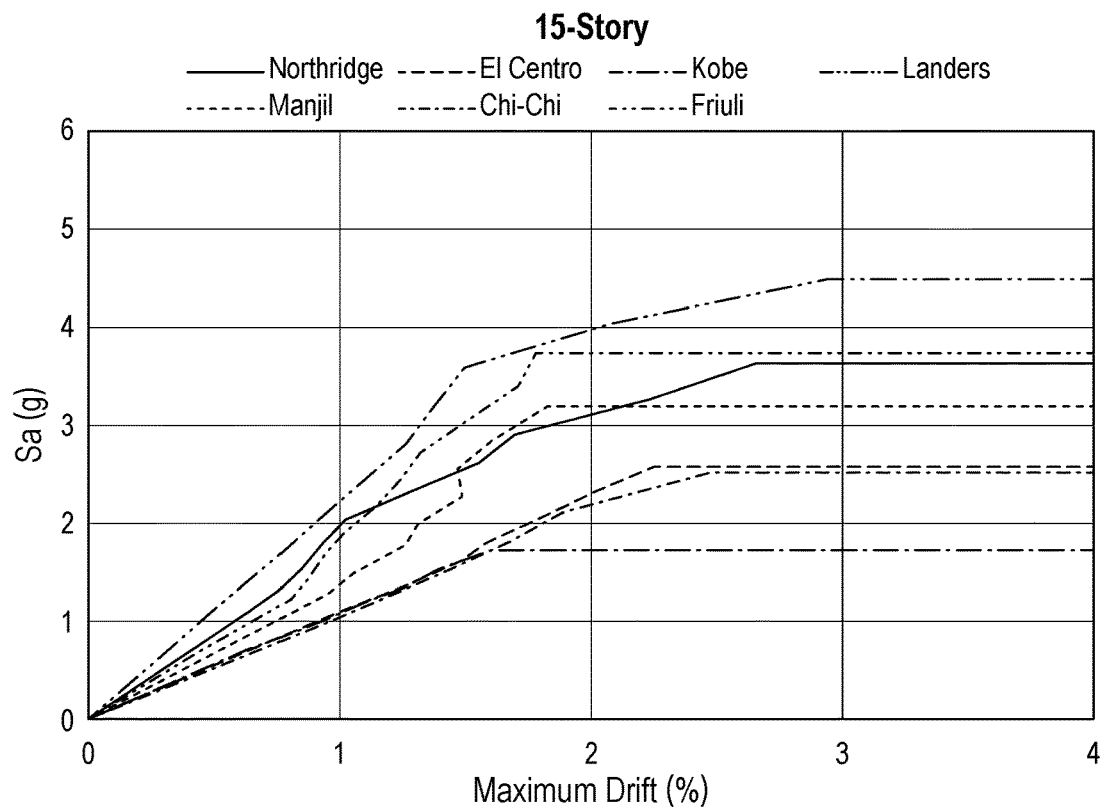
FIG. 41C is a graph showing incremental dynamic analysis of a 15-story special concentrically braced frame (SCBF) braced building.
Figure 42A:
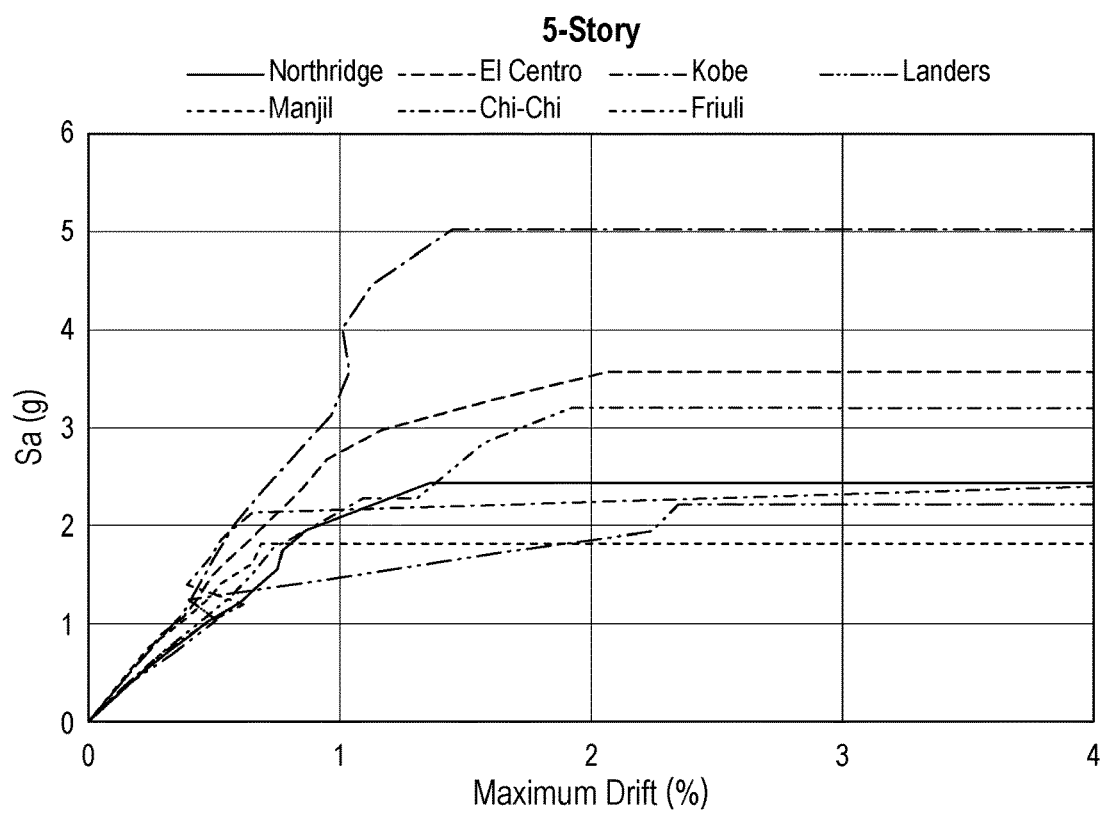
FIG. 42A is a graph showing incremental dynamic analysis of a 5-story structural bracing system (Nibellen) braced building.
Figure 42B:
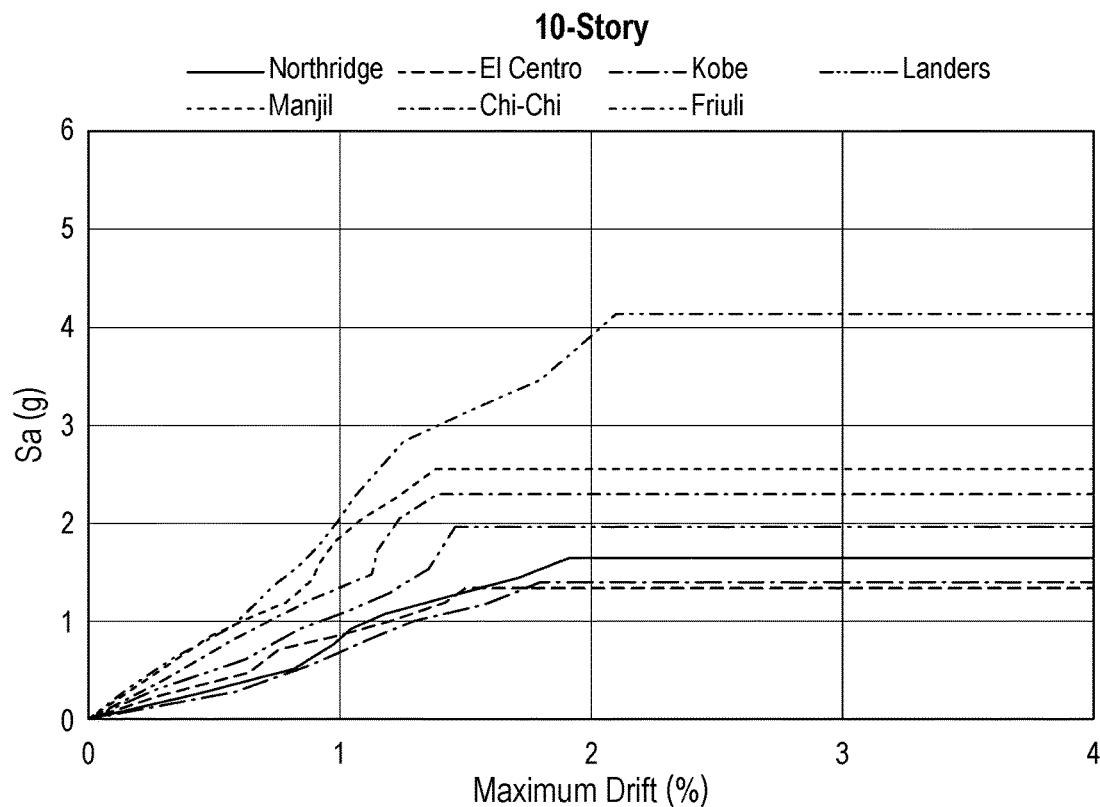
FIG. 42B is a graph showing incremental dynamic analysis of a 10-story structural bracing system (Nibellen) braced building.
Figure 42C:
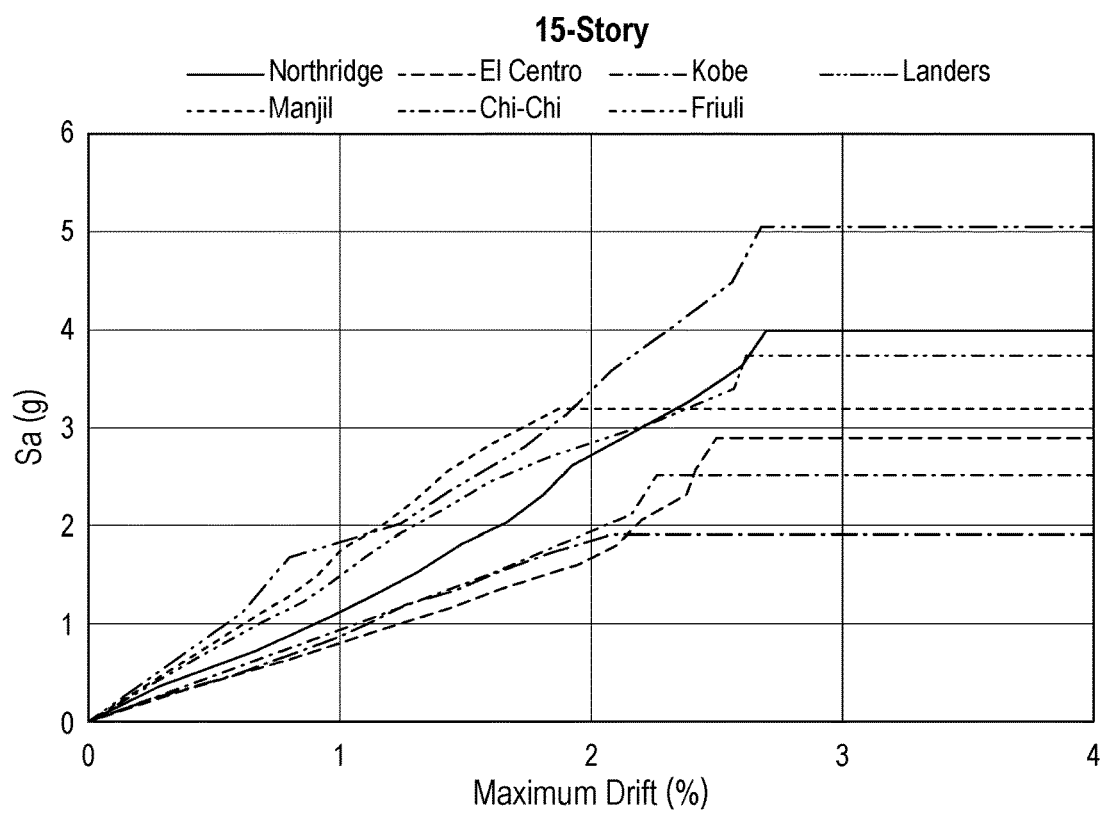
FIG. 42C is a graph showing incremental dynamic analysis of a 15-story structural bracing system (Nibellen) braced building.

FIG. 34 shows the acceleration spectra of scaled ground motions versus the target DBE for the 5-story building. The scale factors obtained by the PEER tool to match ground motions to DBE spectrum were then multiplied by 1.5 to increase the hazard level of the ground motions to the MCE level.

TABLE 18

Ground motion information

| Name | Year | Station | Magnitude | Scale Factor for 5-story buildings | Scale Factor for 10-story buildings | Scale Factor for 15-story buildings |
|---|---|---|---|---|---|---|
| Friuli | 1976 | Tolmezzo | 6.50 | 0.94 | 1.08 | 1.25 |
| Imperial Valley | 1979 | El Centro Array #11 | 6.53 | 0.88 | 0.97 | 1.04 |
| Landers | 1992 | Yermo Fire Station | 7.28 | 1.55 | 1.37 | 1.32 |
| Northridge | 1994 | BeverlyHills-12520 Mulhol | 6.69 | 0.75 | 0.89 | 1.03 |
| Kobe | 1995 | Nishi-Akashi | 6.90 | 0.64 | 0.73 | 0.81 |
| Chi-Chi | 1999 | CHY101 | 7.62 | 0.90 | 0.86 | 0.82 |
| Manjil | 1990 | Abbar | 7.37 | 0.67 | 0.77 | 0.81 |

Buildings Responses

Three dimensional models of the buildings were created in RUAUMOKO-3D (Carr, 2008), and the horizontal components of each ground motion acceleration were applied to the buildings concurrently per ASCE/SEI41-13 (2014); NIST (2017) to perform response history analyses on the building models. The aforementioned codes do not require concurrent analysis for regular buildings; however, such analyses were performed to study the behavior of the structural bracing system 12 when used in both building directions.

Columns 58, beams 56, and braces 42 were modelled to have an elastic-perfectly-plastic behavior. Structural assemblies 10 were modelled based on the cyclic behavior discussed in Hadad et al. (2021). Concrete slab with 10 cm (4 in.) thickness was used as the floor system. Plane-stress quadrilateral elements with elastic material behavior were used to model the floor system. According 178 to NIST (2017), stiffness for elastic diaphragms was calculated using expected material properties and reduced to reflect an effective stiffness based on the expected deformations and cracking. Thus, 30 percent of concrete Young's modulus was input as the in-plane stiffness, and concrete Poisson's ratio was input as the Poisson's ratio of the quadrilateral elements.

The maximum inter-story drift ratio for each building was obtained for each ground motion, and then the average of the seven values was calculated and reported as the average of maximum inters-story ratio. The results are shown in FIGS. 35A to 37B. Based on FIGS. 35A and 35B, the 5-story building experienced more drift in comparison to the structural bracing system 12 building at both DBE and MCE hazard levels. This figure also shows the drift difference between the SCBF system and the structural bracing system 12 was increased as the SCBF system experienced more plastification at the MCE level. FIGS. 36A-37B show the drift values of the two systems were close to each other in the 10- and 15-story buildings at both DBE and MCE hazard levels. Since the SCBF system did not experience significant plastic deformations in the 10- and 15-story buildings, the drift values of the two systems in the selected mid-rise and high-rise buildings did not show a great difference. Comparison of FIGS. 35A to 37B also reveals that the maximum drift occurred at lower levels in the 5-story buildings while the 10- and 15-story buildings experienced the maximum drift at the higher levels.

FIGS. 38A to 40B show representative roof displacement histories for Friuli ground motion at different hazard levels. According to FIGS. 38A and 38B, the structural bracing system did not experience any permanent deformation while the SCBF systems experienced a considerable amount of residual deformation. FIGS. 39A-40B show the amount of residual deformation was decreased as the building height was increased.

Incremental Dynamic Analysis (IDA) and Fragility Curves

In order to evaluate the performance of seismic systems, probable damage states were identified for each brace type. Also, the inter-story drift at which each damage states occurred was obtained by performing Incremental Dynamic Analysis (IDA) (Vamvatsikos, D. and C. A. Cornell (2002). "Incremental dynamic analysis," Earthquake engineering & structural dynamics, Vol. 31, No. 3, pp. 491-514) on the buildings. FIGS. 41A-42C show the results of IDA for the buildings. The vertical axis shows the spectral acceleration of the ground motions, and the horizontal axis shows the maximum inter-story drift. The ground motion records were scaled up incrementally until the systems reached collapse. Collapse state was defined as the numerical instability of response history analysis due to the yielding and plastic deformations of gravity members leading to excessive deformations in the building.

Fragility function measures the probability of reaching a specific damage state under earthquake excitation at a certain inter-story drift. Equation 34 (above) was used to obtain the fragility function of the systems. According to FEMA-P58 (2018), fragility estimates obtained with as few as seven ground motions per intensity level are likely to be of comparable quality to those obtained using a greater number of ground motions (order of thirty).

In order to build the fragility curves, two damage states were considered for a SCBF brace: (1) brace compression buckling, and (2) brace tensile yielding. Three damage states were defined for a brace 42 including one or more structural assemblies 10: (1) structural assembly 10 reaching the tensile force corresponding to 6% strain in Nitinols, (2) structural assembly 10 reaching stack's maximum compression force, and (3) HSS section in the brace 42 including one or more structural assemblies 10 reaching compression buckling force. The strain of 6% was selected for Nitinol because this material experiences permanent deformations when deformed beyond 6% strain in tension (DesRoches et al., 2004). Table 19 lists the drift ratio median (θ) and dispersion (β) values for all the selected damage states in all three buildings for the SCBF system and the structural bracing system 12. The mean and dispersion values for each damage state were obtained by tracking the member's state (force) versus maximum inter-story drift at different increments of the dynamic analysis and saving the value once it reached the damage state limit. Since larger brace sections experienced each damage states at larger drifts, the brace sections in the buildings were categorized into three groups based on the brace unit weight. The 5-story building had one brace group (Group 1), the 10-story building had two brace groups (Group 2 braces were used in levels 1 to 5, and Group 1 braces were used in levels 6 to 10), and the 15-story building had three brace groups (Group 3 braces were used in levels 1 to 5, Group 2 braces were used in levels 6 to 10, Group 1 braces were used in levels 11 to 15).

Figure 43A:
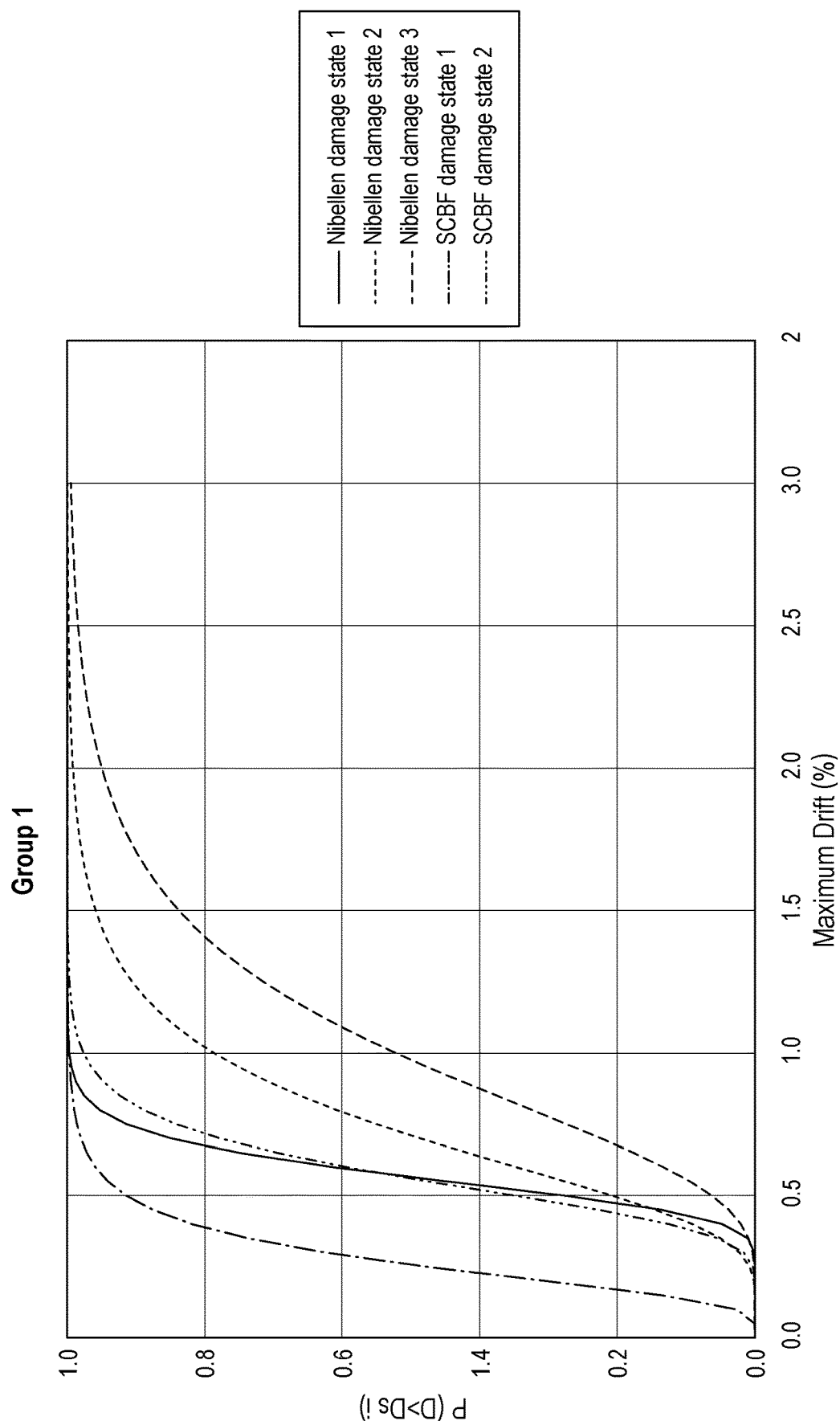
FIG. 43A is a graph showing performance fragility curves of brace group 1 for a structural bracing system (Nibellen) braced building and a special concentrically braced frame (SCBF) braced building.
Figure 43B:
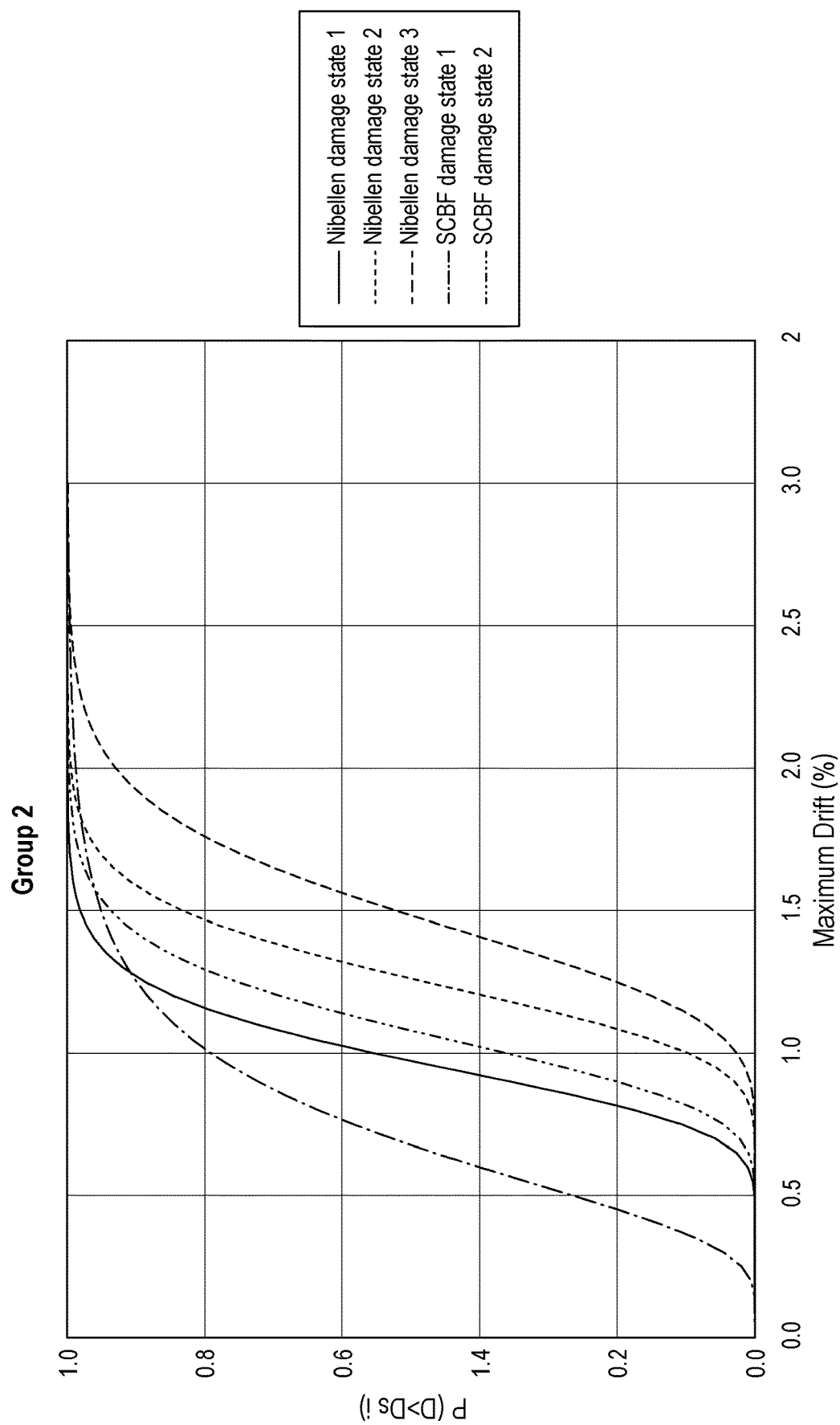
FIG. 43B is a graph showing performance fragility curves of brace group 2, similar to FIG. 43A.
Figure 43C:
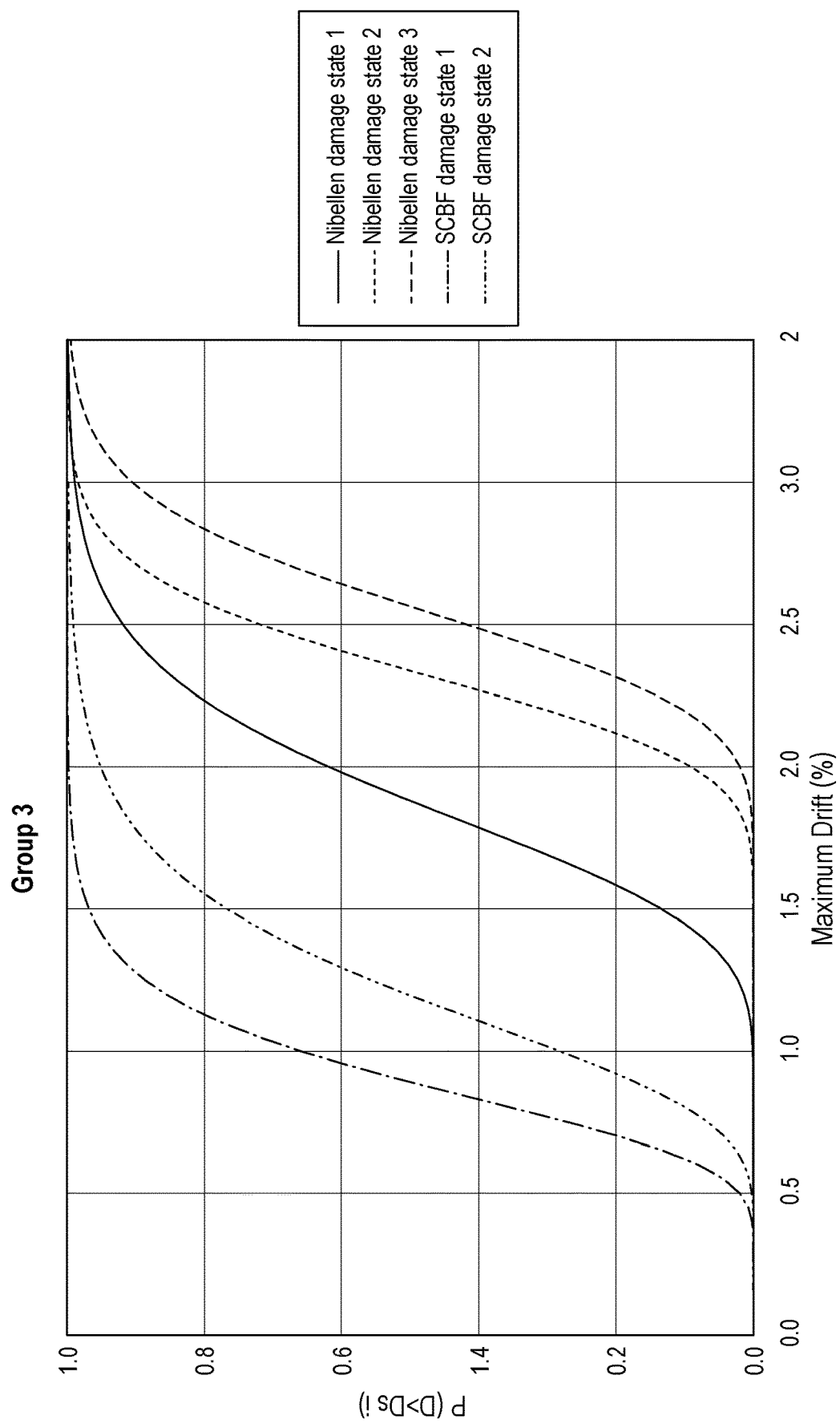
FIG. 43C is a graph showing performance fragility curves of brace group 3, similar to FIG. 43A.

As seen from Table 19, the mean drift ratio (θ) causing damage state i (i=1, 2) in brace group n (n=1, 2, 3) of SCBF brace is lower than the corresponding value for the brace 42 including one or more structural assemblies 10, i.e., the SCBF brace experiences damage state i at lower drift values when compared to the structural bracing system 12. The dispersion of the drift ratios (β) in each damage state determines the extent to which the fragility curve is stretched. FIGS. 43A-43C show all the fragility curves based on the defined damage states in the systems. Considering a certain group of braces (e.g., Group 1) for a certain damage state (e.g., Damage state 1), the fragility curve for the brace 42 including one or more structural assemblies 10 is lower than the SCBF brace curve (FIG. 43A) which means the brace 42 including one or more structural assemblies 10 is less likely to experience the damage state at a given drift value when compared to the SCBF brace. This observation matches the median drift values presented in Table 19: the median drift value for damage state 1 in SCBF Group 1 braces (θ=0.29) is lower than the corresponding value in the structural bracing system 12 (θ=0.58) indicating SCBF system experiences this damage earlier in comparison to the structural bracing system 12.

Consequence functions are relationships that indicate the potential distribution of losses as a function of damage state and translate damage into potential repair and replacement costs as well as repair time. The consequence functions for the bracing systems were developed based on PACT supporting material and digital libraries (FEMA-P58, 2018), construction costs data (Gordian, 2018), and estimated construction costs shown in FIGS. 33A-33C. This data was input into PACT.

Figure 44A:
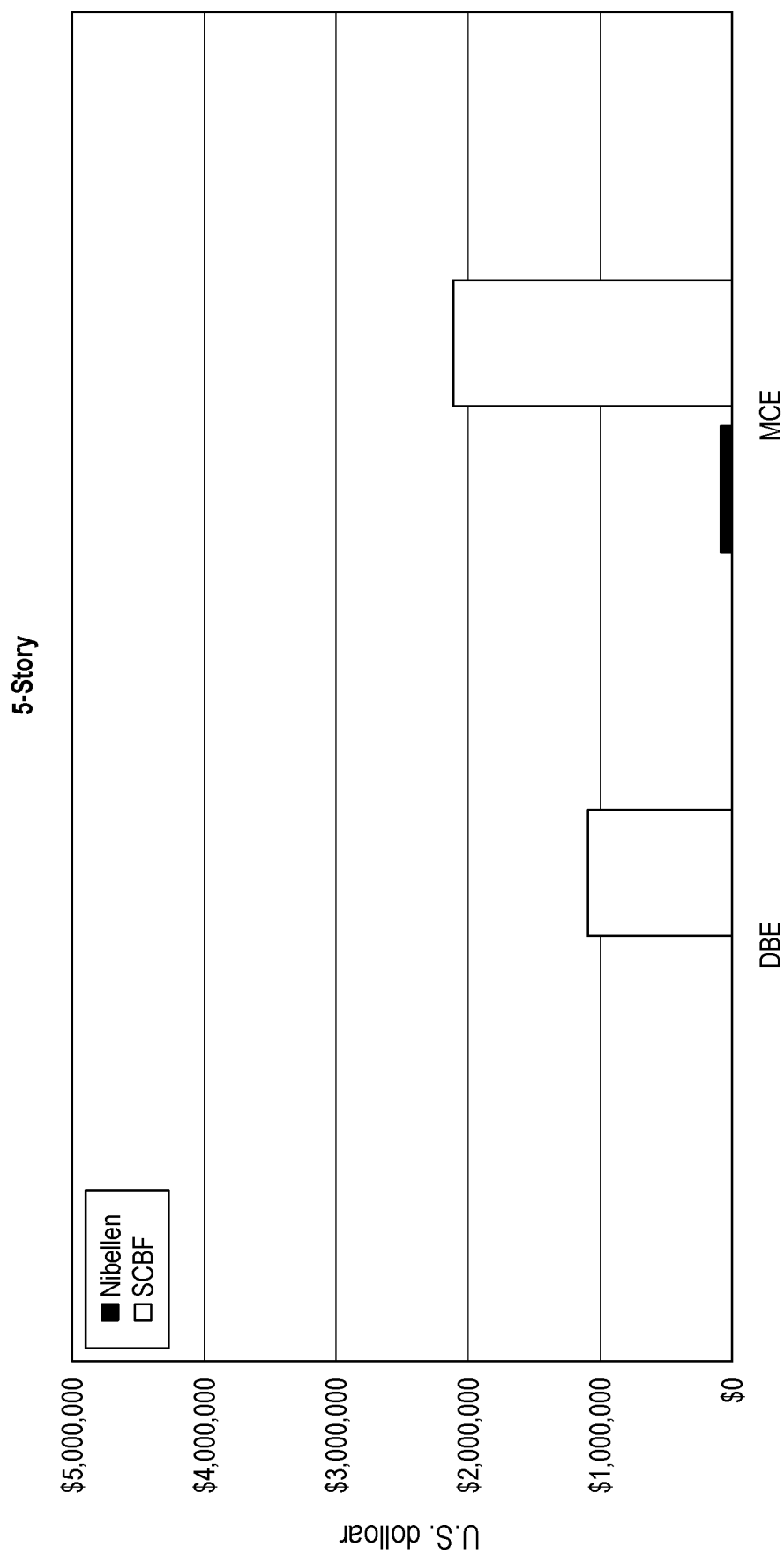
FIG. 44A is a graph showing repair cost of a 5-story structural bracing system (Nibellen) braced building and a 5-story special concentrically braced frame (SCBF) braced building at DBE and MCE hazard level.
Figure 44B:
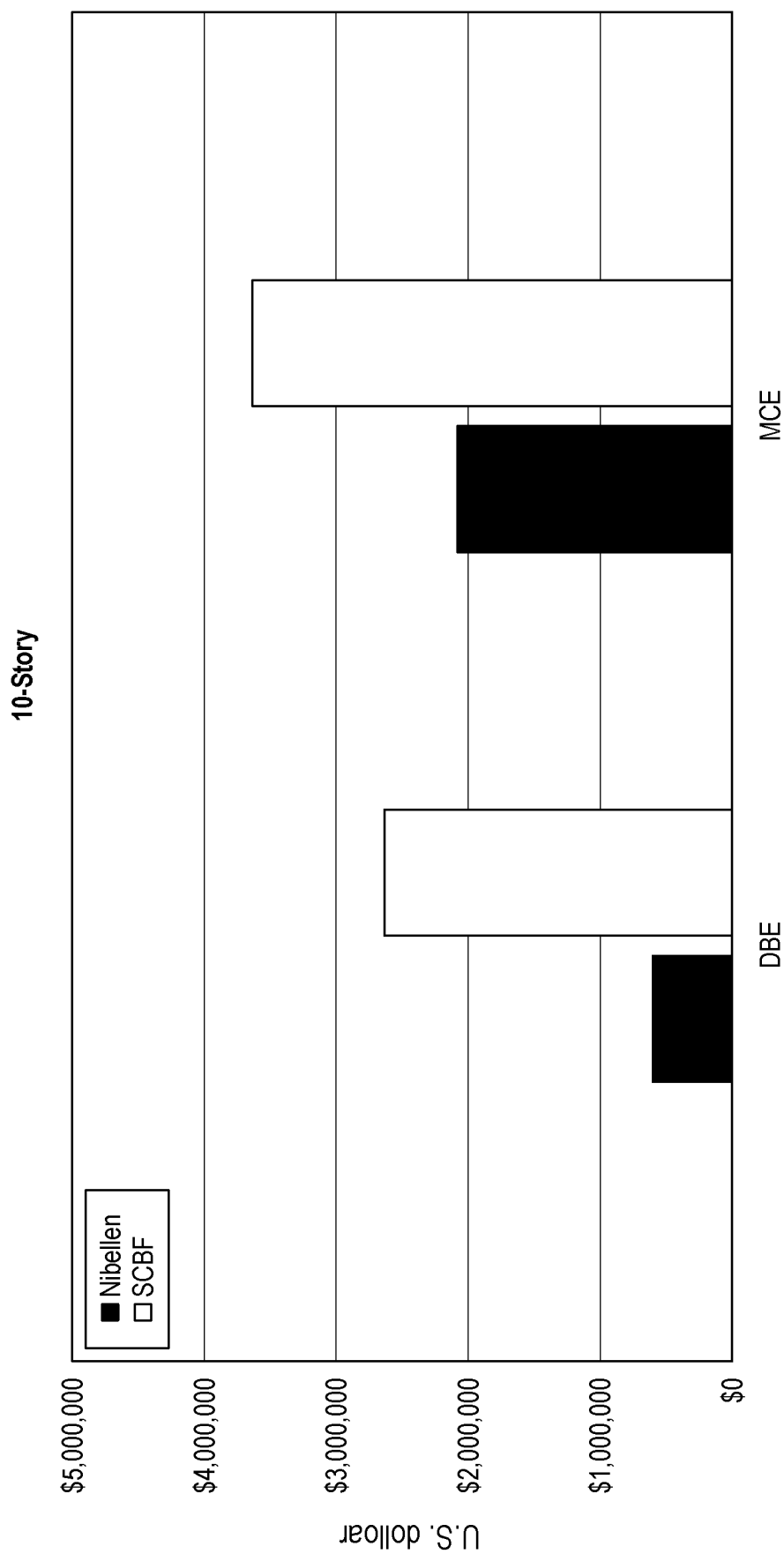
FIG. 44B is a graph showing repair cost for 10-story buildings, similar to FIG. 44A.
Figure 44C:
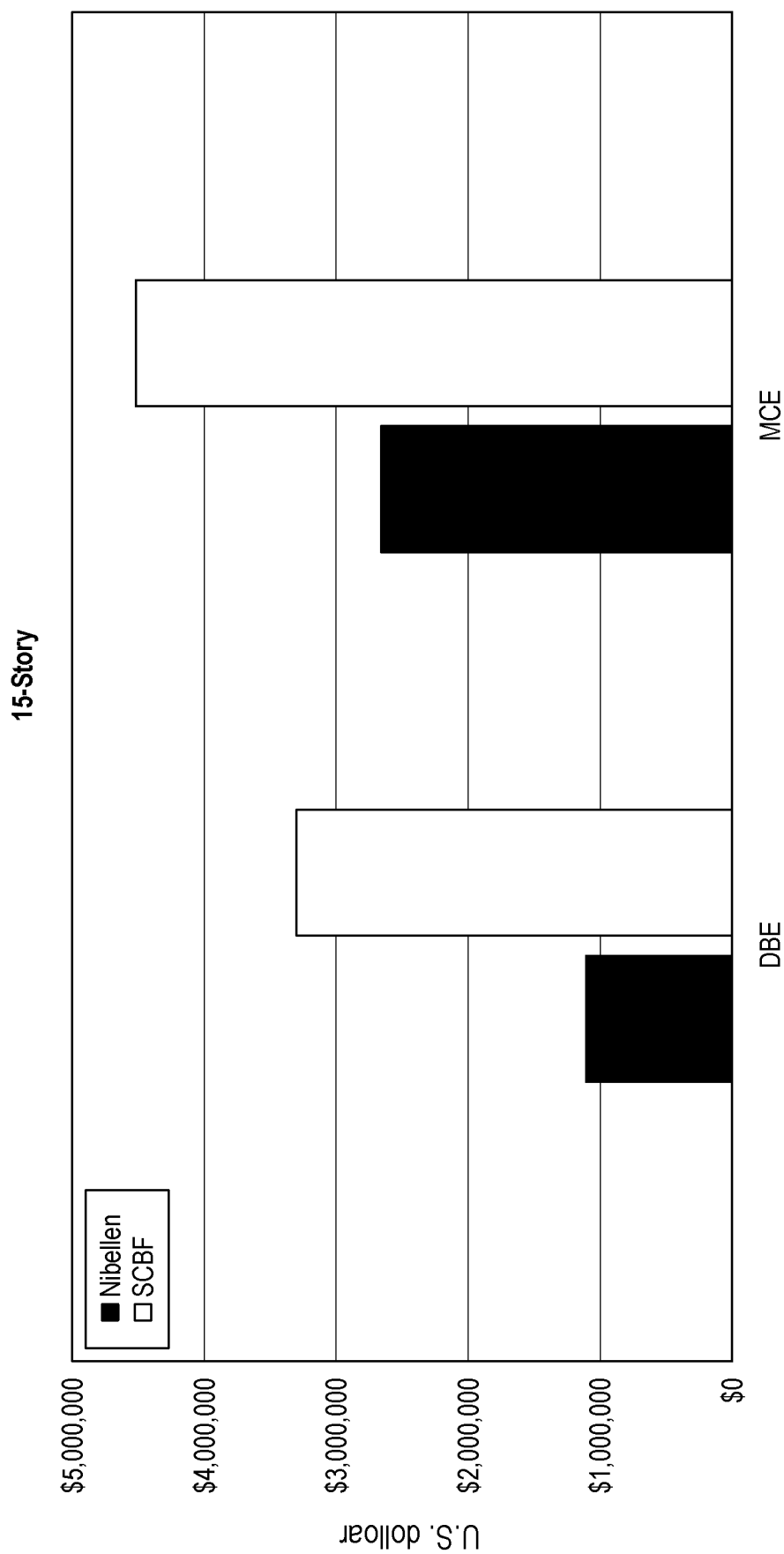
FIG. 44C is a graph showing repair cost for 15-story buildings, similar to FIG. 44A.

The structural loss, the repair cost, and the repair time were determined by inputting the defined fragility functions, consequence functions, and the maximum inter-story drift values into PACT. FIGS. 44A-44C compares the total repair cost of the buildings for each of the hazard levels. Although the application of the structural bracing system 12 in the 5-story building increased the total construction cost by 4%, it removed 100% and 95% of the repair costs at the DBE and MCE hazard level, respectively. The repair cost in the 10-story structural bracing system 12 building was lower than the SCBF building repair costs by 76% and 42% at the DBE and MCE hazard levels, respectively. Similarly for the 15-story building, the repair costs of structural bracing system 12 at DBE and MCE hazard levels were 66% and 41%, respectively lower than those in the SCBF system. Thus, the application of the structural bracing system 12 in high-rise buildings (10- and 15-story) reduces both the construction costs (see FIGS. 33A-33C) and repair costs (see FIGS. 44A-44C).

The structural bracing system 12 experienced some damage at all the applied hazard levels in the 10- and 15-story buildings; however, the repair costs for the damage were lower than those in the SCBF system. Such lower damage in the structural bracing system 12 is due to the application of different elements in the braces 42 including one more structural assemblies 10 in comparison to the SCBF brace. In the brace 42 including one or more structural assemblies 10, Nitinol rods 16 are the first elements to experience damage corresponding to tensile strain values of 6% or more. At higher loads, the compression disks 14 experience full deformation that ultimately leads to buckling of the HSS section. Thus, for different load intensities, only some elements of the brace 42 might need to be replaced due to damage while the other elements remain undamaged. In the

TABLE 19

Brace fragility groups and parameters

| Brace type | Group | $W_{brace}\left(\frac{lb}{ft}\right)$ | Damage State 1 | | Damage State 2 | | Damage State 3 | |
| --- | --- | --- | --- | --- | --- | --- | --- | --- |
| | | | θ | β | θ | β | θ | β |
| SCBF | 1 | $0 \leq W_{brace} < 45$ | 0.29 | 0.49 | 0.59 | 0.29 | — | — |
| | 2 | $45 \leq W_{brace} < 70$ | 0.77 | 0.48 | 1.10 | 0.21 | — | — |
| | 3 | $70 \leq W_{brace}$ | 0.93 | 0.28 | 1.26 | 0.31 | — | — |
| Structural | 1 | $0 \leq W_{brace} < 45$ | 0.58 | 0.21 | 0.79 | 0.43 | 1.08 | 0.44 |
| Bracing | 2 | $45 \leq W_{brace} < 70$ | 1.00 | 0.21 | 1.28 | 0.18 | 1.51 | 0.20 |
| System | 3 | $70 \leq W_{brace}$ | 1.92 | 0.39 | 2.35 | 0.26 | 2.58 | 0.29 |

Resiliency of Systems

Equation (30), which was defined by Bruneau et al. (2003), was used to measure the resiliency of systems. In this equation, R is the resiliency of the system, Q (t) is the functionality of the system under consideration which is defined in Equation (31). The structural loss was calculated based on Equation (32). Linear recovery function ($f_{rec}$) was shown in Equation (33).

SCBF brace, however, the entire brace buckles once it reaches the compressive strength which requires replacement of the entire brace.

Figure 45A:
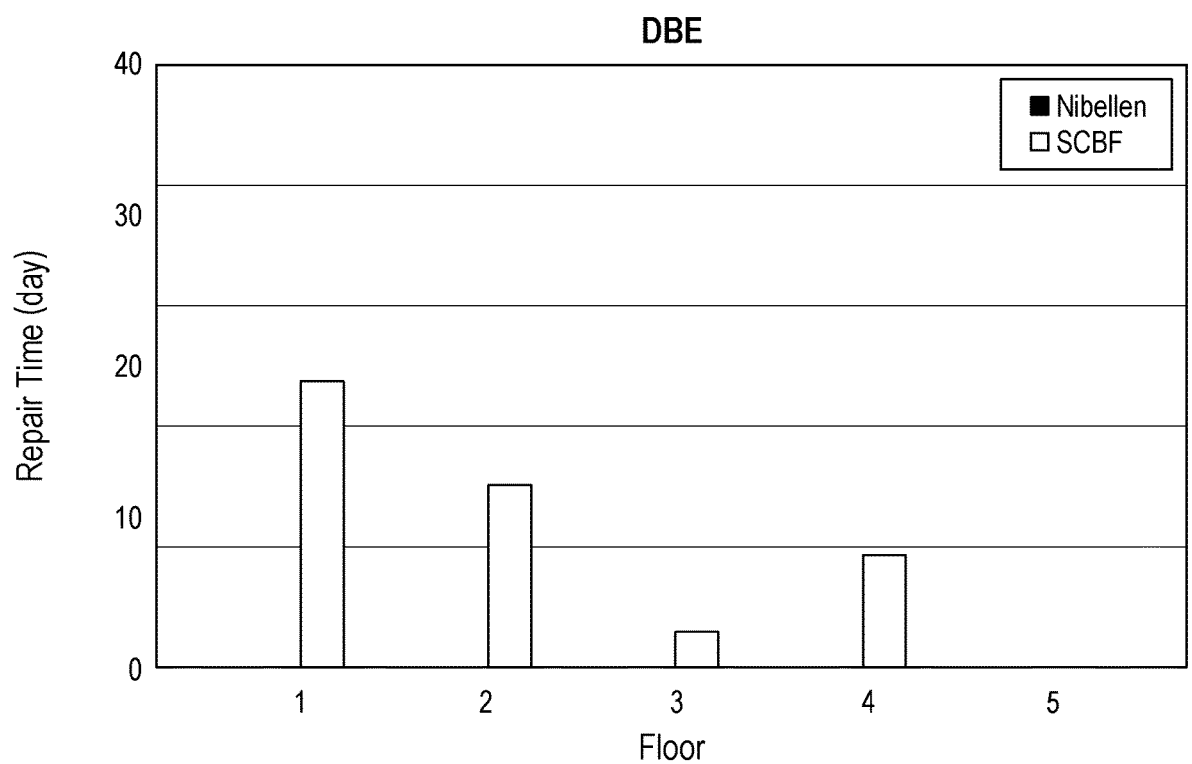
FIG. 45A is a graph showing repair time for a 5-story structural bracing system (Nibellen) braced building and a 5-story special concentrically braced frame (SCBF) braced building at DBE hazard level.
Figure 45B:
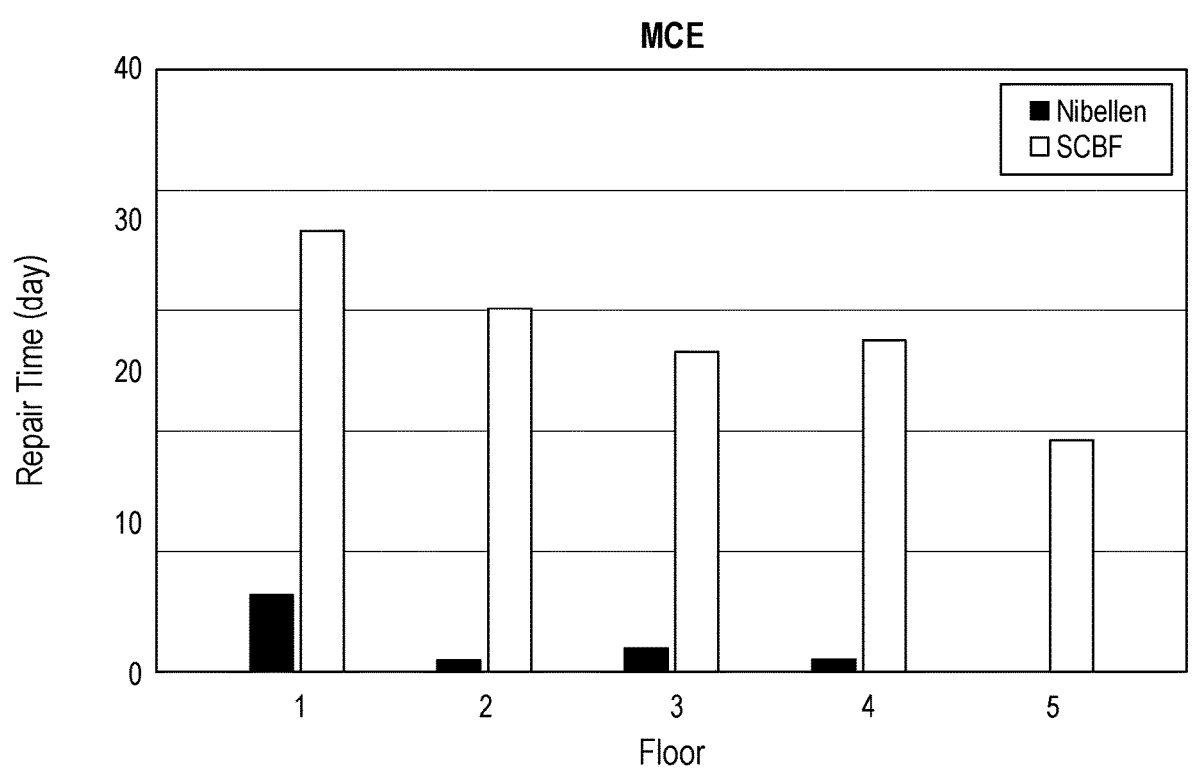
FIG. 45B is a graph showing repair time for 5-story buildings at MCE hazard level, similar to FIG. 45A.
Figure 46A:
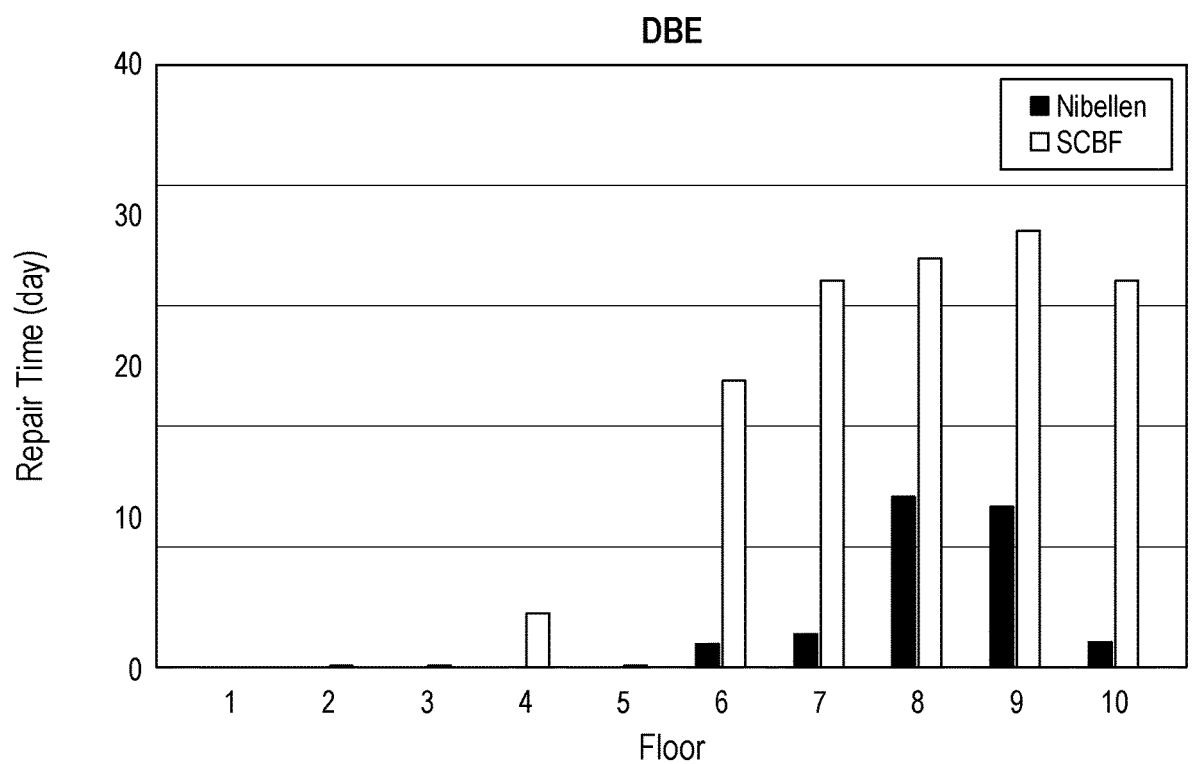
FIG. 46A is a graph showing repair time for a 10-story structural bracing system (Nibellen) braced building and a 10-story special concentrically braced frame (SCBF) braced building at DBE hazard level.
Figure 46B:
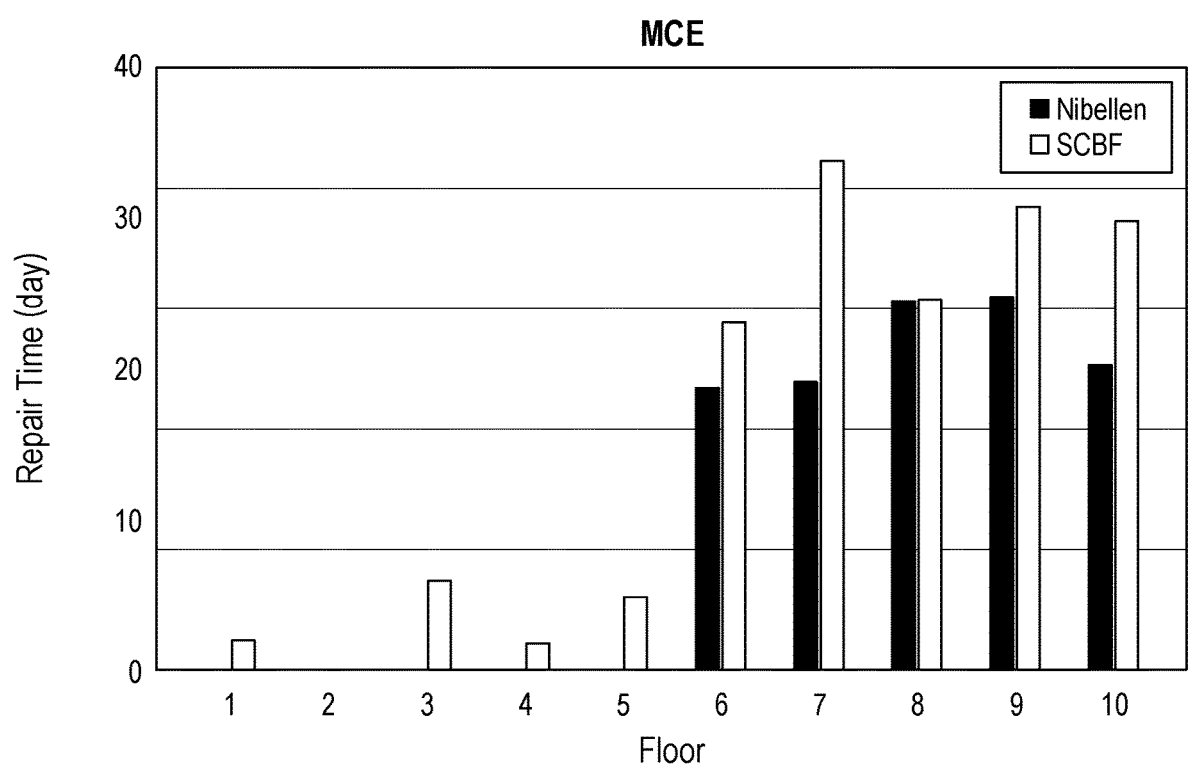
FIG. 46B is a graph showing repair time for 10-story buildings at MCE hazard level, similar to FIG. 46A.
Figure 47A:
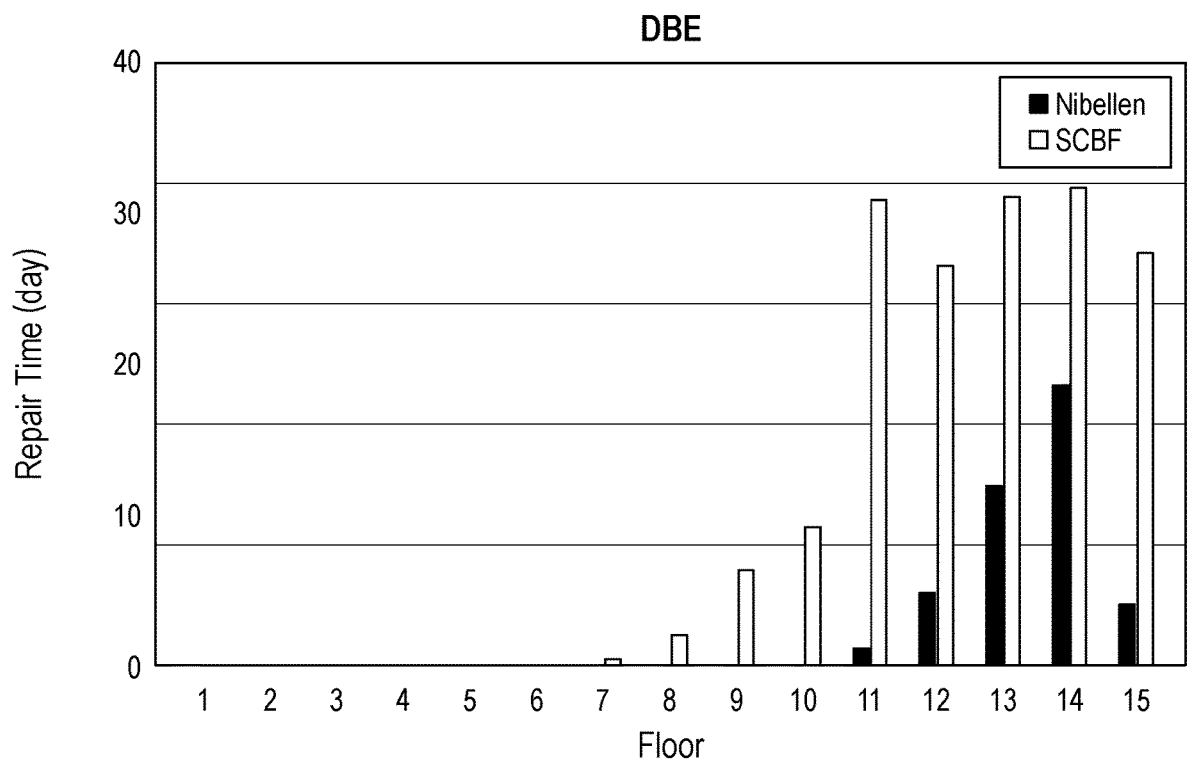
FIG. 47A is a graph showing repair time for a 15-story structural bracing system (Nibellen) braced building and a 15-story special concentrically braced frame (SCBF) braced building at DBE hazard level.
Figure 47B:
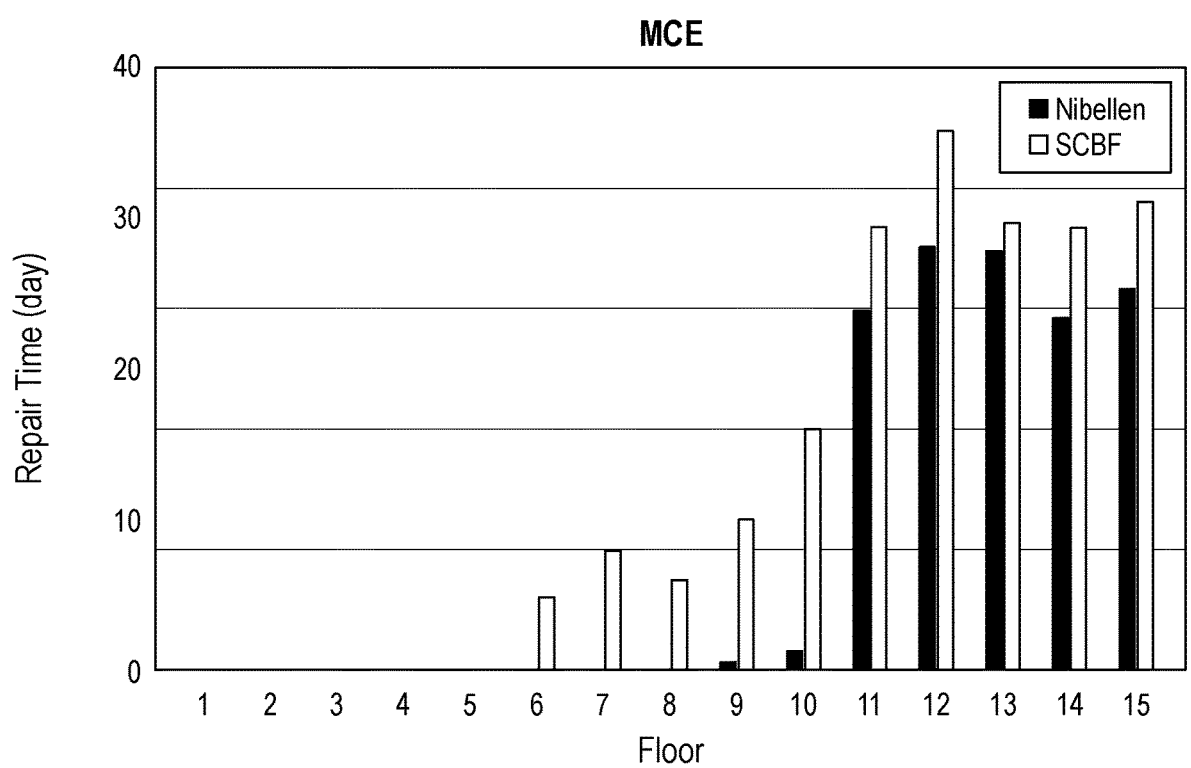
FIG. 47B is a graph showing repair time for 15-story buildings at MCE hazard level, similar to FIG. 47A.
Figure 48A:
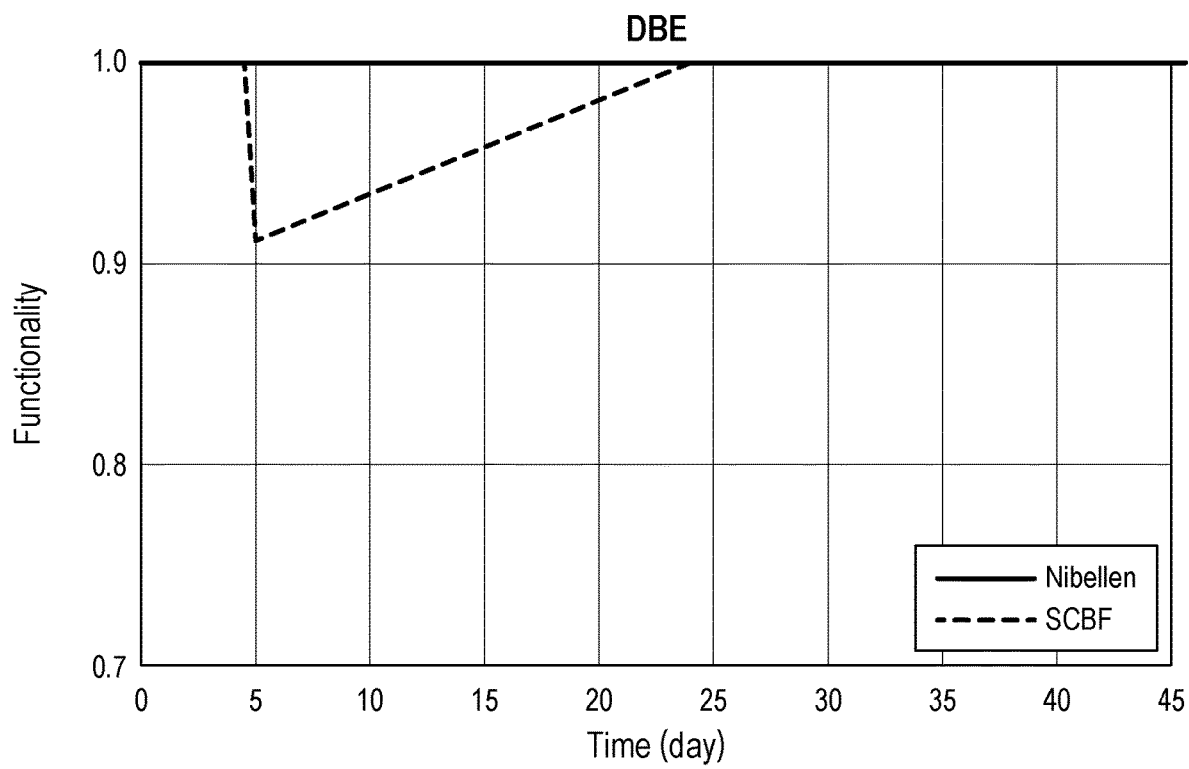
FIG. 48A is a graph showing functionality curves for a 5-story structural bracing system (Nibellen) braced building and a 5-story special concentrically braced frame (SCBF) braced building at DBE hazard level.
Figure 48B:
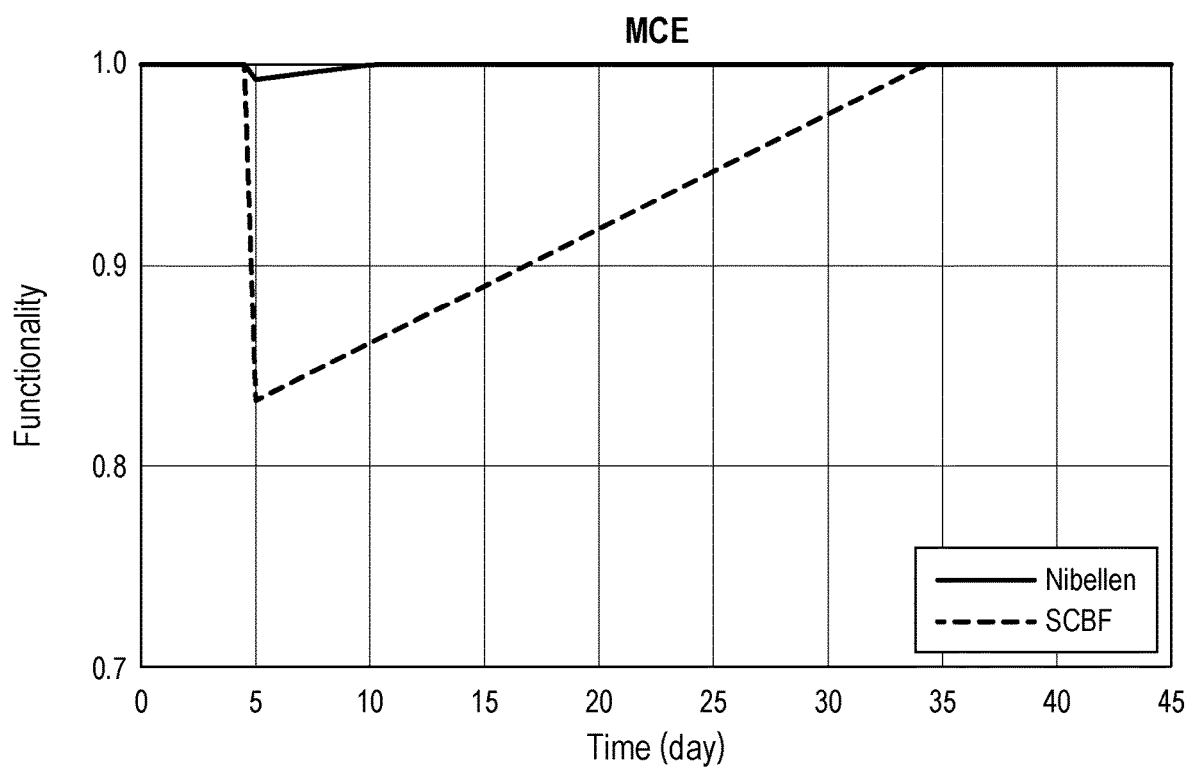
FIG. 48B is a graph showing functionality curves for 5-story buildings at MCE hazard level, similar to FIG. 48A.
Figure 49A:
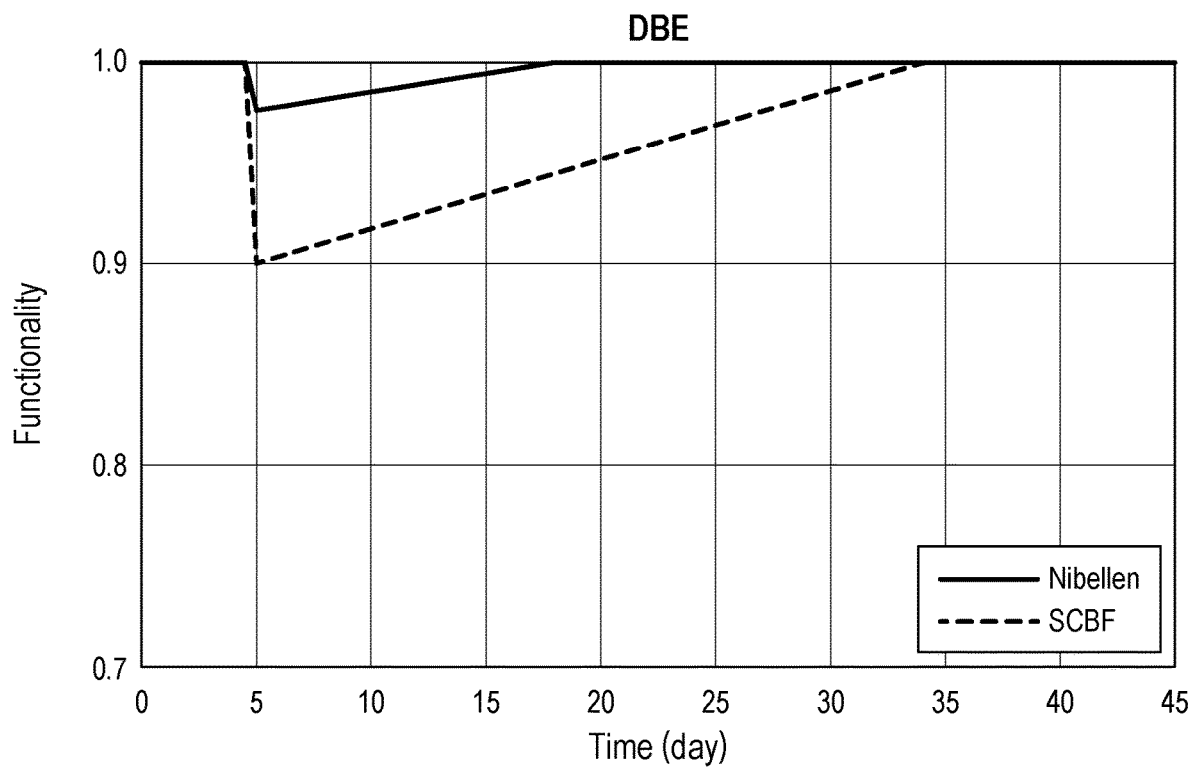
FIG. 49A is a graph showing functionality curves for a 10-story structural bracing system (Nibellen) braced building and a 10-story special concentrically braced frame (SCBF) braced building at DBE hazard level.
Figure 49B:
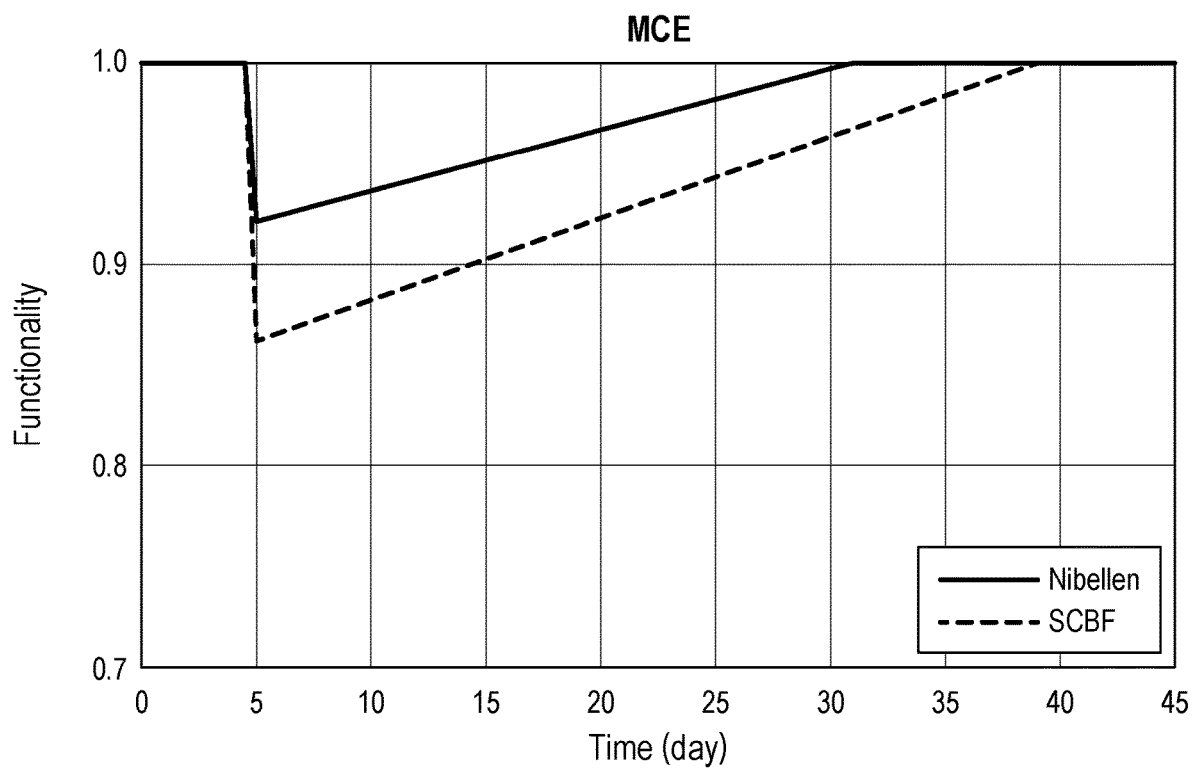
FIG. 49B is a graph showing functionality curves for 10-story buildings at MCE hazard level, similar to FIG. 49A.
Figure 50A:
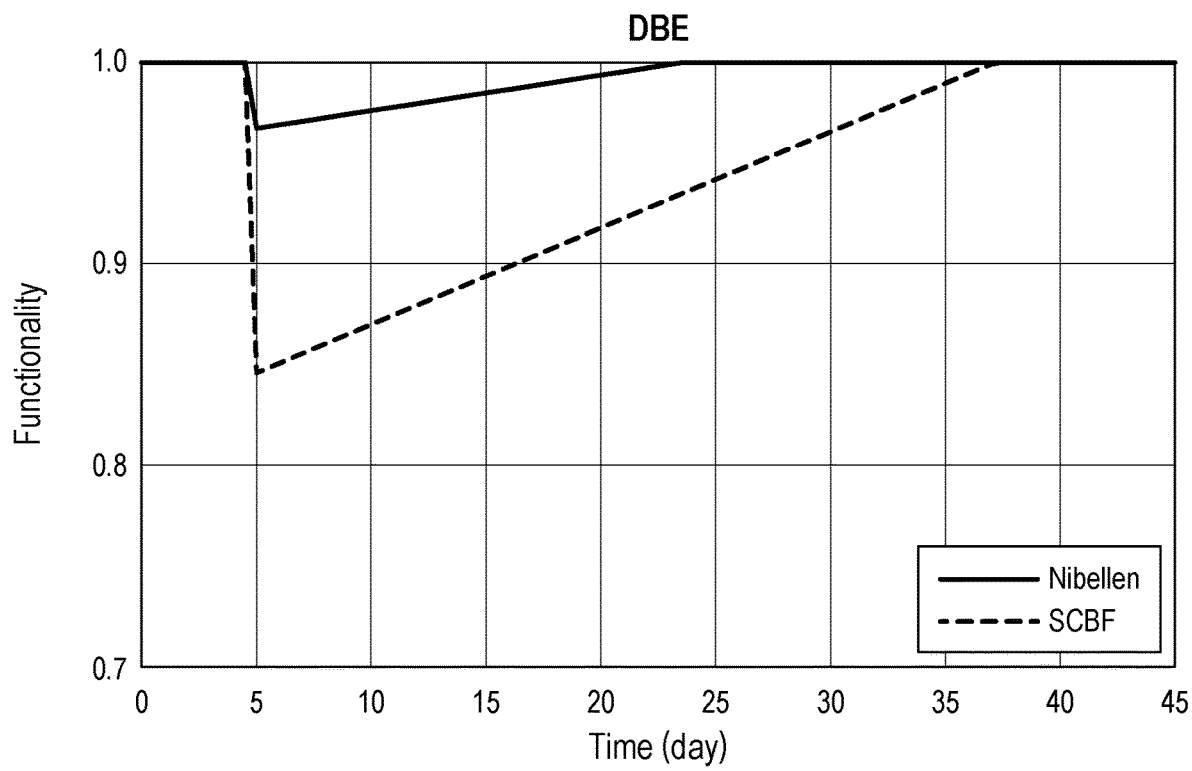
FIG. 50A is a graph showing functionality curves for a 15-story structural bracing system (Nibellen) braced building and a 15-story special concentrically braced frame (SCBF) braced building at DBE hazard level.
Figure 50B:
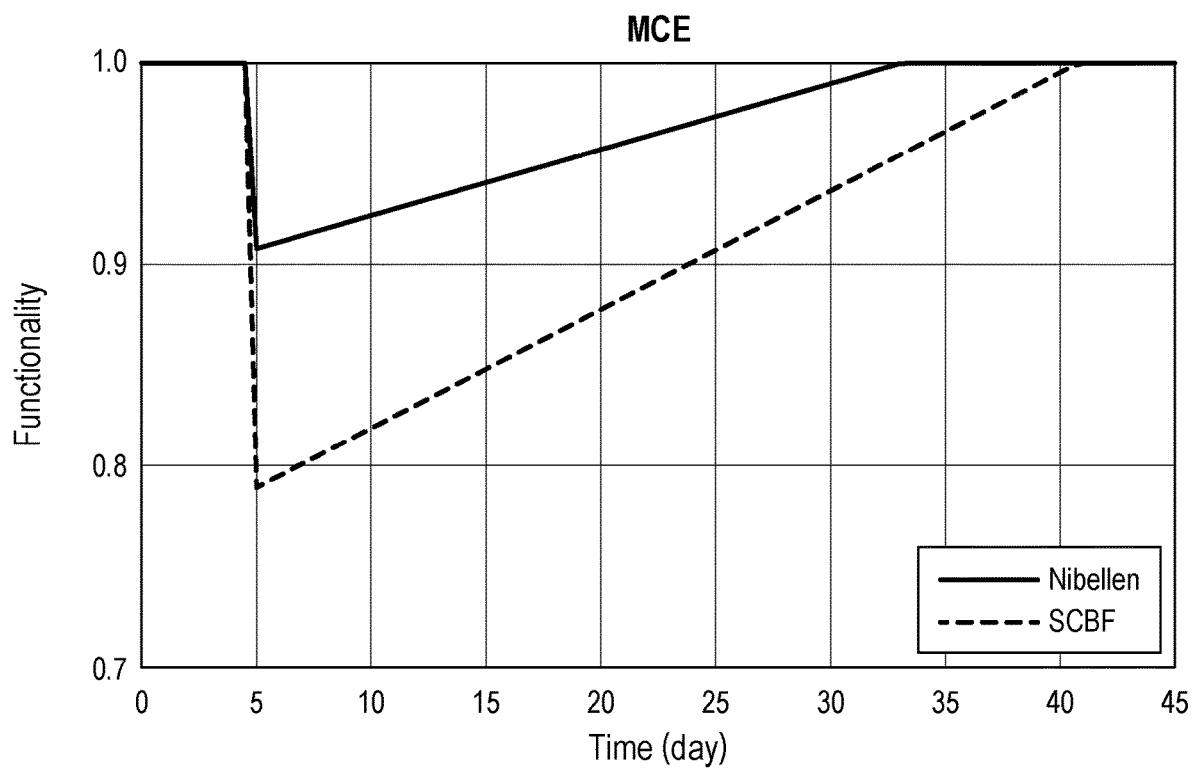
FIG. 50B is a graph showing functionality curves for 15-story buildings at MCE hazard level, similar to FIG. 50A.

FIGS. 45A to 47B compare the repair time of the buildings required for each floor when different levels of ground motion hazard were applied to the buildings. The floors were assumed to be repaired concurrently. Since the 5-story structural bracing system building 12 did not experience any damage at the DBE hazard level, the repair times for this building are zero in FIGS. 45A and 45B. FIGS. 45A and 45B also shows lower levels of the 5-story buildings experienced more damage in comparison to the upper levels. This behavior was reversed in the 10- and 15-story buildings (FIGS. 46A-47B) in which the majority of damage occurred in the upper levels. Such observations are similar to the trend of the maximum inter-story drift ratios shown in FIGS. 35A-37B.

FIGS. 48A to 50B show the functionality (Q) of the systems. Initially the functionality was 100% since there was no initial damage. The ground motion was arbitrarily assumed to occur after 5 days once monitoring the buildings' functionality began (i.e., $t_{OE}$ is 5). As observed earlier through the repair cost and time diagrams, the 5-story structural bracing system 12 building did not experience any damage at the DBE hazard level. This is reflected in the functionality curve of FIG. 48A. The steady horizontal functionality curve means no disruption on the system performance. The graphs show a greater decrease in the functionality of systems when the intensity of ground motions increased. It should be noted that the functionality curves are only based on the performance of the braces in order the compare the brace 42 including one or more structural assemblies 10 versus SCBF brace. Inclusion of other structural and non-structural members leads to greater decrease in the functionality curves due to the damages incurred in such members.

Resiliency (R) of the systems was obtained by calculating the area under the functionality curves based on Equation (30). Table 20 shows the resiliency of the buildings at different hazard levels. According to these results, application of the structural bracing system 12 improved the resiliency of all buildings by 5% on average at all the considered hazard levels. Since only the damage in the braces was the only loss metric in the buildings ($L_s$), the resiliency values are relatively close. Inclusion of fragility curves and consequence functions for other structural and non-structural members is expected to result in a greater variation of the values.

TABLE 20

Resiliency of buildings (%)

| System | Number of stories | Hazard level 1 | Hazard level 2 |
|---|---|---|---|
| Structural Bracing System | 5 | 100 | 97 |
| | 10 | 99 | 96 |
| | 15 | 98 | 97 |
| SCBF | 5 | 93 | 91 |
| | 10 | 96 | 93 |
| | 15 | 93 | 91 |

CONCLUSION

In order to assess the seismic performance of the structural bracing system 12, two groups of buildings were evaluated. The structural bracing system 12 was used as the lateral force resisting system in the first group, and the other group had SCBF system. Each group consisted of 5-, 10-, and 15-story buildings. Two levels of seismic hazard were considered and a suite of seven ground motions were applied to the buildings to evaluate seismic performance. The first hazard level had 10% probability of occurrence in 50 years (DBE), and the second had 2% probability of occurrence in 50 years (MCE).

While the SCBF buildings experienced residual deformations under some ground motions at the DBE and MCE hazard level, the structural bracing system 12 did not experience any residual deformation. The nonlinear elastic behavior of the structural assembly 10 enables the system to resist the earthquake load without permanent deformations. The maximum inter-story drift ratios showed the 5-story SCBF system experienced more drift in comparison to the structural bracing system 12 at lower levels. In the 10- and 15-story buildings, however, the drift values were close and both systems experienced the maximum drift at upper levels.

The estimated construction cost of the structural bracing system 12 was 4% higher than that in the SCBF system for 5-story buildings. In the 10- and 15-story buildings, however, the estimated construction cost of the structural bracing system 12 buildings was 25% and 35%, respectively, lower than that in the SCBF buildings. The brace mechanism forces in the structural bracing system 12 were closer leading to lower demands in the chevron beams 56 and the supporting columns 58 in the braced frame 36. Thus, lighter beam and column section were required in the braced bays of the structural bracing system 12. Inclusion of additional design equations in the structural bracing system 12 in order to have equal tension and compression mechanism forces in the brace 42 including one or more structural assemblies 10 will further reduce the demands on chevron beams 56 and columns 58 which results in lighter sections for those members. Lighter sections reduce construction costs in the structural bracing system 12.

Fragility curves were generated for both systems by performing incremental nonlinear dynamic analyses of three-dimensional models. Consequence functions were also generated for the systems to estimate the loss in each system after seismic events. To determine the resiliency of the structural bracing system 12, the level of damage and the associated repair costs were quantified. The structural bracing system 12 required less repair time and cost in comparison to the SCBF system in all buildings when the systems were evaluated under different hazard levels. According to the measured resiliency values, application of the structural bracing system 12 improved the resiliency of all buildings by 5%, on average for all the considered hazard levels.

While the present invention has been illustrated by the description of various embodiments and while these embodiments have been described in some detail, it is not the intention of the Applicant to restrict or in any way limit the scope of the invention to such detail. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A structural assembly, the assembly comprising:
   an upper plate, the upper plate including at least one aperture;
   a lower plate, the lower plate including at least one aperture and the lower plate located a distance below the upper plate;
   a plurality of Belleville disks, the plurality of Belleville disks stacked one on top of another to form a stack of Belleville disks, the stack of Belleville disks located between the upper plate and the lower plate; and
   at least one shape memory alloy rod, an upper end of the at least one shape memory alloy rod inserted into the at least one aperture in the upper plate and a lower end of the at least one shape memory alloy rod inserted into the at least one aperture in the lower plate such that the at least one shape memory alloy rod spans the distance between the upper plate and the lower plate.

2. The structural assembly of claim 1, wherein the upper plate is a rectangular steel plate having four corners, the at least one aperture of the upper plate including four apertures, each of the four corners of the upper plate including an aperture, and
wherein the lower plate is a rectangular steel plate having four corners, the at least one aperture of the lower plate including four apertures, each of the four corners of the lower plate including an aperture.

3. The structural assembly of claim 1, wherein the stack of Belleville disks is arranged into groups of Belleville disks, the Belleville disks within a group of the groups arranged in parallel, the groups of Belleville disks arranged in series.

4. The structural assembly of claim 3, wherein the stack of Belleville disks comprises two groups of Belleville disks arranged in series, each group of the two groups comprising 11 Belleville disks arranged in parallel.

5. The structural assembly of claim 3, wherein the stack of Belleville disks comprises one group of Belleville disks arranged in series, the group comprising 21 Belleville disks arranged in parallel.

6. The structural assembly of claim 3, wherein the stack of Belleville disks comprises two groups of Belleville disks arranged in series, each group of the two groups comprising six Belleville disks arranged in parallel.

7. The structural assembly of claim 3, wherein the stack of Belleville disks comprises one group of Belleville disks arranged in series, the group comprising 18 Belleville disks arranged in parallel.

8. The structural assembly of claim 1, wherein the upper end of the at least one shape memory alloy rod extends through the at least one aperture of the upper plate and the lower end of the at least one shape memory alloy rod extends through the at least one aperture of the lower plate,
wherein the upper end and the lower end of the at least one shape memory alloy rod are threaded, and
wherein an upper nut is removably fastened to the upper end of the at least one shape memory alloy rod and a lower nut is removably fastened to the lower end of the at least one shape memory alloy rod.

9. The structural assembly of claim 1, wherein the at least one shape memory alloy rod includes four shape memory alloy rods.

10. The structural assembly of claim 1, wherein the at least one shape memory alloy rod is a Nitinol rod.

11. The structural assembly of claim 1, wherein the at least one shape memory alloy rod does not carry a load when the structural assembly is in compression, and
wherein the at least one shape memory alloy rod carries the load when the structural assembly is in tension.

12. The structural assembly of claim 1, the assembly further comprising:
a shaft located at a center of the stack of Belleville disks, the stack of Belleville disks arranged on and surrounding the shaft between the upper plate and the lower plate, the shaft stabilizing the structural assembly.

13. The structural assembly of claim 12, wherein the at least one aperture of the upper plate includes a central aperture, the central aperture located at or near a center of the upper plate, and
wherein an upper end of the shaft is inserted into the central aperture of the upper plate such that the shaft spans the distance between the upper plate and the lower plate.

14. The structural assembly of claim 12, wherein the shaft is a hollow steel tube.

15. A structural bracing system, the system comprising:
a rectilinear frame, the frame including beam elements operatively connected to column elements;
a plurality of brace elements, the brace elements arranged in a chevron orientation and operatively connected to the frame; and
at least one structural assembly operatively connected to an end of each of the brace elements, the structural assembly comprising:
an upper plate, the upper plate including at least four apertures;
a lower plate, the lower plate including at least four apertures and the lower plate located a distance below the upper plate;
a stack of Belleville disks located between the upper plate and the lower plate; and
at least four Nitinol rods, an upper end of each Nitinol rod inserted into an aperture of the at least four apertures in the upper plate and a lower end of each Nitinol rod inserted into an aperture of the at least four apertures in the lower plate.

16. The structural backing system of claim 15, wherein the plurality of brace elements include a compression brace and a tension brace, and wherein both the compression brace and the tension brace include at least one structural assembly attached to an end thereof.

17. The structural bracing system of claim 15, wherein the structural assemblies are operatively connected to both ends of the brace elements.

18. The structural bracing system of claim 15, wherein the at least one structural assembly is operatively connected to a gusset plate of the frame via steel C-shaped sections.

19. The structural bracing system of claim 15, wherein the at least one structural assembly is welded to the brace element.

20. The structural bracing system of claim 15, the structural assembly further comprising:
a shaft located at a center of the stack of Belleville disks, the stack of Belleville disks arranged on and surrounding the shaft between the upper plate and the lower plate, the shaft stabilizing the structural assembly.

* * * * *